United States Patent [19]

Hill et al.

[11] Patent Number: 4,597,082

[45] Date of Patent: Jun. 24, 1986

[54] TRANSCEIVER FOR MULTI-DROP LOCAL AREA NETWORKS

[75] Inventors: Lawrence W. Hill, Arlington; Frederick W. Sarles, Lexington, both of Mass.

[73] Assignee: Controlonics Corporation, Westford, Mass.

[21] Appl. No.: 586,863

[22] Filed: Mar. 6, 1984

[51] Int. Cl.[4] ............... G08C 25/02; G06F 11/00; H04L 27/06

[52] U.S. Cl. .......................... 371/32; 375/8; 375/42; 375/99

[58] Field of Search ............ 375/75, 92, 8, 99, 104, 375/41; 329/105; 371/32, 33

[56] References Cited

U.S. PATENT DOCUMENTS 3,757,226 9/1973 Stover ........................ 375/99

*Primary Examiner*—Marc E. Bookbinder
*Attorney, Agent, or Firm*—F. Eugene Davis, IV

[57] ABSTRACT

A multi-drop local area network utilizes alternating current power lines as a transmission channel. Identical transceivers are used as a master and as up to 255 slaves. Each transceiver comprises modulator and demodulator units and a microprocessor control unit which may be connected to a host. The modulator and demodulator are connected to the alternating current power line through a high pass filter comprising a split bobbin, iron core transformer having an air gap which also provides impedance matching. The demodulator includes a clipper and analog circuitry providing a band pass filter and generating a square wave corresponding to the received carrier. A state machine acting as a digital filter produces a received carrier signal only when each half cycle of the carrier square wave is of the proper duration and the carrier signal has existed for slightly more than one half of the transmitted bit duration, which is a predetermined number of carrier cycles.

The microprocessors are programmed to provide for block ahead acknowledgment, alternate transmissions between master and slaves; each block message comprises an acknowledgment non-acknowledgment bit, a message sequence bit, a polling sequence bit, and a longitudinal redundancy check. The carrier frequency utilized lies in the range of 20 to 40 KHz and preferably within the range between 27 and 33 KHz for a power line transmission channel. Error free 1200 Baud transmission rates are achieved in full duplex. Higher carrier frequencies and transmission rates are possible over less noisy transmission channels such as wire pairs.

4 Claims, 21 Drawing Figures

FIG. 3

| HOST OUTPUT MASTER INPUT | HOST INPUT MASTER OUTPUT | SLAVE 01 OUTPUT | SLAVE 01 INPUT | SLAVE 02 OUTPUT | SLAVE 02 INPUT |
|---|---|---|---|---|---|
| ^A01 HELLO, ADDRESS 1 | ACK FE SOMETHING | HELLO, ADDRESS 1 | SOMETHING | | |
| ^B02 48656C6C6F 7264647265 73736263 | ACK 02 536F6D657 468 696E6742 6163 6B | | | HELLO ADDRESS 2 | SOMETHING BACK |
| ^A01 | ACK 01 SOMETHING HAPPENED | | SOMETHING HAPPENED | | |
| ^A03 | NACK 03 | | | | |
| ^A00 BROADCAST | ACK 00 | BROADCAST | | BROADCAST | |

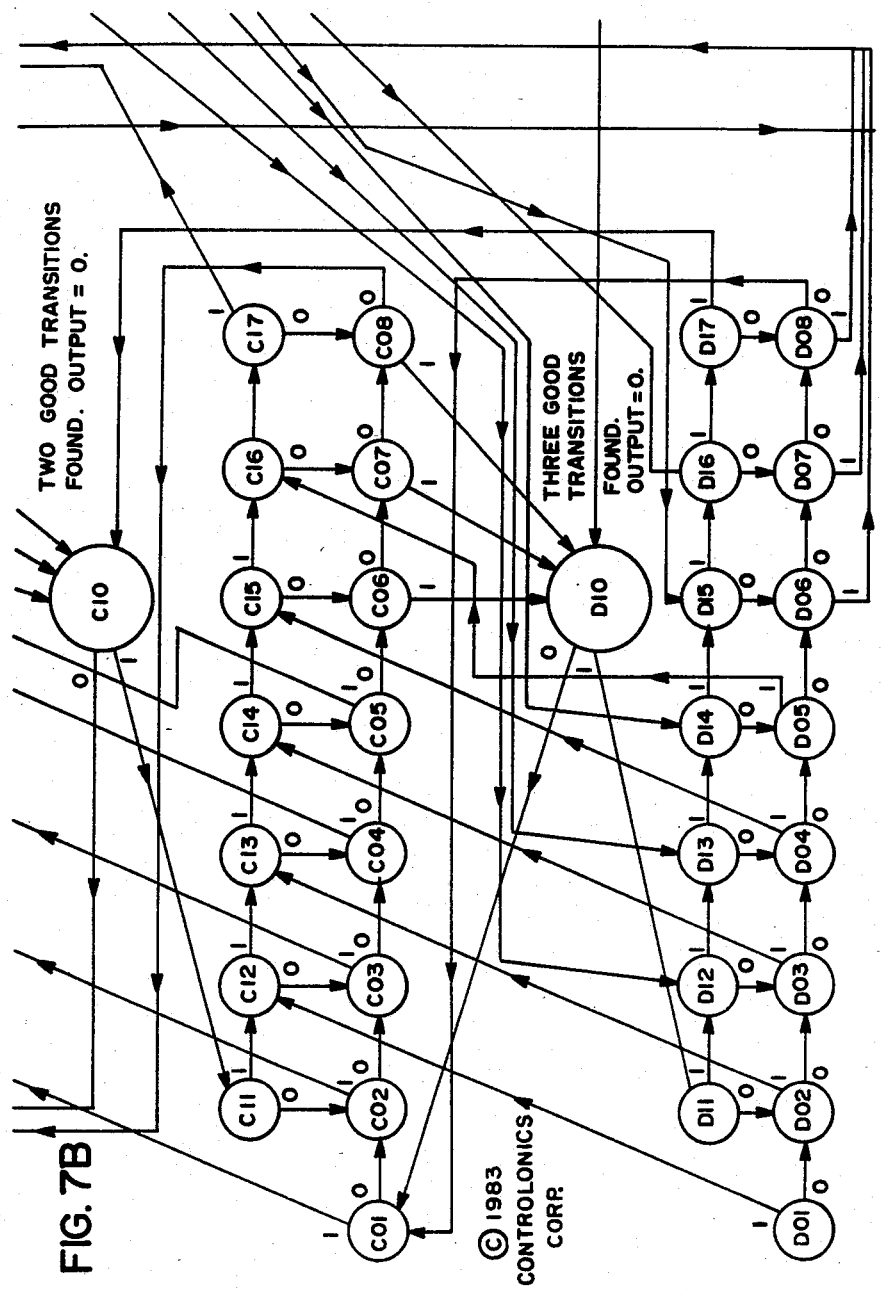

© CONTROLONICS 1983 CORP.

EIGHT GOOD TRANSITIONS FOUND. OUTPUT = 1.

ONE GOOD TRANSITION MISSED. OUTPUT = 1.

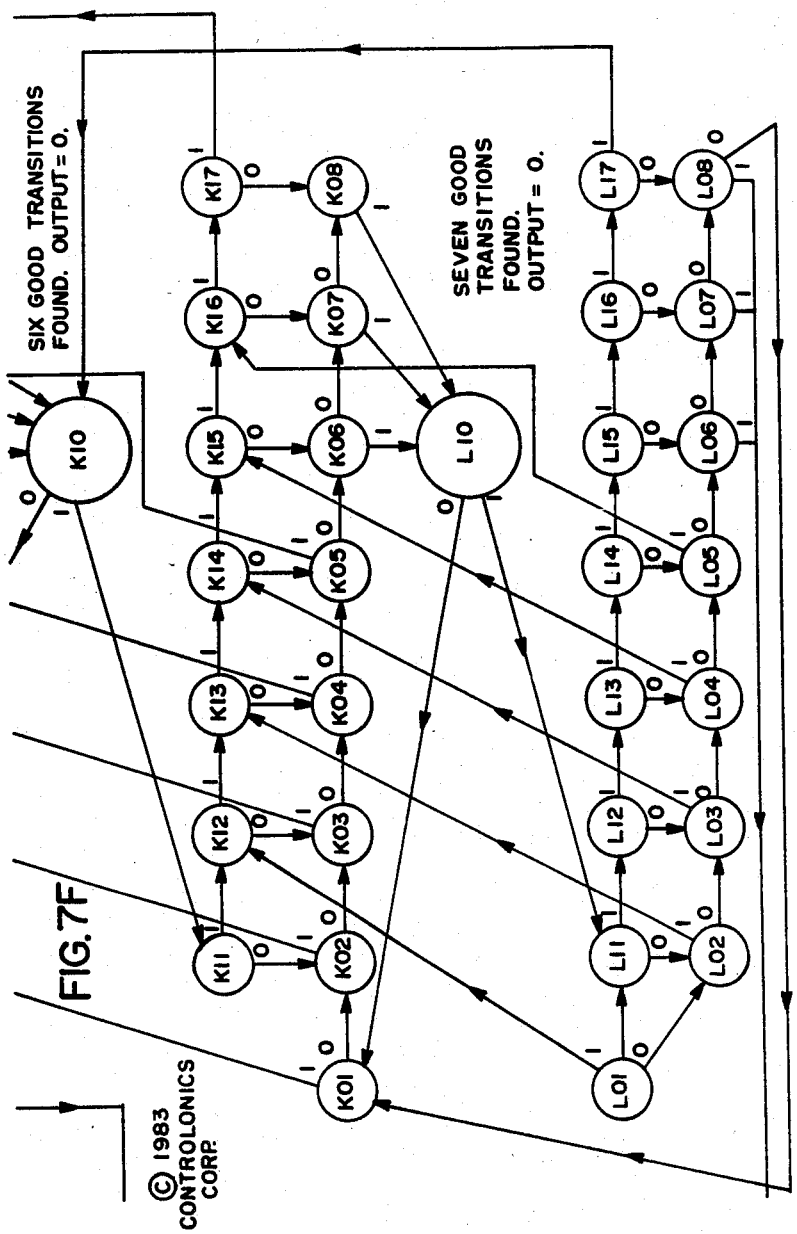

FIG. 8

SEQUENCE ROM CONTENTS (INTEL HEX FORMAT)

```
:200000000001000209030A040B050C060D070E080009A010B010C010D010E010F010010FO
:20002000001118121913131A141B151C161D081801190110A011B011C011D1F1E1F00IF17204E
:200040000282129222A2232B242C252D262E102812291322A142B152C162D2F2E2F172F273002
:2000600003831393239333A33343C353D363E1F3821392223A233B243C253D803E802780000090C
:200080000484149424A434B444C454D464E474F5049424434B444C454D465E465F40584058
:2000A0000585159525A535B545C555D565E575F6059525A535B545C555D565E505F40684068
:2000C0000686169626A636B646C656D666E676F7069626A636B646C656D6665F507850468
:2000E0000787172727373747479757A767B777CC07272A767B607C60C86000000000000A6
:200100000378189828A838B848C858D868E878F2F89318A328B338C348D358E908F90379048F
:200120000889199929A939B949C959D969E979F8099829A839B849C859D869EA09FA088A027
:200140000098A1A9A2AAA3ABA4ACA5ADA6AEA7AF90A992AA93AB94AC95AD96AEB0AFB098B007
:20016000 A8B1B9B2BAB3BBB4BCB5BDB6BEB7BFA0B9A2BAA3BBA4BCA5BDA6BE40BF40A84067
:200180000C8C1C9C2CAC3CBC4CCC5CDC6CEC7CFD0C9C2CAC3CBC4CCC5CDC6CE70CF70D87047
:2001A000D8D1D9D2DAD3DBD4DCD5DDD6DED7DFE0D9D2DAD3DBD4DCD5DDD6DECODFC0E8C067
:2001C000E8E1E9E2EAE3EBE4ECE5EDE6EEE7EFF0E9E2EAE3EBE4ECE5EDE6EEDOEFDOF8D047
:2001E000F8F1F2F2F3F3F4F4F9F5FAF6FBF7FC08F2F2FAF6FBEOFCE000E0000000000025
:00000001FF
```

© 1983 CONTROLONICS CORP.

FIG. 11

| CHAR \ BIT | 9 | 8 | 7 | 6 | 5 | 4 | 3 | 2 | 1 | |
|---|---|---|---|---|---|---|---|---|---|---|
| 1 | P | $A_{OK}$ | 0 | $A_{DR}$ | $S_{EQ}$ | $C_4$ | $C_3$ | $C_2$ | $C_1$ | → CONTROL BYTE |
| 2 | P | $A_8$ | $A_7$ | $A_6$ | $A_5$ | $A_4$ | $A_3$ | $A_2$ | $A_1$ | → ADDRESS |
| 3 | P | | D | A | T | A | # | 1 | | |
| 4 | P | | D | A | T | A | # | 2 | | |
| 5 | P | | D | A | T | A | # | 3 | | |
| 6 | P | | D | A | T | A | # | 4 | | |
| 7 | P | | D | A | T | A | # | 5 | | |
| 8 | P | | D | A | T | A | # | 6 | | |
| 9 | P | | D | A | T | A | # | 7 | | UP TO 15 BYTES DATA |
| 10 | P | | D | A | T | A | # | 8 | | |
| 11 | P | | D | A | T | A | # | 9 | | |
| 12 | P | | D | A | T | A | # | 10 | | |
| 13 | P | | D | A | T | A | # | 11 | | |
| 14 | P | | D | A | T | A | # | 12 | | |
| 15 | P | | D | A | T | A | # | 13 | | |
| 16 | P | | D | A | T | A | # | 14 | | |
| 17 | P | | D | A | T | A | # | 15 | | |
| 18 | P | | BLOCK | | CHECK | | | | | |

→ BLOCK CHECK

→ HORIZONTAL EVEN PARITY

© 1983 CONTROLONICS CORP

TRANSCEIVER FOR MULTI-DROP LOCAL AREA NETWORKS

TECHNICAL FIELD

This application relates to transceivers for multi-drop local area networks; more particularly to such transceivers connected to alternating current power lines as a transmission channel. The application also relates to the use of a state machine as a digital filter in a demodulator in such transceivers; to the use of a split bobbin, air gapped, iron core transformer for analog impedance matching and high pass filtering in such transceivers; and to the use of a microprocessor to implement error free point to point transmission utilizing block ahead acknowledgment, so as to provide a strictly transparent full duplex transmission channel between a master and any slave.

BACKGROUND ART

So-called power line carrier local area networks have been designed according to the prior art and have the acknowledged advantage of reducing wiring costs and interference with everyday work during installation. However, the prior art devices have major disadvantages; namely, in order to achieve relatively long time error free transmission they are only able to achieve low data rates. Such prior art systems have utilized carrier frequencies in the range of 90 to 400 KHz. Major problems in utilizing an alternating current power line transmission channel or any other channel subject to electromagnetic interference are noise produced by motors, light dimmers, arc welders and the like. Specific problems of AC power line transmission channels are large changes from approximately one ohm to infinity in line impedance due to changing load conditions; average low impedance of the line in the order of 10 ohms; and effective carrier signals in the single digit voltage range. Such systems have utilized error detection and correction and redundant transmission in attempts to overcome these problems.

However, one of the fastest systems according to the prior art only produces an effective transmission rate of 240 baud at half duplex.

Thus, a leading supplier in the field has acknowledged "Unfortunately, an inherent limitation of PLC (power line carrier) today is the relatively slow transmission rate. Moreover, the AC power lines can support only one channel of simultaneous communication, although with multiple carriers this can be increased to four channels. Because of its low throughput, PLC cannot be used yet for centralized automation systems in large buildings because it cannot handle the high volume of data traffic between the computer and remote sites."

It is therefore highly desirable to overcome the problems of AC transmission lines as data transmission channels and to achieve local area networks utilizing AC transmission lines as the data transmission channels which provide relatively high speed, at least 1200 baud, full duplex, transparent, data transmission. It is also highly desirable to provide a system that provides for virtually error free transmission.

It is also desirable to achieve such local area networks utilizing other transmission channels in noisy environments, such as wire pairs.

DISCLOSURE OF THE INVENTION

The present invention achieves these results by providing a transceiver that may be utilized in a multi-drop local area network comprising a master and up to 255 slave transceivers. All of the transceivers are identical, except that the slave transceivers utilize a different program in their microprocessor than the master transceiver.

Each transceiver comprises a modulator and demodulator and a microprocessor for receiving messages from the demodulator and transmitting messages to the modulator. The microprocessor is also adapted to be connected to a host unit for supplying data to the transceiver and for receiving data from the transceiver.

The modulator and demodulator of each transceiver are connected through a split bobbin, iron core transformer having an air gap to the AC power line. This transformer provides a unique analog impedance matching function in both the transmit and receive mode over the great range of time varying impedances encountered on the power line which can range anywhere from approximately one ohm to infinity together with a high pass filter characteristic. The modulator power driver is part of a switched feedback network in order to achieve the impedance matching. The demodulator comprises clipping, carrier band pass filtering, and shaping circuits for clipping and filtering noise and for providing an output signal which is the square wave analog of the received carrier.

Each demodulator also comprises a state machine which may be a programmable read only memory and a multiple latch for receiving the squared wave carrier signal and generating a data signal.

The state machine is responsive to a clock to change its state at a multiple of the carrier frequency which may be 8, for example. The other input to the state machine is the square wave carrier signal.

The state machine determines the presence or absence of carrier. In the preferred embodiment of the invention the presence of carrier indicates a "0" bit and the absence of carrier indicates a "1" bit.

The state machine makes its determination in two steps.

First, it checks the duration of each square wave cycle to see if both half cycles are of the correct duration, neither too long nor too short. If both are correct, it declares the existence of a good carrier cycle.

Second, the state machine counts the good carrier cycles. When it receives eight consecutive carrier cycles, it declares that carrier exists until eight consecutive non carrier cycles have occurred; then it declares that no carrier exists until eight consecutive good circuit cycle have occurred, and so forth.

The state machine has 512 states. There are eight state transitions per carrier cycle. It sets its output to 0 to declare receipt of good carrier, and sets its output to 1 to declare that no carrier is being received. Thus the state machine provides a digital filter centered about the carrier frequency having infinitely sharp cutoffs.

The microprocessors of the transceivers are programmed to provide for block ahead acknowledgment transmission, the message format being as follows:

| Control byte: | 1 | Bit for Ack, Nack |
|---|---|---|
| | 1 | Bit message sequence number (if set, indicate first message in |

|              | -continued |                                                                    |
|--------------|------------|--------------------------------------------------------------------|
|              |            | an interchange to a single slave)                                  |
|              | 1          | Bit for polling sequence number (increments with each polling cycle) |
|              | 1          | Bit for Master originator, vs for slave originator                 |
|              | 4          | Bits for quantity of data bytes.                                   |
| Address Byte: | ØØ        | = Broadcast                                                        |
|              | Ø1         | to FF assigned to units                                            |
| Data         |            |                                                                    |
| .            |            |                                                                    |
| .            |            |                                                                    |
| .            |            |                                                                    |
| Date 15      | Ø–15 data bytes. |                                                             |
| LRC          | longitudinal redundancy check |                                                |

A local area network utilizing transceivers according to the present invention produces an effective error rate of one error in two years of transmission. This low error rate is the result of the utilization of a carrier frequency between 20 and 40 KHz, preferably between 27 and 33 KHz; the use of a split bobbin, air gapped, iron core transformer in the impedance matching network connected to the power line and the analog filtering and impedance matching network connected thereto; the digital filtering provided by the state machine and the software message format protocol.

While the design disclosed utilizes a separate microprocessor and state machine, they can be combined in a single large scale integrated circuit. Various input/output devices may be utilized as the host, the microprocessors of the transceivers providing an RS-232 connection and also providing for direct logical connection to the host. Additionally, the transceivers of the invention may be sold without the microprocessor with only relatively minor changes in the circuit board for use as modems only.

Because the transceivers use a block ahead, acknowledgment transmission system, they provide a strictly transparent transmission channel between master and slaves.

While the transceivers disclosed herein are designed for connection to AC transmission lines, they can, in fact, be connected to a private wire or other less noisy transmission channels to provide error free transmissions at even higher data rates in a noisly environment, at low cost.

OBJECTS OF THE INVENTION

It is therefore an object of the invention to provide a transceiver for multi-drop local area networks.

Among the objects of the invention are to provide such a transceiver for connection to alternating current power lines; to provide for error free, full duplex transmission at high data rates; to provide identical hardware for masters and slaves; to utilize digital filtering which may be combined with a microprocessor for large scale integration; to provide a multi-use modular design; and to provide for a software protocol that is strictly transparent.

Other objects of the invention will in part be obvious and will in part appear hereinafter.

The invention accordingly comprises the features of construction, the several elements, the arrangement of parts, and the choice of functions and signals which will be exemplified in the construction and system hereinafter set forth. The scope of the invention is indicated in the claims.

BRIEF DESCRIPTION OF THE DRAWINGS AND APPENDIX

For a fuller understanding of the nature and objects of the invention reference should be made to the following detailed description taken in connection with the accompanying drawings and appendixes in which:

FIG. 3 is a diagram illustrating messages transmitted between a master and slaves in the local area networks of FIGS. 1 and 2;

Figure 4:
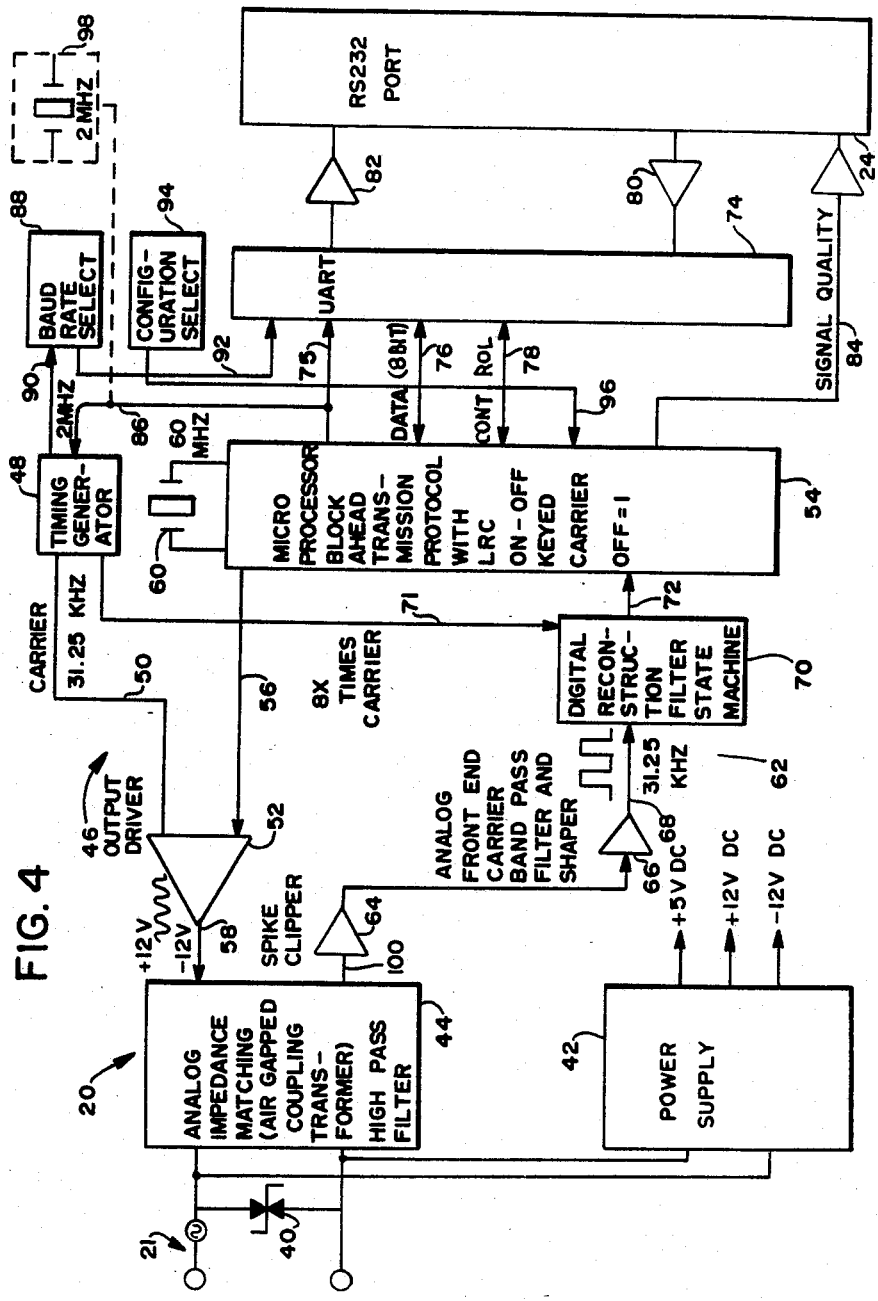
FIG. 4 is a schematic block diagram of a transceiver according to the invention.
Figure 5A:
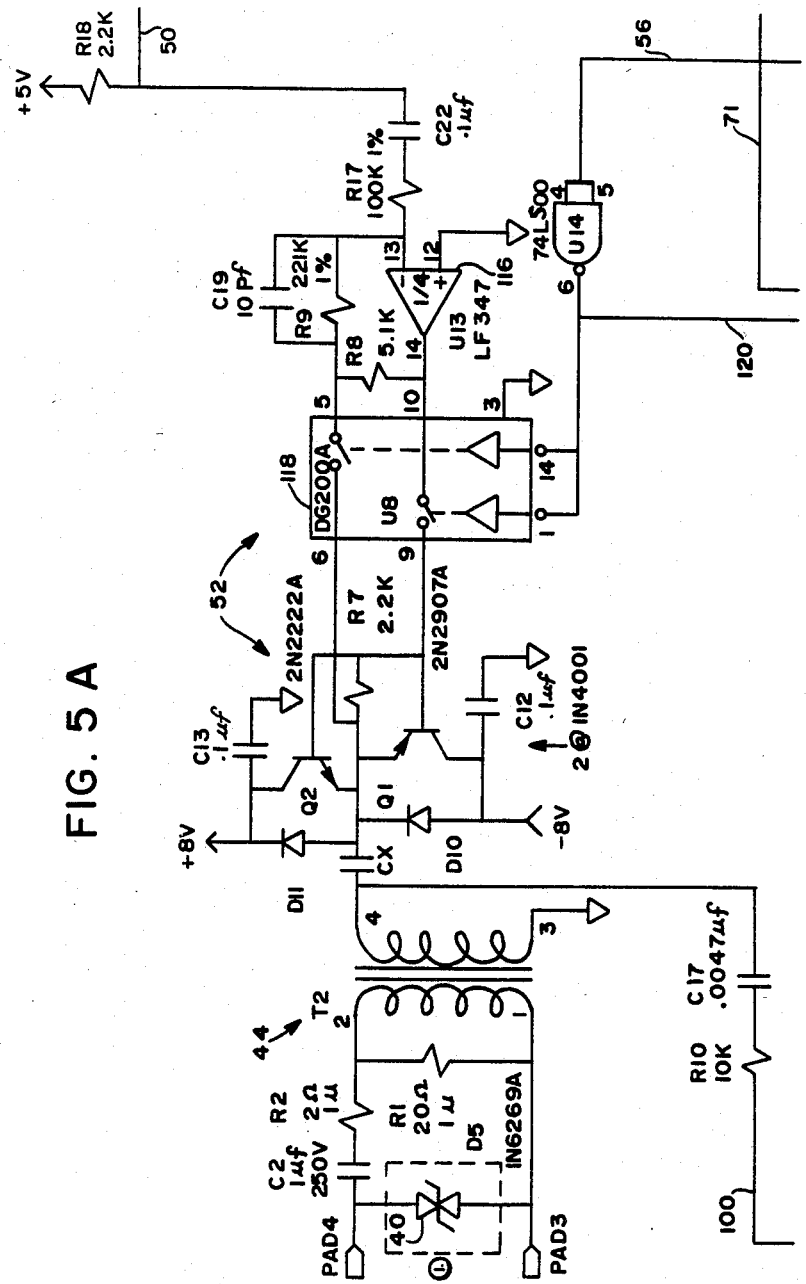
Figure 5B:
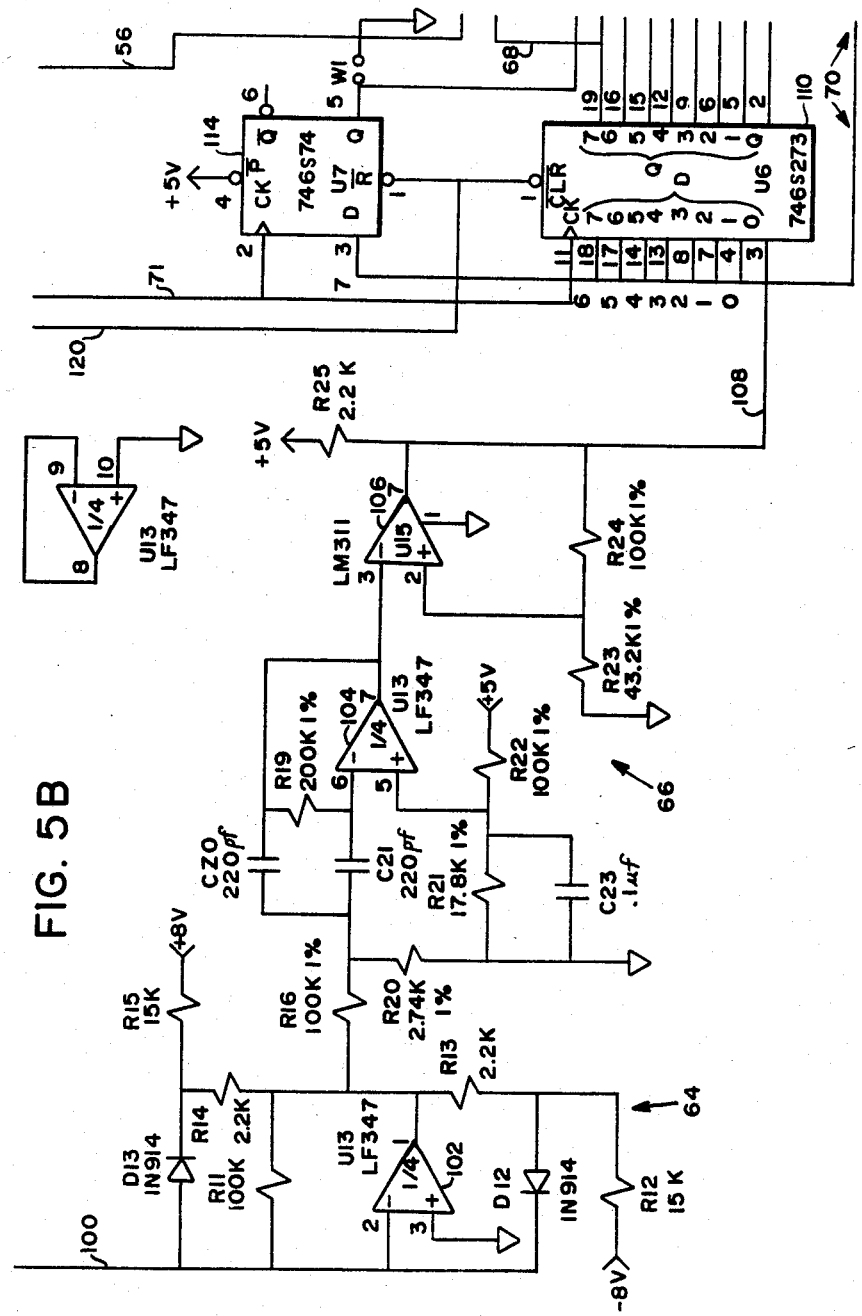
Figure 5C:
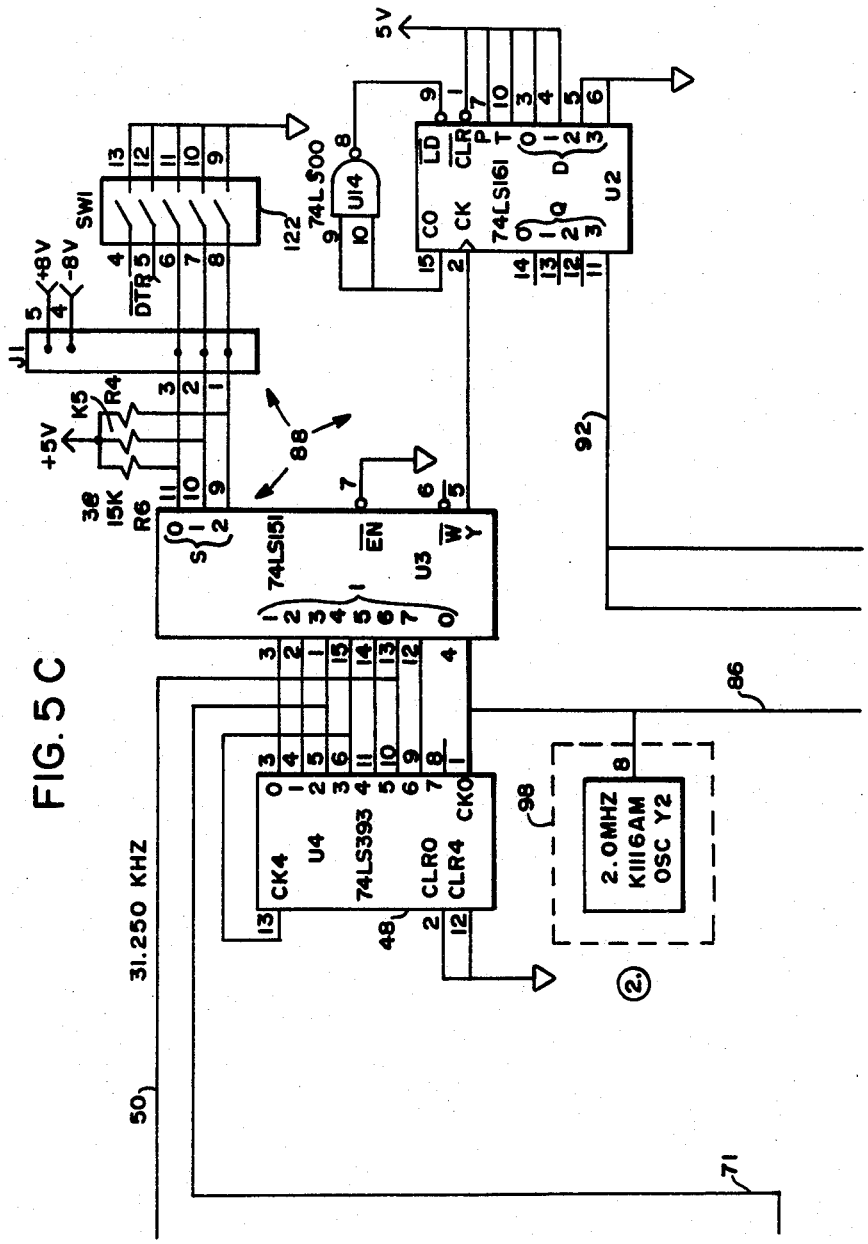
Figure 5D:
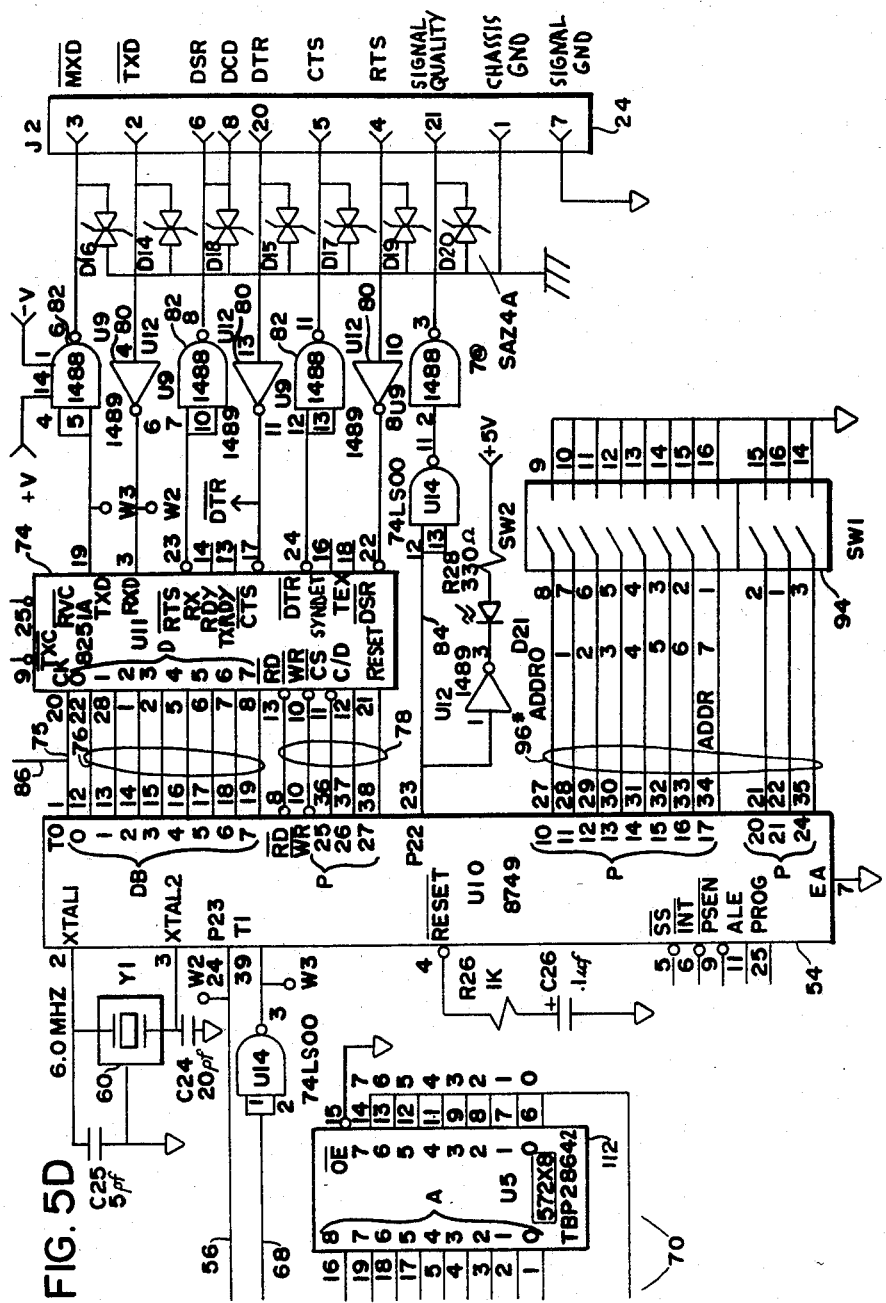
Figure 6:
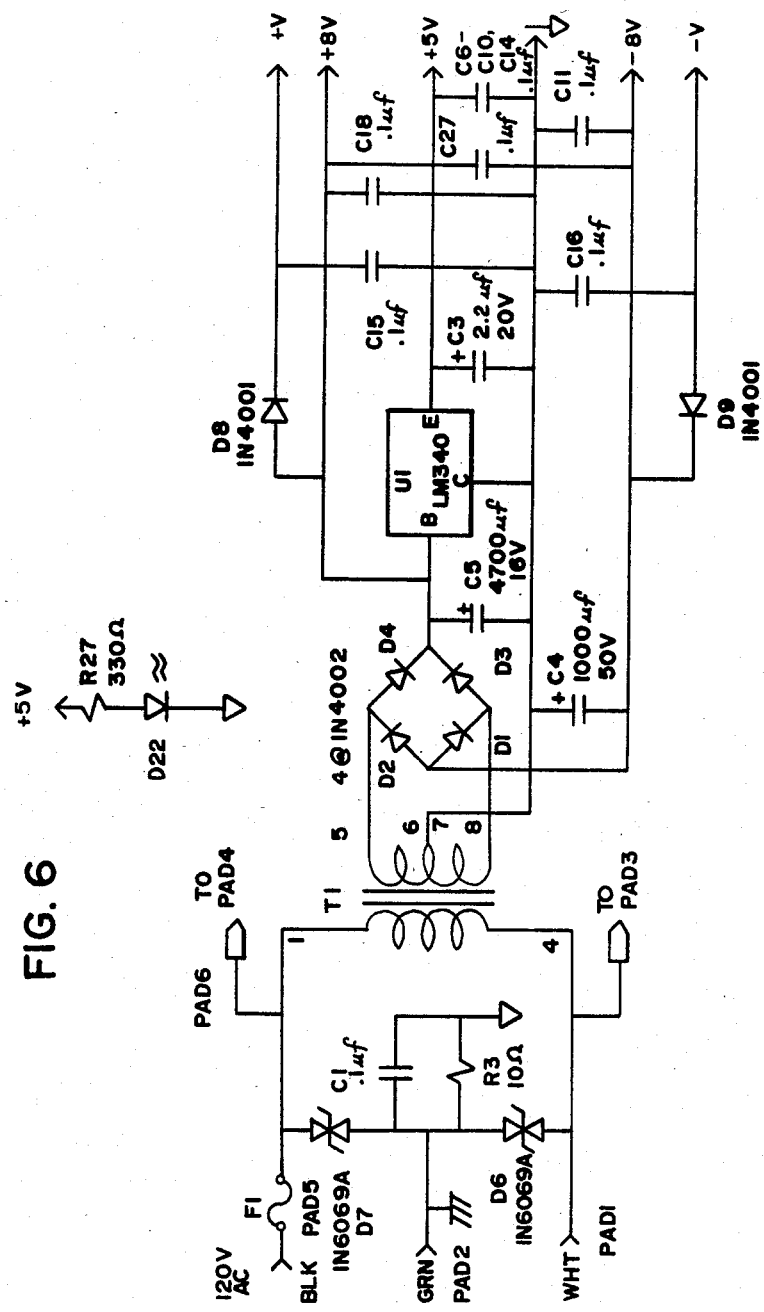
Figure 7A:
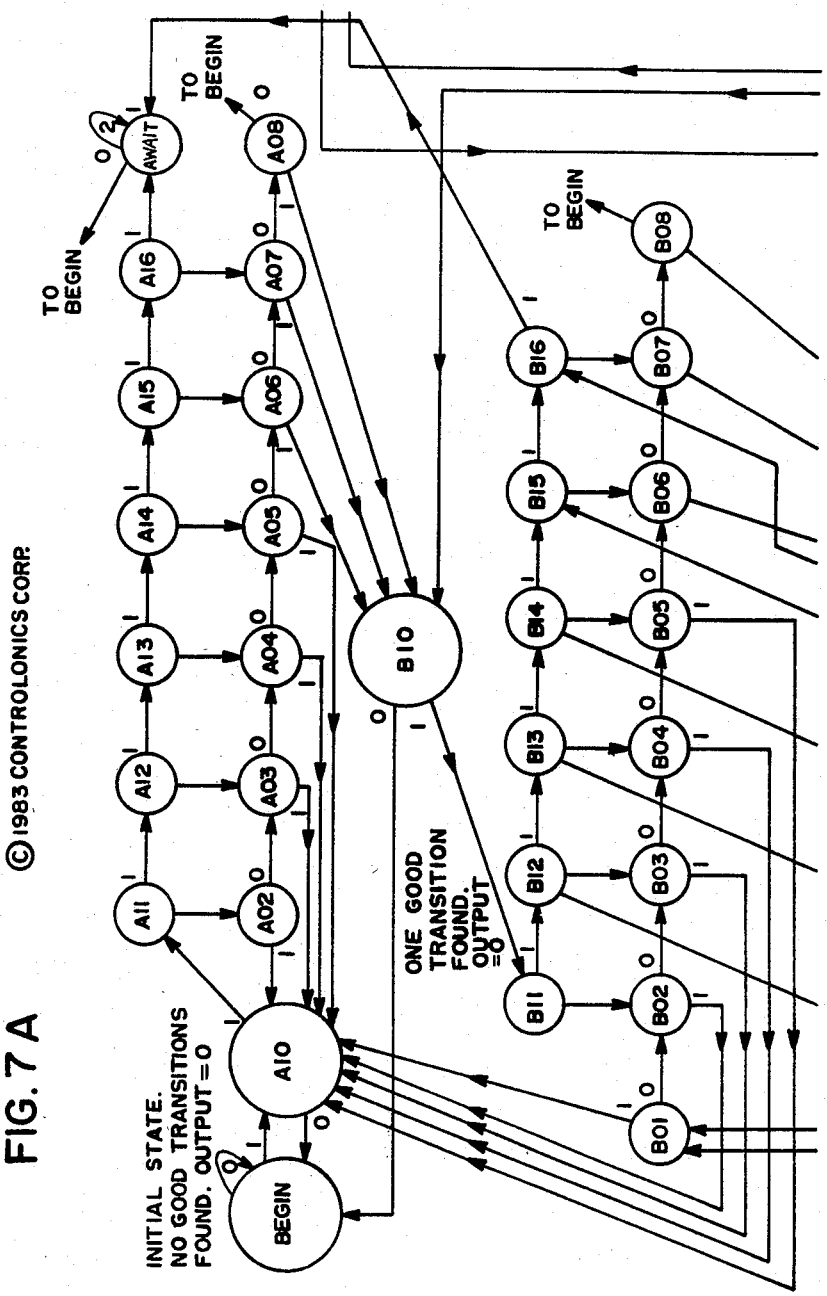
Figure 7C:
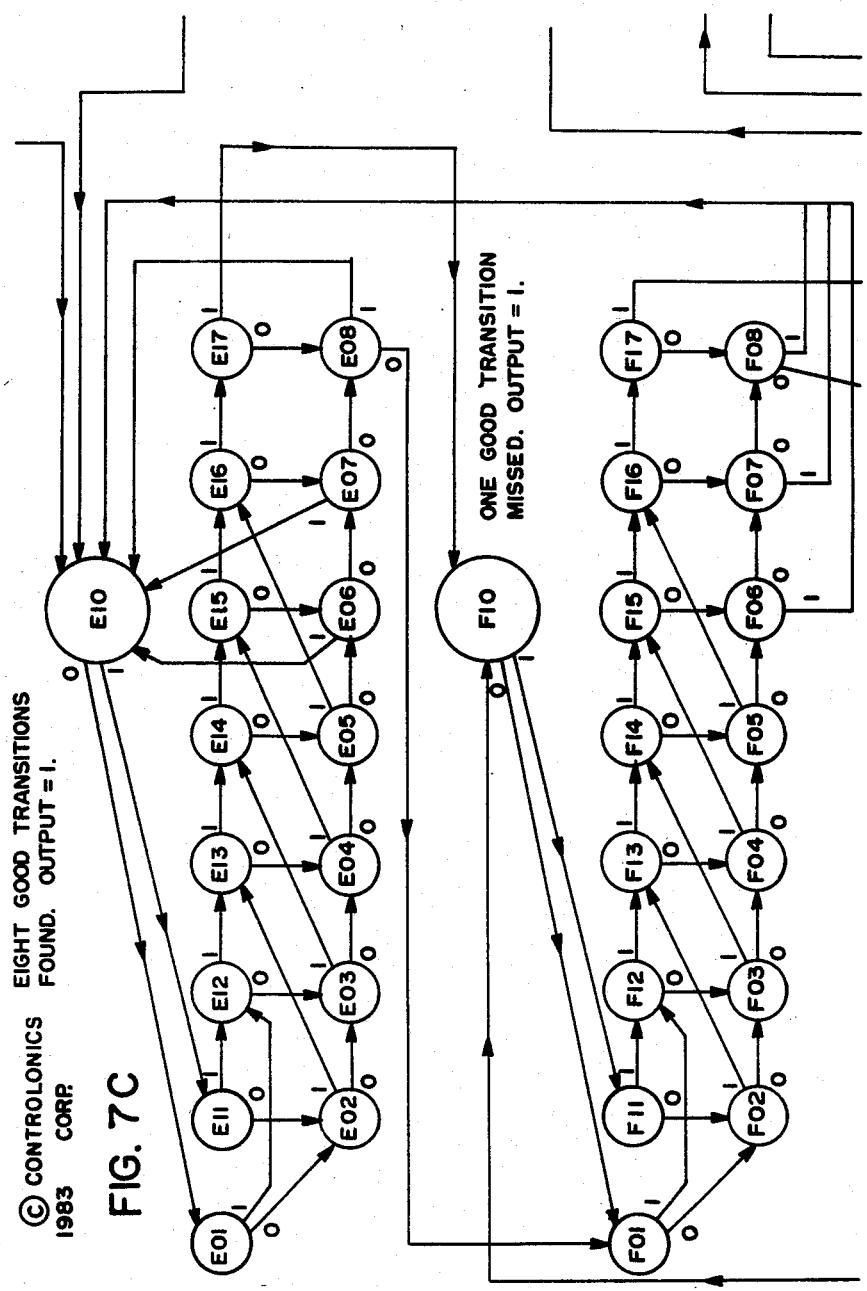
Figure 7D:
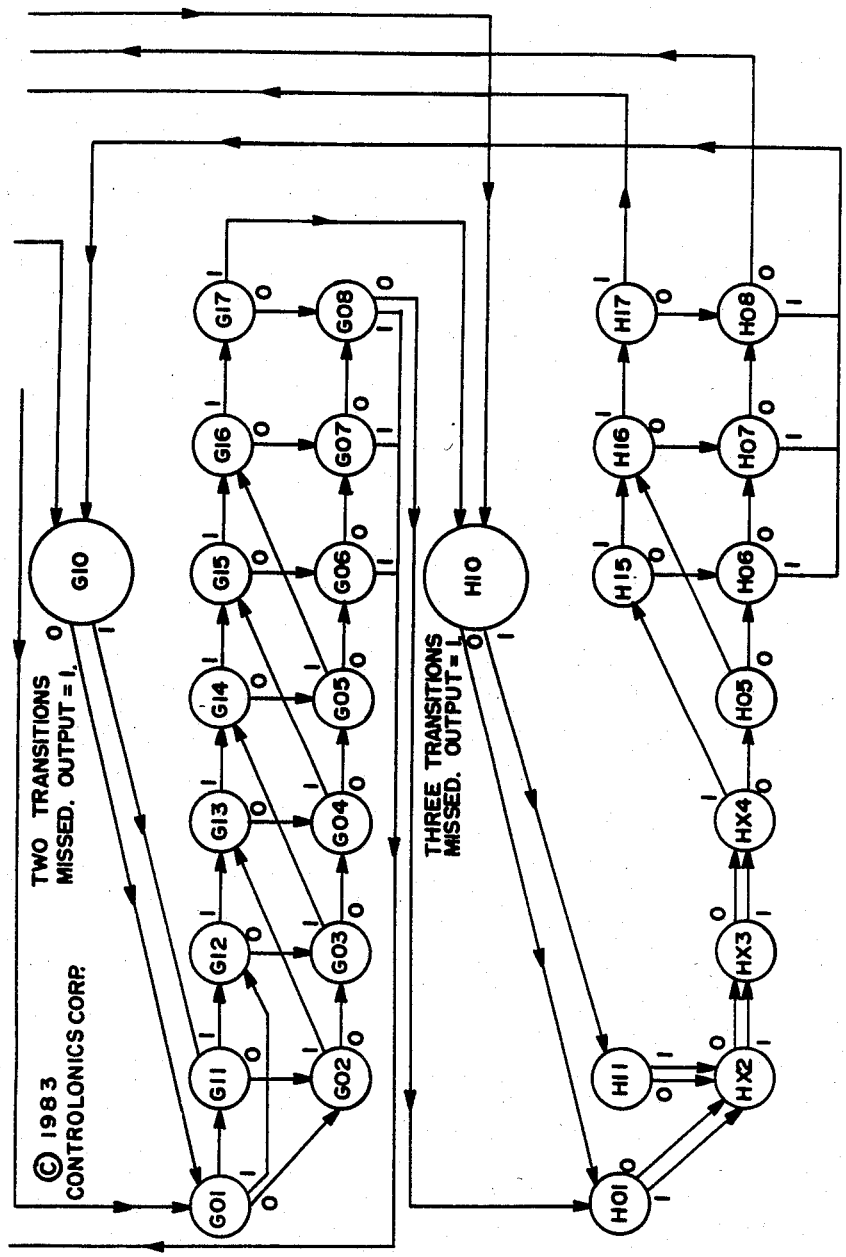
Figure 7E:
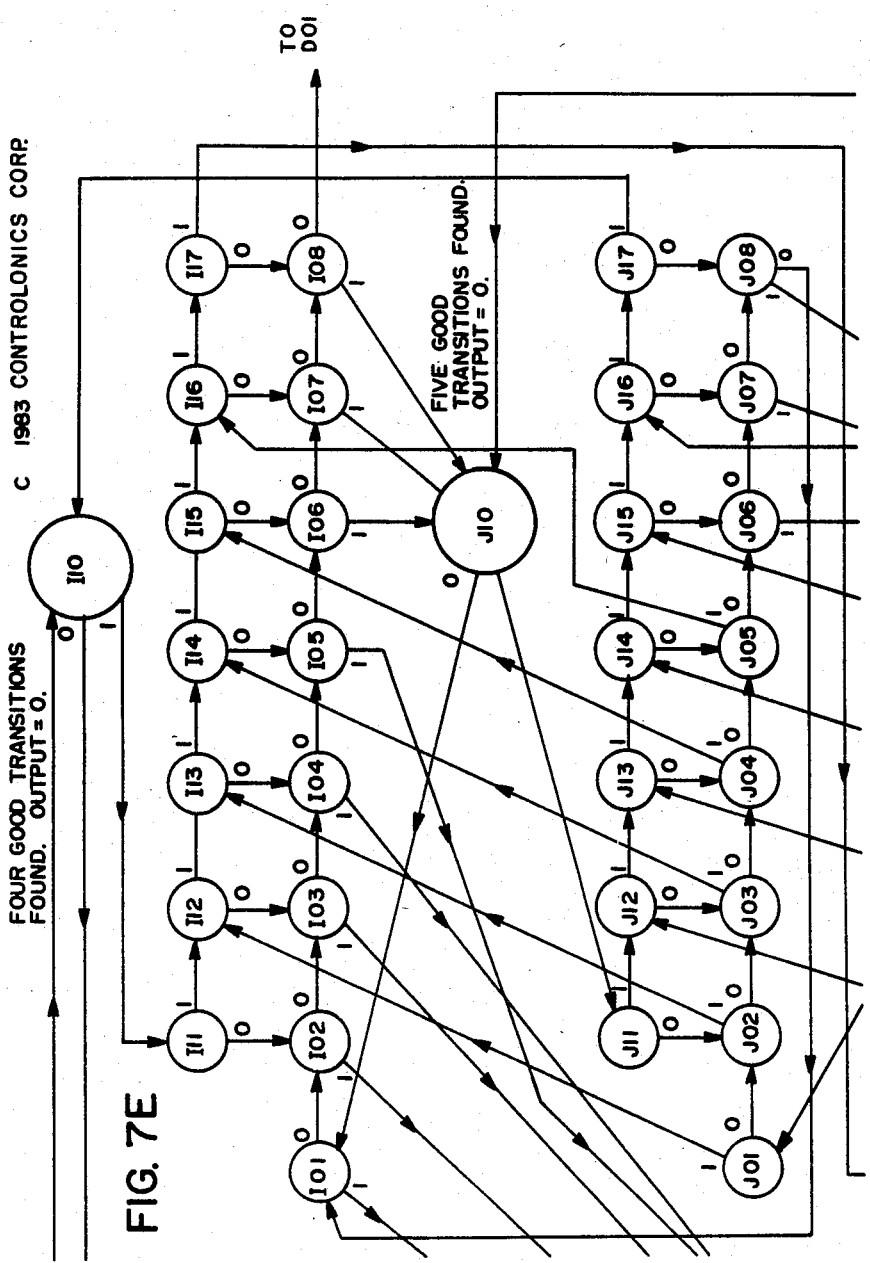
Figure 7G:
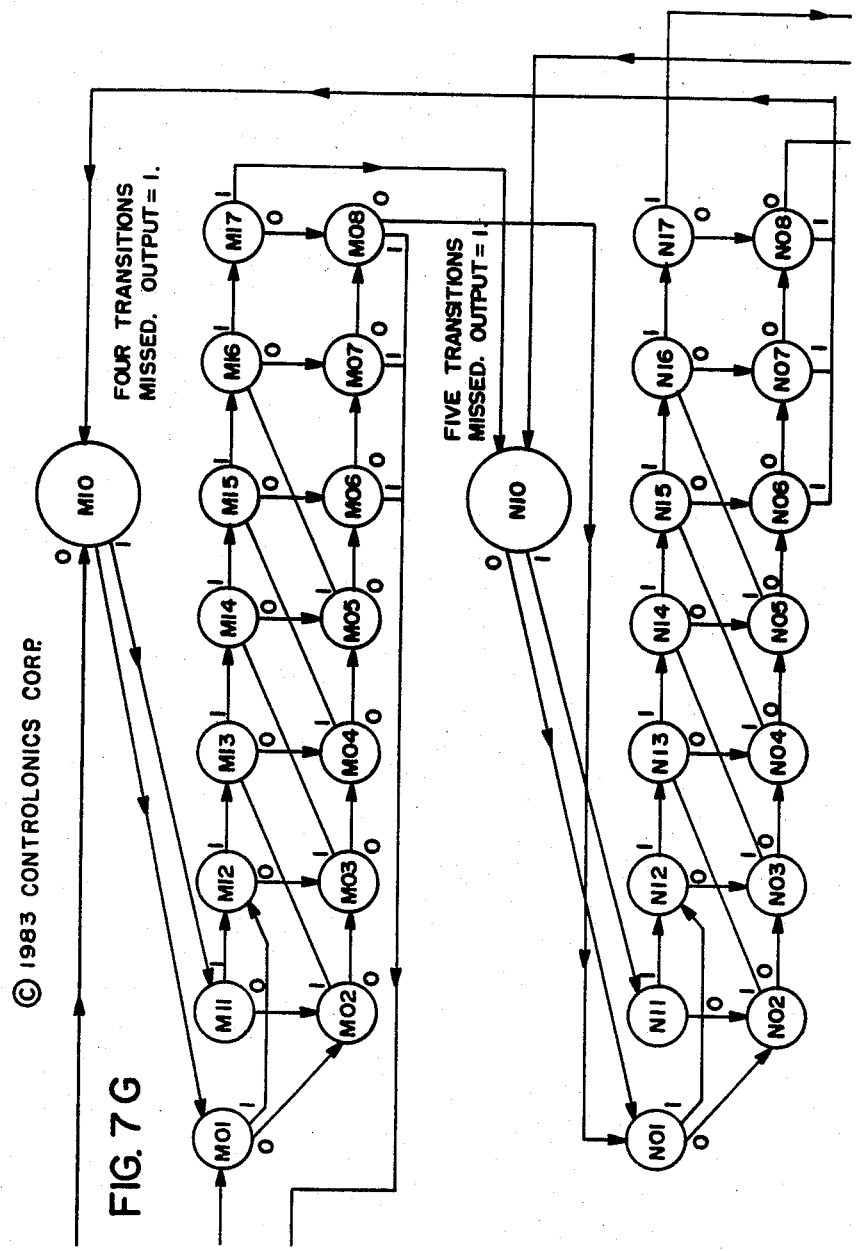
Figure 7H:
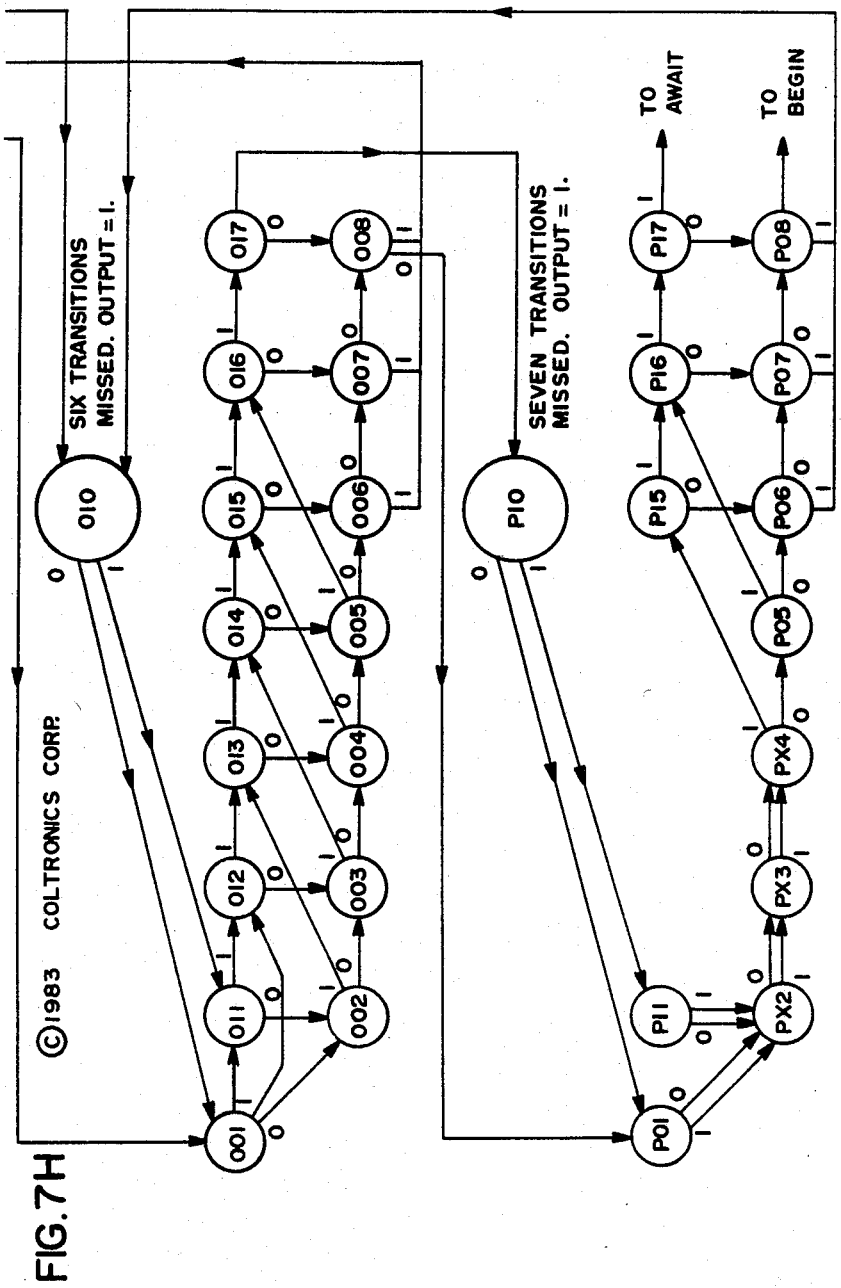
Figure 9:
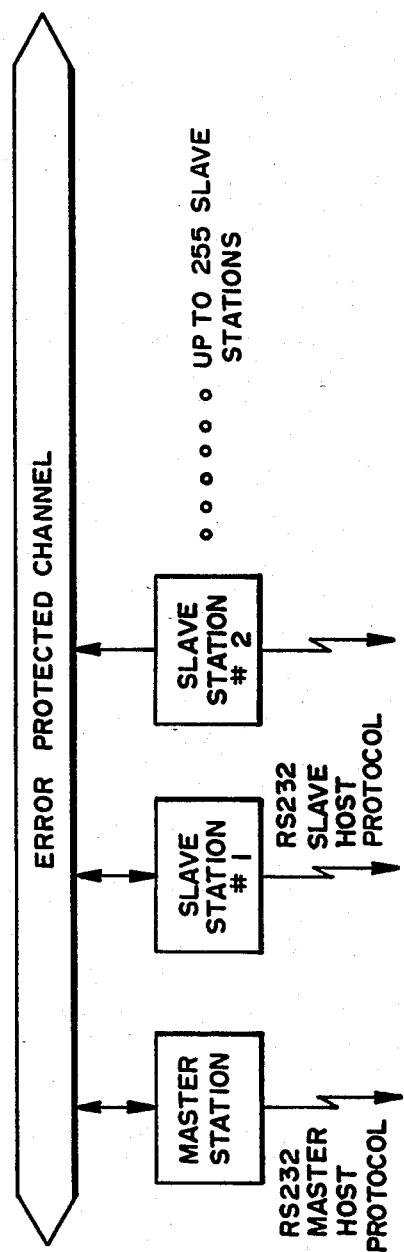
Figure 10:
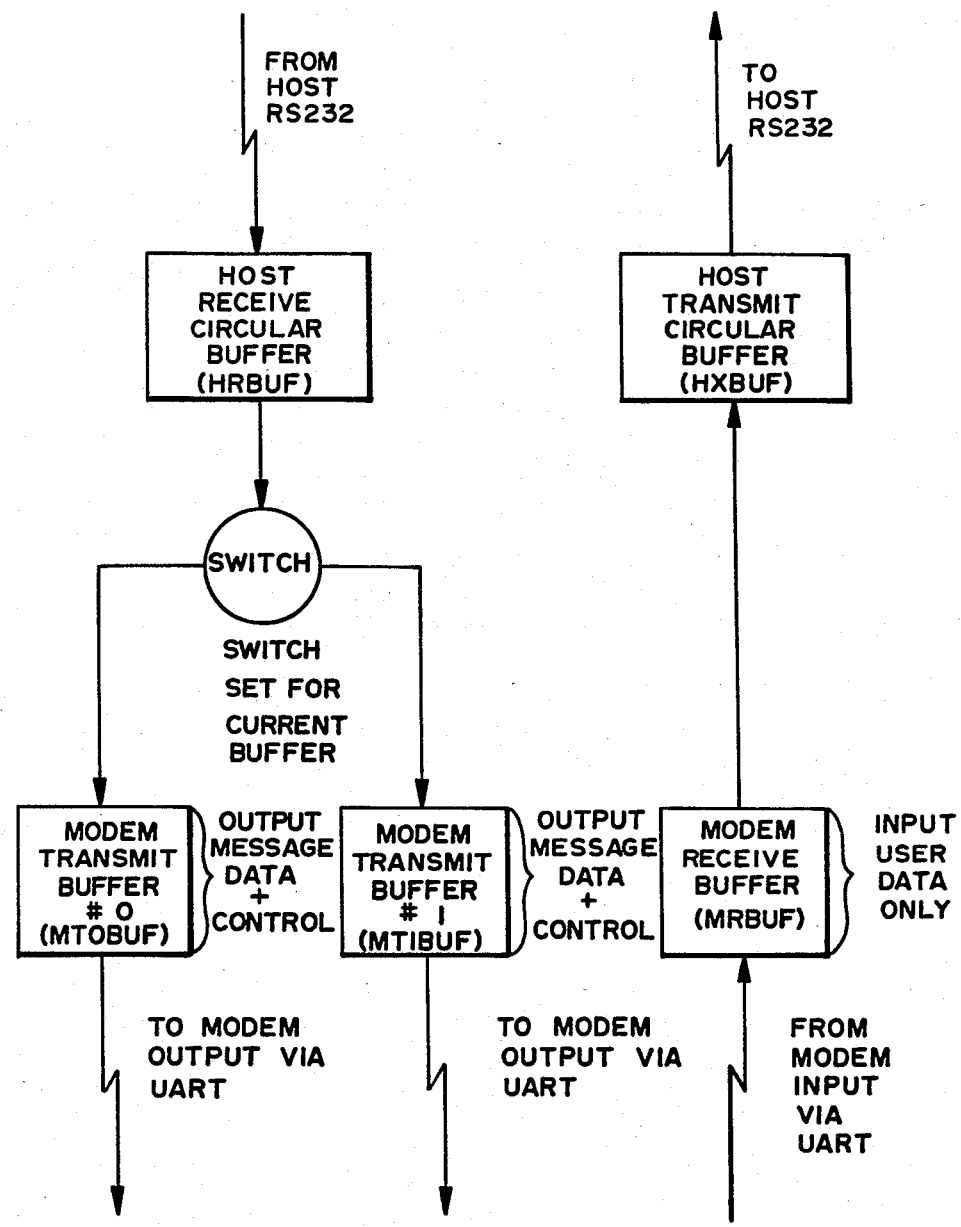
Figure 12:
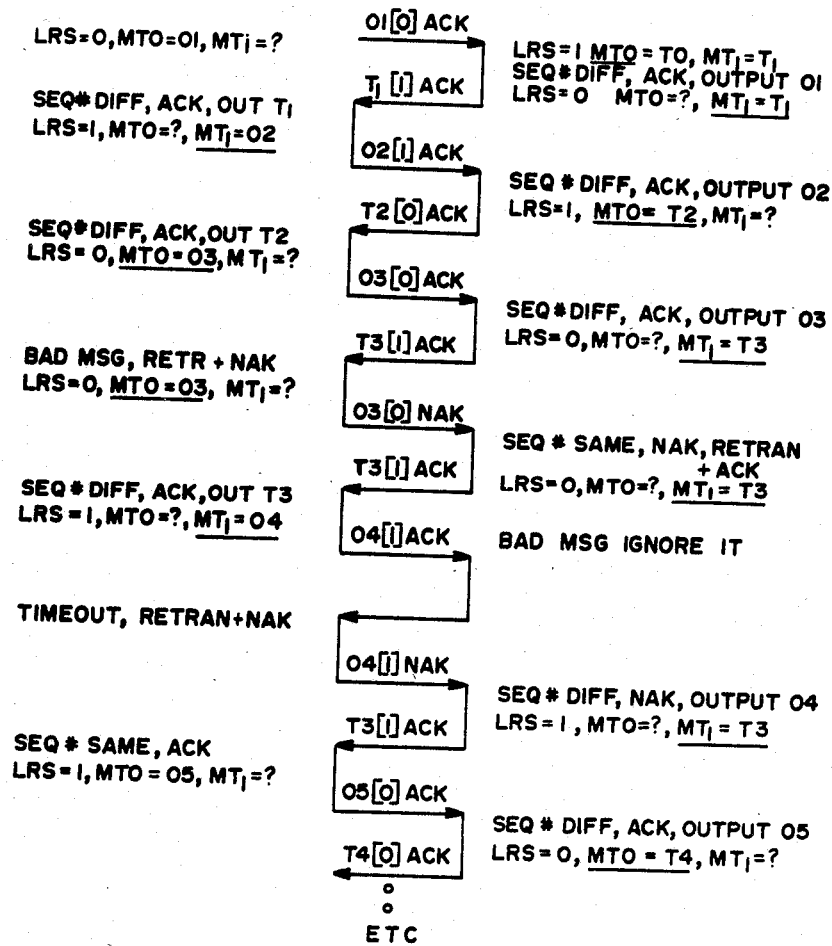

FIG. 5 comprisings FIGS. 5A, 5B, 5C, and 5D is a detailed schematic electrical circuit diagram of the transceiver of FIG. 4;

FIG. 5E is a diagram showing how FIGS. 5A, 5B, 5C, and 5D may be placed together to form FIG. 5;

FIG. 6 is a schematic electrical circuit diagram of the power supply for the transceiver of FIG. 5;

FIG. 7 comprising FIGS. 7A, 7B, 7C, 7D, 7E, 7F, 7G, and 7H is a state diagram of the state machine of the invention;

FIG. 7I is a diagram showing how FIGS. 7A, 7B, 7C, 7D, 7E, 7F, 7G, 7H may be put together to form FIG. 7;

FIG. 8 is a printout of the contents of the sequence ROM of the state machine of the invention in Intel Hex format;

FIG. 9 is an illustration of a local area network according to the invention;

FIG. 10 is an illustration of the buffering provided in a transceiver according to the invention;

FIG. 11 is a diagram of the message format of the invention utilized in the transceivers of the invention; and, FIG. 12 is a diagram indicating the mode of data transfer according to the invention.

The same reference characters refer to the same elements throughout the several views of the drawings.

APPENDIX A is the source listings of the state machine program according to the invention:

APPENDIX B is the source listings of the master program for a transceiver according to the invention:

APPENDIX C is the source listings of the slave program for a transceiver according to the invention.

BEST MODE FOR CARRYING OUT THE INVENTION

INTRODUCTION

The transceiver according to the invention is a compact electronic device that transmits and receives computer data signals over conventional AC power wires within a building. A controller, computer, terminal, or peripheral device equipped with it is simply connected to a standard single-phase or multi-phase AC circuit for normal use.

Then, the transceiver translates low-voltage binary data impulses into signals which it transmits through the existing AC wiring of the building. Only another transceiver plugged into the same building's circuit can detect these signals and translate them back into low-voltage data inputs for the equipment to which it is connected. Each transceiver acts like an RS 232 Modem, but instead of being connected to a phone line it is connected to the AC power line for carrier modulated transmission and reception of data. The multidrop local area network eliminates custom wiring for distributed data collection, process control, and energy management. It provides error-free data links, even in electrically noisy environments. The network eliminates the installation delays and material costs of dedicated wire networks, and increases reliability.

The network according to the invention replaces hard-wired local area networks and offers a low-cost communications alternative for smaller distributed control and data acquisition applications.

The transceiver uses AC power lines to provide point-to-point full duplex or polled communications between two or more users in a Multidrop local area network. As part of a full duplex communications network, the transceivers provide complete data communications between the master and the slaves within the network. When set up this way, the network performs as a switch, allowing the master to communicate at length with any of the slaves.

In polled communications, the network allows the master to perform polling and data collection of all the slaves in the network. In a polled network, the master checks with each slave in turn, again and again. Of course, the two communications methods can be combined, with the master polling each unit in turn until a unit requires more extended communications.

The transceiver provides error checking through the use of redundancy codes; the errors are then corrected by retransmitting those blocks in which errors have been detected. The undetected error rate is less than one bit error in two years of continuous operation.

Figure 1:
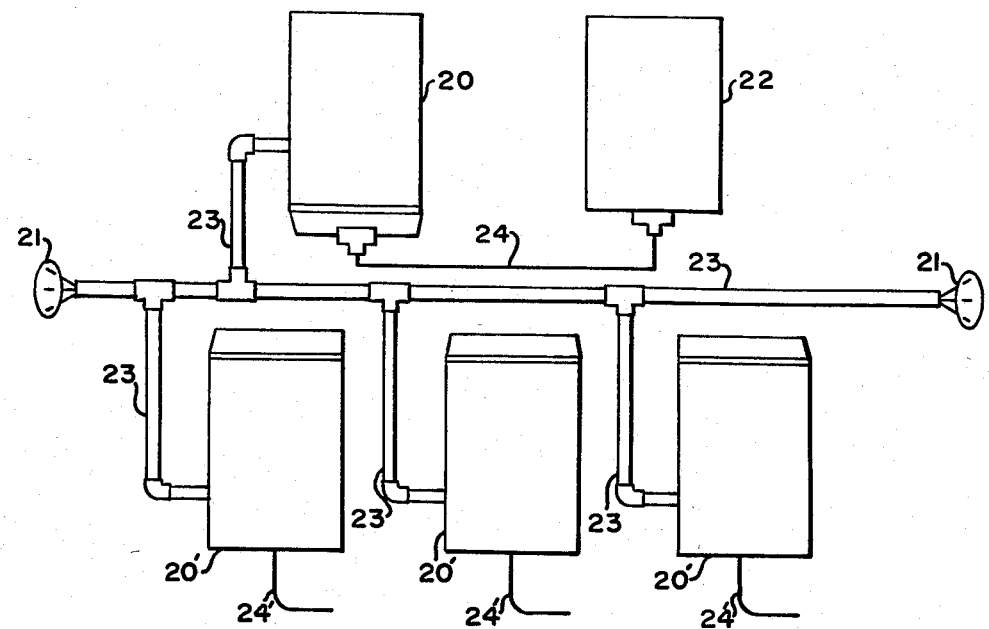
FIG. 1 is a schematic block diagram of a local area network according to the invention.

A Multidrop local area network is made up of a single master 20 and one or more physically identical slaves 20′, as shown in FIG. 1.

Information is sent between the master 20 and the host—which may be a controller, terminal, peripheral, or computer—over a full-duplex RS 232 communication link 24. The baud rate, parity, and transmission mode—whether ASCII or ASCII hexadecimal—are controlled by the host switch settings. (ASCII and ASCII hexadecimal transmission modes are described in more detail below.)

On request from the host computer, the master 20 will transmit a message to any given slave 20′ or group of slaves 20′. This message is transmitted over the building's AC power lines 21 (shown in conduit 23), and is ignored by any slave to whom it is not addressed. The slave checks for transmission errors and requests retransmission of the message if errors are found. Eight retries are made before attempts are abandoned.

When the slave receives the message, the slave sends the message out over its RS 232 host port 24′. Simultaneously, the slave 20′ transmits any data it has received from its host over port 24′ back to the master 20. Data from a slave's host is received and buffered until the slave's buffer is full, whether or not the master has sent any messages.

Figure 2:
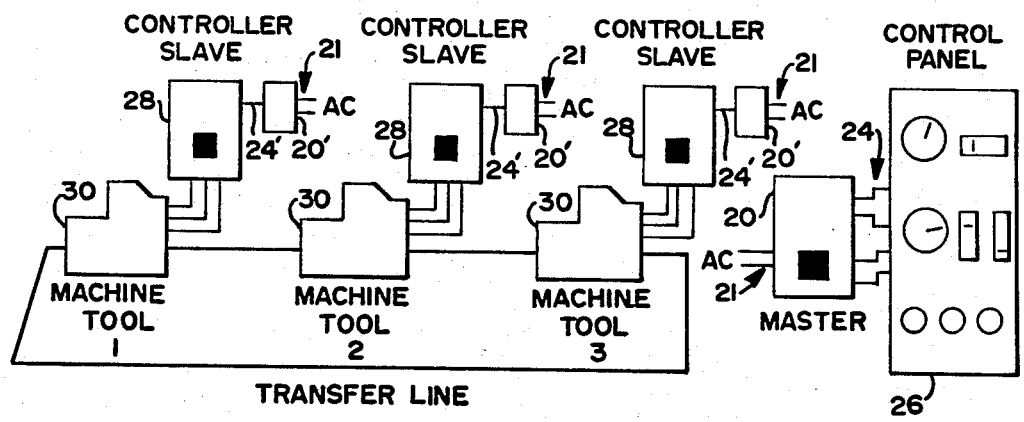
FIG. 2 is a schematic block diagram of a local area network according to the invention utilized to communicate between a control panel and a plurality of programable controllers.

For example, to use a Multidrop network to monitor programmable controllers and other machinery in a manufacturing process, the network would work as follows. (See FIG. 2.)

1. The master's host—a control panel 26 for monitoring the network is used for complete control of the network, from display of data from programmable controllers 28 to changing the instructions to the machines 30 along the line.

It could be used (for example) to report production rates, status, and machine diagnostic information from the programmable controllers 28 to the control panel.

When needed, it could also be used to send control information and setup instructions to the programmable controllers 28, allowing simple and fast changes to the sequences being used. These changes could be sent to one machine at a time or to all the machines at once, and would not require a shutdown.

2. One slave 20′ is connected to each programmable controller 28, over its RS 232 port 24′. It receives control information, and sends status and count information back to the master transceiver 20 over AC power lines 21. The master 20 is connected to the control panel 26 over its RS 232 port 24.

SUMMARY OF FEATURES AND BENEFITS

Thus a network according to the invention provides:

Accurate data communications over existing AC power lines to eliminate the need for custom wiring.

Point-to-point or selective broadcast communication which simplifies communications protocols.

Built-in error checking that assures high data accuracy amid the electromagnetic interference and power surges of a factory.

Stand-alone or printed circuit assembly packages suitable for end-users and OEMs.

A system that is simple to install. An entire system or network may be installed and checked out in hours, not weeks. Equipment may be moved without re-wiring.

A system that meets all applicable FCC and UL standards; that isolates all equipment from the 110 volt AC current; and protects electronic equipment from damaging voltages.

Information is transferred between the master 20 and the master's host 22 (FIG. 1) over a full-duplex RS 232 communications link, in either ASCII or ASCII hexadecimal format. Information may be transmitted directly from the host's terminal (key board and display) or sent by a program running on the host's computer. To use a terminal directly, the control sequences below are typed in as shown; if sent by a program, the program must generate the appropriate control sequences.

The master ignores information coming from the host until it receives a valid control sequence. The control sequence indicates the data transmission format and the address or addresses to which the ensuing data should be sent.

The control sequence is:

CONTROL CODE—The control code indicates the start of a message for the master to send. Typing [CTRL-A] (pressing the capital A and the CTRL keys simultaneously or sending ∅1 Hex) tells the master that the data following is in standard ASCII format; [CTRL-B] (or ∅2 Hex) indicates that the data following is in AXCII hexadecimal format.

ADDR HI—The most significant nibble of the address. The slave's address must be in ASCII hexadecimal. That is, there are 16 possible digits for each nibble, identified as ∅ through 9 and A through F. The addresses range from ∅∅ to FF. The address must be sent in decimal digits or capital letters. Address ∅∅ is used for broadcasting to all slaves, so that no slave should have address 00. The "most significant nibble" of the address is the first digit. For example, 02 and CF are both valid addresses. 0 is the most significant nibble of 02; C is the most significant nibble of CF.

ADDR LOW—The least significant nibble of the address. The least significant nibble is the second digit; 2 in 02 and F in CF. The address must be sent in decimal digits or capital letters.

DATA—The data to be transmitted. The data must be in ASCII format following a [CTRL-A] control code.

The address of the slave is determined by its internal switch settings, set at installation (see below). The addresses range from 01 to FF. To broadcast to all slaves, use address 00.

A sample control sequence and message is:

[CTRL-A]01 Hello address 1 . . .

which is sent to the slave at address 01; the message is "Hello, address 1 . . . ". It is sent as standard ASCII characters.

Another example is:

[CTRL-B]0148656C6C6F60616464726573732E2E2E which is the same message sent in ASCII hexadecimal. A table below lists the ASCII characters and their ASCII hexadecimal equivalents.

When the master formats a message and sends it to the designated slave or slaves, and the master receives the correct response from the slave, the master returns to its host:

ACK—ASCII ACK character (acknowledgement) (06 Hex)

ADDRESS—the address of the slave (in ASCII hexadecimal)

Any data received at the slave is also returned. The link then remains open until it is terminated. Typing an ESCape characer (1B Hex) or another valid control sequence will terminate the link.

If the master does not obtain the correct response from the slave, eight transmission retries are made. If no link is made after the retries, the master returns to its host:

NACK—ASCII NACK character (no acknowledgement) (15 Hex)

ADDRESS—the address of the slave (in ASCII hexadecimal)

The RS 232 line 24 then remains idle until a valid control sequence is received.

The slave ignores all messages being transmitted over the network until it receives a message with its own address (or the broadcast address). Valid messages are sent out by the slave over its own host port 24'. All communications through the host slave port 24' are in 8-bit binary, unlike the master.

Then, the slave transmits any data which it has received from its host back to the master. The slave receives and stores data from its host until its buffer is full, whether or not the slave is being polled by the master. The slave controls the flow of data into the buffer using RS 232C handshake protocol.

FIG. 3 shows a series of communications from the master to its slaves, assuming a slave with Address 03 is not on the network.

A block diagram of a transceiver which may be programmed to be a master or a slave, according to the invention, is shown in FIG. 4. FIG. 5 is a detailed electrical circuit diagram of the transceiver of FIG. 4. The programs are listed in the Appendixes.

Test Mode

Each transceiver provides for a special network test mode, in which the network of transceivers may be eaily and thoroughly tested. All transceivers in the network must be switched into test mode before beginning; this is done by resetting the DIP switches of FIG. 5 as described below.

When the master is powered on in the test mode, it sends the message "TEST MODE STARTED" to its host and requests a starting address for the test. The address should be entered as:

[CTRL-A] ADDR HI ADDR LOW.

This is the same as entering an address for normal operation, where the address must be in ASCII hexadecimal, from 01 to FF. The address must be in capital letters, and must be preceded by the [CTRL-A] (01 Hex).

Then, the master requests an ending address, which should be entered the same way. The ending address must be equal to or lerger than the starting address. If the ending address is less than the starting address, the message "INVALID ADDRESS" is returned. If you make a mistake typing or provide a bad address, the NONWIRE module will ignore your entry, print out a question mark, and wait for a valid address.

The two addresses do not need to include all the slaves in the system, nor does it matter if several addresses are not in use. For example:

TEST MODE STARTED

STARTING ADDRESS: [CTRL-A]01

ENDING ADDRESS: [CTRL-A]09 would be valid in a network with addresses 01, 04, 05, 06, 09, 0A, and 0E in use. In this system, the address 01, 04, 05, 06, and 09 would be tested; OA and OE would not be tested.

Once the addresses are entered, the master responds with the message "TEST MODE RUNNING" and begins its test.

During the test, the master and slaves, one-by-one, send a series of steadily increasing numbers back and forth, counting the number of errors that are made. Any addresses that do not respond during the test are reported back to the host by the master. This can be used to identify a module that is not working properly.

During the test, you can type [CTRL-R] to display the number of errors that have been found so far during the test.

To restart the test entirely, type ESCape and enter new addresses.

To set the system back into normal operation, the internal switches must be reset to normal operation and the transceiver powered up again.

As described above, communications to the master may be in ASCII format or in ASCII hexadecimal format. In ASCII format, data is entered as the common alphabetical characters seen everywhere. In ASCII hexadecimal format, however, data is entered using the hexadecimal digits 0, 1, 2, 3, 4, 5, 6, 7, 8, 9, A, B, C, D, E, F. Then, each digit received represents four bits of information (one nibble) that is transmitted to the slave. Two nibbles (one byte) are sent at a time; the most significant nibble is expected first.

If you enter an odd number of hexadecimal digits, the last nibble will not be sent until you enter another ditis, terminate the link, or send another control code. (The master adds a blank nibble of all zeroes to send the last nibble you entered, in this case.)

Two hexadecimal digits are combined to make a single character such as the letter A. Table 1 shown the ASCII and ASCII hexadecimal equivalents.

Thus, using Table 1, you can send messages in both ASCII and ASCII hexadecimal format. For example, the word "HELLO" is (obviously) "HELLO" in ASCII format; in ASCII hexadecimal, it is "48454C4C4F".

ASCII hexadecimal is provided to allow systems which cannot send ASCII format (binary) to use the transceivers; obviously, ASCII format is easier for the user to interpret.

The flow of information over a communications link is controlled at both the master and the slave:

1. The master can buffer two fifteen-byte messages (30 bytes of buffer space) before it must tell the host to stop sending data until it has sent the messages. The master uses either RS-232 RTS/CTS flow control, or an XON/XOFF protocol; this is selected at installation time. The transceiver module is a DCE device; it transmits data on pin 3 and receives data on pin 2 of its RS-232 port.

If XON/XOFF protocol is used, the master sends the XOFF to its host when the buffer is four bytes (characters) less than full; the host must therefore assure that no more than four bytes are sent after the XOFF is received. (Characters after the fourth character are lost).

The host may also suspend communications from the master by sending the XOFF and XON itself. After the host has sent the XOFF, the master may send one or two more bytes (characters) before suspending communications.

TABLE 1

ASCII and ASCII Hexadecimal Characters

| Hexadecimal | Character | Hexadecimal | Character | Hexadecimal | Character |
|---|---|---|---|---|---|
| 00 | NUL | 32 | 2 | X | X |
| 01 | SOH | 33 | 3 | 64 | d |
| 02 | STX | 34 | 4 | 65 | e |
| 03 | ETX | 35 | 5 | 66 | f |
| 04 | EOT | 36 | 6 | 67 | g |
| 05 | ENQ | 37 | 7 | 68 | h |
| 06 | ACK | 38 | 8 | 69 | i |
| 07 | BEL | 39 | 9 | 6A | j |
| 08 | BS | 3A | : | 6B | k |
| 09 | HT | 3B | ; | 6C | l |
| 0A | LF | 3C | < | 6D | m |
| 0B | VT | 3D | = | 6E | n |
| 0C | FF | 3E | > | 6F | o |
| 0D | CR return | 3F | ? | 70 | p |
| 0E | SO | 40 | @ | 71 | q |
| 0F | SI | 41 | A | 72 | r |
| 10 | DLE | 42 | B | 73 | s |
| 11 | DC1 | 43 | C | 74 | t |
| 12 | DC2 | 44 | D | 75 | u |
| 13 | DC3 | 45 | E | 76 | v |
| 14 | DC4 | 46 | F | 77 | w |
| 15 | NAK | 47 | G | 78 | x |
| 16 | SYN | 48 | H | 79 | y |
| 17 | ETB | 49 | I | 7A | z |
| 18 | CAN | 4A | J | 7B | { |
| 19 | EM | 4B | K | 7C | \| |
| 1A | SUB | 4C | L | 7D | } |
| 1B | ESC | 4D | M | 7E | — |
| 1C | FS | 4E | N | 7F | RUBOUT (DEL) |
| 1D | GS | 4F | O | | |
| 1E | RS | 50 | P | | |
| 1F | US | 51 | Q | | |
| 20 | SP | 52 | R | | |
| 21 | ! | 53 | S | | |
| 22 | " | 54 | T | | |
| 23 | # | 55 | U | | |
| 24 | $ | 56 | V | | |
| 25 | % | 57 | W | | |
| 26 | & | 58 | | | |
| 27 | ' | 59 | Y | | |
| 28 | ( | 5A | Z | | |
| 29 | ) | 5B | [ | | |
| 2A | * | 5C | \ | | |
| 2B | + | 5D | ] | | |
| 2C | , (comma) | 5E | | | |
| 2D | — | 5F | —(line) | | |
| 2E | . (period) | 60 | (quote) | | |
| 2F | / | 61 | a | | |
| 30 | 0 | 62 | b | | |
| 31 | 1 | 63 | c | | |

2. A slave always uses the RS-232 RTS/CTS flow control protocol. It will buffer the information coming from its host until its buffer is full (30 bytes) and then discard any additional information. The slave sends the full contents of its buffer to the master whenever it is polled (receives a message from the master).

The network detects and corrects transmission errors by using a block-ahead acknowledgment protocol, which uses error-detecting codes and correction algorithms to guarantee an error-free link. If an error is detected, eight transmission retries are made. An address which does not exist will (after the eight retries) cause the message to be discarded. An address which is not between 00 and FF will be ignored.

If a transceiver is forced to make so many retries that undetected errors become possible, line quality (COMM) light will be turned off and pin 21 of the D-connector (the RS-232 "line quality" signal) will go low. (FIG. 5)

While the error correction mechanism is excellent, it does have a theoretical miss rate of one in 10 to the ninth; if the retry rate approaches this, the line quality light is turned off. Retries to addresses which never respond are not counted in the retry rate.

Network Setup

To install a Multidrop local area network, you must first determine the configuration settings for the network. This section provides complete diagrams of the DIP switches and how they should be set; in addition, complete configuration work sheets are given following these diagrams for the master and slaves. You should make as many copies of the SLAVE CONFIGURATION WORK SHEET as you will have slaves in the network.

Before you connect any devices to a transceiver (whether host or slave), you should verify that the cables conform to RS 232C standards and that the pin usage corresponds to the RS 232C pin usage shown in Table 5 below.

Once you have determined the configurations for the master and slaves, Table 2 shows how the master and slave DIP switches should be set.

Once you have set all the DIP switches, switch SW3 in both the master and the slaves should be set to TEST MODE. Then, using the test mode instructions above, you can completely test the Multidrop local area network.

Once testing has been successfully completed, return the switches to NORMAL MODE and your Multidrop local area network will be fully operational.

These individual switches in DIP Switch SW1 in both master and slave are used as follows:
Switches 7 and 8 have no effect
Switches 4, 5, and 6 set Baud Rate.
Switch 3 when OFF sets Normal Mode; when ON sets Test Mode
Switches 1 and 2 set Parity and word length.
All according to Tables 2 and 3.

TABLE 2

| SW1 8 | SW1 7 | SW1 6 | Baud Rate |
|---|---|---|---|
| 0 | 0 | 0 | 9600 |
| 0 | 0 | 1 | 4800 |
| 0 | 1 | 0 | 2400 |
| 0 | 1 | 1 | 1200 |
| 1 | 0 | 0 | 600 |
| 1 | 0 | 1 | 300 |

TABLE 2-continued

| SW1 8 | SW1 7 | SW1 6 | Baud Rate |
|---|---|---|---|
| 1 | 1 | 0 | 150 |
| 1 | 1 | 1 | 75 |

TABLE 3

| | SW1 5 | SW1 3 | SW1 2 | SW1 1 | Control Status |
|---|---|---|---|---|---|
| Parity | | | 0 | 0 | Even Parity, 7-Data Bits |
| and | | | 0 | 1 | Even Parity, 8-Data Bits |
| Word | | | 1 | 0 | No Parity, 8-Data Bits |
| Length | | | 1 | 1 | Odd Parity, 8-Data Bits |
| Mode | | 0 | | | Test |
| | | 1 | | | Normal |
| DTR | 0 | | | | UART Always Enabled |
| | 1 | | | | Flow Cut by J2-20 |

*SW1-4 Unused
0 = ON
1 = OFF

The individual switches of DIP Switch SW2 in a master are used as follows:
Switches 3, 4, 5, 6, 7 and 8 have no effect.
Switches 1 and 2 are used for Flow Control as shown in Table 4.

TABLE 4

| SW2 | SW2 | FLOW CONTROL |
|---|---|---|
| OFF | OFF | Processes ⌒S⌒Q from host Sends DTR to Host |
| ON | OFF | Does not process ⌒S⌒Q Sends ⌒S⌒Q to Host |
| OFF | ON | Processes ⌒S⌒Q from Host Sends DTR to Host |
| ON | ON | Does not process ⌒S⌒Q Sends ⌒S⌒Q to Host |

Dip Switch is used in a slave to set its address.

An address consists of eight binary digits, ∅ through B 7. Individual switches 1 through 8 of DIP Switch SW2 correspond to the digits ∅ through 7. Switches 4 through 7 of SW2 set the first, most significant character (hexidecimal digit) of the address and Switches 1 through 4 of SW2 set the second, least significant character (hexidecimal digit) of the address.

ON indicates zero; OFF indicates 1. For example, the address F∅ is given as 1111∅∅∅∅ and is set into the individual switches of DIP Switch SW2 in individual switch order 87654321. That is, switches 8, 7, 6, and 5 of SW2 are ON and switches 4, 3, and 2 and 1 of SW2 are OFF.

Thus, the Host-Master baud rate may be set at 9600, 1200, 600, 300, or 110 Baud.

The Host-Master parity may be set as Odd parity, 8-bit word; Even parity, 8-bit word; Parity disabled, 8-bit word; or Even parity, 7-bit word.

The Master Flow Control may be set as RTS or CTS and XON or XOFF.

Slave addresses may be set from ∅1 to FF with a maximum of 255 slaves.

A Slave-Host Baud Rate may be set at 9600, 1200, 600, 300, or 110 Baud.

A Slave-Host parity and word length may be set as Odd parity, 8-bit word; Even parity, 8-bit word; Parity disabled, 8-bit word; or Even parity, 7-bit word.

that the most deleterious noise on the power lines and on two wire circuits in a factory environment is at these higher frequencies, and that there is a preferred window for carrier transmission between 20 and 40 KHz, preferably within the range between 27 and 33 KHz. Thus the choice of the 31.25 carrier which is a submultiple of the 6 MHz provided by the clock 60 connected to the microprocessor 54.

The receiver portion 62 of the transceiver 20 is generally indicated at 62. In addition to the analog impedance matching and high pass filter network 44, it comprises spike clipper 64 and an analog front end 66 comprising a carrier band pass filter and shaper.

The output of the analog front end 66 is a 31.25 KHz square wave analog of the carrier on line 68. It is supplied to digital reconstruction filter 70 implemented by a state machine which indicates the presence or absence of carrier to the microprocessor 54 on line 72.

The microprocessor 54 provides a block ahead transmission protocol with a longitutanal redundancy check (LRC) and also provides for on off keyed carrier transmission, with the carrier being off indicating the transmission of a 1.

It is the choice of carrier frequency, the analog impedance matching and high pass filter network 44, spike clipper 64 and analog front end 66 the digital reconstruction filter 70, and the Block Ahead transmission protocol with LRC which together provide for error free, full duplex transmission at 1200 baud over alternating current power lines. Not only do these elements and features provide this new and important result. They provide the result at low cost.

The transceiver 24 may be provided with an RS-232 port 24 for connection to a host (not shown).

A UART 74 is connected between the RS-232 port 24 and the microprocessor 54. It receives a 2 MHz clock signal on line 75 from the microprocessor 54, communicates with the microprocessor 54 in parallel on data lines 76 and exchanges control signals on control lines 78.

The UART 74 communicates with the RS-232 port via input conditioning circuits 80 and output conditioning circuits 82. The microprocessor 54 supplies the RS-232 port with a signal quality signal on line 84.

The microprocessor provides the 2 MHz signal on line 86 to timing generator 48.

The timing generator 48 supplies baud rate generator 88 with selectable timing signals on timing lines 90, the selected one of which is supplied on line 92 to the UART 74. The configuration selecting switches and network 94 controls microprocessor 54 via lines 96.

The only difference between a master and a slave is the program stored in the read only memory of the microprocessor 54 and the configuration selected.

The transceiver illustrated in FIG. 4 may be converted to and sold as a stand alone modem by eliminating the microprocessor 54, its master clock 60, the UART 74, the RS-232 port 24, the configurations select network 94, and the baud rate select network 88. When this is done a 2 MHz crystal oscillator 98 is connected to supply the 2 MHz signal to the timing generator 48. The customer supplies data on line 56 and receives data on line 72.

The modem or transceiver may be configured for collision detection multiple access carrier sense (CD/CSMA) by appropriately connecting line 56 to line 72 so that it hears its own transmissions.

A detailed electrical circuit diagram of a transceiver 20 according to the invention is shown in FIG. 5 comprising FIGS. 5A through 5D which may be placed together for form FIG. 5 as shown in FIG. 5E. The analog impedance matching and high pass filter network is generally indicated at 44 in FIG. 5A. The essential elements of this network are the transformer T2, the capacitor C2, and resistors R1 and R2 connected to the power line side of transformer T2; and resistor R10 and capacitor C17 connected to the transceiver side of transformer T2.

The purpose of this network in its receiving function (that is receiving signals from the power line 21 connected at pads 3 and 4) is to couple the carrier signal to and from the power line to the transceiver, to suppress the alternating current and its harmonics, and to eliminate common mode.

In this regard transformer T2 does more than act as a transformer. Its inductance parameters are part of the filter design for data received from the power lines. It provides a low leakage inductance in the transmit mode, that is when data is being transmitted to the power lines. The transformer must provide isolation between the power line and the transceiver and be capable of sustaining 3750 Volt line surges in accordance with the appropriate UL specification.

We use an air gap transformer so that the transformer is not saturated by the power line alternating current or the noise on the power line. Also, an air gap transformer concentrates the major flux in the gap so that permiability can be controlled within ±1%. An ungapped transformer would provide higher permeability but at the expense of a ±25% variation.

In the transmit mode, when data is being transmitted to the power line, the circuit 44 must provide a low impedance since the power line is of unknown and varying impedance. This prevents variations in the AC power line impedance from overloading the drive transistors 21 and 22. Capacitor Cx which is 0.039 microfarads, in conjunction with the transformer T2 provides this effect. When the drivers are ON, a low impedance path is provided. When the drivers are OFF a high impedance path is provided, and the leakage inductance of the transformer is not seen.

The transformer T2 is a Ferroxcube 2213P-A600-3B9. By winding the primary and secondary on opposite sides of a split bobbin, a voltage breakdown between the primary and secondary of better than 3750 Volts may be achieved. The transformer T2 utilizes a turns ratio of 1 to 2.6; that is the primary between terminals 1 and 2 being 1, and the secondary between terminals 3 and 4 being 2.6. This provides a primary incremental inductance of 1.6 milliHenrys±5% and a leakage inductance of less than 1 milliHenrys. The operational frequency is 10 to 100 KHz. The primary consists of 51 turns of number 26 AWG and the secondary of 133 turns of number 30 AWG.

Thus, in the receive mode the carrier is supplied on line 100 after filtering the carrier and its low frequency harmonics. The signal on line 100 is supplied to the spike clipper generally indicated at 64 in FIG. 5B.

The spike clipper 64 comprises a operational amplifier 102 connected, as shown. Circuit 64 sets the gain and threshold of the input circuits and drains energy from spikes on the power line.

The analog front end, generally indicated at 66, comprises operational amplifiers 104 and 106. Operational amplifier 104 and its associated components forms a

Network Operation

We have achieved excellent communications at 1200 Baud between a master and any slave over 5000 feet of 12-gauge Romex cable. Longer distances may be achieved, particularly with widely separated conductors.

Communictions will generally occur between phases of the same step-down transformer; testing is recommended since a saturated transformer can cause drop-outs of communications. (While step-down transformers are not generally operated at loads causing saturations, in practice some are.) Communications through high-voltage transmission lines between step-down transformers will generally not occur.

The data rate and pooling time are dependent on the number of devices in the network and the amount of data transferred. Table 5 shows the number of slaves which can be polled each second, as a function of the total number of bytes which are transferred between the master and the slave with each polling transaction, counting the sum of the length of any message from master to slave and the length of the reply from the slave to the master. The individual size of the messages makes no difference; only the sum is important. Zero bytes of data, for example, might be transferred in an exception-reporting scheme, where no reply indicates "okay". Messages longer than thirty bytes are also possible, since a link to any slave may be continued indefinitely; then, the data rate in both directions is 120 bytes per second, exclusive of the overhead needed to establish the link at the beginning of the message.

TABLE 5

| Number of Information Bytes Transferred per Device | Number of Devices Polled Per Second |
|---|---|
| 0 | 16 |
| 1 | 14.1 |
| 2 | 12.6 |
| 4 | 10.6 |
| 8 | 8 |
| 15 | 5.4 |
| 30 | 3.4 |

RS 232C Handshake Protocol

The transceivers provide an RS 232C Handshake Protocol as shown in Table 6. PIN references are to connector J2 of FIG. 5D.

TABLE 6

| Pin | Name | Description |
|---|---|---|
| 1 | Chassis Ground | |
| 2 | Transmit Data | Serial Data into Transceiver |
| 3 | Receive Data | Serial Data out of Transceiver |
| 5 | Clear to Send | High output from Transceiver indicated readiness to receive data from Host; Low indicates Transceiver buffer full |
| 6 | Data Set Ready | Output from Transceiver always High |
| 7 | Signal Ground | |
| 8 | Data Carrier Detect | Output from Transceiver always High |
| 20 | Data Terminal Ready | High Input to Transceiver enables output of buffered data from Transceiver; Low input to Transceiver inhibits output |
| 21 | Signal Quality | High Output from Transceiver means acceptable signal quality; low output means retry rate above threshold (Same as COMM light) |

Network Specifications

The transceivers, one of which is shown in detail in FIG. 5, provide for the following local area network specifications.

Application: Provides multi-user networking of data over AC power lines within a building.

Communications: Full-duplex data exchange at a continuous total rate of 1200 bits/second between units.

Error Rate: One undetected data error per two years continuous operation, guaranteed by built-in software error detection and correction logic.

Units in Network: Maximum 256 devices.

Total Distance: Maximum 5000 feet.

Interfaces: Standard: RS 232C with standard control signals.

Configurations:
  Baud rate to host: 300 to 9600 bits/second.
  Parity: Odd, even, none, ignore.
  Word length: 7 or 8 bits.
  Normal or Test Mode operations.
  Address on network: 00 to FF.

Indicator LED's: POWER to indicate AC operating power; COMM to indicate error free link.

Power Connection: Terminal block or 3-prong plug with 6 foot cord.

Power Requirement: 115 VAC±15%, 8 watts maximum.

Dimensions:
  Self-contained unit: metal case with drip-proof convection ventilation: 5"W×7"H×3.5"D.
  OEM circuit board: 5.5"×6.5".

Environment:
  Maximum temperature: 140 degrees F.
  Maximum humidity: 95%, non-condensing.
  High resistance to shock, vibration, EMI, and power line noise.

THE TRANSCEIVER

Now referring to FIG. 4, a transceiver according to the invention is generally indicated at 20. The AC power line is indicated at 21. A transorb 40 is connected across the power line 21. The power supply 42 and the transceiver 20 are connected at power line 21. The transceiver 20 is connected through an analog impedance matching and high pass filter network 44 that comprises an air gap coupling transformer. The modulator portion of the transceiver 20 is generally indicated at 46, it comprises a timing generator 48 which generates carrier frequency of 31.25 KHz on line 50. This is supplied to an output driver network 52 and is switched on and off by a signal from the microprocessor 54 on line 56. The ON OFF keyed carrier at 31.25 KHz is supplied to the matching high pass filter network 44 on line 58. The carrier is a sinusoidal signal varying between ±12 volts, as shown.

The choice of carrier signals is part of the invention. The carrier must be high enough so that the alternating current and its harmonics can be filtered to separate the carrier at a receiver. According to the prior art, the carrier should be very high, preferably in the order of 100 kilocycles or higher. However, we have discovered narrow band filter centered at the carrier frequency and provides some filtering against deleterious noise. The filter has an effective Q of 9 which provides some additional noise rejection. However, the filter will ring according to the energy content of the spikes it receives. Therefore, the spike clipper 64 is utilized to drain energy from spikes to reduce this possibility.

The entire input circuitry comprising circuits 44, 64, and 66 reflect an equivalent detectable carrier threshold of approximately 32.6 millivolts to the power line 21. The analog detected carrier signal is converted to a square wave by operational amplifier 106 and the square wave carrier is supplied on line 68 to one of the latches 110 of FIG. 5B connected to a read only memory 112 (FIG. 5D). Another latch circuit 114 is provided since latch 110 does not provide enough latches. The latches 110 and 114 and read only memory 112 form the state machine of the invention that provides a digital detection and filtering action. The operation of the state machine, its program, and state diagram are discussed below. The output of state machine 70 is provided on line 116 as the data input to microprocessor 54 (FIG. 5D).

Again, referring to FIG. 5A the output driver, generally indicated at 52, provides a high impedance when OFF. It receives carrier on line 50. This is amplified in amplifier 116 and supplied to digital switch 118. Digital switch 118 is controlled by the data signal on line 56 from the microprocessor 54. When switch 118 is closed the controlled gain of operational amplifier 116 controls the amplitude of the outputs of drive transistors 21 and 22. Thus, the output driver of 52 is controlled by a switch feedback network, it provides a high impedance when OFF so as not to deleteriously affect reception of data from the power line and a low impedance when ON so as to match the unknown impedance of the power line.

This circuit also meets the maximum current density specification into a power line, and rise time limit specifications set by the F.C.C. The slew rate of the operational amplifier 116 is controlled by the feedback capacitors C19 to meet these specifications. The output data signal on line 56 is provided to the state machine 70 via line 120 to reset the state machine to its Ø state upon a data transmission. This means that the state machine does not detect the transceiver's own transmissions. If such is desired, for example in a local area network using collision detection (CS/CSMA), line 120 merely has to be cut to effect this purpose and an appropriate collision detection program stored in the microprocessor 54.

Now referring to FIG. 5C the baud rate selection circuitry 88 is conventional and is under control of switches 122. Similarly the connections between the UR 74, and the RS 232 port 24, and the microprocessor 54 are conventional as are the connections of the configurations switches 94.

FIG. 6 is a detailed schematic of a power supply for the transceiver of FIG. 5.

Table 7 and 8 give additional information concerning the detailed configuration of the transceiver of FIG. 5.

TABLE 7

| I.C. | GND | +5v | Filter Cap |
|---|---|---|---|
| 8749 | 20.7 | 26, 40 | C10 |
| 8251A | 4 | 26 | |
| 74LS00 | 7 | 14 | |

TABLE 7-continued

| I.C. | GND | +5v | Filter Cap |
|---|---|---|---|
| 74LS74 | 7 | 14, 4 | C14 |
| 74LS151 | 8 | 16 | |
| 74LS161 | 8,5,6 | 1,3,4,7, 10,16 | C9 |
| 74LS273 | 10 | 20 | C8 |
| 74LS393 | 7 | 14 | C6 |

TABLE 8

| I.C. | GND | +5v | +8v | −8V | Filter Cap |
|---|---|---|---|---|---|
| 1488 | 7 | | +v-14 | −v-1 | C15,C16 |
| 1489 | 7 | 14 | | | |
| T8P28L42 | 10,15 | 20 | | | C7 |
| K1116AM | 7 | 14 | | | |
| DG200A | 3 | | 12 | 7 | C11 |
| LF347 | | | 4 | 11 | C16 |
| LM311 | 1 | | 8 | 4 | |

The State Machine Program

The program listings for the state machine are found in Appendix A. As previously stated, the state machine receives the analog filtered carrier on line 68 (FIG. 4) and an eight times carrier clock signal on line 71. The state machine determines whether the carrier square wave signal on line 68 provides transitions at the appropriate time and then counts the good transitions to detect the eight good carriers necessary to declare a Ø and the absence of eight good carriers necessary to declare a 1.

For a fuller understanding to the state machine, reference should be made to the state diagram of FIG. 7 comprising FIGS. 7A through 7H. There, the circles indicate states. If the carrier square wave on line 68 is high, a 1 input to the state machine (NOT a received 1), the state machine 70 goes to the state indicated by the arrow labeled 1. If the carrier square wave on line 68 is lower Ø input to the state machine, the state machine goes to the next state indicated by the arrow labeled Ø. These states are indicated in the listings of Appendix A to the right of the plus sign "+" the exact sequence recorded in the ROM 112 of FIG. 5D is shown in FIG. 8 in Intel Hexidecimal format.

THE TRANSCEIVER PROGRAMS 1.0 INTRODUCTION

Below we describe the implementation of the multi-drop software systems with reference to the Master and Slave programs source listings set out in the Appendixes B and C.

The protocol implemented has the following characteristics:
Master/Slave Multi-drop Topology
1 Master
1-255 Slaves
Slaves uniquely addressable
Protocol is error protected
Broadcast functionality
Auto-polling functionality
Block ahead acknowledgement In addition, a test mode is provided for verification of line quality and installation checkout.

Referring to FIG. 9 the Master 20 supports a simple non-protected protocol to a "host" computer with flow control implemented in both directions.

The Slave stations 20 support a simple non-protected protocol to a slave "host" device with uni-directional flow control. The interfaces to the Master and Slave are accomplished via an Intel 8251 UART using standard RS-232 control. See above for further details of the hardware.

2.0 FOREGROUND

The foreground in both the Master and Slave programs implements a UART for the remainder of the programs. The users (background) is provided with 2 services:
Read a character
Send a message
The internal timer in the 8049 is used to establish a time base which generates timer interrupts at 2 frequencies.
TQBIT—¼ bit time on wire
TOBIT—1 bit time on wire
These constants provide the basic transmit and receive clocks to the software modem. The embodiment disclosed uses values of $-2$ and $-8$ giving interrupt periods of 160 and 640 microseconds, respectively.

The 8049 uses the basic machine cycle clock to determine the frequency at which to increment this counter. The equation is simply:

Machine Clock/32=frequency at which counter is incremented.

At 6 MHZ XTAL, the clock cycle is XTAL/15 or 400 KHZ. Prescale this by 32 to give 12.5 KHZ. Convert to period to give 80 microseconds. Similarly, at 8 MHZ then the period is $$60\ \text{microseconds} = [(15.32 \times 10^6\ \text{microseconds})/(8 \times 10^6)]$$

In the current implementation interrupts are occurring every 160 or 640 microseconds. It is important to note that there is no software latency since this is the only interrupt used in the implementation. Furthermore, the divide by 32 pre-scaler is only cleared when the timer is started. This implies that as long as the timer is not restarted and foreground reloads the counter within 32 machine cycles, then interrupts will occur exactly every 160 or 640 microseconds. The following constraints are imposed on the implementation of the foreground:
Timer must be reloaded within 32 machine cycles.
No servicing must exceed the time slice.

The precise time base is critical to the implementation since the output bit stream to the wire is derived from this timer. Background must never disable or restart timer interrupts. Furthermore, the external interrupt cannot be used as an interrupt source because of the interrupt priorities in the 8049.

2.1 General Architecture

As discussed in the previous section, the foreground is entered every 160 or 640 microseconds (i.e., every 64 or 256 machine cycles). The foreground implements a software UART. The structure is a state machine. In general, the 2nd bank of registers and flag 1 are reserved for the foreground. The variable USTATE defines which state the foreground is currently in. The possible states are given in TABLE 9.

TABLE 9

| State # | Period | Description |
|---|---|---|
| 0 | TQBIT | Start Bit Search |
| 1 | TQBIT | Start Bit Verification |
| 2 | TOBIT | Receive 8 Data Bits |
| 3 | TOBIT | Receive Parity Bit |
| 4 | TOBIT | Stop Bit Verification |
| 5 | TOBIT | Transmit Start Bit |
| 6-13 | TOBIT | Transmit 8 Data Bits |
| 14 | TOBIT | Transmit Parity Bit |
| 15 | TOBIT | Transmit Stop Bit |
| 16 | TOBIT | Stop Bit Duration Complete |

The UART is in one of two major states: Read (Sub-states 0-4) or Write (Sub-states 5-16). Upon initialization, the UART is in read state and will continuously read characters on the line and pass the character information to the background via an interface register (see next section). The UART will continuously read the wire until requested to transmit by the background. The background requests that the UART transmit by setting the STATE to transmit (substate 5) and supplying a buffer to transmit. The UART will transmit the buffer by using sub-states 5-16 repetitively until the message buffer has been completely transmitted. At this point, the UART will automatically return to substate 0 and minitor the line for incoming characters. This structure is ideal for the block ahead acknowledgement protocol impelemented by the background. From the background's point of view the UART is reading characters one at a time and transferring them to background. When background decides to respond, it builds a response and requests that the UART transmit the message. From the background's point of view, once requested to transmit, the data is sent and the background immediately waits for a reply from the UART. The UART transmits the information to the wire and automatically turns the line around and waits for a response to send to background. The point here is that the background is never signalled by the UART when the transmission is completed. All transmissions are automatically paired with a reception at the lowest UART level.

2.2 Foreground Interface

As already discussed, the foreground task is entered via a timer interrupt every TQBIT*32 or TOBIT*32 machine cycles and this timing is exact.

The UART provides a timeout flat on reception for use by the background. In fact flag #1 (F1) is dedicated to this use. This flag is associated to the foreground timeout counter XCNTRT. This counter is advanced by 1 during start bit search. If this counter overflows, then the receive timeout flag is set. This flag will be set when no valid start bit is detected within 256 TQBIT times or 64 bit times. This imposes a window in which a device must respond if it is going to respond. Latencies in a slave exceeding 64 bit times will cause the link to be inoperable since the Master will time out and start retransmitting while the Slave is also transmitting its response. This 64 bit response window must be observed by background.

The read interface between the foreground and background consists of a data register and a status register.
UDATA—Contains read 8 bit character
UFLAG—Status flag
The UFLAG contains 3 status bits reflecting horizontal parity error, over-run error, framing error and character available.

When the UART is in receive state, it monitors for a valid start bit. Once a start bit is recognized, data is shifted into a shift register. Upon completion of reading the character, the read character will be transferred to UDATA for access by the application. The status register will be updated (UFLAG) to reflect that a new character is available. If a horizontal parity error was detected, then a status bit will be set, signalling that the character is invalid, similarly for a framing error. If the UART has assembled a character and background has not read the previous character, (i.e., data available still set in UFLAG) then the previous character is over-written and the over-run status flag is set. This imposes a constraint on background to service incoming characters within 1 character time (11 bit times). In system timing, this implies that background must process each incoming character within approximately 7 milliseconds. Failure to process within this window will result in loss of characters and re-transmissions on the wire. The receive interface is therefore basically the following:

Background continuously samples receive character available in UFLAG.

Foreground assembles character and sets receive character available.

Background sees receive character available and reads the character.

Background clears receive character available and clears error status indicators.

It should be noted that the timeout flag (F1) discussed earlier does not stop reception. In fact, every 64 bit times the flag willl be set if no valid start bit has been recognized.

Once the application has read a message or decides that it is time to transmit, the background must do the following:

Set UPTR to the start of the 1st byte of a message to transmit (UPTR)

Set STATE to sub-state 5 (UPSTATE)

These two operations must be atomic. The easiest way to guarantee this by the background is to re-load the timer with TQBIT. Since the pre-scaler is not cleared by this operation, this will guarantee that no clock interrupts will occur between TQBIT and TQBIT-1. If TQBIT is changed in the future to increase data rates and TQBIT ends up set to −1 then the above scheme must reload the timer with TQBIT+1 to ensure sufficient time to set up these variables.

If the timeout flag is set (F1), the user should clear this flat before starting to test for a response from the message just transmitted, since the timeout was for the previous message. The UART assumes that the number of bytes in the buffer for transmission is equal to the least significant nibble of the first byte of the buffer plus 3. That is, the UART upon the next timer interrupt will enter sub-state 5 which will establish a character transmit counter. This counter is loaded by masking of the LS4 bits of the first byte and adding 3. This represents a message of the form:

CTRL Byte 1
CTRL Byte 2
DATA Bytes
CHECK Byte where the LS4 bits of CTRL byte 1 specify the number of data bytes. The precise message syntax is discussed later. The point here is that the UART doesn't know what the format of the message is except that the least significant 4 bits of the first byte pointed to by UPTR specifies the number of bytes −3 to transmit. The smallest message which can be transmitted is, therefore, 3 bytes.

The characters will be transmitted one after the other until all have been sent at which point the UART will clear the receive character timeout flag and timeout sub-counter and enter start bit search waiting for a reply. 64 bit times later, if no response is received, the timeout flag will be set indicating that no response was received for the message just transmitted.

2.3 Framing

Each character sent on the wire is composed of 11 bits.
Start bit (space)
8 data bits (least significant first)
Horizontal parity bit (even parity)
Stop bit (mark)

The data bits are transmitted least significant bit first. The UART provides an even parity bit which it calculates during the transmission of each character.

Each character is framed with a start bit and a stop bit. The start bit is a line space while the stop bit is a line mark. Upon completion of transmission of the last character the line will be (and must be) left in a marking state.

The timing on the stop bit between character transmissions is exactly 1 bit time. Upon completion of the full stop bit on the last character in a transmit message, the UART will delay entering the start bit search state for an additional ¼ bit time. This is a constant and is used to prevent the UART from reading the tail end of its own transmission. The output to A/C modem is reflected back to the 8049 on the input line after a modem delay. This delay is assumed to not exceed 1 bit time. The ¼ assures use that we are well within the stop bit of our last transmission when we turn around to read. If the delay in the modem were exactly 1 bit time (640 microseconds) then we would see the last ¾ of our own stop bit. If the bit rates are increased or the delays in the modem changed, then this TQBIT delay in the UART sub-state 16 will have to be changed to insure that read state is not entered prematurely with the result that the tail end of our transmission is recognized as the start of transmission from a responding unit.

2.4 Bit Synchronization

As discussed earlier in this document, the UART is interrupted at a precise rate (TQBIT or TOBIT) with no latency. The transmission of a new bit should occur at the same time within each interrupt window. The UART transmit states have been coded so that a new bit is output at nearly the exact time within the interrupt window.

TABLE 10

| State | Cycles to Transition |
|---|---|
| 5 | 19 (this is only on 1st start bit of the message) |
| 6–12 | 13 |
| 13 | 13 |
| 14 | 13 |
| 15 | 12 |
| 16 | 14 |

With the exception of the first start bit the remaining bits are output to within ±1 cycle of a nominal 13 cycles. An additional 1 cycle error can be introduced by a delay in starting the timer interrupt servicer when background is executing a 2 cycle instruction. Hence, a range of 12-15 cycles is possible in transitioning of the output. This will result in 7.5 microsecond variations between the duration of bits. This error is not cumulative. Any work at the UART level must insure that the bit times are transitioned very close to the same time within each interrupt window.

On input start bits are monitored every ¼ bit time. When a start bit is recognized the UART will delay ¼ additional bit time and verify the start bit. This results in sampling the data bit stream somewhere in the second quarter of the bit. As with the transmit, the sampling is performed nearly at the same time within the interrupt time slice for each of the read states. The sampling occurs 13 cycles into the time slice ±1 cycle.

There is plenty of design tolerance in this design. However, if the modem speeds are increased to, say, 9600 baud, an additional level of software balancing is required to insure that the sampling and transitioning occur at the exact same number of cycles within the interrupt window. This can be accomplished by a few strategically placed NOP's. At 9600 baud a ¼ bit is 20 microseconds. 7.5 microsecond variations start to become significant. Furthermore, the entire UART must be carefully timed out to insure that each state can execute in its alloted slice. The start bit search is the most time sensitive and must be further optimized at faster rates.

2.5 Parity

As mentioned briefly above, the UART provides horizontal checksum capability on each character transmitted and checks horizontal parity on each received character. The parity implemented by the traditional even parity check. The horizontal parity is completely transparent to the background and is handled completely at the foreground level. The only indication to the background is that a parity error in a character was recognized via the parity error status bit in UFLAG. Conversely, the vertical parity error is left to the application level. The UART performs no vertical checking and from the UART's point of view the check character is just another character to be transmitted or received.

3.0 SYSTEM BUFFERING

Referring to FIG. 10 the buffering in the units is fairly complicated in order to provide rapid turnaround on the powerline modem. The design attempts to minimize the time received to initiate a response in order to get the maximum bandwidth on the powerline. A total of 5 buffers are used in each device:
Host Receive Buffer
Host Transmit Buffer
Modem Receive Buffer
Modem Transmit Buffer #0
Modem Transmit Buffer #1

The Modem Transmit Buffers have an additional attribute which will be referred to as the current attribute. The current buffer is the buffer currently being transmitted on the wire.

The two host buffers are circular and controlled by 6 parameters.
2 Put Pointers (HXPTR, HRPTR)
2 Get Pointers (HXGPTR, HRGPTR)
2 Counters (HXCNT, HRCNT)

All information transferred to or from the host pass through the host circlar buffers.

Characters are continuously monitored at the input UART from the host. When a character is available, it is read and placed in the input host buffer. In turn, the host receive buffer continuously monitors the host receive buffer. When a character exists in the buffer, the character will be moved to the alternate (non-current) modem transmit buffer. If the alternate modem transmit buffer is full, then the input host character is left in the host buffer. The idea here is that the alternate buffer is being built while the current buffer is being transmitted and acknowledged. Upon successful acknowledgement the alternate buffer is built and ready to go. All the application does is switch the alternate buffer to the current buffer (8049 flag #0, F0 specifies the current buffer). This scheme provides a double buffered host input as well as minimizing the turnaround time to transmit the next data message, thereby enhancing the bandwidth on the network. The section on host protocol will discuss the interface between the host input-/output buffers and the host.

Data entering a unit from the modem is always placed in the Modem Receive Buffer. This buffer will only contain the data portion of the message and is therefore exactly 15 bytes in length. The control characters are stored separately by the application. Once a message has been successfully read and determined to be a new message (see section on Protocol), the contents of the buffer will be moved to the Host Transmit Buffer for transmission to the host. If the data bytes will overflow the output buffer to the host, then the entire message will be rejected. This flow control is implemented differently in the Master and Slave stations. In the Slave the message is thrown away and no response is made to the Master. The Master will eventually timeout and re-transmit. Hopefully, sufficient data has been offloaded to the host at this time to create enough room in the Transmit Buffer to accept the re-transmitted data. The Master flow controls the link by sending a negative acknowledgement to the Slave and discarding the received message. The negative acknowledgement will cause the Slave to re-transmit the message, and again, hopefully sufficient information has been output to create enough room in the Host Transmit Buffer to accept the new incoming data message.

As mentioned above, the two host buffers are circular buffers controlled by get and put pointers and character counts. The Modem Receive Buffer contains the user data portion of an incoming message with the control characters removed. The control characters specify the number of data bytes in this buffer. The modem transmit buffers are exact images of the messages sent on the network. The LS4 bits of the first character specify the number of data characters in the message and hence currently in the Modem Transmit Buffer. The next section discusses the format of messages on the network. Table 11 gives the buffer sizes.

TABLE 11

| BUFFER | MASTER | SLAVE |
|---|---|---|
| MT0BUF | MTBSZ=18 | MTBSZ=18 |
| MT1BUF | MTBSZ=18 | MTBSZ=18 |
| MRBUF | MRBSZ=15 | MRBSZ=15 |
| HRBUF | HRBSZ=19 | HRBSZ=19 |
| HXBUF | HXBSZ=19 | HXBSZ=20 |

It should be noted that:
(1) MTBSZ - Must equal maximum message length including control;
(2) MRBSZ - Must equal maximum # of user bytes in message;
(3) HRBSZ - Any size will work; and
(4) HXBSZ - Must be greater than or equal to MRBSZ.

4.0 PROTOCOL SYNTAX

FIG. 11 illustrates the syntax of a message. The message is comprised of 4 fields with the data field optional. The fields are:

Control
Address
Data
Block Check

The control field is comprised of three control bits, one unused bit which is always zero, and a four bit count. The ACK bit is used to specify a positive or negative acknowledge and is discussed in the next section. The ADR bit is used to specify whether the message is the first message being sent to a slave. The ADR bit will be set only by the Master when the Master is trying to establish a connection with a slave. The address bit will never be set and will always be zero in messages originating from a slave. The SEQ bit is used to specify the sequence number of a message and is used to prevent duplicate messages being passed through to the host. In the implementation the sequence number is bound to the modem transmit buffers. That is, every message which is transmitted from MT0BUF will have the sequence bit set to 0 and every message from MT1BUF will have the sequence number set to a 1. In fact, these bits are set as part of power on initialization in the modem transmit buffers and remain unaltered. The count field of the control byte specifies the number of data bytes to follow the assumes a range from 0-15. A zero value specifies that no user data is included in the message.

The address field specifies the particular slave to which the Master is communicating. Slave addresses assume a range from 1-255. When the Master is requested to communicate to a slave at a given address, the Master will initialize the second byte of each modem transmit buffer with the address. The slave initializes the second byte of each of its modem transmit buffers with its address as read from configuration dip switches as part of system initialization.

An address value of zero is a special case and signifies a broadcast. No slave can have an address of zero. No check is performed on slave initialization that the address straps are all zero, this is considered an installation failure. Broadcasting is discussed in the next section.

As previously discussed, the UART appends an even parity bit to each character.

The block check character is the exclusive OR of all characters in the message and provides a longitudinal redundancy check for the message. Only the data bits are included in this check byte; parity is excluded. In order for a message to be accepted the horizontal parity on every character must come out even, including the block check character. The foreground will reject any character with an odd horizontal parity and background will reject an entire message if any character is rejected by foreground. Once a message is read and free of framing or horizontal errors the control byte, address byte and data bytes are exclusive OR'd together to compute the check digit. The computed check digit is then compared to the received block check character. The message will be rejected if unequal or accepted as correct if equal.

In a loaded system where every message being transmitted has the maximum 15 bytes of user data the Protocol overhead is 39.4%.

| | |
|---|---|
| Data Bits | 120 |
| Control Bits | 16 |
| Parity Bits | 26 |
| Start Bits | 18 |
| Stop Bits | 18 |
| | 198 |
| Data Bits | 61.6% |
| Overhead | 39.4% |

5.0 PROTOCOL SEMANTICS

The Protocol implemented has three major states referred to as Connect, Data Transfer and Idle. In the Idle state the Master is waiting for an address from the host to which a connection is to be made. There is no traffic on the wire and both the Master's and Slave's software UARTS are in receive state and continuously timing out. Once a connect address is received from the host the Master will enter Connect state and try to establish a circuit to the slave. If the connection is established both the Master and Slave enter the Data state. Otherwise the Master drops back to the Idle state if no connection can be established.

5.1 Protocol Concepts

Before discussing the wire Protocol in detail, some of the basic concepts need discussion. As mentioned earlier, both the Slave and Master have two wire transmit buffers referred to as MT0BUF and MT1BUF. The buffers are bound tightly to a sequence number with all messages transmitted from buffer 0 having a sequence number of 0 and those from MT1BUF having a sequence number of 1. The transmitted sequence numbers are used to prevent duplicate messages from being transmitted to the attached host devices. A station, once connected, maintains a last received sequence number (LRS). This is the sequence number of the last correctly received message which has been buffered for output to the attached host device. If a new message is received which is free of physical defects with the same sequence number as the LRS then the message is a duplicate. The message will be acknowledged but not queued for output to the host device since it has already been successfully read and queued for output to the host. If a message is received with a sequence number different from the LRS then the message is a new message, is queued for output to the host device and the LRS is toggled.

The following responses to a received message will be generated by a slave station:
ACK
No Response The following responses to a received message will be generated by a master station:
ACK
NAK
No Response The ACK's signal that the previously transmitted message was correctly received and the sending station can discard the message and transmit a new message. The ACK/NAK responses are embedded within data messages going in the other direction, hence the label block ahead acknowledgement. Consequently, once a connection between the Master and a Slave station has been established there is a continuous exchange of information back and forth on the wire.

5.2 Circuit Establishment-Slave

The slave station will continuously read messages on the wire whether connected or not. A slave station will never respond to a message which has a physical defect. There are 2 flags which control the major state in the slave.

STRTUP—If set, implies that the slave is not currently connected to the master, i.e., the slave is in idle state and no circuit exists to the slave.

DATAS—If set, implies that the slave station is connected to the Master and data is being exchanged.

On slave power on initialization the state of these flags are set to (STRTUP=1, DATAS=0). Similarly, whenever an address message is received (bit 6 of control byte=1) for a different slave station these variables will be initialized to the above initial conditions.

Slave connect processing involves the following four cases.

Case 1

ACK STRTUP=1

This is normal case. Address SEQ correctly received and slave is waiting to be connected implied ACK on current transmit buffer. Set up BUFFER 0 and LRS=0 clear STRTUP.

Case 2

NAK STRTUP=1

This case is processed identical to Case 1 and indicates that the masters 1st or subsequent address messages were hit on the line.

Case 3

ACK STRTUP=0

This case is processed identically to Case 1 and indicates that either the master powered off while a circuit was established or the master went to the Idle state after circuit to the slave and now is attempting to re-establish circuit.

Case 4

NAK STRTUP=0

This case implies that the slave is connected and the master is trying to re-connect and the 1st or subsequent ADDR message have been hit on the line.

There is no explicit disconnect control message in the Protocol. The disconnect at each slave is an implied disconnect. That is, from a slave's view, once connected, always connected, until a connect message is recognized for another station. Hence, except for initial startup of the network, some slave is always connected to the Master (i.e., the last one addressed) even though the Master is in idle state.

The recognition of an address sequence at a slave has two implications. The first is that the master wishes to establish a connection and the second is that the last buffer which the slave was transmitting is acknowledged. This acknowledgement is referred to as the implied ACK. Once a slave is exchanging data with the Master one of the two modem transmit buffers is active and the slave is waiting for an acknowledgement from the Master. Once the acknowledgement is received than the alternate buffer will be transmitted. This prevents a problem to the Master in how to connect to another device since if the Master acknowledges the last received message then the slave will send a new message which must be acknowledged etc, etc. The rule implemented in the Protocol is that the Master will only request a connection to a slave station when the last message received from the currently connected slave is successfully received. The Master will then address the new slave and not acknowledge the last received message. From the slave's point of view since the Master has addressed somebody else, the current buffer was correctly received by the Master and must be flushed in order that it not be transmitted when the slave is again addressed and hence transmit the same message twice. The above is the "implied ACK" which is critical to the Protocol in the absence of a disconnect control sequence.

When a slave recognizes an address sequence control message, it either thinks that it is already connected to the Master or some other slave is connected. Three situations exist to cause the slave to think that it is already connected to the Master:

Master powered off when circuit was established to the slave and on power on the host requests that a new connection be established to the slave.

Master was placed in idle state by its host when a connection was established to the slave. The host then requests a new connection to the same slave.

Master attempts to address another slave when currently connected. The connected slave never sees any of the address request or data messages to the other slave (improbable but possible) and the host then requests a connection back to the slave.

All three cases are handled identically in the slave.

If the slave is currently connected, or not, and an address request is recognized for the slave then the currently active modem transmit buffer is discarded because of the implied ACK on the address sequence. Any data accompanying the address sequence is buffered to the output device and the startup flag will be cleared.

The Master expects that the first data message from the slave will have a sequence number of zero. Furthermore, the slave assumes that the sequence number embedded in the address sequence is a zero and the sequence numbers will toggle during the data exchange. The slave goes through a process of resetting its internal sequence numbers etc. to guarantee that everything starts at zero. This may involve the actual transfer of information from one modem transmit to the other buffer since the sequence numbers are tightly bound to the buffer. This case occurs when the implied ACK was for buffer number 0 and the slave would normally transmit buffer number 1 next. In this case, buffer number 1 is copied to buffer number 0.

If an address sequence is recognized with a NAK and the STRTUP flag is set then the processing is identical to the ACK cases above. This case implies that the initial addressing sequence was hit on the line coming over. The slave never saw it and hence never responded the Master timed out and re-addressed with NAK.

If an address sequence is recognized with a NAK and the STRTUP flag is reset, then in general the response to a correctly seen address sequence was hit going back to the Master. The slave has copied buffers reset sequence numbers etc. but the response was never seen by the Master. If the DATAS flag is 0 implying that no data transfer has occurred then this is the case and the current buffer (#0 since we just initialized) is re-transmitted with ACK. Any information received in the address sequence is discarded since it has already been queued to the host. If DATAS is set then, the following error case has occurred.

Slave was connected
Master addressed another slave
Slave which was connected never saw the new address sequence or any data transfer
Master then readdressed slave
Slave didn't see address sequence
Master retried address sequence with NAK
Slave saw address sequence with NAK This is just an implied ACK case and the slave has not re-initialized sequence numbers; buffers etc. yet. This case is processed just as if an ACK was seen.

5.3 Circuit Establishment Master

The establishment of a circuit from the Master's point of view is trivial. The Master simply loads transmit buffer ∅ with an address sequence control byte, the address of the slave to be connected and any data to be sent to the slave and transmits it. If valid response is recognized then any data accompanying the response is transferred to host together with an ASCII ACK code. If non response is received or checksum error then address sequence is retried with NAK until a re-try counter is exhausted or the slave successfully responds. If the re-try counter expires then a NAK ASCII character is sent any data is discarded and the Master will wait for another request from host.

5.4 Data Transfer

Once a circuit is established between a Master and a slave, data will be continuously exchanged with the ACK's and NAK's embedded with response data. The Protocol can be viewed a 2 half duplex channels being run simultaneously. The rules in the slave are as follows:
1. If a message is bad because of missing characters, vertical or horizontal parity errors, ignore the message and don't respond. If the message is good do step #2.
2. Check the sequence number in the received message against the current LRS. If equal, go to step 3. If unequal, determine if the data content of the input message will fit in the output buffer to the host. If there is not enough room in the output buffer, then don't respond to the message. This is the link flow control mechanism when the slaves output buffer fills. The Master will timeout and re-transmit at which time hopefully there will be enough buffer space to hold the message for output. If there is enough room, the data portion of the message will be transferred to the host transmit buffer and the LRS toggled. Then do step 3.
3. If the message was an ACK then switch buffers to the other modem transmit buffer (i.e., if using MT∅BUF then switch to MT1BUF and vice versa). This has the effect of switching the sequence number and freeing the current transmit buffer to be filled with additional host data. Then transmit the new buffer and done. If the message received had a NAK then re-transmit the current buffer, and done.

The rules for the Master are identical with the exception that a NAK will never been seen. Instead of a NAK the Master will timeout and the processing of a timeout in the Master is identical to a NAK in the slave. FIG. 11 illustrates these rules.

5.5. Circuit Disconnect

The slave disconnects when it recognizes a valid message to another slave address. The message can be either a connect message or a data message. The slave station will then passively monitor the line, discarding all messages received including data messages to its own address, until a message is received containing both its own address and the connect request bit set.

The Master's sequence is more complicated. When a transmit buffer is being sent to a slave, the Master's other modem transmit buffer is being filled from the host receive buffer. This fill process is continuously monitoring for a host address sequence (A, B, C, D, E or ESC) ASCII character. When one of these characters is recognized the fill process stops filling the alternate buffer, as there is no more data to transmit to the slave and a stop flag (XSTOP) is set.

After the transmission of every message the Master checks the stop flag and, if it is set, initiates a disconnect to the current slave.

This disconnect consists of the following steps at the Master.
1. Continue to the data transfer state until both modem buffers are empty. Since the fill process has stopped loading characters, this has the effect of sending the last message from the host, if any, to the slave.
2. Once both buffers are empty, the Master will continue to the data transfer state until a valid message is received from the slave. Once a valid message is received the Master will transfer any data to its host transmit buffer (data from last message from slave) and then enter the idle state.
3. The Master will then process the character which resulted in bringing the link down and wait for another command from its host.

5.6. Timeouts and Re-try Logic-Slave

The slave implements a 64 bit time delay in its software UART. This timeout is used when reading a message to determine that no more characters are coming. That is this timeout is continuously expiring when the network is in an idle state. Once a character is recognized by the slave, this timeout is cleared and additional characters are read. If this timeout expires before an entire message is read, then the message is declared bad. This situation will occur when, for example, the control byte containing the number of data bits is altered on the wire in such a way that the horiziontal parity still checks. Hence, once started, the Master must ensure that the inter-character delay is less than 64 bits or the slave will reject the entire message. The current design has no delay between characters in a message. The inter-message delay can be any value since the slave syncs to the first received character. No other delays or re-try counters are required in the slave.

5.7 Timeouts and Re-try Logic Master

The Master has the same 64 bit timeout built into its software UART and uses it the same as the slave in preventing a lockup waiting for a character from the slave which will never be received. In addition, this timeout is used in two other ways in the Master.
1. After a message is transmitted, this timer is used to timeout a response from the slave. This imposes a constraint on the slave, in that if the slave is going to response to a message, it must respond within a 64 bit time window.

2. If a character is recognized in error via horizontal parity error, or framing error, or if the LRC does not check, then the Master will wait for this timeout to expire to ensure that no more characters are being transmitted by the slave and the line is idle. This is wasteful since a much smaller delay would suffice. However, the program disclosed herein waits the entire 64 bit time to ensure our idle line before re-transmitting.

The retry counter in the Master is RRETRY and its limit is the constant RCOUNT. RCOUNT is set to 8 in the disclosed program. This re-try counter is used in several ways by the Master.

Upon initiation of a connect sequence the Master will try to establish a circuit RCOUNT times before giving up and sending a NAK to the host. Similarly, the Master uses this counter when in the data state to prevent the network from hanging if a slave powers off or malfunctions when connected. If a valid message is not received within RCOUNT tries from a slave, then the Master will automatically start a disconnect sequence to the slave. After the slave has been disconnected, a NAK will be sent to the host specifying that the modem initiated a disconnect.

As discussed earlier, the slave will not respond to a message if the data content of the message will not fit in the host buffer. This method of flow control from the Master's view cannot be distinguished from an error on the line. If the slave's output is 300 baud and the wire is running at 1200 baud, the slave will ignore 3 out of 4 messages. If the network is altered to run faster, then RCOUNT must be changed to provide a greater number of retries since the Master could disconnect when the slave is actually O.K. in flow controlling.

The re-try counter is also used during the disconnect sequence to prevent the network from locking up. Every successful message received from the host will reset the retry counter.

The Master also protects against jamming. If a message is detected in error, as discussed earlier, the Master will read and discard characters until the 64 bit time timeout in the UART is triggered. To prevent an infinite loop when somebody is jamming by putting continuous spaces on the wire, a maximum number of characters (JAMLIM) will be read before the Master gives up and declares an error. This lower level error will cause RRETRY to eventually expire and the Master will drop the link. The network will not work in this case, however, the Master will not hang in an infinite loop and errors will be generated back to its host.

6.0 HOST INTERFACE

Host devices are attached to the network via an RS-232 interface at each station. During power on initialization each device's UART is programmed by DIP switch settings. Both the slave and the Master will convert a character in error to an ASCII NULL (all zeroes). That is, if a parity error or framing error is encountered on a character read from the host then the character will be converted to a NULL.

6.1 Slave/Host Interface

Information is received and transmitted as 8 bit data at this interface. No conversion is performed except for characters read in error as discussed above. The host is assumed to be able to accept characters at the baud rate selected at the slave, although flow control in the slave in the host direction is implemented by the RS-232 CTS. That is, if the host lowers CTS the slave will buffer input to the host until CTS is raised. The host must not leave CTS low for an extended period of time since the slave's buffers will eventually fill and flow control will be initiated across the network with the Master eventually dropping the link.

Host to slave flow control is implemented by the RS-232 DTR signal. A constant HRLIM is used to set a threshold at which the slave will lower DTR. This constant is currently set to the host receive buffer size (HRBSZ) minus 4. When the slave has HRLIM characters stored in its buffer, DTR will be dropped. The host can continue to send to the slave with DTR low, however, the slave will discard characters when its buffer becomes completely full. DTR will remain low until the buffer empties below the HRLIM threshold at which point DTR will be reasserted.

6.2 Master/Host Interface

A more flexible interface to a host is supported at the Master. The DTR/CTS flow control scheme discussed for the slave is also implemented in the Master. In addition an XON/XOFF scheme is implemented. The type of flow control used is specified by DIP switches. The options are:

Transfer of data from Host to Modem
 DTR
 XON/XOFF
Transfer of data from Modem to Host
 XON/XOFF
 CTS The DTR/CTS scheme is identical to that already discussed in the preceding section.

If XON/XOFF is selected in the Host to Modem direction then the Modem will send an XOFF when its buffers reach the HRLIM threshold. A matching XON will not be sent until the host receive buffer is completely emptied. As with the DTR method, the host can continue to send characters after the Modem has sent the XOFF although characters will eventually be discarded when the input buffer completely fills. Once the threshold is exceeded, the modem will send one and only one XOFF character. A second XOFF will be sent only after the buffer has completely emptied and a matching XON has been transmitted.

If XON/XOFF flow control is selected in the Modem to host direction then the host will send an XOFF to the modem when it can no longer accept information from the modem. The Master will then throttle output to the Master within one character. That is the host must be prepared to accept one additional character from the modem after it has sent XOFF. If the host doesn't send a corresponding XON eventually the Master's buffers will fill and the network will shut down until the matching XON is received at which time the link will automatically start up. When the Master recognizes an XOFF from the host, the network will continue to run the characters still being read from the host and transmitted on the wire. If the input buffer fills and XON/XOFF is selected in the other direction, then an XOFF will be sent to the host even though the host has sent an XOFF to the modem. As noted earlier, the host must be prepared to accept one additional character after an XOFF has been sent to the modem. In fact it must also be able to process a second XOFF character in the event that the modem receive buffer overruns. Even though both receive and transmit buffers are shut down the network will run until a message is received from a slave which causes the output buffer which has been shut off via XOFF to overflow. The Master will then wait for room in the output buffer to store the input data. The network will stop with the Master in an infinite loop trying to unload the last received valid message. Eventually, the host will send an XON which cause the host transmit buffer to empty and create room for the last received message which will cause the network to restart at the point which it stopped without the loss of any data.

If the user decides to implement XON/XOFF in the modem to host direction, then care must be taken to make sure that the Master is not left in the XOFF state. On initialization of the host system, it is recommended that the user send an ESC to reset the modem.

6.3 Command Sequence and Processing

The Master continuously monitors input from its host and refreshes its host receive buffer. The following characters are checked for an input:
XON—Flow Control
XOFF—Flow Control
CTRL A—ASCII Connect Request
CTRL B—Binary Connect Request
CTRL C—Known Length ASCII Connect Request
CTRL D—Known Length Binary Connect Request
CTRL E—Autopoll Request
ESC—Reset Request If XON/XOFF is not selected for flow control, modem to host then XON/XOFF characters are passed unaltered to the host receive buffer. If enabled, then these characters set flags at the input layer either to shut off or turn on the output driver. The remaining control characters are translated to internal codes and placed into the receive buffer with the MSB set indicating a control code. No other input characters are placed into the host receive buffer with the MSB set, as they are all converted to 7 bit ASCII first. It should be noted that if the host receive buffer is completely full, then these characters are discarded. The host must obey the flow control rules at the modem. The above protocol control characters are not processed at the input driver, but are placed in the buffer for later processing. As discussed earlier when the network is running, it is continuously performing three operations.
Updating Host Receive Buffer
Updating Host Transmit Buffer
Building Next Message to transmit in alternate modem transmit buffer.

The next message is built by copying characters from the host receive buffer to the alternate modem transmit buffer. As each character is copied, it is checked to see if it has the MSB set. If set, then there is no more information to be sent to the currently connected slave. The control code is left in the receive buffer and a stop flag is set specifying that, when the current buffer has been transmitted, a disconnect sequence is to be initiated, thereby causing the network to be returned to the idle state after both transmit buffers have been emptied. See the discussion in section five on the disconnect sequence.

Once the network has entered the idle state, the host receive buffer is refreshed and processed continuously to build another valid command. The host output buffer is also continuously processed to ensure that any residual information is transferred to the host.

The building of a command is accomplished in the routine GETADR and consists of passing the input character stream for one of the valid commands. Invalid characters etc. are discarded and the Master will wait until a valid command is entered.

If the command is an ESC, then the Master waits for another valid command. The ESC request, therefore, has the effect of stopping the network without having to specify another command. The remaining commands will stop the network for only a short period of time, i.e., the time it takes the modem to build the next valid command and to restart the link.

The CTRL A, B, C, or D commands all specify that a connection is to be established with the device whose address follows. See above for a description of these commands and formats.

Once a valid command has been established, the Master will attempt to connect to the slave address. If successful, the ASCII character ACK followed by the 2 digit hex ASCII slave address will be transmitted to the host; if unsuccessful a NAK followed by the address will be sent.

A disconnect sequence may be initiated by the Modem if the network goes down, in which case a NAK will be sent to the host. That is, the host can see the sequence ACK, ADDR1, ADDR2, Data ... NAK, ADDR1, ADDR2

Although this sequence is very improbable in a correctly functioning system, the modem must bring the system down if the network fails such that it is not possible to communicate with a slave after communications have been successfully started. The reason is to prevent deadlock. If a slave station powers off when a circuit has been established to it, then the Master's buffers will fill since no information is being successfully sent to the slave. Eventually the buffers will flow control and the host may not be able to stop the link.

When the modem brings the link down, it will drop into idle state and start looking for another command. Any queued data for the slave will be read and discarded since it is not a valid command control code; and the buffers will free, allowing the host to establish communications to another slave.

6.4 Autopolling

This command is handled differently than the connect requests. Upon recognition of a CTRL E command, the modem establishes a range of contiguous slave addresses which are to be continuously polled for information. Each station is connected, and any response data is queued in the host transmit buffer together with an ACK, ADDR1, ADDR2 sequence. Once a slave station is successfully connected to the Master, it will immediately sequence to the next slave and try to establish connection. Each slave will send up to one buffer of information to the Master in response to the connect request. All transfers use the implied ACK since the Master immediately connects to another slave. The Master's host will see a continuous stream of ACK-/NAKs and data as the Master polls the slave devices.

Any information read from the host will be placed into the host receive buffer and not sent on the wire. Autopolling is a slave to master transfer only. Autopolling is stopped the same as other commands and as discussed in the preceding section.

6.5 Broadcast

A broadcast is a transfer from the Master to all slaves with no acknowledgement. A broadcast is identified by specifying a CTRL A or CTRL B command with a target address of zero.

The Master will continuously transmit information received from its host to the slaves. The Master will not wait for an acknowledgement from the slaves since the slaves don't respond to a broadcast. There is no end to end guarantee that information was successfully received. Broadcasting will continue until another command is recognized in the host receive buffer.

The implementation of the broadcast makes the higher level in the Master think that a successful response was received from slave station ØØ. That is, the read response routine (READM) checks for a broadcast. If a broadcast is in progress, then READM will not wait for a response. Instead it waits for the UART to finish transmitting, and then immediately returns with a valid response to the higher level. The higher level thinks it has a valid response and involves PGOODM to process the response which, in turn, recognizes the broadcast and sends the next buffer of information.

7.0 TEST MODE

In a slave, test mode consists of a set of flag tests when processing a valid message from the Master. The Protocol is unchanged. However, in test mode each received data message is looped back (LOOPBK routine) to the Master. Test mode will therefore echo every data character received from the Master using the Protocol as previously discussed. No characters are output to the slave's host in test mode.

The Master uses this slave loopback to continuously transmit fixed patterns of data to a contiguous range of slave addresses and to compare the echoed results while maintaining statistics on the number of re-tries etc. as well as the number of bits in error within the Protocol. If the Protocol is functioning properly then no errors should be encountered within the Protocol due to the probability of an error in both the vertical and horizontal checks.

Test mode is selected by a DIP switch at power on initialization and sets an internal software flag which identifies this mode. Changing the DIP switches after running will have no effect. Upon power up, the Master will continuously read and display the values of the dip switches. The test mode DIP switch must obviously be working and set to test mode. Receiving any input character from the Master's host will stop the switch output display. The host is then requested to specify a contiguous range of slave address via prompts. The host specifies the two address and a loop is set up similar to auto-polling. A circuit is established to each slave with a resulting ACK/NAK, ADDR1, ADDR2 sent to the host. Then 8 data messages are sent and compared. The contents of the messages is a counting pattern starting at Ø and incrementing. That is the first data message will contain Ø-7, the second 8-F etc. As each message is received back from the slave, it is compared with the one last sent and statistics kept. There is no disconnect process in test mode since the slave is just echoing back and the Master knows when it has received the last data message. The re-try logic is different than in regular mode, the eight data messages are controlled by the same counter as the re-try counter. What this means is that the number of data messages plus retries is equal to eight. Hence, if a slave fails when a circuit is established then Master will try up to eight times and then automatically sequence to the next specified slave.

The statistics which are generated overlay the host receive buffer since there is not enough RAM storage to dedicate to these counters and no host receive information needs to be buffered. The host receive data driver is run, but any information received will be discarded with the exception of the ESC and CTRL R, ASCII characters. Recognition of an ESC character causes a jump to absolute address zero simulating a power on restart. This is the only way, other than powering the Master off, to exit the test mode loop. CTRL R sets a flag for the higher level, requesting that the accumulated statistics be transmitted to the host and cleared. All other characters received from the host will be read and ignored.

Prior to initiating a connection to a slave, the Master will check the display flag and, if set, format and output the statistics to the host. Each output clears the statistics. The statistics are:
1. Number of blocks successfully transmitted.
2. Number of timeouts and NAK's.
3. Number of bits within the Protocol in error.

The number of timeouts and NAK's is really the number of timeouts since the slaves no longer send NAK. This is a vestige from the full duplex implementation and the message could be shortened to not be misleading and free up some ROM space. This counter is incremented every time the Master retransmits with a NAK, be it a connect or data message.

The number of blocks successfully transmitted is incremented for every new message received back from the slave.

The number of bits in error is calculated by exclusive OR'ing the data portion of the received message with the sent message and counting the number of one bits in the result.

8.0 LINE QUALITY

Two counters are maintained to monitor the quality of the lime. A double precision PKTXL, PKTXM counter keeps track of the total number of messages placed on the wire by the Master. A single precision counter PKTNAK is maintained which counts the number of messages which the master places on the wire with the NAK control bit set.

Every time PKTXL, PKTXM overflows (every $2^{16}-1$ messages) messages the PKTNAK counter will be cleared. If PKTNAK ever exceeds a threshold THRMK value, the quality output line 84 (FIG. 5D) will be set low and will remain low forever or until the unit is powered off. Hence, THRMK re-tries in $2^{16}-1$ messages will result in the quality output going low.

The flow control at the slave will cause the Master to timeout and re-transmit with a NAK which is included in this quality counting. A revised version could put NAK back in the slave as the mechanism for flow control in the link rather than the timeout to avoid this.

9.0 MODULE BREAKDOWN

This section is intended as an outline of the major software modules. See the listings in Appendixes B and C for more details.

9.1 Slave Major Modules

INIT—Performs startup initialization

SLAVE—Top level control loop
PGOODM—Process a valid message and generate response
READM—Read message
XFER—Build alternate transmit buffer while transmitting current buffer. (This is the fill process).
CPROC1—Read character from UART
RETRAN—Retransmit current buffer with NAK
RETRAK—Retransmit current buffer with ACK
SNEXT—Send next buffer
SENDHT—Refresh host transmit buffer
READH—Refresh host receive buffer
LOOPBK—Test Mode data loopback
UART—Software UART The slave dedicates F1 for UART timeout, F0 for current modem transmit buffer, and the first six registers on Bank #1 for UART interrupt processing. A full eight stack levels are available in the slave.

9.2 Master Major Modules

INIT—Performs startup initialization
TESTL—Test Mode switch display
MAIN—Get command as initiate connect
RUNDAT—Data transfer top level
TESTM—Test Mode startup
NEXSL—Next slave device for last mode and autopolling
READH—Host receiver buffer driver
SENDHT—Host Transmit buffer driver
PGOODM—Process a valid message from slave and initiate response
READM—Read message from slave
FLUSH—Wait for idle line
CPROC—Read character from modem
XFER—Build alternate modem transmit buffer
INA—Read character from host input buffer
CHKEMP—Test host receive buffer for empty
RETRAN—Retransmit current buffer with NAK
RETRAK—Retransmit current buffer with ACK
SNEXT—Send next buffer with ACK
GETADR—Read and parse Plexus command
TMRHT—Transfer message from modem to host transmit buffer
DSTATS—Display test mode statistics
OUTA—Put character in host transmit buffer
UART—Software UART The Master dedicates F1 for UART timeout, F0 for current modem transmit buffer, and the first six registers on Bank #1 for UART interrupt processing. Only five stack levels are available. The other three are used as general purpose RAM.

It will thus be seen that the objects set forth above, among those made apparent from the preceding description, are efficiently attained and, since certain changes may be made in the above system, network, and construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

APPENDIX A title   Receive Data Demodulator 10/22/83

;###############################################################

;
;   Modem   © Controlonics Corp.
;           Westford, MA  1983
;
; Program for PROM-based state machine that demodulates
; recieved data.
;
; Requires a 256 word by 8 bit PROM.
;
;###############################################################
;
; Written by Bret P. Bersack
;
;###############################################################
;
; Revision History:
;
;   REV 0  10/22/83  Initial release
;
;###############################################################

```
0000'           aseg
0100            psize   equ     256     ;prom size
```

```
;##############################################################
;       Macro Definition for next state entry.
;
;       Usage:  name:   s       n0,n1
;
;       Where:  name = current state
;               n0   = next state if input data is 0.
;               n1   = next state if input data is 1.

s       macro   n0,n1
        db      n0 shr 1, n1 shr 1
        endm

;##############################################################
;       Initial state. No good transitions found. Output = 0.

org     0
0000    00 01   +       begin:  s       begin,a10

0002    00 02   +       a10:    s       begin,a11
0004    09 03   +       a11:    s       a02,a12
0006    0A 04   +       a12:    s       a03,a13
0008    0B 05   +       a13:    s       a04,a14
000A    0C 06   +       a14:    s       a05,a15
000C    0D 07   +       a15:    s       a06,a16
000E    0E 08   +       a16:    s       a07,await 0010    00 08   +       await:  s       begin,await 0012    0A 01   +       a02:    s       a03,a10
0014    0B 01   +       a03:    s       a04,a10
0016    0C 01   +       a04:    s       a05,a10
0018    0D 01   +       a05:    s       a06,a10
001A    0E 10   +       a06:    s       a07,b10
001C    0F 10   +       a07:    s       a08,b10
001E    00 10   +       a08:    s       begin,b10

;##############################################################
;       One good transition found. Output = 0.

0020    00 11   +       b10:    s       begin,b11
0022    18 12   +       b11:    s       b02,b12
0024    19 13   +       b12:    s       b03,b13
0026    1A 14   +       b13:    s       b04,b14
0028    1B 15   +       b14:    s       b05,b15
002A    1C 16   +       b15:    s       b06,b16
002C    1D 08   +       b16:    s       b07,await 002E    18 01   +       b01:    s       b02,a10
0030    19 01   +       b02:    s       b03,a10
0032    1A 01   +       b03:    s       b04,a10
0034    1B 01   +       b04:    s       b05,a10
0036    1C 01   +       b05:    s       b06,a10
0038    1D 1F   +       b06:    s       b07,c10
003A    1E 1F   +       b07:    s       b08,c10
003C    00 1F   +       b08:    s       begin,c10
```

```
;################################################################
;       Two good transitions found.  Output = 0.

003E  17 20    +    c10:    s    b01,c11
0040  28 21    +    c11:    s    c02,c12
0042  29 22    +    c12:    s    c03,c13
0044  2A 23    +    c13:    s    c04,c14
0046  2B 24    +    c14:    s    c05,c15
0048  2C 25    +    c15:    s    c06,c16
004A  2D 26    +    c16:    s    c07,c17
004C  2E 10    +    c17:    s    c08,b10

004E  28 18    +    c01:    s    c02,b02
0050  29 19    +    c02:    s    c03,b03
0052  2A 1A    +    c03:    s    c04,b04
0054  2B 1B    +    c04:    s    c05,b05
0056  2C 1C    +    c05:    s    c06,b06
0058  2D 2F    +    c06:    s    c07,d10
005A  2E 2F    +    c07:    s    c08,d10
005C  17 2F    +    c08:    s    b01,d10

;################################################################
;       Three good transitions found.  Output = 0.

005E  27 30    +    d10:    s    c01,d11
0060  37 31    +    d11:    s    d02,d12
0062  38 32    +    d12:    s    d03,d13
0064  39 33    +    d13:    s    d04,d14
0066  3A 34    +    d14:    s    d05,d15
0068  3B 35    +    d15:    s    d06,d16
006A  3C 36    +    d16:    s    d07,d17
006C  3D 1F    +    d17:    s    d08,c10

006E  38 22    +    d02:    s    d03,c13
0070  39 23    +    d03:    s    d04,c14
0072  3A 24    +    d04:    s    d05,c15
0074  3B 25    +    d05:    s    d06,c16
0076  3C 40    +    d06:    s    d07,e10
0078  3D 40    +    d07:    s    d08,e10
007A  27 40    +    d08:    s    c01,e10

;################################################################
;       Four good transitions found.  Output = 1.

007C                        ds   80h-$,0    ;fill prom with zeroes up to 80H 0080  48 41    +    e10:    s    e01,e11
0082  49 42    +    e11:    s    e02,e12
0084  4A 43    +    e12:    s    e03,e13
0086  4B 44    +    e13:    s    e04,e14
0088  4C 45    +    e14:    s    e05,e15
008A  4D 46    +    e15:    s    e06,e16
008C  4E 47    +    e16:    s    e07,e17
008E  4F 50    +    e17:    s    e08,f10

0090  49 42    +    e01:    s    e02,e12
0092  4A 43    +    e02:    s    e03,e13
```

```
0094  4B 44    +   e03:   s   e04,e14
0096  4C 45    +   e04:   s   e05,e15
0098  4D 46    +   e05:   s   e06,e16
009A  4E 40    +   e06:   s   e07,e10
009C  4F 40    +   e07:   s   e08,e10
009E  58 40    +   e08:   s   f01,e10
```

```
;############################################################
;      One transition missed.  Output = 1.
```

```
00A0  58 51    +   f10:   s   f01,f11
00A2  59 52    +   f11:   s   f02,f12
00A4  5A 53    +   f12:   s   f03,f13
00A6  5B 54    +   f13:   s   f04,f14
00A8  5C 55    +   f14:   s   f05,f15
00AA  5D 56    +   f15:   s   f06,f16
00AC  5E 57    +   f16:   s   f07,f17
00AE  5F 60    +   f17:   s   f08,g10

00B0  59 52    +   f01:   s   f02,f12
00B2  5A 53    +   f02:   s   f03,f13
00B4  5B 54    +   f03:   s   f04,f14
00B6  5C 55    +   f04:   s   f05,f15
00B8  5D 56    +   f05:   s   f06,f16
00BA  5E 40    +   f06:   s   f07,e10
00BC  5F 40    +   f07:   s   f08,e10
00BE  68 40    +   f08:   s   g01,e10
```

```
;############################################################
;      Two transitions missed.  Output = 1.
```

```
00C0  68 61    +   g10:   s   g01,g11
00C2  69 62    +   g11:   s   g02,g12
00C4  6A 63    +   g12:   s   g03,g13
00C6  6B 64    +   g13:   s   g04,g14
00C8  6C 65    +   g14:   s   g05,g15
00CA  6D 66    +   g15:   s   g06,g16
00CC  6E 67    +   g16:   s   g07,g17
00CE  6F 70    +   g17:   s   g08,h10

00D0  69 62    +   g01:   s   g02,g12
00D2  6A 63    +   g02:   s   g03,g13
00D4  6B 64    +   g03:   s   g04,g14
00D6  6C 65    +   g04:   s   g05,g15
00D8  6D 66    +   g05:   s   g06,g16
00DA  6E 50    +   g06:   s   g07,f10
00DC  6F 50    +   g07:   s   g08,f10
00DE  78 50    +   g08:   s   h01,f10
```

```
;############################################################
;      Three transitions missed.  Output = 1.
```

```
00E0  78 71    +   h10:   s   h01,h11
00E2  72 72    +   h11:   s   hx2,hx2
00E4  73 73    +   hx2:   s   hx3,hx3
00E6  74 74    +   hx3:   s   hx4,hx4
```

```
00E8   79 75    +   hx4:    s   h05,h15
00EA   7A 76    +   h15:    s   h06,h16
00EC   7B 77    +   h16:    s   h07,h17
00EE   7C 08    +   h17:    s   h08,await 00F0   72 72    +   h01:    s   hx2,hx2
00F2   7A 76    +   h05:    s   h06,h16
00F4   7B 60    +   h06:    s   h07,g10
00F6   7C 60    +   h07:    s   h08,g10
00F8   00 60    +   h08:    s   begin,g10

00FA                        ds  psize-$,0    ;fill rest of prom with zeroes
```

Macros:
s

Symbols:

| | | | | | |
|---|---|---|---|---|---|
| 0012 | A02 | 0014 | A03 | 0016 | A04 |
| 0018 | A05 | 001A | A06 | 001C | A07 |
| 001E | A08 | 0002 | A10 | 0004 | A11 |
| 0006 | A12 | 0008 | A13 | 000A | A14 |
| 000C | A15 | 000E | A16 | 0010 | AWAIT |
| 002E | B01 | 0030 | B02 | 0032 | B03 |
| 0034 | B04 | 0036 | B05 | 0038 | B06 |
| 003A | B07 | 003C | B08 | 0020 | B10 |
| 0022 | B11 | 0024 | B12 | 0026 | B13 |
| 0028 | B14 | 002A | B15 | 002C | B16 |
| 0000 | BEGIN | 004E | C01 | 0050 | C02 |
| 0052 | C03 | 0054 | C04 | 0056 | C05 |
| 0058 | C06 | 005A | C07 | 005C | C08 |
| 003E | C10 | 0040 | C11 | 0042 | C12 |
| 0044 | C13 | 0046 | C14 | 0048 | C15 |
| 004A | C16 | 004C | C17 | 006E | D02 |
| 0070 | D03 | 0072 | D04 | 0074 | D05 |
| 0076 | D06 | 0078 | D07 | 007A | D08 |
| 005E | D10 | 0060 | D11 | 0062 | D12 |
| 0064 | D13 | 0066 | D14 | 0068 | D15 |
| 006A | D16 | 006C | D17 | 0090 | E01 |
| 0092 | E02 | 0094 | E03 | 0096 | E04 |
| 0098 | E05 | 009A | E06 | 009C | E07 |
| 009E | E08 | 0080 | E10 | 0082 | E11 |
| 0084 | E12 | 0086 | E13 | 0088 | E14 |
| 008A | E15 | 008C | E16 | 008E | E17 |
| 00B0 | F01 | 00B2 | F02 | 00B4 | F03 |
| 00B6 | F04 | 00B8 | F05 | 00BA | F06 |
| 00BC | F07 | 00BE | F08 | 00A0 | F10 |
| 00A2 | F11 | 00A4 | F12 | 00A6 | F13 |
| 00A8 | F14 | 00AA | F15 | 00AC | F16 |
| 00AE | F17 | 00D0 | G01 | 00D2 | G02 |
| 00D4 | G03 | 00D6 | G04 | 00D8 | G05 |
| 00DA | G06 | 00DC | G07 | 00DE | G08 |
| 00C0 | G10 | 00C2 | G11 | 00C4 | G12 |
| 00C6 | G13 | 00C8 | G14 | 00CA | G15 |
| 00CC | G16 | 00CE | G17 | 00F0 | H01 |
| 00F2 | H05 | 00F4 | H06 | 00F6 | H07 |
| 00F8 | H08 | 00E0 | H10 | 00E2 | H11 |

| | | | | | |
|---|---|---|---|---|---|
| 08EA | H15 | 08EC | H16 | 08EE | H17 |
| 08E4 | HX2 | 08E6 | HX3 | 08E8 | HX4 |
| 0103 | PSIZE | | | | |

No Fatal error(s)

APPENDIX B

```
1:
2:
3: AVOCET SYSTEMS 8048 CROSS-ASSEMBLER - VERSION 1.63
4:
5: NONWIRE (TM) MASTER VER 2.07 © 1984 CONTROLONICS CORP
6:
7:
8:          ;********************************************************************
9:          ;*                                                                  *
10:         ;*        NONWIRE (TM) MASTER STATION VERSION 2.07 01/31/84         *
11:         ;*        COPYRIGHT © 1984 CONTROLONICS CORP.                       *
12:         ;*        HEX FILE CHECKSUM = 9C57   PART NO = 2100162              *
13:         ;*        RUNS ON 8749/8049 AT 6 MHZ                                *
14:         ;*                                                                  *
15:         ;********************************************************************
16:         ;*NOTES:
17:         ;     1) PROGRAM OPTIMIZED FOR SPEED + RAM UTILIZATION. CARE MUST BE TAKEN
18:         ;        IN CODE REDUCTION AS VIRTUALLY THE ENTIRE PROGRAM IS TIME SENSITIVE
19:         ;     2) F0 IS DEDICATED TO APPLICATION (BACKGROUND) AND IS USED TO SPECIFY
20:         ;        WHICH TRANSMIT BUFFER IS ACTIVELY BEING TRANSMITTED.
21:         ;        0=MTBUF1, 1=MTBUF2
22:         ;     3) F1 IS USED AS A RECEIVE TIMEOUT FLAG AND IS DEDICATED TO THIS
23:         ;        FUNCTION.
24:         ;     4) REGISTERS R0-R5 BANK#1 ARE RESERVED FOR FOREGROUND.
25:         ;        REGITERS R6-R7 IN BANK #1 ARE USED AS GENERAL RAM
26:         ;     5) ONLY 5 STACK LEVELS ARE AVAILABLE THE REST IS USED AS RAM STORE
27:         ;
28:         ;
29: 007F    TOPRAM  EQU   07FH            ;TOP OF RAM
30: 000F    MRBSZ   EQU   00FH            ;MODEM BUFFER SIZE ON RECEIVE
31: 0012    MTBSZ   EQU   012H            ;MODEM BUFFER SIZE ON TRANSMIT
32: 0013    HRBSZ   EQU   013H            ;HOST RECEIVE BUFFER SIZE
33: 0014    HXBSZ   EQU   014H            ;HOST TRANSMIT BUFFER SIZE
34: 000F    HRLIM   EQU   HRBSZ-4         ;DTR THRESHOLD
35: 0010    MMASK   EQU   010H            ;TEST MODE P2 INPUT MASK
36: 0003    PARTYM  EQU   003H            ;PARITY MODE P2 INPUT MASK
37: 0000    NUACK0  EQU   000H            ;ACK, NO DATE, SEQUENCE=0
38: 0010    NUACK1  EQU   010H            ;ACK, NO DATE, SEQUENCE=1
39: 0080    NAKBIT  EQU   080H            ;NAK BIT MASK
40: 0020    RESTRT  EQU   020H            ;RESTART BIT MASK
41: 002C    THRMK   EQU   02CH            ;# OF NAKS IN 2**16-1 TO SET ALARM
42: 0004    ALARM   EQU   004H            ;ALARM BIT P2
43: 0008    RCOUNT  EQU   008H            ;RETRY COUNTER START VALUE
44: 00E0    JAMLIM  EQU   0E0H            ;JAM LIMIT ON RETRIES
45:         ;
```

```
46:                    ;       TEST MODE ERROR COUNTERS -- USES HOST RECEIVE BUFFER
47:                    ;
48: 0026    NUMMSG  EQU    HRBUF           ;COUNTER ON NO. MSGS SENT
49: 000A    CNUMNG  EQU    10              ;NO. BYTES MESSAGE COUNTER
50: 0030    NUMERR  EQU    NUMMSG+CNUMNG   ;NO. BITS IN ERROR COUNTER
51: 0004    NNERR   EQU    4               ;NO. BYTES BIT ERROR COUNTER
52: 0034    NUTTTS  EQU    NUMERR+NNERR    ;TIMEOUT AND NAK COUNTER
53: 0005    NT      EQU    5               ;# BYTES TIMEOUT AND NAK COUNTER
54: 0008    NBYMS   EQU    8               ;NO. BYTES EACH TEST MODE MSG
55:
56:
57: AVOCET SYSTEMS 8048 CROSS-ASSEMBLER - VERSION 1.63
58:
59: NONWIRE (TM) MASTER VER 2.07 (C) 1984 CONTROLONICS CORP
60:
61:
62:                    ;
63:                    ;       INPUT PORT # 1 BIT MASKS
64:                    ;
65: 0001    XONCTR  EQU    1               ;1=XON/XOFF CTRL HOST (JB0)
66: 0002    XDTREN  EQU    2               ;1=DTR,0=XON/XOF CTRL MODEM (JB1)
67:                    ;
68:                    ;       ASCII CODES
69:                    ;
70: 000D    CR      EQU    0DH             ;ASCII CARRIAGE RETURN
71: 000A    LF      EQU    0AH             ;ASCII LINE FEED
72: 0020    SP      EQU    20H             ;ASCII SPACE
73: 0000    NULL    EQU    00H             ;ASCII NULL
74: 0012    CTRLR   EQU    12H             ;ASCII CTRL R
75: 0006    ACK     EQU    06H             ;ACK
76: 0015    NAK     EQU    15H             ;NAK
77: 0030    AZERO   EQU    30H             ;ASCII 0
78: 0041    ALA     EQU    41H             ;ASCII A
79: 001B    ASTOP   EQU    1BH             ;ASCII CONTROL STOP CODE(ESCAPE)
80: 0011    XON     EQU    11H             ;ASCII XON(CTRL Q)
81: 0013    XOFF    EQU    13H             ;ASCII XOFF(CTRL S)
82: 0001    AAADR   EQU    01H             ;ASCII CONTROL ADDRESS SEQ ASCII MODE(CTRL A)
83: 0002    AHADR   EQU    02H             ;ASCII CONTROL ADDRESS SEQ HEX MODE(CTRL B)
84: 0003    ATAADR  EQU    03H             ;KNOWN LENGTH ASCII(CTRL C)
85: 0004    ATHADR  EQU    04H             ;KNOWN LENGTH BINARY (CTRL D)
86: 0005    ATPOLL  EQU    05H             ;AUTO-POLL CONTROL CHAR (CTRL E)
87:
88:
89: AVOCET SYSTEMS 8048 CROSS-ASSEMBLER - VERSION 1.63
90:
91: NONWIRE (TM) MASTER VER 2.07 (C) 1984 CONTROLONICS CORP
92:
93:
94:                    ;       BANK 0 REGISTER USAGE
95:                    ;
96: 0A07    FIRSTC  EQU    R7              ;1ST CHAR OF MESSAGE
97: 0A06    AFLAG   EQU    R6              ;BACKGROUND FLAGS
98: 0A05    LRC     EQU    R5              ;COMPUTED LRC
99: 0A04    CCOUNT  EQU    R4              ;CHARACTER COUNTER DURING MESSAGE READ
100: 0A03   LASTC   EQU    R3              ;LAST CHARACTER OF MESSAGE RECEIVED
101: 0A02   TEMP    EQU    R2              ;TEMP REGISTER
```

```
102:            ;       BACKGROUND FLAG DEFINITION(AFLAG)
103:            ;
104: 0001   RUNMD   EQU   001H        ;1 RUN MODE (JB0)
105: 0002   ADDPRG  EQU   002H        ;1 ADDRESS SEQUENCE IN PROGRESS(JB1)
106: 0004   XSTOP   EQU   004H        ;1=STOP TRANSFER HOST BUFFER (JB2)
107: 0008   XNIB    EQU   008H        ;1=NIBBLE SET (JB3)
108: 0010   RSEQ    EQU   010H        ;RECEIVED SEQUENCE# (JB4)
109: 0020   ASCFL   EQU   020H        ;1=ASCII IN,0=HEX IN (JB5)
110: 0040   DSTATF  EQU   040H        ;1=DISPLAY STATS TEST MODE (JB6)
111: 0080   HSTOPT  EQU   080H        ;1=XOFF RECEIVED FROM HOST
112:            ;
113:            ;       BACKGROUND FLAG DEFINITION(FLAG2)
114:            ;
115: 0001   SEDXOF  EQU   001H        ;1=TRANSMIT XOF TO HOST (JB0)
116: 0002   SEDXON  EQU   002H        ;1=SEND XON TO HOST (JB1)
117: 0004   SENTOF  EQU   004H        ;1=XOF SENT TO HOST (JB2)
118: 0040   LABORT  EQU   040H        ;1=LINK ABORTED BY MASTER (JB6)
119: 0080   AUTOPL  EQU   080H        ;1=AUTOPOLLING (JB7)
120:            ;
121:            ;       BANK 1 REGISTERS ACCESSED BY APPLICATION
122:            ;
123: 0019   UDATA   EQU   019H        ;MODEM DATA
124: 001A   UFLAG   EQU   01AH        ;MODEM FLAGS
125: 0005   XSVAL   EQU   5           ;STARTING TRANSMIT STATE#
126:
127:
128: AVOCET SYSTEMS 8048 CROSS-ASSEMBLER - VERSION 1.63
129:
130: NONWIRE (TM) MASTER VER 2.07 (C) 1984 CONTROLONICS CORP
131:
132:
133:            ;
134:            ;       APPLICATION RAM
135:            ;
136:            ;       LAST 3 POSITIONS STACK,REGS R6-R7 BANK 1 AND REST OF
137:            ;       REGULAR RAM IS ALL USED AS SCRATCH
138:            ;
139:            ;       LAST 3 POSITIONS OF STACK
140: 0012           ORG   12H
141: 0012   HRGPTR  EQU   012H        ;HOST RECEIVE BUFFER GET POINTER
142: 0013   HRCNT   EQU   HRGPTR+1    ;#BYTES IN HOST RECEIVE BUFFER
143: 0014   HRPTR   EQU   HRCNT+1     ;HOST RECEIVE BUFFER PUT POINTER
144: 0015   HXGPTR  EQU   HRPTR+1     ;HOST XMIT BUFFER GET POINTER
145: 0016   HXCNT   EQU   HXGPTR+1    ;#BYTES IN HOST XMIT BUFFER
146: 0017   HXPTR   EQU   HXCNT+1     ;HOST XMIT BUFFER PUT POINTER
147:            ;       BANK 01 REGS R6-R7 AND REST OF RAM
148: 0A06   RRETRY  EQU   R6          ;RETRY COUNTER (R6 IN BANK 1)
149: 001E   RETRY   EQU   01EH
150: 0A07   RBADR   EQU   R7          ;START ADDRESS (R7 IN BANK 1)
151: 001F   BADR    EQU   RETRY+1
152: 0020   EADR    EQU   BADR+1      ;END ADDRESS TEST
153: 0021   FLAG2   EQU   EADR+1      ;FLAG BYTE #2 BACKGROUND
154: 0022   PKTXL   EQU   FLAG2+1     ;LS # PACKETS SENT COUNTER
155: 0023   PKTXM   EQU   PKTXL+1     ;MS # PACKETS SENT COUNTER
156: 0024   PKTNAK  EQU   PKTXM+1     ;# NAKS SENT COUNTER
157: 0025   NIBSV   EQU   PKTNAK+1    ;NIBBLE SAVE AREA
```

```
158: 0026         HRBUF    EQU    NIBSV+1          ;HOST RECEIVE BUFFER
159: 0039         HXBUF    EQU    HRBUF+HRBSZ      ;HOST TRANSMIT BUFFER
160: 004D         MRBUF    EQU    HXBUF+HXBSZ      ;MODEM RECEIVE BUFFER
161: 005C         MT0BUF   EQU    MRBUF+MRBSZ      ;MODEM TRANSMIT BUFFER#1
162: 006E         MT1BUF   EQU    MT0BUF+MTBSZ     ;MODEM TRANSMIT BUFFER#2
163: 0080         ERAM     EQU    MT1BUF+MTBSZ     ;END OF RAM
164:
165:
166: AVOCET SYSTEMS 8048 CROSS-ASSEMBLER - VERSION 1.63
167:
168: NONWIRE (TM) MASTER VER 2.07 (C) 1984 CONTROLONICS CORP
169:
170:
171:              ;
172:              ;       USRT EQUATES
173:              ;
174: 00F7         INITP2   EQU    0F7H             ;INITIAL P2 OUTPUT
175: 0080         MCLR     EQU    080H             ;USRT RESET ADDRESS
176: 0020         CSEL     EQU    020H             ;CHIP SELECT
177: 0040         RESET    EQU    040H             ;RESET USRT
178: 0040         CTRLM    EQU    040H             ;CONTROL MODE (D BIT ON 8251)
179: 0038         RCERR    EQU    038H             ;RECEIVE CHAR ERROR MASK
180: 0007         DTREN    EQU    007H             ;RECEIVER ENABLE,DTR,XMIT ENABLE
181: 0010         ERRST    EQU    010H             ;ERROR RESET
182: 0005         DTRDIS   EQU    005H             ;RTS=0,DTR=0,RCV ENA=1,XMT ENA=1
183:              ;===============================================================
184:              ;             EQUATES FOR MODEM CONTROL
185:              ;===============================================================
186:              ;
187:              ;       REGISTER ASSIGNMENTS BANK 1(R6-R7 RESERVED USED GENERAL RAM)
188:              ;
189: 0A05         XREG     EQU    R5               ;SHIFT REGISTER (1D)
190: 0A04         STATE    EQU    R4               ;MODEM STATE# (1C)
191: 0A03         XCNTRT   EQU    R3               ;RECEIVE CHAR TIMER/TRAN CHAR COUNTER(1B)
192: 0A02         FLAGSS   EQU    R2               ;CONTROL FLAGS (1A)
193: 0A01         XPTR     EQU    R1               ;XMIT BUFFER POINTER (19)
194: 0A01         RDATA    EQU    R1               ;RECEIVED DATA BUFFER(19)
195: 0A00         ATEMP    EQU    R0               ;REG A SAVE (18)
196:              ;NOTE
197:              ;     1)REGISTERS R0-R5 BANK 1 RESERVED CLOCK INTERRUPT SERVICER
198:              ;     2)F1 USED BY INTERRUPT ROUTINE TO SIGNAL RECEIVE TIMEOUT AND IS
199:              ;       UNAVAILABLE FOR OTHER USES.
200:              ;
201:              ;       FLAG BYTE CONSTANTS MODEM
202:              ;
203: 0080         PARAC    EQU    080H             ;PARITY ACCUMULATER
204: 0040         BITX     EQU    040H             ;TRANSMIT NEXT BIT TO OUT FLAG
205: 0004         VERR     EQU    004H             ;HORIZONTAL PARITY ERROR
206: 0002         ERR      EQU    002H             ;RECEIVE CHARACTER ERROR.SET BY INTERRUPT
207: 0012                                          ;SERVICER ON FRAMING ERROR.MUST
208: 0012                                          ;BE CLEARED BY APPLICATION
209: 0001         RCAV     EQU    001H             ;SET BY INTERRUPT ROUTINE WHEN CHARACTER IS
210: 0012                                          ;AVAILABLE IN RDATA RESET BY APPLICATION.
211:              ;
212:              ;       MISC EQUATES MODEM
213:              ;
```

```
214: FFFE           TQBIT   EQU     -2              ;1/4 BIT CLOCK RELOAD CONSTANT
215: FFF8           TQBIT   EQU     (4*TQBIT)       ;1 BIT CLOCK RELOAD CONSTANT
216:                ;
217:                ; OUTPUT:
218:                ; A MARK= 0 OUTPUT ON P23----) 1 DATA BIT
219:                ; A SPACE=1 OUTPUT ON P23----) 0 DATA BIT
220:                ; INPUT:
221:                ; A MARK= 1 ON T1 ----) 1 DATA BIT
222:
223:
224: AVOCET SYSTEMS 8048 CROSS-ASSEMBLER - VERSION 1.63
225:
226: NONWIRE (TM) MASTER VER 2.07 (C) 1984 CONTROLONICS CORP
227:
228:
229:                ; A SPACE=0 ON T1 ----) 0 DATA BIT
230:                ;
231: 0008          MARK    EQU     008H            ;MARK BIT
232:
233:
234: AVOCET SYSTEMS 8048 CROSS-ASSEMBLER - VERSION 1.63
235:
236: NONWIRE (TM) MASTER VER 2.07 (C) 1984 CONTROLONICS CORP
237:
238:
239: 0000                   ORG     000H
240:                ;
241:                ;       POWER ON RESET
242:                ;
243: 0000 00       POWER:  NOP                     ;BURN 1 INSTRUCTION
244: 0001 15               DIS     I               ;BLOCK EXTERNAL INTERRUPTS
245: 0002 35               DIS     TCNTI           ;DISABLE TIMER COUNTER
246: 0003 040A             JMP     INIT            ;GO INITIALIZE
247: 0005 E411     UARTT:  JMP     UART            ;GO PROCESS TIMER INTERRUPT
248:                ;TIMER INTERRUPTS
249: 0007                   ORG     007H
250: 0007 1605     UARTEN: JTF     UARTT           ;TIMER FLAG TEST + CLEAR
251: 0009 93               RETR                    ;NOT SET ???, RETURN
252:
253:
254: AVOCET SYSTEMS 8048 CROSS-ASSEMBLER - VERSION 1.63
255:
256: NONWIRE (TM) MASTER VER 2.07 (C) 1984 CONTROLONICS CORP
257:
258:
259:                ;
260:                ;SYSTEM INITIALIZATION CALLED ON RESET
261:                ;
262:                ;       1)STACK PTR=0
263:                ;       2)REGISTER BANK=0
264:                ;       3)PORTS 1 AND 2 ALL LOADED WITH 1'S
265:                ;       4)INTERRUPTS DISABLED (BOTH EXTERNAL+TIMER)
266:                ;       5)TIMER STOPPED
267:                ;       6)CLOCK OUTPUT ON T0 ENABLED
268: 000A 65       INIT:   STOP    TCNT            ;STOP TIMER COUNTER
269: 000B 75               ENT0    CLK             ;TURN ON CLOCK TO 8251
```

```
270: 000C 23F7              MOV    A,#INITP2       ;INITIALIZE ALL P2 OUTPUTS
271: 000E 3A                OUTL   P2,A
272:                  ;
273:                  ;     P27 = 1      MASTER RESET
274:                  ;     P26 = 1      C OF C/D
275:                  ;     P25 = 1      NO CHIP SELECT
276:                  ;     P24 = 1      1=RUN MODE,0=TEST MODE
277:                  ;     P23 = 0      MODEM XMIT DATA=MARK
278:                  ;     P22 = 1      RESET ALARM
279:                  ;     P21, P20 = 1    PARITY INPUTS
280:                  ;
281: 000F 27                CLR    A               ;STACK PTR TO 0,REGISTER BANK
282: 0010 D7                MOV    PSW,A           ;BANK TO 0
283: 0011 B87F              MOV    R0,#TOPRAM      ;CLEAR ALL OF RAM
284: 0013 A0       INIT1:   MOV    @R0,A
285: 0014 E813              DJNZ   R0,INIT1
286:                  ;
287:                  ;     INITIALIZE 8255
288:                  ;
289: 0016 9A5F              ANL    P2,#NOT MCLR+CSEL ;REMOVE RESET AND SELECT 8251
290: 0018                                          ;BUG IN CHIP MAY NOT INITIALIZE
291: 0018 90                MOVX   @R0,A           ;CORRECTLY IF NOT IN MODE
292: 0019 90                MOVX   @R0,A           ;STATE, ZEROS AND INTERNAL
293: 001A 90                MOVX   @R0,A           ;RESET WILL GET YOU THERE
294: 001B 2340              MOV    A,#RESET        ;REGARDLESS OF WHAT THE DAMN
295: 001D 90                MOVX   @R0,A           ;CHIP DOES ON POWER ON/RESET
296: 001E 8A23              ORL    P2,#PARTYM+CSEL ;OUTPUT MASK TO READ PARITY STRAPS/DE-SEL 8251
297: 0020 0A                IN     A,P2            ;GET THE MODE WORD TO WRITE
298: 0021 5303              ANL    A,#PARTYM       ;TO THE CHIP.X16,1 STOP BIT,
299: 0023 E3                MOVP3  A,@A            ;8 DATA BITS,PARITY FUNTION OF STRAPS
300: 0024 9ADF              ANL    P2,#NOT CSEL    ;SELECT 8251
301: 0026 90                MOVX   @R0,A
302: 0027 2317              MOV    A,#DTREN+ERRST  ;DTR=1,REC ENA=1,XMT ENA=1,RST=0,RESET ERR
303: 0029 90                MOVX   @R0,A           ;RX AND TX DISABLED
304: 002A 8A20              ORL    P2,#CSEL        ;DE-SELECT 8251
305:                  ;
306:                  ;     INITIALIZE RAM POINTERS
307:                  ;
308: 002C B812              MOV    R0,#HRGPTR      ;SET HOST RECEIVE GET POINTER
309: 002E B026              MOV    @R0,#HRBUF      ;TO START UP RECEIVE BUFFER
310:
311:
312: AVOCET SYSTEMS 8048 CROSS-ASSEMBLER - VERSION 1.63
313:
314: NONWIRE (TM) MASTER VER 2.07 (C) 1984 CONTROLONICS CORP
315:
316:
317: 0030 18                INC    R0
318: 0031 18                INC    R0              ;SETOST RECEIVE PUT POINTER
319: 0032 B026              MOV    @R0,#HRBUF      ;TO START OF RECEIVE BUFFER
320: 0034 18                INC    R0              ;SET HOST TRANSMIT GET POINTER
321: 0035 B039              MOV    @R0,#HXBUF      ;TO START OF TRANSMIT BUFFER
322: 0037 18                INC    R0
323: 0038 18                INC    R0              ;SET HOST TRANSMIT PUT POINTER
324: 0039 B039              MOV    @R0,#HXBUF      ;TO START OF TRANSMIT BUFFER
325:                  ;
```

```
326:                    ;       START CLOCK AND ALLOW 1 BIT TIME TO INITIALIZE
327:                    ;
328: 003B 23F8          MOV     A,#T0BIT        ;LOAD TIMER
329: 003D 62            MOV     T,A
330: 003E 55            STRT    T               ;START TIMER
331: 003F 25            EN      TCNTI           ;ENABLE TIMER INTERRUPTS
332:                    ;
333:                    ;       BRANCH ON RUN OR TEST MODE
334:                    ;
335: 0040 8A10  START:  ORL     P2,#MMASK
336: 0042 0A            IN      A,P2
337: 0043 5310          ANL     A,#MMASK        ;TEST MODE?
338: 0045 C64A          JZ      TESTL           ;YES,GO START UP TEST MODE
339: 0047 1E            INC     AFLAG           ;NO,SET FLAG FOR RUN MODE
340: 0048 2400          JMP     MAIN
341:
342:
343: AVOCET SYSTEMS 8048 CROSS-ASSEMBLER - VERSION 1.63
344:
345: NONWIRE (TM) MASTER VER 2.07 (C) 1984 CONTROLONICS CORP
346:
347:
348:                    ;
349:                    ;       TEST MODE SELECTED
350:                    ;       OUTPUT SWITCHES UNTIL A KEY IS DEPRESSED
351:                    ;       THEN GO START UP TEST MODE
352:                    ;
353: 004A 8A33  TESTL:  ORL     P2,#PARTYM+MMASK+CSEL
354: 004C 0A            IN      A,P2            ;GET TEST MODE AND PARITY
355: 004D AB            MOV     LASTC,A         ;OPTION STRAP VALUES
356: 004E 5303          ANL     A,#3            ;MASK OFF PARITY OPTIONS
357: 0050 97            CLR     C               ;SWAP THE LS 2 BITS
358: 0051 67            RRC     A
359: 0052 E656          JNC     TESTA
360: 0054 4302          ORL     A,#2
361: 0056 A8   TESTA:   MOV     R0,A            ;SAVE SWAPPED HOST CONTROL
362: 0057 FB            MOV     A,LASTC         ;GET VALUE OF STARPS BACK
363: 0058 77            RR      A               ;PUT TEST MODE STRAP BIT
364: 0059 77            RR      A               ;IN BIT 2
365: 005A 5304          ANL     A,#4            ;AND SET BITS 0,1 TO SWAPPED
366: 005C 68            ADD     A,R0            ;INPUT BITS
367: 005D BB96          MOV     LASTC,#LOW MSG14
368: 005F D4B8          CALL    OBINM           ;OUTPUT SW1=AND VALUES
369: 0061 09            IN      A,P1            ;GET ADDRESS SWITCHES AND
370: 0062 BB9D          MOV     LASTC,#LOW MSG15
371: 0064 D4B8          CALL    OBINM           ;AND OUTPUT
372: 0066 94DD          CALL    CHKEMP          ;LOOP FOREVER UNTIL KEY HIT
373: 0068 C64A          JZ      TESTL
374: 006A 249F          JMP     TESTM           ;GO START UP TEST MODE
375:
376:
377: AVOCET SYSTEMS 8048 CROSS-ASSEMBLER - VERSION 1.63
378:
379: NONWIRE (TM) MASTER VER 2.07 (C) 1984 CONTROLONICS CORP
380:
381:
```

```
382: 0100                        ORG     100H
383:                     ;
384:                     ;       NO TRANSMISSION IN PROGRESS.BOTH TRANSMIT BUFFERS EMPTY
385:                     ;
386: 0100 B451   MAIN:   CALL    GETADR          ;GET ADDRESS FROM HOST
387: 0102 85     MAINS:  CLR     F0              ;SET BUFFER 0
388: 0103 B85D           MOV     R0,#MT0BUF+1    ;PUT ADDRESS IN ADDRESS
389: 0105 B96F           MOV     R1,#MT1BUF+1    ;FIELD OF BOTH TRANSMIT
390: 0107 A0             MOV     @R0,A           ;BUFFERS
391: 0108 A1             MOV     @R1,A
392: 0109 C9             DEC     R1              ;SET BUFFER #1 WITH NO
393: 010A B110           MOV     @R1,#NUACK1     ;DATA AND ACK
394: 010C FE             MOV     A,AFLAG         ;SET ADDRESS SEQUENCE IN PROGRESS
395: 010D 4302           ORL     A,#ADDPRG       ;TO BYPASS STATISTICS AND QUALITY
396: 010F AE             MOV     AFLAG,A         ;CHECKING
397: 0110 F4F4           CALL    LOADRT          ;SET RE-TRY COUNTER
398: 0112 B432           CALL    RETRAK          ;SEND ADDRESS SEQUENCE
399: 0114 9400   ADDR10: CALL    READM           ;GET RESPONSE TO ADDRESS SEQUENCE
400: 0116 968A           JNZ     ADDRER          ;ERROR
401: 0118 FF             MOV     A,FIRSTC        ;MUST BE SEQUENCE #0
402: 0119 928A           JB4     ADDRER          ;OR ERROR
403: 011B FE             MOV     A,AFLAG         ;IS 0,SET RECEIVED SEQ # TO 0
404: 011C 53ED           ANL     A,#NOT RSEQ+ADDPRG ;SET RECEIVED SEQUENCE #=0
405: 011E AE             MOV     AFLAG,A         ;IN FLAGS
406: 011F 67             RRC     A               ;IS IT TEST MODE?
407: 0120 E6EC           JNC     TSTDAT          ;YES,ALL DONE WITH ADDRESS SEQ
408: 0122 2306           MOV     A,#ACK          ;NO,SEND ACK AND ADDRESS
409: 0124 D4D1           CALL    ACKADR          ;TO HOST WE MADE IT
410: 0126 D44A           CALL    TMRHT           ;DATA IF ANY TO HOST
411:                     ;
412:                     ;       DATA MODE AND ADDRESS SEQUENCE HAS COMPLETED
413:                     ;
414: 0128 F4F8   RUNDAT: CALL    TAPOLL          ;ARE WE AUTOPOLLING?
415: 012A C633           JZ      RUND05          ;NO
416: 012C FE     AUTO0:  MOV     A,AFLAG         ;YES,HAS THE STOP
417: 012D 5304           ANL     A,#XSTOP        ;FLAG BEEN SET?
418: 012F C6D5           JZ      AUTONX          ;NO,GO ADDRESS NEXT SLAVE
419: 0131 2400           JMP     MAIN            ;YES,GO GET NEXT HOST COMMAND
420: 0133 B43B   RUND05: CALL    SNEXT           ;START UP LINK
421: 0135 F4F4           CALL    LOADRT          ;INITIALIZE RE-TRY COUNTER
422: 0137 9400   RUND30: CALL    READM           ;GET RESPONSE
423: 0139 9641           JNZ     RUND10          ;ERROR
424: 013B 74A3           CALL    PGOODM          ;PROCESS RESPONSE
425: 013D F4F4           CALL    LOADRT          ;RESET RE-TRY COUNTER ON GOOD MESSAGE
426: 013F 2443           JMP     RUND60          ;GO SEE IF STOP FLAG SET
427: 0141 B400   RUND10: CALL    RETRAN          ;SOME KIND OF ERROR NAK
428: 0143 FE     RUND60: MOV     A,AFLAG         ;STOP FLAG SET
429: 0144 5254           JB2     RUND20          ;YES,GO FINISH COMM AND GO RE-ADDRESS
430: 0146 F4F0           CALL    ADVRTY          ;NO,ADVANCE RE-TRY COUNTER
431: 0148 9637           JNZ     RUND30          ;IF OVERFLOW THEN WE ARE MAKING
432: 014A FE             MOV     A,AFLAG         ;NO PROGRESS IN DATA TRANSFER
433:
434:
435: AVOCET SYSTEMS 8048 CROSS-ASSEMBLER - VERSION 1.63
436:
437: NONWIRE (TM) MASTER VER 2.07 (C) 1984 CONTROLONICS CORP
```

```
438:
439:
440: 014B 4304              ORL      A,#XSTOP          ;SET STOP FLAG AND BRING THE
441: 014D AE                MOV      AFLAG,A           ;LINK DOWN
442: 014E B821              MOV      R0,#FLAG2         ;ALSO SET FLAG TO SPECIFY
443: 0150 F0                MOV      A,@R0             ;THAT MASTER BROUGHT THE LINK
444: 0151 4340              ORL      A,#LABORT         ;DOWN AND THAT THE HOST IS
445: 0153 A0                MOV      @R0,A             ;OWED A NAK
446: 0154 B85C     RUND20:  MOV      R0,#MT0BUF        ;STOP FLAG SET CONTINUE LINK
447: 0156 F0                MOV      A,@R0             ;UNTIL BOTH TRANSMIT BUFFERS
448: 0157 B86E              MOV      R0,#MT1BUF        ;ARE EMPTY AND WE HAVE RECEIVED
449: 0159 40                ORL      A,@R0             ;GOOD RESPONSE OR RETRY COUNTER
450: 015A 530F              ANL      A,#0FH            ;HAS EXHAUSTED
451: 015C C662              JZ       RUND90
452: 015E F4F0              CALL     ADVRTY            ;INC RE-TRY,OVERFLOW?
453: 0160 9637              JNZ      RUND30            ;NO,WAIT FOR BUFFERS TO CLEAR OUT
454: 0162 F4F4     RUND90:  CALL     LOADRT            ;YES,RE-LOAD RE-TRY COUNTER
455: 0164 9400     RUND50:  CALL     READM             ;GET FINAL RESPONSE
456: 0166 9672              JNZ      RUND70            ;ERROR
457: 0168 FE                MOV      A,AFLAG           ;NO ERROR
458: 0169 DF                XRL      A,FIRSTC
459: 016A 5310              ANL      A,#RSEQ           ;NEW DATA IN FINAL RESPONSE?
460: 016C C67A              JZ       RUND80            ;NO,BREAK LINE
461: 016E D44A              CALL     TMRHT             ;YES,TRANSFER TO HOST THE NEW DATA
462: 0170 247A              JMP      RUND80            ;AND GO WAIT FOR NEW ADDRESS
463: 0172 F4F0     RUND70:  CALL     ADVRTY            ;ADV RE-TRY COUNTER,OVERFLOW?
464: 0174 C67A              JZ       RUND80            ;GIVE UP IF OVERFLOW
465: 0176 B400              CALL     RETRAN            ;OTHERWISE RE-TRANSMIT WITH NAK
466: 0178 2464              JMP      RUND50
467: 017A B821     RUND80:  MOV      R0,#FLAG2         ;ALL DONE CHECK TO SEE
468: 017C F0                MOV      A,@R0             ;IF WE MUST SEND A NAK TO
469: 017D D281              JB6      RUND85            ;THE MASTER
470: 017F 2400              JMP      MAIN              ;DONT OWE NOTHIN
471: 0181 53BF     RUND85:  ANL      A,#NOT LABORT     ;OWE A ANK CLEAR
472: 0183 A0                MOV      @R0,A             ;LINK ABORT FLAG
473: 0184 2315              MOV      A,#NAK            ;AND SEND NAK TO THE HOST
474: 0186 D4D1              CALL     ACKADR
475: 0188 2400              JMP      MAIN
476:                   ;
477:                   ;     ERROR DURING ADDRESS SEQUENCE
478:                   ;
479: 018A F4F0     ADDRER:  CALL     ADVRTY            ;ADVANCE RE-TRY COUNTER,EXPIRED?
480: 018C C692              JZ       ADDR20            ;YES,ABORT ADDRESSING
481: 018E B400              CALL     RETRAN            ;NO,RETRANSMIT WITH NAK
482: 0190 2414              JMP      ADDR10            ;AND GO TRY AGAIN
483: 0192 2315     ADDR20:  MOV      A,#NAK            ;CANNOT GET SLAVE TO TALK
484: 0194 D4D1              CALL     ACKADR            ;SEND NAK AND ADDRESS TO HOST
485: 0196 F4F8              CALL     TAPOLL            ;ARE WE AUTOPOLLING?
486: 0198 962C              JNZ      AUTO0             ;YES
487: 019A FE                MOV      A,AFLAG           ;NO,IF NOT TEST MODE THEN GO WAIT
488: 019B 1200              JB0      MAIN              ;FOR ANOTHER ADDRESS TO TRY
489: 019D 24D3              JMP      NEXTSL            ;TEST MODE,GET NEXT SLAVE ADDRESS
490:
491:
492: AVOCET SYSTEMS 8048 CROSS-ASSEMBLER - VERSION 1.63
493:
```

```
494: NONWIRE (TM) MASTER VER 2.07 (C) 1984 CONTROLONICS CORP
495:
496:
497:                   ;
498:                   ;       TEST MODE STARTUP
499:                   ;
500: 019F BB36    TESTM:  MOV    LASTC,#LOW MSG8
501: 01A1 D4AF    TEST80: CALL   OUTMES
502: 01A3 BB4C            MOV    LASTC,#LOW MSG10
503: 01A5 D4AF            CALL   OUTMES          ;OUTPUT MESSAGE
504: 01A7 B451            CALL   GETADR          ;GET ADDRESS
505: 01A9 D4CB            CALL   UTILS           ;ECHO START ADDRESS
506: 01AB FD              MOV    A,LRC           ;AND SAVE
507: 01AC BB6B            MOV    LASTC,#LOW MSG12
508: 01AE C6A1            JZ     TEST80          ;TRAP START ADDRESS=0, 0=BROADCAST
509: 01B0 B81F            MOV    R0,#BADR
510: 01B2 A0              MOV    @R0,A
511: 01B3 AF              MOV    FIRSTC,A        ;SAVE FOR LATER CHECK
512: 01B4 BB5D            MOV    LASTC,#LOW MSG11
513: 01B6 D4AF            CALL   OUTMES          ;OUTPUT MESSAGE AND
514: 01B8 B451            CALL   GETADR          ;GET ADDRESS
515: 01BA D4CB            CALL   UTILS           ;ECHO END ADDRESS
516: 01BC FD              MOV    A,LRC           ;AND SAVE
517: 01BD B820            MOV    R0,#EADR
518: 01BF A0              MOV    @R0,A
519: 01C0 37              CPL    A               ;MAKE SURE THAT START <=END
520: 01C1 6F              ADD    A,FIRSTC        ;OR ERROR OUT AND START OVER
521: 01C2 BB6B            MOV    LASTC,#LOW MSG12
522: 01C4 F6A1            JC     TEST80
523: 01C6 BB80            MOV    LASTC,#LOW MSG13
524: 01C8 D4AF            CALL   OUTMES          ;SEND STARTING MESSAGE
525: 01CA BD13            MOV    LRC,#HRBSZ      ;CLEAR HOST RECEIVE BUFFER
526: 01CC B826            MOV    R0,#HRBUF       ;AS THIS RAM IS USED AS
527: 01CE B000    TEST10: MOV    @R0,#0          ;COUNTERS FOR STATISTICS
528: 01D0 18              INC    R0              ;IN TEST MODE
529: 01D1 EDCE            DJNZ   LRC,TEST10
530:
531:                   ;       ADDRESS NEXT SLAVE
532:                   ;
533: 01D3 D485    NEXTSL: CALL   DSTATS          ;DISPLAY STATITICS IF REQUIRED AND SET STOP FLG
534: 01D5 B85C    AUTONX: MOV    R0,#MT0BUF      ;INITIALIZE BUFFER 0 FOR
535: 01D7 B020            MOV    @R0,#RESTRT     ;ADDRESS SEQUENCE
536: 01D9 18              INC    R0              ;IF WE JUST FINISHED THE
537: 01DA B920            MOV    R1,#EADR        ;THE LAST ADDRESS THEN
538: 01DC F0              MOV    A,@R0           ;GO BACK AND START AT
539: 01DD D1              XRL    A,@R1           ;BEGINNING,ELSE INCREMENT ADDRESS IN
540: 01DE 96E4            JNZ    TEST30          ;AT END?
541: 01E0 C9              DEC    R1              ;YES,GET BEGINNING ADDRESS
542: 01E1 F1              MOV    A,@R1           ;TO A AND START AGAIN
543: 01E2 2402            JMP    MAINS
544: 01E4 F0      TEST30: MOV    A,@R0           ;NOT AT END GET CURRENT ADDRESS
545: 01E5 17              INC    A               ;AND INCREMENT TO A AND USE
546: 01E6 2402            JMP    MAINS           ;AS NEXT ADDRESS
547:                   ;
548:
549:
```

550: AVOCET SYSTEMS 8048 CROSS-ASSEMBLER - VERSION 1.63
551:
552: NONWIRE (TM) MASTER VER 2.07 (C) 1984 CONTROLONICS CORP
553:
554:
555:                 ;       DATA TRANSFER IN SLAVE MODE
556:                 ;
557: 01E8 B400      TEST50: CALL    RETRAN          ;SEND WITH NAK
558: 01EA 24FA              JMP     TEST60          ;AND GO ADVANCE RETRY COUNTER
559: 01EC BF00      TSTDAT: MOV     FIRSTC,#0       ;YES,FILL BUFFER #1
560: 01EE D422              CALL    IFILL           ;WITH STARTING PATTERN
561: 01F0 F4F4              CALL    LOADRT          ;INITIALIZE RE-TRY COUNTER
562: 01F2 843B              CALL    SNEXT           ;START DATA TRANSFER
563: 01F4 9400      TEST40: CALL    READM           ;GET RESPONSE
564: 01F6 96E8              JNZ     TEST50          ;ERROR
565: 01F8 74A3              CALL    PGOODM          ;VALID,PROCESS MESSAGE
566: 01FA F4F0      TEST60: CALL    ADVRTY          ;ADV COUNTER,OVERFLOW?
567: 01FC 96F4              JNZ     TEST40          ;NO,LOOP ON DATA
568: 01FE 9400              CALL    READM           ;THATS IT,CLEAR OUT LAST
569: 0200 24D3              JMP     NEXTSL          ;GO DO NEXT SLAVE
570:
571:
572: AVOCET SYSTEMS 8048 CROSS-ASSEMBLER - VERSION 1.63
573:
574: NONWIRE (TM) MASTER VER 2.07 (C) 1984 CONTROLONICS CORP
575:
576:
577:            ;
578:            ;       READ CHARACTER FROM HOST
579:            ;
580:            ;       R0,R1,A DESTROYED
581:            ;
582:            ;       THIS ROUTINE WILL READ CHARACTER FROM HOST AND STORE IN HRBUF.  IF
583:            ;       NUMBER CHARACTERS IN BUFFER IS LESS THAN THRESHOLD THEN DTR IS
584:            ;       CLEARED ;ELSE DTR IS SET,  CHARACTER WILL BE STORED IN BUFFER.
585:            ;       IF USER CONTINUES TO SEND AFTER DTR IS CLEARED CHARACTERS WILL BE
586:            ;       STORED IN THE BUFFER UNTIL THE BUFFER IS COMPLETELY FULL AT WHICH
587:            ;       TIME INPUT CHARACTERS ARE THROWN AWAY.IF DTR FLOW CONTROL IS NOT
588:            ;       ENABLED THEN XON/XOFF IS USED TO HOST.WHEN CHARACTER ALMOST
589:            ;       FILLS BUFFER THE XOFF FLAG IS SET CAUSING XOFF TO BE SENT
590:            ;       TO HOST AT NEXT CALL TO SENDHT.A MATCHING XON WILL BE SEND WHEN
591:            ;       BUFFER IS COMPLETELY EMPTY
592:            ;
593:            ;       (0 SUBROUTINES LEVEL USED)
594:            ;
595:            ;       CHARACTER FILTERING
596:            ;         1)IF STOP CODE IS READ THEN HARD JMP 0 IS EXECUTED IF TST MODE
597:            ;            ELSE 84H IS PLACED INTO THE BUFFER
598:            ;         2)IF NOT TEST MODE THEN ASCII ADDRESS REQUEST RESULTS IN 80H IN BUF
599:            ;         3)IF NOT TEST MODE THEN HEX ADDRESS REQUEST RESULTS IN 81H IN BUF
600:            ;         4)IF NOT TEST MODE THEN KNOWN ASCII ADDRESS RESULTS IN 82H IN SUB
601:            ;         5)IF NOT TEST MODE THEN KNOWN BINARY ADDRESS RESULTS IN 83H IN BUF
602:            ;         6)IF NOT TEST MODE OR 1,2,3 THEN STORE CHAR AS IS IN BUFFER
603:            ;         7)IF TEST MODE AND XSTOP=0 THEN SAME AS RUN MODE
604:            ;         8)IF TEST MODE AND XSTOP=1 THEN CTRL R SETS DSTATF AND ALL OTHER
605:            ;            CHARACTERS ARE IGNORED

```
606:                          ;   9) IF XON/XOF ENABLED FROM HOST THEN XON/XOFF IS TRAPPED
607:                          ;
608: 0202 9ADF   READH:  ANL   P2,#NOT CSEL         ;SELECT 8251
609: 0204 80             MOVX  A,@R0                ;GET CHARACTER STATUS
610: 0205 8A20           ORL   P2,#CSEL             ;DE-SELECT 8251
611: 0207 320A           JB1   READH1               ;CHARACTER AVAILABLE
612: 0209 83     READH4: RET                        ;NO CHARACTER, EXIT
613: 020A A9     READH1: MOV   R1,A                 ;SAVE STATUS
614: 020B 9A9F           ANL   P2,#NOT CTRLM+CSEL
615: 020D 80             MOVX  A,@R0
616: 020E 537F           ANL   A,#7FH               ;MASK PARITY BIT
617: 0210 8A60           ORL   P2,#CTRLM+CSEL
618: 0212 29             XCH   A,R1
619: 0213 5338           ANL   A,#RCERR             ;MASK ERROR BITS
620: 0215 C627           JZ    READH3               ;IF ERROR FORCE CHAR TO 0
621: 0217 B900           MOV   R1,#0                ;IS AN ERROR
622: 0219 09             IN    A,P1                 ;DTR FLOW CONTROL ENABLED?
623: 021A 3220           JB1   READ70               ;YES
624: 021C 2317           MOV   A,#DTREN+ERRST       ;NO,CLEAR ERROR AND LAEVE DTR ON
625: 021E 4422           JMP   READ75
626: 0220 2315   READ70: MOV   A,#DTRDIS+ERRST      ;RESET ERROR ON CHIP
627: 0222 9ADF   READ75: ANL   P2,#NOT CSEL         ;SELECT 8251
628:
629:
630: AVOCET SYSTEMS 8048 CROSS-ASSEMBLER - VERSION 1.63
631:
632: NONWIRE (TM) MASTER VER 2.07 (C) 1984 CONTROLONICS CORP
633:
634:
635: 0224 90             MOVX  @R0,A
636: 0225 8A20           ORL   P2,#CSEL             ;DE-SELECT 8251
637: 0227 B813   READH3: MOV   R0,#HRCNT
638: 0229 F0             MOV   A,@R0
639: 022A 03ED           ADD   A,#-HRBSZ            ;IS BUFFER COMPLETELY FULL?
640: 022C C609           JZ    READH4               ;YES, IGNORE INPUT,USER SHOULD HAVE STOPPED
641: 022E 0304           ADD   A,#-HRLIM+HRBSZ      ;SET C=1 IF ALMOST FULL
642: 0230 09             IN    A,P1                 ;DTR FLOW CONTROL?
643: 0231 323F           JB1   READ80               ;YES
644: 0233 E64A           JNC   READH5               ;NO, IS XON/XOFF,BUFFER ALMOST FULL?
645: 0235 B821           MOV   R0,#FLAG2            ;YES,HAVE WE ALREADY SENT
646: 0237 F0             MOV   A,@R0                ;AN XOFF?
647: 0238 524A           JB2   READH5               ;YES,DONT SEND ANOTHER
648: 023A 4305           ORL   A,#SEDXOF+SENTOF     ;NO,SET SEND XOF AND XOF SENT
649: 023C A0             MOV   @R0,A                ;FLAGS SO XOFF WILL GO OUT
650: 023D 444A           JMP   READH5               ;AND ONLY ONCE
651: 023F 2305   READ80: MOV   A,#DTRDIS            ;SET TO TURN DTR OFF
652: 0241 F645           JC    READH8               ;IS ALMOST FULL DTR=0
653: 0243 2307           MOV   A,#DTREN             ;NOT ALMOST FULL DTR=1
654: 0245 9ADF   READH8: ANL   P2,#NOT CSEL         ;SELECT 8251
655: 0247 90             MOVX  @R0,A                ;SET OR CLR DTR
656: 0248 8A20           ORL   P2,#CSEL             ;DE-SELECT 51
657: 024A B813   READH5: MOV   R0,#HRCNT            ;POINT TO RECEIVE BUFFER COUNTER
658: 024C 09             IN    A,P1
659: 024D 67             RRC   A                    ;XON/XOFF FROM HOST ENABLED?
660: 024E E659           JNC   READH7               ;NO
661: 0250 F9             MOV   A,R1                 ;YES
```

```
662: 0251 03EF            ADD     A,#-XON          ;IS CHARACTER XON?
663: 0253 C698            JZ      READ55           ;YES
664: 0255 03FE            ADD     A,#XON-XOFF      ;NO,IS IT XOFF?
665: 0257 C69D            JZ      READ60           ;YES
666: 0259 FE      READH7: MOV     A,AFLAG          ;NO,IS IT TEST MODE?
667: 025A 125E            JB0     READH9           ;NO
668: 025C 5288            JB2     READ10           ;YES,STOP SET?
669: 025E F9      READH9: MOV     A,R1             ;NO,TREAT SAME AS RUN MODE
670: 025F 07              DEC     A                ;ASCII MODE ADDRESS SEQUENCE?
671: 0260 C676            JZ      READH6           ;YES,SET CHARACTER=80H
672: 0262 07              DEC     A                ;NO,HEX MODE ADDRESS SEQUENCE?
673: 0263 C675            JZ      READ40           ;YES,SET CHARACTER=81H
674: 0265 07              DEC     A                ;KNOWN LENGTH ASCII
675: 0266 C674            JZ      READ41           ;YES,SET 82H
676: 0268 07              DEC     A                ;NO,KNOWN LENGTH BINARY
677: 0269 C673            JZ      READ42           ;YES,SET 83H
678: 026B 07              DEC     A                ;NO,AUTO-POLL REQUEST?
679: 026C C6A2            JZ      READ30           ;YES
680: 026E 03EA            ADD     A,#ATPOLL-ASTOP  ;NO,STOP CODE?
681: 0270 9679            JNZ     READH2           ;NO,PASS THROUGH AS IS
682: 0272 17              INC     A                ;YES,SET CHARACTER=84H
683: 0273 17      READ42: INC     A
684: 0274 17      READ41: INC     A
685: 0275 17      READ40: INC     A
686:
687:
688: AVOCET SYSTEMS 8048 CROSS-ASSEMBLER - VERSION 1.63
689:
690: NONWIRE (TM) MASTER VER 2.07 (C) 1984 CONTROLONICS CORP
691:
692:
693: 0276 4380    READH6: ORL     A,#80H           ;SET STOP CTRL BIT
694: 0278 29      READ31: XCH     A,R1             ;CHAR TO R1
695: 0279 10      READH2: INC     @R0              ;ADVANCE CHARCTER COUNT
696: 027A 18              INC     R0               ;SET PTR TO PUT PTR
697: 027B F0              MOV     A,@R0            ;PUT PTR TO R1
698: 027C 29              XCH     A,R1             ;STORE CHARACR
699: 027D A1              MOV     @R1,A            ;STORE CHARACTER
700:                  ;
701:                  ;   MERGE POINTER FOR CIRCULAR POINTER TO HOST RECEIVE
702:                  ;   BUFFER INCREMENT.
703:                  ;   R0(— PTR TO BUFFER PTR
704:                  ;   R1(— PTR BEING ADVANCED
705:                  ;
706: 027E 10      ADVHRP: INC     @R0              ;ADVANCE POINTER
707: 027F F9              MOV     A,R1             ;GET OLD VALUE BACK
708: 0280 03C8            ADD     A,#-HXBUF+1      ;WRAP TO BEGINNING OF BUFFER
709: 0282 9686            JNZ     READ20           ;NO,ALL SET
710: 0284 B026            MOV     @R0,#HRBUF
711: 0286 F1      READ20: MOV     A,@R1            ;GET VALUE BACK TO A
712: 0287 83              RET
713: 0288 F9      READ10: MOV     A,R1             ;TEST MODE IS RUNNING
714: 0289 03E5            ADD     A,#-ASTOP        ;STOP CODE
715: 028B 968F            JNZ     READ50           ;NO
716: 028D 0400            JMP     POWER            ;YES,HARD RESET
717: 028F 0309    READ50: ADD     A,#ASTOP-CTRLR   ;ONLY OTHER CHARACTER ALLOWED
```

```
718:  0291 9697              JNZ     READ95         ;IS CTRL R FOR STATUS
719:  0293 FE                MOV     A,AFLAG        ;IS CTRL R SET STATUS OUTPUT
720:  0294 4340              ORL     A,#DSTATF      ;REQUEST FLAG
721:  0296 AE                MOV     AFLAG,A
722:  0297 83      READ95:   RET                    ; SHOULD HAVE STENED;TRASH CHAR
723:
724:                ;
725:                ;       XON RECEIVED HOST AND FLOW CONTROL HOST ENABLED
726:                ;
727:  0298 FE      READ55:   MOV     A,AFLAG        ;CLEAR OUT STOP FLAG
728:  0299 537F              ANL     A,#NOT HSTOPT  ;SO CHARACTERS WILL BE SENT TO
729:  029B AE                MOV     AFLAG,A        ;HOST
730:  029C 83                RET
731:                ;
732:                ;       XOFF RECEIVED HOST AND FLOW CONTROL ENABLED
733:                ;
734:  029D FE      READ60:   MOV     A,AFLAG        ;SET STOP FLAG SO NO MORE
735:  029E 4380              ORL     A,#HSTOPT      ;CHARACTERS WILL BE SENT
736:  02A0 AE                MOV     AFLAG,A        ;TO THE HOST
737:  02A1 83                RET
738:                ;
739:                ;       AUTOPOLL REQUEST
740:                ;
741:  02A2 2388    READ30:   MOV     A,#88H         ;SET AUTOPOLL REQUEST BIT
742:  02A4 4478              JMP     READ31         ;AND CONTROL BIT
743:
744:
745: AVOCET SYSTEMS 8048 CROSS-ASSEMBLER - VERSION 1.63
746:
747: NONWIRE (TM) MASTER VER 2.07 (C) 1984 CONTROLONICS CORP
748:
749:
750:                ;
751:                ;A,R0,R1 DESTROYED
752:                ;1)  TRANSMITER NOT READY — 15 MSEC
753:                ;2)  TRANSMITTER READY NO DATA — 30 MSEC
754:                ;3)  DATA PLUS NO BFER WRAP  — 90 MSEC
755:                ;4)  DATA PLUS BUFFER WRAP   — 90 MSEC
756:                ;       0 SUBROUTINE LEVELS USED
757:                ;
758:  02A6 9ADF    SENDHT:   ANL     P2,#NOT CSEL   ;SELECT 8251
759:  02A8 80                MOVX    A,@R0          ;GET USART STATUS
760:  02A9 8A20              ORL     P2,#CSEL       ;DE-SELECT 8251
761:  02AB 12AE              JB0     SENDH1         ;TRANSMITTER READY
762:  02AD 83      SENDH2:   RET                    ;NO,EXIT
763:  02AE 52B1    SENDH1:   JB2     SENDH7         ;YES, TRANSMITTER BUFFER EMPTY
764:  02B0 83                RET                    ;NO, SO CTS WILL WORK
765:  02B1 B821    SENDH7    MOV     R0,#FLAG2      ;YES
766:  02B3 F0                MOV     A,@R0          ;SEND XOFF REQUESTED?
767:  02B4 12D4              JB0     SENDH4         ;YES,GO SEND XOFF TO HOST
768:  02B6 32DB              JB1     SENDH5         ;NO,SEND XON?
769:  02B8 FE                MOV     A,AFLAG        ;NO,HOST IS FLOW CONTROLLING?
770:  02B9 F2AD              JB7     SENDH2         ;YES,NO TRANSMISSION
771:  02BB B816              MOV     R0,#HXCNT      ;NO
772:  02BD F0                MOV     A,@R0          ;ANYTHING IN BUFFER TO SEND
773:  02BE C6AD              JZ      SENDH2         ;NO,GO EXIT
```

```
774: 02C0 07              DEC     A                       ;YES; DECREMENT COUNT
775: 02C1 A0              MOV     @R0,A
776: 02C2 C8              DEC     R0                      ;PTR TO GET PTR
777: 02C3 F0              MOV     A,@R0                   ;GET THE GET POINTER
778: 02C4 A9              MOV     R1,A
779: 02C5 F1              MOV     A,@R1                   ;GET CHARACTER
780: 02C6 9A9F            ANL     P2,#NOT CTRLM+CSEL      ;SET DATA ON C/D 8251+SELECT 8251
781: 02C8 90              MOVX    @R0,A                   ;SEND CHARACTER
782: 02C9 8A60            ORL     P2,#CTRLM+CSEL          ;SET CTRL ON C/D 8251+DE-SELECT 8251
783:                      ;
784:                      ;       COMMON MERGE POINT FOR UPDATE OF CIRCULAR GET OR PUT
785:                      ;       POINTER ON HOST TRANSMIT BUFFER.
786:                      ;       R0(---PTS TO PTR
787:                      ;       R1(---CONTAINS POINTER
788:                      ;
789: 02CB 18      SENDH3: INC     @R0                     ;ADVANCE POINTER
790: 02CC F9              MOV     A,R1
791: 02CD 03B4            ADD     A,#-HRBUF+1             ;PTR WRAPS AROUND TO BEGINNING
792: 02CF 96AD            JNZ     SENDH2                  ;NO, EXIT
793: 02D1 B039            MOV     @R0,#HXBUF              ;YES,RESET POINTER TO BEGINNING
794: 02D3 83              RET                             ;OF THE BUFFER
795: 02D4 53FE    SENDH4: ANL     A,#NOT SEDXOF           ;CLEAR SEND XOFF FLAG
796: 02D6 A0              MOV     @R0,A                   ;AND GO SEND XOFF TO
797: 02D7 2313            MOV     A,#XOFF                 ;THE HOST
798: 02D9 44E0            JMP     SENDH6
799: 02DB 53FD    SENDH5: ANL     A,#NOT SEDXON           ;CLEAR SEND XON FLAG
800: 02DD A0              MOV     @R0,A                   ;AND GO SEND XON TO
801:
802:
803: AVOCET SYSTEMS 8048 CROSS-ASSEMBLER - VERSION 1.63
804:
805: NONWIRE (TM) MASTER VER 2.07 (C) 1984 CONTROLONICS CORP
806:
807:
808: 02DE 2311            MOV     A,#XON                  ;TO HOST
809: 02E0 9A9F    SENDH6: ANL     P2,#NOT CTRLM+CSEL
810: 02E2 90              MOVX    @R0,A
811: 02E3 8A60            ORL     P2,#CTRLM+CSEL
812: 02E5 83              RET
813:
814:
815: AVOCET SYSTEMS 8048 CROSS-ASSEMBLER - VERSION 1.63
816:
817: NONWIRE (TM) MASTER VER 2.07 (C) 1984 CONTROLONICS CORP
818:
819:
820: 0300                 ORG     300H
821:                      ;
822:                      ;THE FOLLOWING IS A TABLE OF MODE WORDS FOR 81 INITIALIZE.
823:                      ;INDEX IS P20,P21
824:                      ; .X16 CLOCK
825:                      ; .8DATA BITS=8
826:                      ; .1 STOP BIT
827:                      ;PARITY IS FUNCTION OF DIPS
828:                      ;
829: 0300 7A      MTABLE: DB      07AH                    ;P20=0 P21=0 --)EVEN,7 BIT
```

```
830:  0301 4E                DB     04EH           ;P20=1 P21=0 -->NO PARITY,8 BIT
831:  0302 7E                DB     07EH           ;P20=0 P21=1 -->EVEN,8 BIT
832:  0303 5E                DB     05EH           ;P20=1 P21=1 -->ODD,8 BIT
833:                         ;
834:                         ; MESSAS USED IN TEST MODE
835:                         ; MESSAGES OUTPUT MUST BE TERMINATED BY A NULL
836:                         ;
837:  0304 23424C4B   MSG5:  DB     '#BLKS SENT=',NULL
838:  0310 20234249   MSG6:  DB     ' #BITS IN ERROR=',NULL
839:  0321 20235449   MSG7:  DB     ' #TIMEOUTS AND NAKS=',NULL
840:  0336 0D0A       MSG8:  DB     CR,LF
841:  0338 54455354          DB     'TEST MODE STARTED'
842:  0349 0D0A00     MSG2:  DB     CR,LF,NULL
843:  034C 0D0A       MSG10: DB     CR,LF
844:  034E 53544152          DB     'START ADDRESS=',NULL
845:  035D 20454E44   MSG11: DB     ' END ADDRESS=',NULL
846:  036B 0D0A       MSG12: DB     CR,LF
847:  036D 494E5641          DB     'INVALID ADDRESSES?',NULL
848:  0380 0D0A       MSG13: DB     CR,LF
849:  0382 54455354          DB     'TEST MODE RUNNING'
850:  0393 0D0A00            DB     CR,LF,NULL
851:  0396 0D0A5357   MSG14: DB     CR,LF,'SW1=',NULL
852:  039D 20535732   MSG15: DB     ' SW2=',NULL
853:
854:
855: AVOCET SYSTEMS 8048 CROSS-ASSEMBLER - VERSION 1.63
856:
857: NONWIRE (TM) MASTER VER 2.07 (C) 1984 CONTROLONICS CORP
858:
859:
860:                         ;
861:                         ;      PROCESS MESSAGE IN DATA STATE FOR RUN OR TEST MODE
862:                         ;
863:                         ;      (3 SUBROUTINE LEVELS USED)
864:                         ;
865:  03A3 B85D      PGODM:  MOV    R0,#MT0BUF+1    ;IF BROADCASTING THEN GO
866:  03A5 F0                MOV    A,@R0           ;SEND NEXT
867:  03A6 C6B1              JZ     PGOD2
868:  03A8 FE                MOV    A,AFLAG
869:  03A9 DF                XRL    A,FIRSTC
870:  03AA 5310              ANL    A,#RSEQ         ;SEQUENCE # DIFFERENT
871:  03AC 96B3              JNZ    PGOD1           ;YES, A NEW MESSAGE
872:  03AE FF        PGOD6:  MOV    A,FIRSTC        ;NO, OLD DATA, NAK?
873:  03AF F2C1              JB7    PGOD4           ;YES, GO RESEND WITH ACK
874:  03B1 A439      PGOD2:  JMP    CSNEXT          ;NO,COMPARE IF TEST AND SEND NEXT
875:  03B3 FF        PGOD1:  MOV    A,FIRSTC        ;NAK RECEIVED?
876:  03B4 F2BE              JB7    PGOD5           ;YES
877:  03B6 B439      PGOD7:  CALL   CSNEXT          ;NO,COMPARE IF TEST MODE AND SEND NEXT
878:  03B8 FE        PGOD9:  MOV    A,AFLAG         ;TOGGLE SEQUENCE NUMBER SINCE
879:  03B9 D310              XRL    A,#RSEQ         ;WE HAVE NEW DATA MESSAGE
880:  03BB AE                MOV    AFLAG,A         ;TRANSFER DATA TO HOST IF THERE
881:  03BC C44A              JMP    TMRHT           ;IS ANY AND NOT TEST MODE
882:  03BE FE        PGOD5:  MOV    A,AFLAG         ;TEST MODE?
883:  03BF 12C3              JB0    PGOD8           ;NO
884:  03C1 A432      PGOD4:  JMP    RETRAK          ;YES, RE-TRANSMIT WITH ACK AND EXIT
885:  03C3 B432      PGOD8:  CALL   RETRAK          ;RE-TRANSMIT WITH ACK,UPDATE SEQ #
```

```
886: 03C5 64B8            JMP     PGOD9           ;AND COPY DATA IF ANY
887:
888:
889: AVOCET SYSTEMS 8048 CROSS-ASSEMBLER - VERSION 1.63
890:
891: NONWIRE (TM) MASTER VER 2.07 (C) 1984 CONTROLONICS CORP
892:
893:
894:                  ;
895:                  ;     R1(---PTR TO ALTERNATE MODEM TRANSMIT BUFFER
896:                  ;
897: 03C7 A1    PALTST: MOV    @R1,A           ;FRONT END
898: 03C8 B95C  PALTBU: MOV    R1,#MT0BUF
899: 03CA B6CE          JF0    PAEXT
900: 03CC B96E          MOV    R1,#MT1BUF
901: 03CE 83    PAEXT:  RET
902:                  ;
903:                  ;     R0(---PTR TO CURRENT MODEM TRANSMIT BUFFER
904:                  ;
905: 03CF B86E  PCURBU: MOV    R0,#MT1BUF
906: 03D1 B6D5          JF0    PBEXT
907: 03D3 B85C          MOV    R0,#MT0BUF
908: 03D5 83    PBEXT:  RET
909:
910:
911: AVOCET SYSTEMS 8048 CROSS-ASSEMBLER - VERSION 1.63
912:
913: NONWIRE (TM) MASTER VER 2.07 (C) 1984 CONTROLONICS CORP
914:
915:
916: 0400                 ORG 400H
917:                  ;
918:                  ;THIS ROUTINE WILL READ A MESSAGE FROM THE MODEM.
919:                  ;HOST INTERFACE IS CONTINUOUSLY UPDATED.
920:                  ;TRANSFERS ARE CONTINUOUSLY MADE TO ALTERNATE MODEM TRANSMIT BUFFER.
921:                  ;
922:                  ;RETURN
923:                  ;     A=()0 IF ERROR
924:                  ;     A=0 IF NO ERROR
925:                  ;IF NO ERROR DATA PORTION OF MESSAGE IS IN MRBUF.
926:                  ;FIRSTC=FIRST CHARACTER OF MESSAGE ON EXIT
927:                  ;     (3 SUBROUTINE LEVELS USED)
928:                  ;
929:                  ;     ALL REGISTERS DESTROYED
930:                  ;
931: 0400 B85D  READM:  MOV    R0,#MT0BUF+1    ;ARE WE READING A RESPONSE
932: 0402 F0            MOV    A,@R0           ;FROM A BROADCAST?
933: 0403 C63F          JZ     RM1             ;YES,GO WAIT FROM TRANSMIT TO FINISH
934: 0405 BD00          MOV    LRC,#0          ;CLEAR OUT LRC ACCUMULATION
935: 0407 9457          CALL   CPROCA          ;GET 1ST CHARACTER
936: 0409 7639          JF1    RM9             ;TIMEOUT
937: 040B 9637          JNZ    RM3             ;NO,1ST CHARACTER BAD
938: 040D F9            MOV    A,R1            ;GET CHARACTER + SAVE
939: 040E AF            MOV    FIRSTC,A
940: 040F 9458          CALL   CPROC           ;GET ADDRESS CHARACTER
941: 0411 7639          JF1    RM9             ;TIMEOUT
```

```
942: 0413 9637          JNZ    RM3              ;PHYSICAL ERROR
943: 0415 B85D          MOV    R0,#MT0BUF+1     ;IF ADDRESS IN RESPONSE IS NOT
944: 0417 F0            MOV    A,@R0            ;EQUAL TO ADDRESS
945: 0418 D9            XRL    A,R1             ;RECEIVED IN MESSAGE
946: 0419 9637          JNZ    RM3              ;THEN AN ERROR
947: 041B FF            MOV    A,FIRSTC
948: 041C 530F          ANL    A,#0FH           ;ANY DATA
949: 041E C62F          JZ     RM4              ;NO
950: 0420 BB4D          MOV    LASTC,#MRBUF     ;YES,SET PTR TO START OF DATA
951: 0422 AC            MOV    CCOUNT,A         ;SET COUNT ON #DATA CHARS
952: 0423 9458    RM5:  CALL   CPROC            ;GET NEXT CHARACTER
953: 0425 7639          JF1    RM9              ;EXIT ON TIMEOUT
954: 0427 9637          JNZ    RM3              ;ERROR,GO WAIT FOR TIMEOUT
955: 0429 FB            MOV    A,LASTC          ;STORE CHARACTER
956: 042A 29            XCH    A,R1             ;IN BUFFER
957: 042B A1            MOV    @R1,A
958: 042C 1B            INC    LASTC            ;ADVANCE PTR
959: 042D EC23          DJNZ   CCOUNT,RM5       ;LOOP ON CHARACTER
960: 042F 9458    RM4:  CALL   CPROC            ;GET LAST CHECK CHARACTER
961: 0431 7639          JF1    RM9              ;TIMEOUT
962: 0433 9637          JNZ    RM3              ;BAD CHARACTER ON LAST CHAR, PASS ERR BACK
963: 0435 FD            MOV    A,LRC            ;A=0 IF LRC GOOD,ELSE NOT 0
964: 0436 83            RET
965:
966:               ;    SET ERROR RETURN AND WAIT FOR 1 MORE TIMEOUT
967:
968:
969: AVOCET SYSTEMS 8048 CROSS-ASSEMBLER - VERSION 1.63
970:
971: NONWIRE (TM) MASTER VER 2.07 (C) 1984 CONTROLONICS CORP
972:
973:
974:               ;
975: 0437 9448    RM3:   CALL   FLUSH           ;WAIT FOR QUITE LINE
976: 0439 A5      RM9:   CLR    F1              ;AND ONE MORE FOR GOOD
977: 043A 9448           CALL   FLUSH           ;MEASURE
978: 043C 2301           MOV    A,#1
979: 043E 83             RET
980:               ;
981:               ;    WAITING FOR RESPONSE FROM BROADCAST
982:               ;
983: 043F 9457    RM1:   CALL   CPROCA          ;REFRESH BUFFERS HOST I/O
984: 0441 D5             SEL    RB1             ;CONTINUE UNTIL THE
985: 0442 FC             MOV    A,STATE         ;TRANSMISSION IN PROGRESS
986: 0443 C5             SEL    RB0             ;IS FINISHED.
987: 0444 963F           JNZ    RM1
988: 0446 AF             MOV    FIRSTC,A        ;RETURN A=0,FIRSTC=0
989: 0447 83             RET
990:
991:               ;
992:               ;    WAIT FOR QUITE LINE
993:               ;
994:               ;    (2 SUBROUTINE LEVELS)
995:               ;
996: 0448 BBE0    FLUSH:  MOV   LASTC,#JAMLIM   ;SET LIMIT
997: 044A 9458    FLUS20: CALL  CPROC           ;GET CHARACTER
```

```
998:  044C 7656              JF1    FLUS10        ;EXIT ON TIMEOUT
999:  044E 1B                INC    LASTC         ;NOT TIMEOUT,ADVANCE LIMIT
1000: 044F FB                MOV    A,LASTC       ;OVER LIMIT?
1001: 0450 964A              JNZ    FLUS20        ;NO
1002: 0452 9AFB              ANL    P2,#NOT ALARM ;YES,THIS IS RIDICULOUS
1003: 0454 A5                CLR    F1            ;SOMEBODY IS JAMMING
1004: 0455 B5                CPL    F1            ;GET OUT WITH ERROR OUTPUT ON
1005: 0456 83       FLUS10:  RET
1006:
1007:
1008: AVOCET SYSTEMS 8048 CROSS-ASSEMBLER - VERSION 1.63
1009:
1010: NONWIRE (TM) MASTER VER 2.07 (C) 1984 CONTROLONICS CORP
1011:
1012:
1013:                 ;
1014:                 ;READ CHARACTER MODEM, UPDATE HOST AND ALTERNATE TRANSMIT
1015:                 ;
1016:                 ;       R0,R1,A,TEMP DESTROYED
1017:                 ;
1018:                 ;       RTN F1 = 1 TIMEOUT R0,R1,A INDETERMINATE
1019:                 ;       RTN F0 = 0 A = CHAR STATUS, R1 = CHARACTER, R0 = UNDEFINED
1020:                 ;       IF A=0,NO ERROR, ELSE BIT = OVERRUN/FRAMING
1021:                 ;                         BIT 2 = PARITY
1022:                 ;       SUBROUTINES CALLED (USES ONE LEVELS)
1023:                 ;
1024:                 ;
1025:                 ;
1026: 0457 A5        CPROCA:  CLR    F1
1027: 0458 76CD      CPROC:   JF1    CPROC1        ;IF TIMEOUT
1028: 045A B81A               MOV    R0,#UFLAG     ;GET RECEIVE CHAR
1029: 045C F0                 MOV    A,@R0         ;STATUS
1030: 045D 12BD               JB0    CPROC2        ;IS A CHARACTER
1031: 045F 5402               CALL   READH         ;READ HOST INPUT IF ANY
1032: 0461 54A6               CALL   SENDHT        ;SEND TO HOST IF ANYTHING
1033:                 ;
1034:                 ;       HOST RECEIVE TO ALTERNATE MODEM TRANSMIT BUFFER MOVE
1035:                 ;
1036:                 ;       A,R0,R1,TEMP DESTROYED
1037:                 ;
1038:                 ;       FLAGS USED:
1039:                 ;         XSTOP(---SET IF MSB OF INPUT CHARACTER IS SET
1040:                 ;                   THIS STOPS TRANSFER
1041:                 ;         XNIB (---USED WHEN ASSEMBLING NIBBLES TO SPECIFY THAT THE
1042:                 ;                   FIRST NIBBLE HAS BEEN TRANSFERRED
1043:                 ;         ASCL (---USED TO DETERMINE 7 BIT ASCII OR 4 BIT HEX
1044:                 ;                   IS BEING READ FROM HOST RECEIVE BUFFER
1045:                 ;
1046:                 ;       IF HEX MODE THEN BYTES ARE PACKED WITH FIRST CHARACTER OUT OF BUFFER
1047:                 ;       TO MS 4 BITS OF TRANSMIT CHARACTER.IE MS FIRST,LS SECOND.IF A STOP
1048:                 ;       IS ENCOUNTERED WHEN IN HEX MODE AND ONLY THE 1ST NIBBLE HAS BEEN
1049:                 ;       READ THE THE CHARACTER SENT HAS LS 4 BITS=0
1050:                 ;
1051: 0463 94DD               CALL   CHKEMP        ;BUFFER EMPTY AND XON CHECK
1052: 0465 C658               JZ     CPROC         ;BUFFER IS EMPTY
1053: 0467 FE                 MOV    A,AFLAG       ;YES,IS THE STOP FLAG SET?
```

```
1054: 0468 5258            JB2    CPROC          ;YES, GO EXIT
1055: 046A C8              DEC    R0             ;NO, FETCH THE HOST RECEIVE
1056: 046B F0              MOV    A,@R0          ;GET POINTER
1057: 046C A8              MOV    R0,A
1058: 046D 74C8            CALL   PALTBU         ;SET R1=ADDRESS OF ALTERNATE BUFFER
1059: 046F F1     XFER2:   MOV    A,@R1          ;FETCH # OF BYTES IN
1060: 0470 17              INC    A              ;MODEM TRANSMIT BUFFER
1061: 0471 530F            ANL    A,#0FH         ;IS THE BUFFER FULL?
1062: 0473 C658            JZ     CPROC          ;YES, NO TRANSFER, NO ROOM
1063: 0475 69              ADD    A,R1           ;NO, COMPUTE PTR
1064:
1065:
1066: AVOCET SYSTEMS 8048 CROSS-ASSEMBLER - VERSION 1.63
1067:
1068: NONWIRE (TM) MASTER VER 2.07 (C) 1984 CONTROLONICS CORP
1069:
1070:
1071: 0476 17              INC    A              ;TO STORE CHARACTER
1072: 0477 A9              MOV    R1,A           ;IN MODEM BUFFER
1073: 0478 F0              MOV    A,@R0          ;FETCH CHARACTER
1074: 0479 B825            MOV    R0,#NIBSV      ;PT TO NIBBLE SAVE LOCATION
1075: 047B F2AC            JB7    XFER5          ;STOP BIT IN CHARACTER?
1076: 047D AA              MOV    TEMP,A         ;NO, SAVE CHARACTER
1077: 047E F4F8            CALL   TAPOLL         ;AUTOPOLLING?
1078: 0480 B825            MOV    R0,#NIBSV      ;IF SO THEN DISCARD THE
1079: 0482 96A0            JNZ    XFER8          ;CHARACTER
1080: 0484 FE              MOV    A,AFLAG        ;FULL ASCII?
1081: 0485 B29C            JB5    XFER6          ;YES
1082: 0487 F4CD            CALL   HATOHX         ;NO, IS HEX ASCII MODE
1083: 0489 96A0            JNZ    XFER8          ;CONVERT, VALID HEX ASCII?
1084: 048B FE              MOV    A,AFLAG        ;YES, CONTINUE
1085: 048C 7296            JB3    XFER7          ;2ND NIBBLE?
1086: 048E 4308            ORL    A,#XNIB        ;NO, IS FIRST
1087: 0490 AE              MOV    AFLAG,A        ;SET 2ND FLAG
1088: 0491 FA              MOV    A,TEMP         ;SAVE 1ST NIBBLE AWAY AND
1089: 0492 47              SWAP   A              ;GO INC GET PTR AND COUNT
1090: 0493 A0              MOV    @R0,A          ;HOST RECEIVE BUFFER
1091: 0494 84A0            JMP    XFER8
1092: 0496 53F7   XFER7:   ANL    A,#NOT XNIB    ;RESET NIBBLE FLAG AND
1093: 0498 AE              MOV    AFLAG,A        ;BUILD 8 BIT BINARY TO
1094: 0499 FA              MOV    A,TEMP         ;TRANSMIT
1095: 049A 60              ADD    A,@R0
1096: 049B AA              MOV    TEMP,A
1097: 049C FA     XFER6:   MOV    A,TEMP         ;STR IN ALTERNATE TRANSMIT BUFFER
1098: 049D 74C7            CALL   PALTST         ;R1<--- PTR TO ALTERNATE BUFFER
1099: 049F 11              INC    @R1            ;INCREMENT # BYTES IN ALTERNATE BUFFER
1100: 04A0 B813   XFER8:   MOV    R0,#HRCNT      ;DECREMENT COUNT ON # OF BYTES
1101: 04A2 F0              MOV    A,@R0          ;IN HOST RECEIVE BUFFER
1102: 04A3 07              DEC    A
1103: 04A4 A0              MOV    @R0,A
1104: 04A5 C8              DEC    R0
1105: 04A6 F0              MOV    A,@R0          ;SET R1<---GET PTR
1106: 04A7 A9              MOV    R1,A           ;AND GO ADVANCE THE POINTER
1107: 04A8 547E            CALL   ADVHRP         ;MODULO THE BUFFER
1108: 04AA 8458            JMP    CPROC
1109: 04AC FE     XFER5:   MOV    A,AFLAG        ;SET STOP FLAG AS CHAR AS STOP BIT SET
```

```
1110: 04AD 4304            ORL     A,#XSTOP
1111: 04AF AE              MOV     AFLAG,A         ;FINAL NIBBLE?
1112: 04B0 72B4            JB3     XFER10          ;YES,ODD # OF NIBBLES
1113: 04B2 8458            JMP     CPROC           ;NO,EVEN #
1114: 04B4 53F7    XFER10: ANL     A,#NOT XNIB     ;RESET NIBBLE FLAG
1115: 04B6 AE              MOV     AFLAG,A
1116: 04B7 F0              MOV     A,@R0           ;GET LAST NIBBLE AND STORE IN BUFFER
1117: 04B8 74C7            CALL    PALTST          ;R1<---PTR TO ALTERNATE BUFFER
1118: 04BA 11              INC     @R1             ;INC # BYTES IN ALTERNATE BUFFER
1119: 04BB 8458            JMP     CPROC
1120: 04BD 35      CPROC2: DIS     TCNTI           ;DISABLE CLOCK INTERRUUPT
1121: 04BE A9              MOV     R1,A            ;SAVE STATUS
1122:
1123:
1124: AVOCET SYSTEMS 8048 CROSS-ASSEMBLER - VERSION 1.63
1125:
1126: NONWIRE (TM) MASTER VER 2.07 (C) 1984 CONTROLONICS CORP
1127:
1128:
1129: 04BF 53F8            ANL     A,#NOT(VERR+ERR+RCAV)  ;GET ERRORS+CHAR AVAILABLE
1130: 04C1 A0              MOV     @R0,A           ;UPDATE STAS
1131: 04C2 C8              DEC     R0              ;SET PTR TO CHAR
1132: 04C3 F0              MOV     A,@R0           ;READ CHARACTER
1133: 04C4 DD              XRL     A,LRC           ;INCLUDE CHARACTER IN RUNNING LRC
1134: 04C5 AD              MOV     LRC,A
1135: 04C6 F0              MOV     A,@R0           ;CHARACTER BACK TO A REGISTER
1136: 04C7 25              EN      TCNTI           ;ENABLE CLOCK INTERRUPT
1137: 04C8 1407            CALL    UARTEN          ;CALL UART IF FALG SET
1138: 04CA 29              XCH     A,R1            ;CHAR TO R1
1139: 04CB 5306            ANL     A,#VERR+ERR     ;STATUS TO A
1140: 04CD 83      CPROC1: RET
1141:
1142:
1143: AVOCET SYSTEMS 8048 CROSS-ASSEMBLER - VERSION 1.63
1144:
1145: NONWIRE (TM) MASTER VER 2.07 (C) 1984 CONTROLONICS CORP
1146:
1147:
1148:                 ;
1149:                 ;       READ CHARACTER FROM HOST INPUT BUFFER TO A
1150:                 ;
1151:                 ;       A,R0,R1,TEMP    DESTROYED
1152:                 ;
1153:                 ;       (1 SUBROUTINE LEVEL)
1154:                 ;
1155:                 ;       IF NO CHARACTERS THEN WAIT BY UPDATING HOST INPUT AND OUTPUTS
1156:                 ;       UNTIL A CHARACTER IS ENTERED
1157:                 ;
1158:                 ;       RETURN CHARACTER IN A
1159:                 ;
1160: 04CE 5402    INA:    CALL    READH           ;GET HOST INPUT IF ANY
1161: 04D0 54A6            CALL    SENDHT          ;SEND ANY OUTPUT TO HOST IF READY
1162: 04D2 94DD            CALL    CHKEMP          ;RECEIVE BUFFER CHECK + XON CHECK
1163: 04D4 C6CE            JZ      INA             ;BUFFER EMPTY WAIT
1164: 04D6 07              DEC     A               ;YES,DECREMENT COUNT ON # CHARS
1165: 04D7 A0              MOV     @R0,A
```

```
1166: 04D8 C8              DEC     R0              ;PT TO HOST RECEIVE GET PTR
1167: 04D9 F0              MOV     A,@R0           ;GET PTR TO R1
1168: 04DA A9              MOV     R1,A
1169: 04DB 447E            JMP     ADVHRP          ;GO UPDATE PTRE AND GET CHAR
1170:
1171:
1172: AVOCET SYSTEMS 8048 CROSS-ASSEMBLER - VERSION 1.63
1173:
1174: NONWIRE (TM) MASTER VER 2.07 (C) 1984 CONTROLONICS CORP
1175:
1176:
1177:                      ;       TEST HOST RECEIVE BUFFER FOR EMPTY
1178:                      ;
1179:                      ;       CASE 1 - BUFFER NOT EMPTY
1180:                      ;              .RTN R0 = PTS TO HOST RECEIVE COUNT
1181:                      ;                     A = COUNT
1182:                      ;
1183:                      ;       CASE 2 - BUFFER EMPTY
1184:                      ;              .RTN R0 - DESTROYED
1185:                      ;                     A - 0
1186:                      ;              .DTR WILL BE SET
1187:                      ;              .IF XOF SENT TO HOST XON WILL BE SENT
1188:                      ;
1189:                      ;
1190: 04DD B813    CHKEMP: MOV     R0,#HRCNT       ;POINT TO HOST RECEIVE COUNT
1191: 04DF F0              MOV     A,@R0           ;GET COUNT
1192: 04E0 C6E3            JZ      CHK10           ;EMPTY CASE
1193: 04E2 83              RET                     ;NOT EMPTY
1194: 04E3 2307    CHK10   MOV     A,#DTREN        ;GET DTR
1195: 04E5 9ADF            ANL     P2,#NOT CSEL
1196: 04E7 90              MOVX    @R0,A
1197: 04E8 8A20            ORL     P2,#CSEL
1198: 04EA B821            MOV     R0,#FLAG2       ;COUNT TO FLAG#2
1199: 04EC F0              MOV     A,@R0           ;READ FLAGS
1200: 04ED 52F1            JB2     CHK20           ;JUMP ON XOF SENT
1201: 04EF 27              CLR     A               ;NO XOF SENT EXIT
1202: 04F0 83              RET
1203: 04F1 53FB    CHK20:  ANL     A,#NOT SENTOF   ;CLEAR XOF SENT FLAG
1204: 04F3 4302            ORL     A,#SEDXON       ;SET SEND XON FLAG
1205: 04F5 A0              MOV     @R0,A
1206: 04F6 27              CLR     A               ;RETURN A=0
1207: 04F7 83              RET
1208:
1209:
1210: AVOCET SYSTEMS 8048 CROSS-ASSEMBLER - VERSION 1.63
1211:
1212: NONWIRE (TM) MASTER VER 2.07 (C) 1984 CONTROLONICS CORP
1213:
1214:
1215: 0500                 ORG     500H
1216:                      ;
1217:                      ;       RETRANSMIT CURRENT BUFFER WITH NAK.
1218:                      ;
1219:                      ;       (2 SUBROUTINE LEVELS USED)
1220:                      ;
1221:                      ;       A,R0,TEMP DESTROYED
```

```
1222:                  ;
1223: 0500 FE          RETRAN: MOV    A,AFLAG         ;IF ADDRESS SEQUENCE BYPASS
1224: 0501 3215                JB1    RETRA4          ;IS ADDRESS
1225: 0503 120B                JB0    RETRA6          ;TEST MODE?
1226: 0505 B834                MOV    R0,#NUTTTS      ;YES,INCREMENT RETRY COUNTER
1227: 0507 BA05                MOV    TEMP,#NT
1228: 0509 D47A                CALL   INCCN
1229: 050B B824        RETRA6: MOV    R0,#PKTNAK      ;NAK,ADVANCE NAK COUNTER
1230: 050D 10                  INC    @R0             ;AND IF OVERFLOW TO THRESHOLD
1231: 050E F0                  MOV    A,@R0           ;THEN SET ALARM OUTPUT
1232: 050F 03D4                ADD    A,#-THRMK
1233: 0511 E615                JNC    RETRA4
1234: 0513 9AFB                ANL    P2,#NOT ALARM   ;ALARM ON = LOW ON OUTPUT
1235: 0515 74CF        RETRA4: CALL   PCURBU          ;R0(---PTS TO CURRENT BUFFER
1236: 0517 F0                  MOV    A,@R0           ;SET NAK BIT
1237: 0518 4380                ORL    A,#NAKBIT       ;IN FIRST BYTE OF BUFFER
1238: 051A A0         RETRA3:  MOV    @R0,A
1239: 051B 23FE       RETRA2:  MOV    A,#TQBIT        ;CRITICAL REGION RESET TIMER
1240: 051D 62                  MOV    T,A             ;TO PREVENT INTERRUPTS
1241: 051E F8                  MOV    A,R0            ;SET TRANSMIT BUFFER POINTER
1242: 051F D5                  SEL    RB1             ;TO ADDRESS OF CURRENT BUFFER
1243: 0520 A9                  MOV    XPTR,A          ;AND SET STATE TO INITIAL
1244: 0521 BC05                MOV    STATE,#XSVAL    ;TRANSMIT STATE
1245: 0523 C5                  SEL    RB0
1246: 0524 B822                MOV    R0,#PKTXL       ;INCREMENT # PACKETS SENT
1247: 0526 10                  INC    @R0             ;COUNTER AND IF OVERFLOW TO 0
1248: 0527 F0                  MOV    A,@R0           ;THEN CLEAR NAK COUNTER
1249: 0528 9631                JNZ    RETRA5
1250: 052A 18                  INC    R0
1251: 052B 10                  INC    @R0
1252: 052C F0                  MOV    A,@R0
1253: 052D 9631                JNZ    RETRA5
1254: 052F 18                  INC    R0
1255: 0530 A0                  MOV    @R0,A
1256: 0531 83         RETRA5:  RET
1257:                 ;
1258:                 ;RETRANSMIT CURRENT BUFFER WITH ACK
1259:                 ;
1260:                 ;       (1 SUBROUTINE LEVEL USED)
1261:                 ;
1262:                 ;       A,R0,TEMP       DESTROYED
1263:                 ;
1264: 0532 74CF       RETRAK:  CALL   PCURBU          ;R0(---PTS TO CURRENT BUFFER
1265: 0534 F0                  MOV    A,@R0
1266:
1267:
1268: AVOCET SYSTEMS 8048 CROSS-ASSEMBLER - VERSION 1.63
1269:
1270: NONWIRE (TM) MASTER VER 2.07 (C) 1984 CONTROLONICS CORP
1271:
1272:
1273: 0535 537F                ANL    A,#NOT NAKBIT
1274: 0537 A41A                JMP    RETRA3
1275:                 ;
1276:                 ;
1277:                 ;       (2 SUBROUTINE LEVELS USED
```

```
1278:                    ;
1279: 0539 D407   CSNEXT: CALL    COMPR           ;COMPARE RECEIVED WITH SENT IF TEST MODE
1280:                    ;
1281:                    ;       SEND NEXT BUFFER TO SLAVE
1282:                    ;
1283:                    ;       (1 SUBROUTINE LEVEL USED)
1284:                    ;
1285:                    ;       A,R0,TEMP       DESTROYED
1286:                    ;
1287:                    ;       ALSO SETS OLD BUFFER FOR ACK,NOT RESTART,AND PUTS IN SEQ #
1288:                    ;
1289: 053B 95     SNEXT:  CPL     F0              ;TOGGLE BUFFER
1290: 053C B646           JF0     SNEXT1          ;NEW BUFFER IS #1
1291: 053E B86E           MOV     R0,#MT1BUF      ;NO, IS Z0. SET BUF #
1292: 0540 B010           MOV     @R0,#NUACK1     ;FOR ZERO CHARACTERS + ACK
1293: 0542 B85C           MOV     R0,#MT0BUF      ;SET PTR TO BUFFER # 0
1294: 0544 A41B           JMP     RETRA2
1295: 0546 B85C   SNEXT1: MOV     R0,#MT0BUF      ;SET OLD BUFFER = 0
1296: 0548 B000           MOV     @R0,#NUACK0     ;FOR ACK+ZERO CHARACTERS
1297: 054A B86E           MOV     R0,#MT1BUF      ;SET TO SEND BUFFER # 1
1298: 054C A41B           JMP     RETRA2
1299:
1300:
1301: AVOCET SYSTEMS 8048 CROSS-ASSEMBLER - VERSION 1.63
1302:
1303: NONWIRE (TM) MASTER VER 2.07 (C) 1984 CONTROLONICS CORP
1304:
1305:
1306:                    ;       GET ADDRESS SEQUENCE
1307:                    ;
1308:                    ;       REGISTERS DESTROYED (A,R0,R1;TEMP,LASTC,CCOUNT,FIRSTC)
1309:                    ;
1310:                    ;       (3 SUBROUTINE LEVELS USED)
1311:                    ;
1312:                    ;       READ ADDRESS SEQUENCE FROM HOST
1313:                    ;       1) CTRL A-ASCII DON'T WAIT FOR DATA
1314:                    ;       2) CTRL B-HEX ASCII DON'T WAIT FOR DATA
1315:                    ;       3) CTRL C-ASCII WAIT FOR DATA
1316:                    ;       4) CTRL D-HEX ASCII WAIT FOR DATA
1317:                    ;       5) CTRL E-AUTOPOLLING
1318:                    ;
1319:                    ;       THE THREE  FORMATS OF INPUT ARE
1320:                    ;       1) CTRL,A1,A2                   (CTRL A/B CASES)
1321:                    ;       2) CTRL,N,A1,A2,...DATA...      (CTRL C/D CASES)
1322:                    ;       3) CTRL E,A1,A2,A3,A4           (CTRL E CASE)
1323:                    ;
1324:                    ;       N=HEX ASCII COUNT ON DATA BYTES
1325:                    ;       A1,A2=HEX ASCII SLAVE ADDRESS
1326:                    ;       A3,A4=HEX ASCII SLAVE ADDRESS
1327:                    ;
1328:                    ;       ROUTINE WILL WAIT FOREVER ON READ OF VALID
1329:                    ;       SEQUENCE. ANY ERROR WILL CAUSE WHOLE SEQUENCE
1330:                    ;       TO START OVER
1331:                    ;
1332:                    ;       (RETURNS WITH SLAVE ADDRE3SS IN A, 1ST BYTE OF
1333:                    ;       (MODEM TRANSMIT BUFFER 0=ACK, ADDRESS, SEQUENCE 0
```

```
1334:                    ;       (AND NUMBER OF DATA BYTES FILLED IN. IF DATA
1335:                    ;       (BUFFER #0 WILL HAVE TRANSMIT DATA
1336:                    ;
1337:                    ;       ON EXIT THE FOLLOWING FLAGS WILL BE SET/CLEARED
1338:                    ;       1)ASCFL=1 IF ASCII IN ELSE 0=HEX ASCII IN
1339:                    ;       2)XSTOP=0
1340:                    ;       3)XNIB=0
1341:                    ;
1342: 054E FE     GETA50: MOV     A,AFLAG          ;KNOWN LENGTH CASE IS ILLEGAL
1343: 054F 1279          JB0     GETA60           ;IN TEST MODE
1344: 0551 94CE   GETADR: CALL    INA              ;READ CHARACTERS UNTIL A
1345: 0553 F257          JB7     GETA20           ;CONTROL CODE IS FOUND
1346: 0555 A451          JMP     GETADR
1347: 0557 AC     GETA20: MOV     CCOUNT,A         ;SAVE CONTROL CODE
1348: 0558 FE            MOV     A,AFLAG          ;CLEAR STOP,NIBBLE,AND ASCII FLAGS
1349: 0559 53D3          ANL     A,#NOT ASCFL+XSTOP+XNIB
1350: 055B AE            MOV     AFLAG,A
1351: 055C FC            MOV     A,CCOUNT         ;CONTROL CODE BACK TO A
1352: 055D B85C          MOV     R0,#MT0BUF       ;SET ACK,SEQ 0 ADDRESS SEQ
1353: 055F B020          MOV     @R0,#RESTRT      ;AND 0 DATA BYTES
1354: 0561 B821          MOV     R0,#FLAG2        ;AUTOPOLLING?
1355: 0563 72C9          JB3     GET110           ;YES
1356: 0565 F0            MOV     A,@R0            ;NO,CLEAR AUTOPOLL FLAG
1357:
1358:
1359: AVOCET SYSTEMS 8048 CROSS-ASSEMBLER - VERSION 1.63
1360:
1361: NONWIRE (TM) MASTER VER 2.07 (C) 1984 CONTROLONICS CORP
1362:
1363:
1364: 0566 537F          ANL     A,#NOT AUTOPL
1365: 0568 A0            MOV     @R0,A
1366: 0569 85            CLR     F0               ;AND INPUT TYPE
1367: 056A FC            MOV     A,CCOUNT         ;GET CONTROL CODE BACK
1368: 056B 5251          JB2     GETADR           ;STOP CHAR, TRY AGAIN
1369: 056D 1274          JB0     GETA40           ;ASCII INPUT?
1370: 056F FE            MOV     A,AFLAG          ;YES,SET FLAGS
1371: 0570 4320          ORL     A,#ASCFL         ;FOR STRAIGHT ASCII
1372: 0572 AE            MOV     AFLAG,A
1373: 0573 95            CPL     F0
1374: 0574 FC     GETA40: MOV     A,CCOUNT         ;KNOWN LENGTH CASE?
1375: 0575 324E          JB1     GETA50           ;YES
1376: 0577 A485          JMP     GETA30           ;NO
1377: 0579 94CE   GETA60: CALL    INA              ;GET LENGTH BYTE
1378: 057B F257          JB7     GETA20           ;CTRL CODE, TRY AGAIN
1379: 057D F4CC          CALL    HATOHY           ;CONVERT HEX ASCII TO BIN
1380: 057F 9651          JNZ     GETADR           ;NOT HEX ASCII, TRY AGAIN
1381: 0581 FA            MOV     A,TEMP           ;A ZERO COUNT IS INVALID
1382: 0582 C651          JZ      GETADR           ;TRY AGAIN
1383: 0584 AF            MOV     FIRSTC,A         ;SAVE BYTE COUNT FOR LATER
1384: 0585 B4EF   GETA30: CALL    READRR           ;GET ADDRESS
1385: 0587 F257          JB7     GETA20           ;CTRL CODE RECOGNIZED
1386: 0589 9651          JNZ     GETADR           ;NON HEX ASCII CHAR RECOGNIZED
1387: 058B FB            MOV     A,LASTC          ;ADDRESS TO A
1388: 058C 2C            XCH     A,CCOUNT         ;GET CONTROL BYTE,SAVE ADDRESS
1389: 058D 3291          JB1     GETA70           ;KNOWN LENGTH CASE
```

```
1390:  058F FC    GET100: MOV    A,CCOUNT        ;NO ADDRESS TO A
1391:  0590 83            RET                    ;AND DONE
1392:  0591 FC    GETA70: MOV    A,CCOUNT        ;KNOWN LENGTH AND BROADCAST
1393:  0592 C651          JZ     GETADR          ;IS AN ERROR, TRY AGAIN
1394:  0594 B85C          MOV    R0,#MT0BUF      ;STORE BYTE COUNT IN 1ST
1395:  0596 FF            MOV    A,FIRSTC        ;MODEM TRANSMIT BUFFER COUNT
1396:  0597 B69E          JF0    GETA80          ;IS INPUT BYTE COUNT IF ASCII
1397:  0599 97            CLR    C               ;IF HEX ASCII THEN COUNT IS
1398:  059A 67            RRC    A               ;INPUT COUNT DIVIDED BY 2
1399:  059B E69E          JNC    GETA80          ;PLUS REMAINDER
1400:  059D 17            INC    A
1401:  059E 60    GETA80: ADD    A,@R0
1402:  059F A0            MOV    @R0,A
1403:  05A0 BB5E          MOV    LASTC,#MT0BUF+2
1404:  05A2 94CE  GETA90: CALL   INA             ;GET NEXT DATA BYTE
1405:  05A4 F257          JB7    GETA20          ;CONTROL CODE, TRY AGAIN
1406:  05A6 AA            MOV    TEMP,A          ;SAVE CHARACTER
1407:  05A7 FB            MOV    A,LASTC         ;SET PTR TO STORE CHAR
1408:  05A8 A8            MOV    R0,A            ;IN THE BUFFER
1409:  05A9 FA            MOV    A,TEMP          ;TESTORE CHAR TO A
1410:  05AA B6C3          JF0    GETA95          ;ASCII
1411:  05AC F4CC          CALL   HATOHY          ;NO, HEX ASCII CONVERT
1412:  05AE 9651          JNZ    GETADR          ;IN BINARY SWAP TO UPPER
1413:  05B0 FA            MOV    A,TEMP
1414:  05B1 47            SWAP   A               ;NIBBLE AND STORE
1415:
1416:
1417: AVOCET SYSTEMS 8048 CROSS-ASSEMBLER - VERSION 1.63
1418:
1419: NONWIRE (TM) MASTER VER 2.07 (C) 1984 CONTROLONICS CORP
1420:
1421:
1422:  05B2 A0            MOV    @R0,A           ;IN THE BUFFER
1423:  05B3 CF            DEC    FIRSTC          ;DECREMENT COUNT
1424:  05B4 FF            MOV    A,FIRSTC        ;COUNT=0
1425:  05B5 C68F          JZ     GET100          ;YES, ALL DONE
1426:  05B7 94CE          CALL   INA             ;NO, GET 2ND NIBBLE DATA
1427:  05B9 F257          JB7    GETA20          ;CONTROL CODE TRY AGAIN
1428:  05BB F4CC          CALL   HATOHY          ;CONVERT HEX ASCII TO BINARY
1429:  05BD 9651          JNZ    GETADR          ;NOT HEX ASCII, TRY AGAIN
1430:  05BF FB            MOV    A,LASTC         ;SET PTR TO BUFFER AND
1431:  05C0 A8            MOV    R0,A            ;BUILD NEXT CHARACTER
1432:  05C1 FA            MOV    A,TEMP          ;TO STORE
1433:  05C2 60            ADD    A,@R0
1434:  05C3 A0    GETA95: MOV    @R0,A           ;STORE CHARACTER IN BUFFER
1435:  05C4 1B            INC    LASTC           ;ADVANCE STORE POINTER
1436:  05C5 EFA2          DJNZ   FIRSTC,GETA90   ;LOOP ON COUNT
1437:  05C7 FC            MOV    A,CCOUNT        ;DONE, RETURN ADDRESS
1438:  05C8 83            RET                    ;IN A AND EXIT
1439:  05C9 FE    GET110: MOV    A,AFLAG         ;AUTOPOLL REQUEST, IF TEST
1440:  05CA 12CE          JB0    GET120          ;MODE THEN AN ERROR
1441:  05CC A451          JMP    GETADR
1442:  05CE F0    GET120: MOV    A,@R0           ;SET AUTOPOLLING FLAG
1443:  05CF 4380          ORL    A,#AUTOPL
1444:  05D1 A0            MOV    @R0,A
1445:  05D2 B4EF          CALL   READRR          ;GET START ADDRESS
```

```
1446: 05D4 F257          JB7     GETA20      ;CTRL CODE RECOGNIZED
1447: 05D6 9651          JNZ     GETADR      ;NON HEX ASCII CHARACTER RECOGNIZED
1448: 05D8 FB            MOV     A,LASTC     ;SAVE THE STARTING ADDRESS
1449: 05D9 C651          JZ      GETADR      ;A ZERO START ADDRESS IS ERROR
1450: 05DB AC            MOV     CCOUNT,A
1451: 05DC B4EF          CALL    READRR      ;GET ENDING ADDRESS
1452: 05DE F257          JB7     GETA20      ;CTRL CODE RECOGNIZED
1453: 05E0 9651          JNZ     GETADR      ;NON HEX ASCII CHARACTER RECOGNIZED
1454: 05E2 B81F          MOV     R0,#BADR    ;STORE START AND END ADDRESSES
1455: 05E4 FC            MOV     A,CCOUNT
1456: 05E5 A0            MOV     @R0,A
1457: 05E6 18            INC     R0
1458: 05E7 FB            MOV     A,LASTC
1459: 05E8 A0            MOV     @R0,A
1460: 05E9 37            CPL     A           ;THE END ADDRESS MUST BE
1461: 05EA 6C            ADD     A,CCOUNT    ;GREATER THAN OR EQUAL TO
1462: 05EB F651          JC      GETADR      ;TO START ADDRESS OR ERROR
1463: 05ED FC            MOV     A,CCOUNT    ;START ADDRESS TO A
1464: 05EE 83   RADRRY:  RET
1465:
1466:
1467: AVOCET SYSTEMS 8048 CROSS-ASSEMBLER - VERSION 1.63
1468:
1469: NONWIRE (TM) MASTER VER 2.07 (C) 1984 CONTROLONICS CORP
1470:
1471:
1472:                    ;
1473:                    ;       READ ADDRESS TO LASTC
1474:                    ;
1475:                    ;       (A,R0,R1,TEMP DESTROYED)
1476:                    ;       A=0 ON EXIT THEN VALID ADDRESS IN LASTC
1477:                    ;       A NOT 0 IS AN ERROR
1478:                    ;       IF BIT 7=1 THEN CONTROL CODE READ ELSE NON VALID
1479:                    ;                  HEX ASCII CHARACTER REGONIZED
1480:                    ;
1481:                    ;       (2 SUBROUTINE LEVELS USED)
1482:                    ;
1483: 05EF 94CE READRR:  CALL    INA         ;GET 1ST NIBBLE OF ADDRESS
1484: 05F1 F2EE          JB7     RADRRY      ;CONTROL CODE,GO EXIT
1485: 05F3 F4CC          CALL    HATOHY      ;CONVERT TO BINARY
1486: 05F5 96EE          JNZ     RADRRY      ;NON HEX ASCII RECOGNIZED
1487: 05F7 FA            MOV     A,TEMP      ;SAVE 1ST NIBBLE
1488: 05F8 47            SWAP    A           ;OF ADDRESS
1489: 05F9 AB            MOV     LASTC,A
1490: 05FA 94CE          CALL    INA         ;GET 2ND NIBBLE OF ADDRESS
1491: 05FC F2EE          JB7     RADRRY      ;CONTROL CODE RECOGNIZED
1492: 05FE F4CC          CALL    HATOHY      ;CONVERT TO BINARY
1493: 0600 9606          JNZ     RADRRX      ;INVALID HEX ASCII CHARACTER
1494: 0602 FA            MOV     A,TEMP      ;BUILD COMPLETE ADDRESS TO
1495: 0603 6B            ADD     A,LASTC     ;LASTC
1496: 0604 AB            MOV     LASTC,A
1497: 0605 27            CLR     A           ;SET VALID EXIT
1498: 0606 83   RADRRX:  RET
1499:
1500:
1501: AVOCET SYSTEMS 8048 CROSS-ASSEMBLER - VERSION 1.63
```

```
1502:
1503: NONWIRE (TM) MASTER VER 2.07 (C) 1984 CONTROLONICS CORP
1504:
1505:
1506:
1507:            ;       THIS ROUTINE IS USED TO PROCESS A SUCCESSFULLY RECEIVED
1508:            ;       NEW MESSAGE FROM THE SLAVE END OF PLEXUS MODEM WHEN IN TEST MODE.
1509:            ;       THIS ROUTINE WILL:
1510:            ;            1) INCREMENT NUMBER OF MESSAGES SENT
1511:            ;            2) COMPARE THE CURRENT BUFFER WITH THE RECEIVE BUFFER
1512:            ;               IF BITS DIFFERENT, ADD # TO RUNNING COUNT
1513:            ;            4) GENERATE NEXT PATTERN IN ALTERNATEUFFER
1514:            ;
1515:            ;       INPUTS
1516:            ;            1) RECEIVED MESSAGE IN MRBUF
1517:            ;            2) TRANSMITTED MESSAGE IN CURRENT TRANSMIT BUFFER
1518:            ;
1519:            ;       (1 SUBROUTINE LEVEL USED)
1520:            ;
1521: 0607 FE        COMPR:  MOV   A,AFLAG          ;MASTER IN TEST MODE?
1522: 0608 1279              JB0   P6EXIT           ;NO,EXIT
1523: 060A BA0A              MOV   TEMP,#CNUMMG     ;INCREMENT #MGS
1524: 060C B826              MOV   R0,#NUMMSG       ;SENT COUNTER
1525: 060E D47A              CALL  INCCN            ;INCREMENT # MSGS COUNTER
1526: 0610 74CF              CALL  PCURBU           ;R0(---PTS TO CURRENT BUFFER
1527: 0612 18                INC   R0               ;PTR TO DATA
1528: 0613 18                INC   R0
1529: 0614 BC08              MOV   CCOUNT,#NBYMS    ;SET COUNTER ON # BYTES COMPARE
1530: 0616 B94D              MOV   R1,#MRBUF        ;SET POINTER TO RECEIVED DATA
1531: 0618 F1        COMPR6: MOV   A,@R1            ;COMPARE NEXT 2
1532: 0619 D0                XRL   A,@R0            ;CHARACTERS
1533: 061A 9633              JNZ   COMPR5           ;ERROR
1534: 061C F1        COMP12: MOV   A,@R1            ;LAST CHAR TO A
1535: 061D AF                MOV   FIRSTC,A         ;SAVE IN FIRSTC
1536: 061E 18                INC   R0               ;NO, ADVANCE POINTER
1537: 061F 19                INC   R1
1538: 0620 EC18              DJNZ  CCOUNT,COMPR6    ;FINISHED ALL CHARACTERS IN MSG
1539:            ;
1540:            ;       MERGE POINT TO FILL ALTERNATE BUFFER WITH PATTERN IN FIRSTC
1541:            ;
1542: 0622 74C8     IFILL:  CALL  PALTBU           ;R1(---PTS TO ALTERNATE BUFFER
1543: 0624 BA08     COMP13: MOV   TEMP,#NBYMS     ;SET # BYTES IN BUFFER
1544: 0626 F1               MOV   A,@R1           ;PUT # BYTES IN MESSAGE
1545: 0627 53F0              ANL   A,#0F0H          ;INTO CONTROL FIELD OF
1546: 0629 DA                XRL   A,TEMP           ;FIRST BYTE
1547: 062A A1                MOV   @R1,A
1548: 062B FF                MOV   A,FIRSTC
1549: 062C 19                INC   R1               ;ADVANCE PAST ADDRESS
1550: 062D 19        COMP14: INC   R1
1551: 062E 17                INC   A                ;SET STARTING VALUE NEXT MSG
1552: 062F A1                MOV   @R1,A            ;START NEXT DATA BYTE
1553: 0630 EA2D              DJNZ  TEMP,COMP14      ;FINISHED MESSAGE?
1554: 0632 83                RET                    ;YES, EXIT
1555:            ;COMPUTE NUMBER OF BITS IN ERROR TO TEMP
1556: 0633 BD00     COMPR5: MOV   LRC,#0           ;COUNT BITS DIFFERNT
1557:
```

1558:
1559: AVOCET SYSTEMS 8048 CROSS-ASSEMBLER - VERSION 1.63
1560:
1561: NONWIRE (TM) MASTER VER 2.07 (C) 1984 CONTROLONICS CORP
1562:
1563:
1564: 0635 97        COMPR9:  CLR   C
1565: 0636 67        COMPR8:  RRC   A
1566: 0637 E63A              JNC   COMP15
1567: 0639 1D                INC   LRC
1568: 063A 9635     COMP15:   JNZ   COMPR9
1569: 063C F8       COMPR7:   MOV   A,R0              ;SAVE R0
1570: 063D AF                 MOV   FIRSTC,A
1571: 063E BA04     COMP19:   MOV   TEMP,#NNERR       ;INCREMENT ERROR
1572: 0640 B830               MOV   R0,#NUMERR        ;COUNTER ONCE
1573: 0642 D47A               CALL  INCCN             ;INCREMENT # ERRORS COUNTER
1574: 0644 ED3E     COMP11:   DJNZ  LRC,COMP19        ;INCREMT FOR # BITS IN ERROR
1575: 0646 FF                 MOV   A,FIRSTC          ;RESTORE R0
1576: 0647 A8                 MOV   R0,A
1577: 0648 C41C               JMP   COMP12
1578:
1579:
1580: AVOCET SYSTEMS 8048 CROSS-ASSEMBLER - VERSION 1.63
1581:
1582: NONWIRE (TM) MASTER VER 2.07 (C) 1984 CONTROLONICS CORP
1583:
1584:
1585:              ;
1586:              ;       TRANSFER MODEM RECEIVE DATA TO HOST OUTPUT BUFFER
1587:              ;
1588:              ;       FIRSTC<----FIRST CHAR RECEIVED ON ENTRY
1589:              ;
1590:              ;       A,R0,R1,TEMP,LASTC DESTROYED
1591:              ;
1592:              ;       (2 SUBROUTINE LEVELS USED)
1593:              ;
1594: 064A FF       TMRHT:    MOV   A,FIRSTC          ;GET # CHARS BYTE
1595: 064B 530F               ANL   A,#0FH            ;MASK TO GET NUMBER OF CHARS
1596: 064D C666               JZ    TMR40             ;IF ZERO EXIT
1597: 064F AB                 MOV   LASTC,A           ;SAVE COUNT
1598: 0650 FE                 MOV   A,AFLAG           ;DONT SEND TO HOST IF TEST MODE
1599: 0651 1254               JB0   TMR05
1600: 0653 83                 RET
1601: 0654 BC4D     TMR05:    MOV   CCOUNT,#MRBUF     ;POINT TO MODEM RECEIVE BUFFER
1602: 0656 FC       TMR10:    MOV   A,CCOUNT          ;SET PTR TO CHARACTER
1603: 0657 A8                 MOV   R0,A              ;AND SAVE
1604: 0658 FE                 MOV   A,AFLAG           ;FULL ASCII?
1605: 0659 B267               JB5   TMR20             ;YES
1606: 065B F0                 MOV   A,@R0             ;NO,IS HEX ASCII
1607: 065C AD                 MOV   LRC,A             ;FETCH AND SAVE CHARACTER
1608: 065D 47                 SWAP  A                 ;CONVERT MS NIBBLE TO ASCII
1609: 065E D4DB               CALL  CHXTAS            ;AND OUTPUT
1610: 0660 FD                 MOV   A,LRC             ;CONVERT LS NIBBLE TO ASCII
1611: 0661 D4DB               CALL  CHXTAS            ;AND OUTPUT
1612: 0663 1C       TMR30:    INC   CCOUNT            ;ADVANCE POINTER AND
1613: 0664 EB56               DJNZ  LASTC,TMR10       ;LOOP ON ALL CHARACTERS

```
1614: 0666 83      TMR40:  RET
1615: 0667 F0      TMR20:  MOV     A,@R0           ;OUTPUT ASCII CHARACTER
1616: 0668 D4E5            CALL    OUTA
1617: 066A C463            JMP     TMR30
1618:
1619:
1620: AVOCET SYSTEMS 8048 CROSS-ASSEMBLER - VERSION 1.63
1621:
1622: NONWIRE (TM) MASTER VER 2.07 (C) 1984 CONTROLONICS CORP
1623:
1624:
1625:                ; OUTPUT A COUNTER TO HOST IN ASCII
1626:                ;
1627:                ;      INPUT:
1628:                ;              1)R0=PTR TO MS BYTE OF COUNTER
1629:                ;              2)LASTC= # BYTES IN COUNTER
1630:                ;
1631:                ;      PROCESSING:
1632:                ;              1)COUNTER ASSUMED IN BCD
1633:                ;              2)COUNTER CONVERTED TO ASCII AND OUTPUT
1634:                ;              3)COUNTER WILL BE CLEARED
1635:                ;
1636:                ;      (2 SUBROUTINE LEVELS USED)
1637:                ;
1638:                ;      A,R0,R1,TEMP,LASTC,LRC DESTROYED
1639:                ;
1640: 066C F8      OCNTH:  MOV     A,R0            ;SAVE R0
1641: 066D AD              MOV     LRC,A
1642: 066E 27              CLR     A               ;GET NEXT BYTE AND CLEAR
1643: 066F 20              XCH     A,@R0           ;IN MEMORY
1644: 0670 0330            ADD     A,#AZERO        ;CONVERT TO ASCII
1645: 0672 D4E5            CALL    OUTA            ;SEND TO HOST
1646: 0674 FD              MOV     A,LRC           ;RESTORE R0
1647: 0675 A8              MOV     R0,A
1648: 0676 C8              DEC     R0              ;SET PTR NT BYTE
1649: 0677 EB6C            DJNZ    LASTC,OCNTH     ;MORE TO GO
1650: 0679 83      P6EXIT: RET                     ;NO,EXIT
1651:                ;
1652:                ; INCREMENT COUNTER
1653:                ;
1654:                ;      INPUT:
1655:                ;              1)R0=PTR TO LS BYTE OF COUNTER
1656:                ;              2)TEMP=# DIGITS IN COUNTER
1657:                ;
1658:                ;      PROCESSING:
1659:                ;              1)COUNTER ASSUMED IN BCD
1660:                ;              2)COUNTER IS INCREMENTED
1661:                ;
1662: 067A 10      INCCN:  INC     @R0             ;INC DIGIT
1663: 067B F0              MOV     A,@R0           ;GET DIGIT
1664: 067C 03F6            ADD     A,#-10          ;OVERFLOW?
1665: 067E 9684            JNZ     INCCN1          ;NO
1666: 0680 A0              MOV     @R0,A           ;YES,ZERO CURRENT DIG
1667: 0681 18              INC     R0              ;SET FOR NEXT DIGIT
1668: 0682 EA7A            DJNZ    TEMP,INCCN      ;IS ANOTHER DIGIT?
1669: 0684 83      INCCN1: RET                     ;NO,RETURN
```

```
1670:
1671:
1672: AVOCET SYSTEMS 8048 CROSS-ASSEMBLER - VERSION 1.63
1673:
1674: NONWIRE (TM) MASTER VER 2.07 (C) 1984 CONTROLONICS CORP
1675:
1676:
1677:              ;
1678:              ;       IF DISPLAY FLAG IS SET THEN CLEAR DISPLAY FLAG AND OUTPUT
1679:              ;       STATISTICS TO HOST.OUTPUT OF STATISTICS ALSO CLEARS
1680:              ;       THE STATISTICS.IN ANY EVENT THE STOP FLAG WILL BE SET
1681:              ;
1682:              ;       REGISTERS DESTROYED A,R0,R1,TEMP,LASTC
1683:              ;
1684:              ;       (3 SUBROUTINE LEVELS ARE USED)
1685:              ;
1686: 0685 FE     DSTATS: MOV     A,AFLAG
1687: 0686 4304           ORL     A,#XSTOP                ;SET STOP FLAG
1688: 0688 AE             MOV     AFLAG,A                 ;DISPLAY STATS REQUESTED
1689: 0689 D28C           JB6     DSTA10                  ;YES,GO OUTPUT STATISTICS
1690: 068B 83             RET                             ;NO,EXIT
1691: 068C 53BF   DSTA10: ANL     A,#NOT DSTATF           ;CLEAR STATS FLAG
1692: 068E AE             MOV     AFLAG,A                 ;ONLY ONCE PER CTRL R
1693: 068F BB04           MOV     LASTC,#LOW MSG5         ;YES, OUTPUT # OF
1694: 0691 D4AF           CALL    OUTMES                  ;BLOCKS TRANSMITTED
1695: 0693 B82F           MOV     R0,#NUMERR-1            ;SET PTR TO MSB BYTE
1696: 0695 BB0A           MOV     LASTC,#CNUMNG           ;SET COUNT
1697: 0697 D46C           CALL    OCNTH                   ;OUTPUT COUNT AND CLEAR
1698: 0699 BB10           MOV     LASTC,#LOW MSG6         ;YES, OUTPUT NO OF BIT ERRORS
1699: 069B D4AF           CALL    OUTMES                  ;AND RESET COUNTER
1700: 069D B833           MOV     R0,#NUMERR+NNERR-1      ;SET PTR TO MSBYTE
1701: 069F BB04           MOV     LASTC,#NNERR            ;SET COUNT ON #BYTES
1702: 06A1 D46C           CALL    OCNTH                   ;OUTPUT COUNT AND CLEAR
1703: 06A3 BB21           MOV     LASTC,#LOW MSG7         ;OUTPUT # TIMEOUTS
1704: 06A5 D4AF           CALL    OUTMES
1705: 06A7 B838           MOV     R0,#NUTTTS+NT-1
1706: 06A9 BB05           MOV     LASTC,#NT
1707: 06AB D46C           CALL    OCNTH
1708:              ;*****FALLS INTO CRLF WHICH FALLS INTO OUTMES****
1709:              ;
1710:              ;       OUTPUT NULL TERMINATED MESSAGE IN PAGE 3 TO HOST
1711:              ;
1712:              ;       REGISTERS A,R0,R1,TEMP,LASTC DESTROYED
1713:              ;
1714:              ;       (2 SUBROUTINE LEVELS USED)
1715:              ;
1716:              ;       LASTC(----PTR TO MESSAGE ON ENTRY
1717:              ;
1718: 06AD BB49   CRLF:   MOV     LASTC,#LOW MSG2         ;OUTPUT CR AND LF ONT END
1719: 06AF FB     OUTMES: MOV     A,LASTC                 ;GET NEXT CHARACTER
1720: 06B0 E3             MOVP3   A,@A                    ;OF MESSAGE
1721: 06B1 C684           JZ      INCCN1                  ;IS EOM
1722: 06B3 D4E5           CALL    OUTA                    ;OUTPUT NEXT CHARACTER
1723: 06B5 1B             INC     LASTC                   ;ADVANCE MESSAGE PTR
1724: 06B6 C4AF           JMP     OUTMES                  ;GO OUTPUT NEXT ARACTER
1725:
```

```
1726:
1727: AVOCET SYSTEMS 8048 CROSS-ASSEMBLER -  VERSION 1.63
1728:
1729: NONWIRE (TM) MASTER VER 2.07 (C) 1984 CONTROLONICS CORP
1730:
1731:
1732:                     ;
1733:                     ;        OUTPUT INPUT MESSAGE FOLLOWED BY INPUT A IN BINARY
1734:                     ;
1735:                     ;        (A,R0,R1,TEMP,LASTC,CCOUNT,LRC) DESTROYED
1736:                     ;
1737:                     ;        (3 SUBROUTINE LEVELS USED
1738:                     ;
1739: 06B8 AD      OBINM:   MOV    LRC,A            ;SAVE INPUT
1740: 06B9 D4AF             CALL   OUTMES           ;OUTPUT MESSAGE
1741: 06BB BC08             MOV    CCOUNT,#8        ;LOOP ON 8 BITS
1742: 06BD FD      OB20:    MOV    A,LRC            ;GET NEXT BIT
1743: 06BE F7               RLC    A
1744: 06BF AD               MOV    LRC,A
1745: 06C0 27               CLR    A
1746: 06C1 E6C4             JNC    OB10
1747: 06C3 17               INC    A
1748: 06C4 D4DB    OB10:    CALL   CHXTAS
1749: 06C6 CC               DEC    CCOUNT
1750: 06C7 FC               MOV    A,CCOUNT
1751: 06C8 96BD             JNZ    OB20
1752: 06CA 83               RET
1753:
1754:
1755: AVOCET SYSTEMS 8048 CROSS-ASSEMBLER -  VERSION 1.63
1756:
1757: NONWIRE (TM) MASTER VER 2.07 (C) 1984 CONTROLONICS CORP
1758:
1759:
1760:                     ;
1761:                     ;        UTILITY ROUTINE
1762:                     ;
1763:                     ;        1)SAVE IN LRC
1764:                     ;        2)OUTPUT ADDRESS
1765:                     ;
1766:                     ;        (USES 2 SUBROUTINE LEVELS)
1767:                     ;
1768: 06CB AD      UTILS:   MOV    LRC,A
1769: 06CC B85D             MOV    R0,#MT0BUF+1
1770: 06CE A0               MOV    @R0,A
1771: 06CF 2320             MOV    A,#SP
1772:                     ;*FALLS INTO ACKADR*
1773:                     ;
1774:                     ;        OUTPUT (A) FOLLOWED BY 2 DIGIT ADDRESS
1775:                     ;
1776:                     ;        A,R0,R1,TEMP,LASTC DESTROYED
1777:                     ;
1778:                     ;        (1 SUBROUTINE LEVEL USED)
1779:                     ;
1780: 06D1 D4E5    ACKADR:  CALL   OUTA
1781: 06D3 B85D             MOV    R0,#MT0BUF+1
```

```
1782: 06D5 F0              MOV     A,@R0
1783: 06D6 AB              MOV     LASTC,A
1784: 06D7 47              SWAP    A
1785: 06D8 D4DB            CALL    CHXTAS
1786: 06DA FB              MOV     A,LASTC
1787:                ;****FALLS INTO CHXTAS****
1788:                ;
1789:                ;      CONVERT A TO ASCII AND PUT IN HOST OUTPUT BUFFER
1790:                ;
1791: 06DB 530F   CHXTAS:  ANL     A,#0FH          ;MASK TO 4 BITS
1792: 06DD 03F6            ADD     A,#-10          ;GREATER THAN 9?
1793: 06DF F6E3            JC      CHXT10          ;YES
1794: 06E1 03F9            ADD     A,#AZERO+10-ALA ;NO
1795: 06E3 0341   CHXT10:  ADD     A,#ALA          ;CONVERT TO A-F
1796:                ;***FALLS INTO OUTA
1797:                ;
1798:                ;      PUT A REGISTER IN HOST TRANSMIT BUFFER
1799:                ;
1800:                ;      A,R0,R1,TEMP    DESTROYED
1801:                ;
1802:                ;      THIS ROUTINE WILL PUT THE INPUT VALUE OF THE A REGISTER
1803:                ;      INTO THE HOST TRANSMIT BUFFER.IF BUFFER IS FULL THE ROUTINE
1804:                ;      WAITS FOR ROOM.WHILE WAITING HOST INPUT BUFFER IS UPDATED
1805:                ;
1806:                ;      (1 SUBROUTINE LEVEL USED)
1807:                ;
1808: 06E5 AA     OUTA:    MOV     TEMP,A          ;SAVE CHARACTER
1809: 06E6 5402   OUTA20:  CALL    READH           ;UPDATE HOST INPUT
1810: 06E8 54A6            CALL    SENDHT          ;UPDATE HOST OUTPUT
1811:
1812:
1813: AVOCET SYSTEMS 8048 CROSS-ASSEMBLER - VERSION 1.63
1814:
1815: NONWIRE (TM) MASTER VER 2.07 (C) 1984 CONTROLONICS CORP
1816:
1817:
1818: 06EA 94DD            CALL    CHKEMP          ;CHECK EMPTY AND XON/XOF
1819: 06EC B816            MOV     R0,#HXCNT       ;GET NUMBER OF CHARACTERS
1820: 06EE F0              MOV     A,@R0           ;ALREADY QUEUED FOR OUTPUT
1821: 06EF 03EC            ADD     A,#-HXBSZ       ;HOST BUFFER FULL?
1822: 06F1 C6E6            JZ      OUTA20          ;YES,WAIT
1823: 06F3 10              INC     @R0             ;NO,ADVANCE COUNT
1824: 06F4 18              INC     R0              ;POINT TO PUT PTR
1825: 06F5 F0              MOV     A,@R0           ;GET PUT PTR AND SAVE IN R1
1826: 06F6 A9              MOV     R1,A
1827: 06F7 FA              MOV     A,TEMP          ;STORE CHARACTER IN HOST OUTPUT
1828: 06F8 A1              MOV     @R1,A           ;BUFFER AND GO ADVANCE POINTER
1829: 06F9 44CB            JMP     SENDH3          ;AT COMMON INC AND EXIT
1830:
1831:
1832: AVOCET SYSTEMS 8048 CROSS-ASSEMBLER - VERSION 1.63
1833:
1834: NONWIRE (TM) MASTER VER 2.07 (C) 1984 CONTROLONICS CORP
1835:
1836:
1837: 0700                 ORG     700H
```

```
1838:         ;
1839:         ;       PAGE 7 ---) CLOCK INTERRUPT SERVICER
1840:         ;************************************************************
1841:         ;*****CAUTION *** DO NOT CHANGE THIS CODE IF YOU ARE NOT 100% UP TO SED
1842:         ;******ON WHAT IT DOES ***************************************
1843:         ;
1844:         ;
1845:         ;TIMING  ASSUMING 6 MHZ CLOCK, 2.5 USEINS CYCLE
1846:         ;
1847:         ;       TRANSMITTER
1848:         ;       THE TRANSMIT SIDE OF MODEM COMMUNICATIONS OUTPUTS THE SERIAL
1849:         ;       CHARACTER INFORMATION ONE BIT AT TIME. EACH BIT IS EXACTLY
1850:         ;       347.5 USEC IN LENGTH GIVING A BAUD RATE OF 2877.7 BITS/SEC.
1851:         ;       EACH CHARACTER IS 8 DATA BITS, 1 PARY BIT, 1 START BIT,
1852:         ;       AND 1 STOP BIT.  THE EFFECTIVE CHARACTER THROUGHPUT IS 261.6 CHARACTERS
1853:         ;       PER SEC, IN A FULLY LOADED SYSM EACH 15 DATA CHARCTERS INCLUDES 8
1854:         ;       BITS OF LRC AND AN 8 BIT HEADER.  THEREFORE THE EFFECTIVE USER DATA
1855:         ;       RATE IS (261.6)*157=230.8 CHARACTERS PER SEC OR 115.41 CHARACTERS
1856:         ;       PER SEC ENTERING EACH SIDE (11 BIT CHARACTERS) CONCURRENTLY.
1857:         ;       THE MAXIMUM NTINUOUS FULL DUPLEX RATE AT WHICH THE PLEXUS CAN
1858:         ;       HANDLE IS THEREFORE 1154.1 BAUD ON BOTH SIDES.  A SECOND ORDER
1859:         ;       EFFECT S BEEN IGNORED IN THAT THE STOP BIT IS SLIGHTLY LONGER THAN
1860:         ;       ONE BIT BECUASE OF LATENCY IN THE SOFTWARE.
1861:         ;       ERROR RETRIES HAVALSO BEEN IGNORED.
1862:         ;
1863:         ;
1864:         ;       THE TIMING IS DERIVED AS FOLLOWS
1865:         ;       CLOCK INTERRUT PERIOD --320 USEC
1866:         ;       VECTOR OVERHEAD -- 17.5 USEC;   CLOCK SETUP -- 10 USEC
1867:         ;
1868:         ;       THIS IMPLES THAT WHILE TRANSMITTING THE CLOCK IS INTERRUPTING ONCE
1869:         ;       EVERY 347.5 USEC. THE BIT TNSITIONS ARE ACTUALLY OCCURRING 32.5
1870:         ;       USEC AFTER EACH INTERRUPT.
1871:         ;
1872:         ;
1873:         ;RECEIVER
1874:         ;
1875:         ;       THE SAMPLING PERIOD FOR A START BIT IONCE EVERY 107.5 USEC. ONCE
1876:         ;       A START BIT IS SEEN IT IS VERIFIED 112.5 USEC LATER AND SAMPLING OF
1877:         ;       DATA COMMENCES ONCE EVERY 7.5 USEC.
1878:         ;
1879:         ;       START BIT SEEN (0,107.5 USEC)
1880:         ;       START BIT VERIFIED (112.5, 220 USEC)
1881:         ;       FIRST DATA READ AT (112.5+347.5,220+347)
1882:         ;       THE CONSEQUENCE OF THIS IS THAT DATA IS ALWAYS READ BETWEEN
1883:         ;       (.32, .63) OF PULSE IE ROUGHLY MIDDLE 1/3 OF THE BIT
1884:         ;
1885:         ;
1886:         ;
1887:         ;       THE USER MUST FIRST INITIALIZE THE MODEM CLOCK DRIVER.  THIS INITIAL-
1888:
1889:
1890: AVOCET SYSTEMS 8048 CROSS-ASSEMBLER - VERSION 1.63
1891:
1892: NONWIRE (TM) MASTER VER 2.07 (C) 1984 CONTROLONICS CORP
1893:
```

```
1894:
1895:           ;       IZATION CONSISTS OF:
1896:           ;               CLEARING L BANK 1 REGISTERS
1897:           ;               RESETTING FLAG 1
1898:           ;               SET TRANSMIT OUTPUT=MARK
1899:           ;       THE MODEM THEN CAN BE STARTED IN ONE OF 2 MODES
1900:           ;               RECEE
1901:           ;                       SET STATE = 0 (R4 OF BANK 1)
1902:           ;                       ENABLE CLOCK AT INITIAL VALUE TOBIT
1903:           ;               TRANSMIT
1904:           ;                       SET STATE = 5 (R4 OF BANK 1)
1905:           ;               LACE PTR TO OUTPUT MESSAGE XPTR (R1 BANK 1)
1906:           ;                       ENABLE CLOCK AT INITIAL VALUE TOBIT
1907:           ;       ONCE STARTED THE MODEM INTERFACE WILL COINUOUSLY RUN AS LONG AS THE
1908:           ;       8049 TIMER IS ENABLED.
1909:           ;       ONCE RUNNING THE USER MUST
1910:           ;               ============
1911:           ;               RECEIVE DATA
1912:           ;               ==========
1913:           ;               SET STATE = 0 (R4 BANK 1)
1914:           ;               F1 WILL BE SET IF NO CHARACTER RECEIVED IN 5.6 CHAR PERIODS.
1915:           ;               IF CHARACTER RECEIVED THRCAV FLAG WILL BE SET (BIT 0 0F R2
1916:           ;                       IN BANK 1)
1917:           ;               IF ERROR THE ERROR FLAG WILL ALSO BE SET (BIT 1 & 2
1918:           ;               OF R2 OF BANK 1)
1919:           ;       IT IS THE USERS RESPONSIBILITY TO CLEAR F1 ON A TIMEOUT. ALSO THE
1920:           ;       RECEIVE DATA FLAG AND ERROR FLAG MUST BE RESET BY THUSER.
1921:           ;
1922:           ;       IN FACT, IF THE RECEIVE DATA FLAG IS NOT CLEARED THEN THE NEXT RECEIVED
1923:           ;       CHARACTER WILL GENERATE AN OVERRUN ERROR. THE USER MUST UNLOAD RDATA
1924:           ;       AND RESET RCAV IN 1 CHARACTER TIME (3.8 MSEC) TO AVOID OVERRUNS.
1925:           ;       THE MODEM DRIVER WILL CONTINUEO READ INPUT CHARACTERS UNTIL TOLD
1926:           ;       TO TRANSMIT BY THE APPLICATION. THIS IS ACCOMPLISHED BY
1927:           ;               PLACING PTR TO MESSAGE IN XPT(BANK1,R1)
1928:           ;               SETTING STATE TO 5 (R4 IN BANK 1)
1929:           ;       THE MESSAGE WILL BE OUTPUT
1930:           ;       AFTER THE MESSAGE IS READ THE DRIVER WILL START MONITORING RECEIVE
1931:           ;       DATA FOR INPUT CHARACTERS.
1932:           ;       THE FORMAT OF THE MESSAGE IS
1933:           ;               BYTE 1 -- LS 4 BITS -- NO. OF DATA BYTES T INCLUDING
1934:           ;                                       BYTE 1 (0 TO 15)
1935:           ;                       -- BIT 4 - SEQUENCE #
1936:           ;                       -- BIT 5 - ADDRESS SEQUENCE
1937:           ;                       -- BIT 6 - UNUSED
1938:           ;                       -- BIT 7 - 1=NAK, 0=ACK
1939:           ;               BYTE 2 -- ADDRESS
1940:           ;               BYTE 3 TO 17 --       DATA BYTES
1941:           ;               BYTE 18 --            LRC
1942:           ;       BYTE 18 WILL BE COMPUTED AND PLACED IN BUFFER BY TRANSMIT
1943:           ;       ROUTI. BUFFER SIZE IS 17 BYTES.
1944:           ;
1945:           ;
1946:
1947:
1948: AVOCET SYSTEMS 8048 CROSS-ASSEMBLER - VERSION 1.63
1949:
```

```
1950: NONWIRE (TM) MASTER VER 2.07 (C) 1984 CONTROLONICS CORP
1951:
1952:
1953:             ;       STATE VECTOR TABLE ON CLOCK INTERRUPT SERVICE
1954:             ;           (*MUST BE ALIGNED ON PAGE BOUNDARY*);
1955: 0700 15     VTABLE: DB    SBSRC-VTABLE        ;STATE 0 = SEARCHING FOR START BIT
1956: 0701 22             DB    VSB-VTABLE          ;STATE 1 = VERIFY START BIT
1957: 0702 36             DB    RRDATA-VTABLE       ;STATE 2 = RECEIVE 8 DATA BITS
1958: 0703 48             DB    RPARTY-VTABLE       ;STATE 3 = READ PARITY
1959: 0704 59             DB    RSTOP-VTABLE        ;STATE 4 = VERIFY STOP BIT
1960: 0705 6A             DB    XMITI-VTABLE        ;STATE 5 = TRANSMIT START SET B0
1961: 0706 92             DB    XMITD-VTABLE        ;STATE 6 = TRANSMIT B0, SET B1
1962: 0707 92             DB    XMITD-VTABLE        ;STATE 7 = TRANSMIT B1, T B2
1963: 0708 92             DB    XMITD-VTABLE        ;STATE 8 = TRANSMIT B2, SET B3
1964: 0709 92             DB    XMITD-VTABLE        ;STATE 9 = TRANSMIT B3, SET B4
1965: 070A 92             DB    XMITD-VTABLE        ;STATE 10= TRANSMIT B4, SET B5
1966: 070B 92             DB    XMITD-VTABLE        ;STATE 11= TRANSMIT B5, SET B6
1967: 070C 92             DB    XMITD-VTABLE        ;STATE 12= TRANSMIT B6, SET B7
1968: 070D 92             DB    XMITD-VTABLE        ;STATE 13= TRANSMIT B7, SET PARITY
1969: 070E 92             DB    XMITD-VTABLE        ;STATE 14= TRANSMIT PARITY SET STOP
1970: 070F B0             DB    XMITT-VTABLE        ;STATE 15= TRANSMIT STOP+WAIT
1971: 0710 B7             DB    XMITG-VTABLE        ;STATE 16= STOP BIT COMPLETE TERMINATE
1972:             ;
1973:             ;       TIMER INTERRUPT SERVICER ---) 5 CYCLES + CYCLES ON
1974:             ;       JTF UART AT LOC 7 TO GET HERE = 17.5 USEC TO ACTUALLY PERFORM VECTOR
1975:             ;
1976: 0711 D5     UART:   SEL   RB1                 ;SELECT ALTERNATE BANK
1977: 0712 A8             MOV   ATEMP,A             ;SAVE A
1978: 0713 FC             MOV   A,STATE             ;GET STATE
1979: 0714 B3             JMPP  @A                  ;VECTOR
1980:             ;
1981:             ;       STATE 0 ---) SEARCHING FOR START BIT
1982:             ;
1983:             ;       46% OPROCESSOR IS USED DURING START BIT SEARCH
1984:             ;
1985:             ;
1986:             ;
1987:             ;
1988: 0715 23FE   SBSRC:  MOV   A,#TQBIT            ;SET TIME FOR 1/4 BIT PERIOD
1989: 0717 62             MOV   T,A                 ;MARK
1990: 0718 4633           JNT1  SBSRC2              ;NO, POSIBLE START BIT
1991: 071A 1B             INC   XCNTRT              ;ADVANCE TIMEOUT COUNTER
1992: 071B FB             MOV   A,XCNTRT            ;=64 BITS = 5,8 CHAR TIMES
1993: 071C 9620           JNZ   SBSRC3              ;OVERFLOW?
1994: 071E A5             CLR   F1                  ;YES, SET TIMER OVERFLOW
1995: 071F B5             CPL   F1                  ;ERROR BUT KEEP LOCKING
1996: 0720 F8     SBSRC3: MOV   A,ATEMP             ;LET APPLICATION FIGURE IT OUT
1997: 0721 93             RETR
1998:             ;
1999:             ;       STATE 1 ---) VERIFY START BIT
2000:             ;
2001: 0722 462A   VSB:    JNT1  GOODST              ;MARK?
2002: 0724 CC             DEC   STATE               ;YES, WAS NOISE, BACK
2003: 0725 23FE           MOV   A,#TQBIT            ;CONTINUE START
2004:
2005:
```

```
2006: AVOCET SYSTEMS 8048 CROSS-ASSEMBLER - VERSION 1.63
2007:
2008: NONWIRE (TM) MASTER VER 2.07 (C) 1984 CONTROLONICS CORP
2009:
2010:
2011: 0727 62              MOV     T,A                 ;BIT SEARCH
2012: 0728 F8              MOV     A,ATEMP             ;RESTORE A AND
2013: 0729 93              RETR                        ;DISMISS INTERRUPT
2014: 072A 23F8    GOODST: MOV     A,#TOBIT            ;SET RATE = 1 BIT TIME, SOFTWARE
2015: 072C 62              MOV     T,A                 ;CORRECTION NECESSARY FOR SKEW
2016: 072D 237F            MOV     A,#NOT PARAC        ;CLEAR RUNNING PARITY
2017: 072F 5A              ANL     A,FLAGSS            ;ACCUMULATE
2018: 0730 AA              MOV     FLAGSS,A            ;SHIFT REGISTER INITIALIZE
2019: 0731 BD80            MOV     XREG,#080H          ;GO ADVANCE STATE AND
2020: 0733 1C     SBSRC2:  INC     STATE               ;DISMISS INTERRUPT
2021: 0734 F8              MOV     A,ATEMP
2022: 0735 93              RETR
2023:                 ;
2024:                 ;       STATE 2 ---) READ 8 DATA BITS
2025:                 ;
2026: 0736 23F8    RRDATA: MOV     A,#TOBIT            ;RESTART CLOCK
2027: 0738 62              MOV     T,A
2028: 0739 97              CLR     C                   ;A = RECEIVE DATA
2029: 073A 4641            JNT1    RDATA1              ;RECEIVE DATA = 1
2030: 073C A7              CPL     C                   ;YES, TOGGLE PARITY
2031: 073D FA              MOV     A,FLAGSS
2032: 073E D380            XRL     A,#PARAC
2033: 0740 AA              MOV     FLAGSS,A
2034: 0741 FD     RDATA1:  MOV     A,XREG              ;SHIFT RECEIVE DATA
2035: 0742 67              RRC     A                   ;BIT INTO SHIFT REGISTER
2036: 0743 AD              MOV     XREG,A
2037: 0744 F633            JC      SBSRC2              ;IF A CY OUT THEN 8 DATA BITS
2038: 0746 F8              MOV     A,ATEMP             ;READ;ELSE KEEP READING
2039: 0747 93              RETR
2040:                 ;
2041:                 ;       STATE 3 ---) READ PARITY BIT
2042:                 ;
2043: 0748 23F8    RPARTY: MOV     A,#TOBIT            ;START TIMER GOING
2044: 074A 62              MOV     T,A                 ;AGAIN
2045: 074B FA              MOV     A,FLAGSS            ;IF RECEIVE DATA IS 1
2046: 074C 4650            JNT1    RPART1              ;THEN TOGGLE PARITY
2047: 074E D380            XRL     A,#PARAC            ;ERROR?
2048: 0750 F7     RPART1:  RLC     A                   ;PARITY IS EVEN OR ERROR
2049: 0751 77              RR      A
2050: 0752 E656            JNC     RPART2              ;ERROR?
2051: 0754 4304            ORL     A,#VERR             ;YES, SET ERROR FLAG
2052: 0756 AA     RPART2:  MOV     FLAGSS,A            ;GO DISMISS INTERRUPT
2053: 0757 E433            JMP     SBSRC2
2054:                 ;
2055:                 ;       STATE 4 ---) READ STOP BIT
2056:                 ;
2057: 0759 23FE    RSTOP:  MOV     A,#TOBIT            ;SET 1/4 BIT INTERRUPT
2058: 075B 62              MOV     T,A
2059: 075C FA              MOV     A,FLAGSS            ;CHARACTER IN BUFFER
2060: 075D 5661            JT1     RSTOP2              ;NO, MARK LINE
2061: 075F 4302            ORL     A,#ERR              ;NO, FRAMING ERROR
```

```
2062:
2063:
2064: AVOCET SYSTEMS 8048 CROSS-ASSEMBLER - VERSION 1.63
2065:
2066: NONWIRE (TM) MASTER VER 2.07 (C) 1984 CONTROLONICS CORP
2067:
2068:
2069: 0761 4301      RSTOP2: ORL    A,#RCAV          ;SET RECEIVE DATA AVAILABLE
2070: 0763 AA                MOV    FLAGSS,A         ;
2071: 0764 FD                MOV    A,XREG           ;MOVE CHARACTER TO
2072: 0765 A9                MOV    RDATA,A          ;RECEIVE BUFFER]
2073: 0766 BC00     RSTOP1: MOV    STATE,#0         ;SET STATE 0
2074: 0768 F8                MOV    A,ATEMP          ;DISMISS INTERRU
2075: 0769 93                RETR
2076:                ;
2077:                ;    STATE 5 ---> INITIAL XMIT MESSAGE STATE
2078:                ;    *NOTE -- ONLY 100 USEC LEFT OUT OF 320*************;
2079: 076A F1       XMITI:  MOV    A,@XPTR          ;GET 1ST CHAR OF MESSAGE
2080: 076B 530F             ANL    A,#0FH           ;GET # DATA BYTES
2081: 076D 17               INC    A                ;GET COUNTER ON TOTAL # OF
2082: 076E 17               INC    A                ;BYTES
2083: 076F AD               MOV    XREG,A
2084: 0770 17               INC    A
2085: 0771 AB               MOV    XCNTRT,A         ;SET COUNTER
2086: 0772 F9               MOV    A,XPTR           ;SAVE POINTER
2087: 0773 AC               MOV    STATE,A
2088: 0774 23F8             MOV    A,#TOBIT         ;START COUNTER
2089: 0776 62               MOV    T,A
2090: 0777 8A08             ORL    P2,#MARK         ;SET START BIT(SPACE)
2091: 0779 27               CLR    A                ;INTO LASTOSITION IN BUFFER
2092: 077A D1       XMITT1: XRL    A,@XPTR
2093: 077B 19               INC    XPTR
2094: 077C ED7A             DJNZ   XREG,XMITT1
2095: 077E A1               MOV    @XPTR,A
2096: 077F FC               MOV    A,STATE          ;RESTORE USER BUFFER PTR
2097: 0780 A9               MOV    XPTR,A
2098: 0781 BC05             MOV    STATE,#XSVAL     ;RESTORE STATE
2099: 0783 27       XMITT4: CLR    A                ;CLEAR FLAGS
2100: 0784 AA               MOV    FLAGSS,A
2101: 0785 F1               MOV    A,@XPTR          ;GET FIRST CHARACTER OUTPUT
2102: 0786 67       XMITT2: RRC    A                ;GET NEXT BIT TO OUTPUT
2103: 0787 AD               MOV    XREG,A           ;UPDATE SHIFT REGISTER'
2104: 0788 FA       XMITT3: MOV    A,FLAGSS         ;SET UP BITX BIT REFLECT
2105: 0789 53BF             ANL    A,#NOT BITX      ;NEXT BIT TO OUTPUT
2106: 078B E68F             JNC    XMITT5           ;0--)IF NEXT BIT IS 0
2107: 078D 4340             ORL    A,#BITX          ;1--)IF NEXT BIT IS 1
2108: 078F AA       XMITT5: MOV    FLAGSS,A
2109: 0790 E433             JMP    SBSRC2           ;GO INC STATE AND DISMISS
2110:                ;
2111:                ;    STATES 6,7,8,9,10,11,12,13,14 ---> OUTPUT DATA BITS
2112:                ;
2113: 0792 23F8     XMITD:  MOV    A,#TOBIT         ;RESTART TIMER
2114: 0794 62               MOV    T,A
2115: 0795 FA               MOV    A,FLAGSS
2116: 0796 D29C             JB6    XMITD1           ;OUTPUT NEXT DATA BIT = BITX
2117: 0798 8A08             ORL    P2,#MARK         ;ON TRANSMITTED DATA
```

```
2118:  073A E4A1            JMP     XMITD2
2119:  079C 9AF7    XMITD1: ANL     P2,#NOT MARK        ;TOGGLE
2120:
2121:
2122: AVOCET SYSTEMS 8048 CROSS-ASSEMBLER - VERSION 1.63
2123:
2124: NONWIRE (TM) MASTER VER 2.07 (C) 1984 CONTROLONICS CORP
2125:
2126:
2127:  079E D380            XRL     A,#PARAC            ;HORIZONTAL PARITY
2128:  07A0 AA              MOV     FLAGSS,A            ;ACCUMULATION
2129:  07A1 FC      XMITD2: MOV     A,STATE
2130:  07A2 03F3            ADD     A,#-13              ;ARE WE SENDING MSB?
2131:  07A4 C6AC            JZ      XMITD3              ;YES,GO SET FOR PARITY NEXT
2132:  07A6 07              DEC     A                   ;NO,SENDING PARITY?
2133:  07A7 C633            JZ      SBSRC2              ;YES,DISMISS STATE 15 NEXT
2134:  07A9 FD              MOV     A,XREG              ;GET CHARACTER
2135:  07AA E486            JMP     XMITT2              ;GO SET NEXT BIT
2136:  07AC FA      XMITD3: MOV     A,FLAGSS            ;SET FLAGS FOR PARITY
2137:  07AD F7              RLC     A                   ;BIT NEXT
2138:  07AE E488            JMP     XMITT3
2139:                ;
2140:                ;       STATE 15 ---) OUTPUT STOP BIT
2141:                ;
2142:  07B0 23F8    XMITT:  MOV     A,#TOBIT            ;RESTART ME BASE
2143:  07B2 62              MOV     T,A
2144:  07B3 9AF7            ANL     P2,#NOT MARK        ;OUTPUT STOP BIT
2145:  07B5 E433            JMP     SBSRC2              ;GO ADVANCE STATE AND EXIT
2146:
2147:                ;
2148:                ;       STATE 16 ---) STOP BIT DURATION COMPLETE
2149:                ;
2150:  07B7 EBC1    XMITG:  DJNZ    XCNTRT,XMITG1       ;MORE DATA
2151:  07B9 A5              CLR     F1                  ;RESET RECEIVE CHARACTER TIMEOUT
2152:  07BA 23FE            MOV     A,#TOBIT            ;NO, SET 1/4 BIT
2153:  07BC 62              MOV     T,A                 ;TIMER
2154:  07BD 27              CLR     A                   ;STATE =0
2155:  07BE AA              MOV     FLAGSS,A
2156:  07BF E466            JMP     RSTOP1              ;GO SET STATE=0 AND DISMISS
2157:  07C1 23F8    XMITG1: MOV     A,#TOBIT            ;START FULL BIT TIMER
2158:  07C3 62              MOV     T,A
2159:  07C4 2305            MOV     A,#XSVAL            ;(TIMING)
2160:  07C6 8A08            ORL     P2,#MARK            ;SET START BIT(SPACE)
2161:  07C8 AC              MOV     STATE,A             ;SET CORRECT STATE NEXT CHAR
2162:  07C9 19              INC     XPTR                ;ADVANCE MESSAGE PTR
2163:  07CA E483            JMP     XMITT4
2164:
2165:
2166: AVOCET SYSTEMS 8048 CROSS-ASSEMBLER - VERSION 1.63
2167:
2168: NONWIRE (TM) MASTER VER 2.07 (C) 1984 CONTROLONICS CORP
2169:
2170:
2171:                ;
2172:                ;       FRONT END TO KATOHX
2173:                ;
```

```
2174:  07CC AA       HATOHY: MOV    TEMP,A                 ;A--->TEMP
2175:
2176:                ;       CONVERT HEX ASCII CHAR IN TEMP TO HEX
2177:                ;
2178:                ;       RTN    A=0     VALID CHAR IN TEMP
2179:                ;       RTN    A()0    INVALID HEX ASCII IN TEMP
2180:                ;
2181:                ;       (0 SUBROUTINE LEVELS USED
2182:                ;
2183:  07CD FA       HATOHX: MOV    A,TEMP          ;GET HEX ASCII CHARACTER
2184:  07CE 03D0             ADD    A,#-AZERO       ;CHAR(0           (-30H)
2185:  07D0 E6ED             JNC    HARTN           ;YES,ERROR
2186:  07D2 03F6             ADD    A,#-10          ;NO,CHAR(10       (-3AH)
2187:  07D4 E6E0             JNC    HAR10           ;YES,0(=CHAR(10
2188:  07D6 03F9             ADD    A,#-7           ;CHAR(A           (-41H)
2189:  07D8 E6ED             JNC    HARTN           ;YES,ERROR
2190:  07DA 03FA             ADD    A,#-6           ;NO,CHAR(=F       (-47H)
2191:  07DC F6E5             JC     HAR20           ;NO,CHECK LOWER
2192:  07DE 0306     HAR30:  ADD    A,#6            ;YES,A(=CHAR(=F
2193:  07E0 030A     HAR10:  ADD    A,#10
2194:  07E2 AA               MOV    TEMP,A
2195:  07E3 27               CLR    A
2196:  07E4 83               RET
2197:  07E5 03E6     HAR20:  ADD    A,#-26          ;CHAR(LOW A       (-61H)
2198:  07E7 E6ED             JNC    HARTN           ;YES,ERROR
2199:  07E9 03FA             ADD    A,#-6           ;NO,)LOW F        (-67H)
2200:  07EB E6DE             JNC    HAR30           ;NO,IS O.K
2201:  07ED 2301     HARTN:  MOV    A,#1
2202:  07EF 83               RET
2203:
2204:
2205: AVOCET SYSTEMS 8048 CROSS-ASSEMBLER - VERSION 1.63
2206:
2207: NONWIRE (TM) MASTER VER 2.07 (C) 1984 CONTROLONICS CORP
2208:
2209:
2210:                ;
2211:                ;       INCREMENT RE-TRY COUNTER AND RESULT TO A
2212:                ;
2213:  07F0 D5       ADVRTY: SEL    RB1
2214:  07F1 1E               INC    RRETRY
2215:  07F2 FE               MOV    A,RRETRY
2216:  07F3 93               RETR
2217:                ;
2218:                ;       LOAD RETRY COUNTER'
2219:                ;
2220:  07F4 D5       LOADRT: SEL    RB1
2221:  07F5 BEF8             MOV    RRETRY,#-RCOUNT
2222:  07F7 93               RETR
2223:
2224:
2225: AVOCET SYSTEMS 8048 CROSS-ASSEMBLER - VERSION 1.63
2226:
2227: NONWIRE (TM) MASTER VER 2.07 (C) 1984 CONTROLONICS CORP
2228:
2229:
```

```
2230: ;
2231: ;       TEST AUTOPOLL FLAG
2232: ;
2233: ;       (R0 DESTROYED)
2234: ;       RETURN A=0 FLAG NOT SET ELSE FLAG SET
2235: ;
2236: ;       USES 0 SUBROUTINE LEVELS
2237: ;
2238: 07F8 B821   TAPOLL: MOV    R0,#FLAG2
2239: 07FA F0             MOV    A,@R0
2240: 07FB 5380           ANL    A,#AUTOPL
2241: 07FD 83             RET
2242:
2243:
2244: AVOCET SYSTEMS 8048 CROSS-ASSEMBLER - VERSION 1.63
2245:
2246: NONWIRE (TM) MASTER VER 2.07 (C) 1984 CONTROLONICS CORP
2247:
2248: 0000           END
2249:
2250:
2251:
2252: AVOCET SYSTEMS 8048 CROSS-ASSEMBLER - VERSION 1.63
2253:
2254: NONWIRE (TM) MASTER VER 2.07 (C) 1984 CONTROLONICS CORP
2255: ---- SYMBOL TABLE ----
2256:
```

| | | | | | | | | | |
|---|---|---|---|---|---|---|---|---|---|
| 2257: | AAADR | 0001 | CSNEXT | 0539 | INA | 04CE | OUTA | 06E5 | READH5 | 024A |
| 2258: | ACK | 0006 | CTRLM | 0040 | INCCN | 067A | OUTA20 | 06E6 | READH6 | 0276 |
| 2259: | ACKADR | 06D1 | CTRLR | 0012 | INCCN1 | 0684 | OUTMES | 06AF | READH7 | 0259 |
| 2260: | ADDPRG | 0002 | DSTA10 | 068C | INIT | 000A | P6EXIT | 0679 | READH8 | 0245 |
| 2261: | ADDR10 | 0114 | DSTATF | 0040 | INIT1 | 0013 | PAEXT | 03CE | READH9 | 025E |
| 2262: | ADDR20 | 0192 | DSTATS | 0685 | INITP2 | 00F7 | PALTBU | 03C8 | READM | 0400 |
| 2263: | ADDRER | 018A | DTRDIS | 0005 | JAMLIM | 00E0 | PALTST | 03C7 | READRR | 05EF |
| 2264: | ADVHRP | 027E | DTREN | 0007 | LABORT | 0040 | PARAC | 0080 | RESET | 0040 |
| 2265: | ADVRTY | 07F0 | EADR | 0020 | LASTC | R3 | PARTYM | 0003 | RESTRT | 0020 |
| 2266: | AFLAG | R6 | ERAM | 0080 | LF | 000A | PBEXT | 03D5 | RETRA2 | 051B |
| 2267: | AHADR | 0002 | ERR | 0002 | LOADRT | 07F4 | PCURBU | 03CF | RETRA3 | 051A |
| 2268: | ALA | 0041 | ERRST | 0010 | LRC | R5 | PGOD1 | 03B3 | RETRA4 | 0515 |
| 2269: | ALARM | 0004 | FIRSTC | R7 | MAIN | 0100 | PGOD2 | 03B1 | RETRA5 | 0531 |
| 2270: | ASCFL | 0020 | FLAG2 | 0021 | MAINS | 0102 | PGOD4 | 03C1 | RETRA6 | 050B |
| 2271: | ASTOP | 001B | FLAGSS | R2 | MARK | 0008 | PGOD5 | 03BE | RETRAK | 0532 |
| 2272: | ATAADR | 0003 | FLUS10 | 0456 | MCLR | 0080 | PGOD6 | 03AE | RETRAN | 0500 |
| 2273: | ATEMP | R0 | FLUS20 | 044A | MMASK | 0010 | PGOD7 | 03B6 | RETRY | 001E |
| 2274: | ATHADR | 0004 | FLUSH | 0448 | MRBSZ | 000F | PGOD8 | 03C3 | RM1 | 043F |
| 2275: | ATPOLL | 0005 | GET100 | 058F | MRBUF | 004D | PGOD9 | 03B8 | RM3 | 0437 |
| 2276: | AUTO0 | 012C | GET110 | 05C9 | MSG10 | 034C | PGODM | 03A3 | RM4 | 042F |
| 2277: | AUTONX | 01D5 | GET120 | 05CE | MSG11 | 035D | PKTNAK | 0024 | RM5 | 0423 |
| 2278: | AUTOPL | 0080 | GETA20 | 0557 | MSG12 | 036B | PKTXL | 0022 | RM9 | 0439 |
| 2279: | AZERO | 0030 | GETA30 | 0585 | MSG13 | 0380 | PKTXM | 0023 | RPART1 | 0750 |
| 2280: | BADR | 001F | GETA40 | 0574 | MSG14 | 0396 | POWER | 0000 | RPART2 | 0756 |
| 2281: | BITX | 0040 | GETA50 | 054E | MSG15 | 039D | RADRRX | 0606 | RPARTY | 0748 |
| 2282: | CCOUNT | R4 | GETA60 | 0579 | MSG2 | 0349 | RADRRY | 05EE | RRDATA | 0736 |
| 2283: | CHK10 | 04E3 | GETA70 | 0591 | MSG5 | 0304 | RBADR | R7 | RRETRY | R6 |
| 2284: | CHK20 | 04F1 | GETA80 | 059E | MSG6 | 0310 | RCAV | 0001 | RSEQ | 0010 |
| 2285: | CHKEMP | 04DD | GETA90 | 05A2 | MSG7 | 0321 | RCERR | 0038 | RSTOP | 0759 |

| | | | | | | | | | |
|---|---|---|---|---|---|---|---|---|---|
| 2286: | CHXT10 | 06E3 | GETA95 | 05C3 | MSG8 | 0336 | RCOUNT | 0008 | RSTOP1 | 0766 |
| 2287: | CHXTAS | 06DB | GETADR | 0551 | MT0BUF | 005C | RDATA | R1 | RSTOP2 | 0761 |
| 2288: | CNUMNG | 000A | GOODST | 072A | MT1BUF | 006E | RDATA1 | 0741 | RUND05 | 0133 |
| 2289: | COMP11 | 0644 | HAR10 | 07E0 | MTABLE | 0300 | READ10 | 0288 | RUND10 | 0141 |
| 2290: | COMP12 | 061C | HAR20 | 07E5 | MTBSZ | 0012 | READ20 | 0286 | RUND20 | 0154 |
| 2291: | COMP13 | 0624 | HAR30 | 07DE | NAK | 0015 | READ30 | 02A2 | RUND30 | 0137 |
| 2292: | COMP14 | 062D | HARTN | 07ED | NAKBIT | 0080 | READ31 | 0278 | RUND50 | 0164 |
| 2293: | COMP15 | 063A | HATCHX | 07CD | NBYMS | 0008 | READ40 | 0275 | RUND60 | 0143 |
| 2294: | COMP19 | 063E | HATCHY | 07CC | NEXTSL | 01D3 | READ41 | 0274 | RUND70 | 0172 |
| 2295: | COMPR | 0607 | HRBSZ | 0013 | NIBSV | 0025 | READ42 | 0273 | RUND80 | 017A |
| 2296: | COMPR5 | 0633 | HRBUF | 0026 | NNERR | 0204 | READ50 | 028F | RUND85 | 0181 |
| 2297: | COMPR6 | 0618 | HRCNT | 0013 | NT | 0005 | READ55 | 0298 | RUND90 | 0162 |
| 2298: | COMPR7 | 063C | HRGPTR | 0012 | NUACK0 | 0200 | READ60 | 029D | RUNDAT | 0128 |
| 2299: | COMPR8 | 0636 | HRLIM | 000F | NUACK1 | 0010 | READ70 | 0220 | RUNMD | 0001 |
| 2300: | COMPR9 | 0635 | HRPTR | 0014 | NULL | 0000 | READ75 | 0222 | SBSRC | 0715 |
| 2301: | CPROC | 0458 | HSTOPT | 0080 | NUMERR | 0030 | READ80 | 023F | SBSRC2 | 0733 |
| 2302: | CPROC1 | 04CD | HXBSZ | 0014 | NUMMSG | 0026 | READ95 | 0297 | SBSRC3 | 0728 |
| 2303: | CPROC2 | 04BD | HXBUF | 0039 | NUTTTS | 0034 | READH | 0202 | SEDXOF | 0001 |
| 2304: | CPROCA | 0457 | HXCNT | 0016 | OB10 | 06C4 | READH1 | 020A | SEDXON | 0002 |
| 2305: | CR | 000D | HXGPTR | 0015 | OB20 | 06BD | READH2 | 0279 | SENDH1 | 02AE |
| 2306: | CRLF | 06AD | HXPTR | 0017 | OBINM | 0638 | READH3 | 0227 | SENDH2 | 02AD |
| 2307: | CSEL | 0020 | IFILL | 0622 | OCNTH | 066C | READH4 | 0209 | SENDH3 | 02CB |
2308:
2309:
2310: AVOCET SYSTEMS 8048 CROSS-ASSEMBLER - VERSION 1.63
2311:
2312: NONWIRE (TM) MASTER VER 2.07 (C) 1984 CONTROLONICS CORP
2313: ---- SYMBOL TABLE ----
2314:

| | | | | | | | | | |
|---|---|---|---|---|---|---|---|---|---|
| 2315: | SENDH4 | 02D4 | TEST40 | 01F4 | TOPRAM | 007F | XFER2 | 046F | XMITT3 | 0788 |
| 2316: | SENDH5 | 02DB | TEST50 | 01E8 | TQBIT | FFFE | XFER5 | 04AC | XMITT4 | 0783 |
| 2317: | SENDH6 | 02E0 | TEST60 | 01FA | TSTDAT | 01EC | XFER6 | 049C | XMITT5 | 078F |
| 2318: | SENDH7 | 02B1 | TEST80 | 01A1 | UART | 0711 | XFER7 | 0496 | XNIB | 0008 |
| 2319: | SENDHT | 02A6 | TESTA | 0056 | UARTEN | 0007 | XFER8 | 04A0 | XOFF | 0013 |
| 2320: | SENTOF | 0004 | TESTL | 004A | UARTT | 0005 | XMITD | 0792 | XON | 0011 |
| 2321: | SNEXT | 053B | TESTM | 019F | UDATA | 0019 | XMITD1 | 079C | XONCTR | 0001 |
| 2322: | SNEXT1 | 0546 | THRMK | 002C | UFLAG | 001A | XMITD2 | 07A1 | XPTR | R1 |
| 2323: | SP | 0020 | TMR05 | 0654 | UTILS | 06CB | XMITD3 | 07AC | XREG | R5 |
| 2324: | START | 0040 | TMR10 | 0656 | VERR | 0004 | XMITG | 07B7 | XSTOP | 0004 |
| 2325: | STATE | R4 | TMR20 | 0667 | VSB | 0722 | XMITG1 | 07C1 | XSVAL | 0005 |
| 2326: | TAPOLL | 07FB | TMR30 | 0663 | VTABLE | 0700 | XMITI | 076A | | |
| 2327: | TEMP | R2 | TMR40 | 0666 | XCNTRT | R3 | XMITT | 07B0 | | |
| 2328: | TEST10 | 01CE | TMRHT | 064A | XDTREN | 0002 | XMITT1 | 077A | | |
| 2329: | TEST30 | 01E4 | TOBIT | FFF8 | XFER10 | 04B4 | XMITT2 | 0786 | | |

APPENDIX C

1:
2:
3: AVOCET SYSTEMS 8048 CROSS-ASSEMBLER - VERSION 1.63
4:
5: NONWIRE(TM) SLAVE VER 2.04 © 1984 CONTROLONICS CORP
6:
7:

```
8:      ;******************************************************************
9:      ;*                                                                *
10:     ;*              NONWIRE(TM) SLAVE STATION                         *
11:     ;*              VERSION 2.04 02/07/84                             *
12:     ;*              COPYRIGHT (C) 1984 CONTROLONICS CORP              *
13:     ;*              HEX FILE CHECKSUM = EC68    PART NO = 2100163     *
14:     ;*              RUNS ON 8049/8749 AT 6.0 MHZ                      *
15:     ;******************************************************************
16:     ;*NOTES:
17:     ;       1) PROGRAM OPTIMIZED FOR SPEED + RAM UTILIZATION. CARE MUST BE TAKEN
18:     ;          IN CODE REDUCTION AS VIRTUALLY THE ENTIRE PROGRAM IS TIME SENSITIVE
19:     ;       2) F0 IS DEDICATED TO APPLICATION (BACKGROUND) AND IS USED TO SPECIFY
20:     ;          WHICH TRANSMIT BUFFER IS ACTIVELY BEING TRANSMITTED.
21:     ;          0=MTBUF1, 1=MTBUF2
22:     ;       3) F1 IS USED AS A RECEIVE TIMEOUT FLAG AND IS DEDICATED TO THIS
23:     ;          FUNCTION.
24:     ;       4) REGISTERS R0-R5 IN BANK #1 RESERVED FOR FOREGROUND.
25:     ;       5) REGISTERS R6 AND R7 BANK 1 PART OF RAM STORAGE AND MUST NOT BE USED
26:     ;
27:     ;                       MISC APPLICATION CONSTANTS
28: 007F        TOPRAM  EQU     07FH            ;TOP OF RAM
29: 000F        MRBSZ   EQU     0FH             ;MODEM BUFFER SIZE ON RECEIVE
30: 0012        MTBSZ   EQU     012H            ;MODEM BUFFER SIZE ON TRANSMIT
31: 0013        HRBSZ   EQU     013H            ;HOST RECEIVE BUFFER SIZE
32: 0013        HXBSZ   EQU     13H             ;HOST TRANSMIT BUFFER SIZE
33: 000F        HRLIM   EQU     HRBSZ-4         ;DTR THRESHOLD
34: 0010        MMASK   EQU     010H            ;TEST MODE P2 INPUT MASK
35: 0003        PARTYM  EQU     003H            ;PARITY MODE P2 INPUT MASK
36: 0000        NUACK0  EQU     0               ;ACK,NO DATE,SEQUENCE=0
37: 0010        NUACK1  EQU     10H             ;ACK,NO DATE,SEQUENCE=1
38: 0080        NUNAK0  EQU     80H             ;NAK,NO DATE,SEQUENCE=0
39: 0090        NUNAK1  EQU     90H             ;NAK,NO DATA,SEQUENCE=1
40: 0080        NAKBIT  EQU     80H             ;NAK BIT MASK
41: 0020        RESTRT  EQU     20H             ;RESTART BIT MASK
42: 0010        SEQBIT  EQU     10H             ;SEQUENCE BIT MASK
43: 002C        THRMK   EQU     2CH             ;# OF NAKS IN 2**16-1 TO SET ALARM
44: 0004        ALARM   EQU     04H             ;ALARM BIT P2
45:
46:
47: AVOCET SYSTEMS 8048 CROSS-ASSEMBLER - VERSION 1.63
48:
49: NONWIRE(TM) SLAVE VER 2.04 (C) 1984 CONTROLONICS CORP
50:
51:
52:         ;
53:         ;       BANK 0 REGISTER USAGE
54:         ;
55: 0A07    FIRSTC  EQU     R7              ;1ST CHAR OF MESSAGE
56: 0A06    AFLAG   EQU     R6              ;BACKGROUND FLAGS
57: 0A05    LRC     EQU     R5              ;COMPUTED LRC
58: 0A04    CCOUNT  EQU     R4              ;CHARACTER COUNTER DURING MESSAGE READ
59: 0A03    LASTC   EQU     R3              ;LAST CHARACTER OF MESSAGE RECEIVED
60: 0A02    TEMP    EQU     R2              ;TEMP REGISTER
61:         ;
62:         ;       BACKGROUND FLAG DEFINITION
63:         ;
```

```
64:  0001          CBAD    EQU     1               ;RECEIVED CHAR BAD (JB0)
65:  0002          TESTMD  EQU     2               ;ZERO = TEST MODE(JB1)
66:  0004          DATAS   EQU     4               ;1=SLAVE HAS SEEN DATA MESSAGE
67:  0008          STRTUP  EQU     8               ;ONE = WAITING FOR RESTART (JB3)
68:  0010          RSEQ    EQU     10H             ;SEQUENCE # LAST RECEIVED MSG(JB4)
69:  00E0          RTRYC   EQU     0E0H            ;TIMEOUT CONSTANT MASTER
70:  0020          RTRYI   EQU     020H            ;RETRY INCREMENT
71:                ;
72:                ;       BANK 1 REGISTERS ACCESSED BY APPLICATION
73:                ;
74:  0019          UPTR    EQU     019H            ;TRANSMIT PTR
75:  0019          UDATA   EQU     019H            ;MODEM DATA
76:  001A          UFLAG   EQU     01AH            ;MODEM FLAGS
77:  001C          USTATE  EQU     01CH            ;MODEM STATE
78:  0005          XSVAL   EQU     5               ;STARTING TRANSMIT STATE#
79:                ;
80:                ;       APPLICATION RAM(USES BANK #1 REGISTERS R6 AND R7)
81:                ;
82:  001E          SRAM    EQU     1EH             ;START OF RAM
83:  001E          PKTXL   EQU     SRAM            ;LS # PACKETS SENT COUNTER
84:  001F          PKTXM   EQU     PKTXL+1         ;MS # PACKETS SENT COUNTER
85:  0020          PKTNAK  EQU     PKTXM+1         ;# NAKS SENT COUNTER
86:  0021          HRGPTR  EQU     PKTNAK+1        ;HOST RECEIVE BUFFER GET POINTER
87:  0022          HRCNT   EQU     HRGPTR+1        ;#BYTES IN HOST RECEIVE BUFFER
88:  0023          HRPTR   EQU     HRCNT+1         ;HOST RECEIVE BUFFER PUT POINTER
89:  0024          HXGPTR  EQU     HRPTR+1         ;HOST XMIT BUFFER GET POINTER
90:  0025          HXCNT   EQU     HXGPTR+1        ;#BYTES IN HOST XMIT BUFFER
91:  0026          HXPTR   EQU     HXCNT+1         ;HOST XMIT BUFFER PUT POINTER
92:  0027          HRBUF   EQU     HXPTR+1         ;HOST RECEIVE BUFFER
93:  003A          HXBUF   EQU     HRBUF+HRBSZ     ;HOST TRANSMIT BUFFER
94:  004D          MRBUF   EQU     HXBUF+HXBSZ     ;MODEM RECEIVE BUFFER
95:  005C          MT0BUF  EQU     MRBUF+MRBSZ     ;MODEM TRANSMIT BUFFER#1
96:  006E          MT1BUF  EQU     MT0BUF+MTBSZ    ;MODEM TRANSMIT BUFFER#2
97:  0080          ERAM    EQU     MT1BUF+MTBSZ    ;END OF RAM(82H IS FULL)
98:
99:
100: AVOCET SYSTEMS 8048 CROSS-ASSEMBLER - VERSION 1.63
101:
102: NONWIRE(TM) SLAVE VER 2.04 (C) 1984  CONTROLONICS CORP
103:
104:
105:                ;
106:                ;       USRT EQUATES
107:                ;
108: 00F7          INITP2  EQU     0F7H            ;INITIAL P2 OUTPUT
109: 0080          MCLR    EQU     080H            ;USRT RESET ADDRESS
110: 0001          DLY     EQU     001H            ;USRT RESET DELAY
111: 0020          CSEL    EQU     20H             ;CHIP SELECT
112: 0010          ICMD    EQU     010H            ;CLEAR ERRORS,CLEAR RTS,CLEAR DTR
113: 0040          RESET   EQU     040H            ;RESET USRT
114: 0040          CTRLM   EQU     40H             ;CONTROL MODE  (D BIT ON 8251)
115: 0038          RCERR   EQU     038H            ;RECEIVE CHAR ERROR MASK
116: 0007          DTREN   EQU     07H             ;RECEIVER ENABLE,DTR,XMIT ENABLE
117: 0010          ERRST   EQU     10H             ;ERRORESET
118: 0005          DTRDIS  EQU     05H             ;RECEIVE ENABLE,NO DTR,XMIT ENABLE
119: 0020          RTSH    EQU     20H             ;RTS MASK
```

```
120:         ;==========================================================
121:         ;                EQUATES FOR MODEM CONTROL
122:         ;==========================================================
123:         ;
124:         ;        REGISTER ASSIGNMENTS BANK 1
125:         ;
126: 0A05    XREG    EQU    R5              ;SHIFT REGISTER (1D)
127: 0A04    STATE   EQU    R4              ;MODEM STATE# (1C)
128: 0A03    XCNTRT  EQU    R3
129: 0A02    FLAGSS  EQU    R2              ;CONTROL FLAGS (1A)
130: 0A01    XPTR    EQU    R1              ;XMIT BUFFER POINTER (19)
131: 0A01    RDATA   EQU    R1              ;RECEIVED DATA BUFFER (19)
132: 0A00    ATEMP   EQU    R0              ;REGISTER A SAVE (18)
133:         ;NOTE
134:         ;       1)RESITERS R0-R5 RESERVED FOR CLOCK INTERRUPT SERVICE
135:         ;          REGISTERS R6-R7 USED AS GENERAL PURPOSED RAM
136:         ;       2)F1 USED BY INTERRUPT ROUTINE TO SIGNAL RECEIVE TIMEOUT AND IS
137:         ;          UNAVAILABLFOR OTHER USES.
138:         ;
139:         ;       FLAG BYTE CONSTANTS MODEM
140:         ;
141: 0080    PARAC   EQU    080H            ;PARITY ACCUMULATER
142: 0040    BITX    EQU    040H            ;TRANSMIT NEXT BIT TO OUUT FLAG
143: 0004    VERR    EQU    004H            ;HORIZONTAL PARITY ERROR
144: 0002    ERR     EQU    002H            ;RECEIVE CHARACTER ERROR.SET BY INTERRUPT
145: 0000                                   ;SERVICER ON OVERUN,OR FRAMING ERROR.MUST
146: 0000                                   ;BE CLEARED BY APPLICATION
147: 0001    RCAV    EQU    001H            ;SET BY INTERRUPT ROUTINE WHEN CHARACTER IS
148: 0000                                   ;AVAILLE IN RDATA RESET BY APPLICATION.
149:         ;
150:         ;       MISC EQUATES MODEM
151:         ;
152: FFFE    TQBIT   EQU    -2              ;1/4 BIT CLOCK RELOAD CONSTANT
153: FFF8    TOBIT   EQU    (4*TQBIT)       ;1 BIT CLOCK RELOAD CONSTANT
154:         ;
155:         ; OUTPUT:
156:
157:
158: AVOCET SYSTEMS 8048 CROSS-ASSEMBLER - VERSION 1.63
159:
160: NONWIRE(TM) SLAVE VER 2.04 (C) 1984  CONTROLONICS CORP
161:
162:
163:         ; A MARK= 0 OUTPUT ON P23----) 1 DATA BIT
164:         ; A SPACE=1 OUTPUT ON P23----) 0 DATA BIT
165:         ; INPUT:
166:         ; A MARK= 1 ON T1 ----) 1 DATA BIT
167:         ; A SPACE=0 ON T1 ----) 0 DATA BIT
168:         ;
169: 0008    MARK    EQU    008H            ;MARK BIT
170:
171:
172: AVOCET SYSTEMS 8048 CROSS-ASSEMBLER - VERSION 1.63
173:
174: NONWIRE(TM) SLAVE VER 2.04 (C) 1984  CONTROLONICS CORP
175:
```

```
176:
177: 0000                         ORG     000H
178:                       ;
179:                       ;     POWER ON RESET
180:                       ;
181: 0000 00                      NOP                     ;BURN 1 INSTRUCTION
182: 0001 040A                    JMP     INIT            ;GO INITIALIZE
183: 0003                         ORG     003H
184:                       ;EXTERNAL INTERRUPTS
185: 0003 15                      DIS     I               ;SHOULD NEVER GET
186: 0004 83                      RET
187: 0005 E411            UARTT:  JMP     UART            ;GO PROCESS TIMER INTERRUPT
188:                       ;TIMER INTERRUPTS
189: 0007                         ORG     007H
190: 0007 1605                    JTF     UARTT           ;TIMER FLAG TEST + CLEAR
191: 0009 93                      RETR                    ;NOT SET ???,RETURN
192:
193:
194: AVOCET SYSTEMS 8048 CROSS-ASSEMBLER -  VERSION 1.63
195:
196: NONWIRE(TM) SLAVE VER 2.04 (C) 1984  CONTROLONICS CORP
197:
198:
199:                       ;
200:                       ;SYSTEM INITIALIZATION CALLED ON RESET
201:                       ;
202:                       ;     1)STACK PTR=0
203:                       ;     2)REGISTEBANK=0
204:                       ;     3)MEMORY BANK=0
205:                       ;     4)PORTS 1 AND 2 ALL LOADED WITH 1'S
206:                       ;     5)INTERRUPTS DISABLED (BOTH EXTERNAL+TIMER)
207:                       ;     6)TIMER STOPPED
208:                       ;     7)F0=0,F1=0
209:                       ;     8)CLOCK OUTPUT ON T0 DISABLED
210: 000A 15              INIT:   DIS     I               ;DISABLE INTERRUPTS
211: 000B 35                      DIS     TCNTI           ;DISABLE TIMER COUNTER INTERRUPTS
212: 000C 65                      STOP    TCNT            ;STOP TIMER COUNTER
213: 000D 27                      CLR     A               ;ZERO PSW,RESETS STACK TO 0
214: 000E D7                      MOV     PSW,A
215: 000F 85                      CLR     F0              ;CLEAR FLAGS
216: 0010 A5                      CLR     F1
217: 0011 C5                      SEL     RB0             ;SELECT REGISTER BANK 0
218: 0012 E5                      SEL     MB0             ;SELECT MEMORY BANK 0
219: 0013 B87F                    MOV     R0,#TOPRAM      ;CLEAR ALL OF RAM
220: 0015 27                      CLR     A
221: 0016 A0              INIT1:  MOV     @R0,A
222: 0017 E816                    DJNZ    R0,INIT1
223:                       ;
224:                       ;     INITIAL 8255 BUT LEAVE RX AND TX DISABLED
225:                       ;
226: 0019 75                      ENT0    CLK             ;START 8251 CLOCK
227:                       ;     P27 = 1         MASTER RESET
228:                       ;     P26 = 1         C OF C/D
229:                       ;     P25 = 1         NO CHIP SELECT
230:                       ;     P24 = 1         MASTER/SLAVE INPUT
231:                       ;     P23 = 0         MODEM XMIT DATA=MARK
```

```
232:                    ;       P22 = 1         RESET ALARM
233:                    ;       P21, P20 = 1    RITY INPUTS
234:  001A 23F7                 MOV     A,#INITP2       ;SET INITIAL STATE OF ALL
235:  001C 3A                   OUTL    P2,A            ;P2 OUTPUTS
236:  001D E81D         INIT2:  DJNZ    R0,INIT2
237:  001F 9A5F                 ANL     P2,#NOT MCLR+CSEL ;RCVE RESET AND SELECT 8251
238:  0021 27                   CLR     A               ;BUG IN CHIP MAY NOT INITIALIZE
239:  0022 90                   MOVX    @R0,A           ;CORRECTLY IF NOT IN MODE
240:  0023 90                   MOVX    @R0,A           ;STATE, ZEROS AND INTERNAL
241:  0024 90                   MOVX    @R0,A           ;RESET WILL GET YOU THERE
242:  0025 2340                 MOV     A,#RESET        ;REGARDLESS OF WHAT THE DAMN
243:  0027 90                   MOVX    @R0,A           ;CHIP DOES ON POWER ON/RESET
244:  0028 8A23                 ORL     P2,#PARTYM+CSEL ;OUTPUT MASK TO READ PARITY STRAPS/DE-SEL 8251
245:  002A 0A                   IN      A,P2            ;GET THE MODE WORD TO WRITE
246:  002B 5303                 ANL     A,#3            ;TO THE CHIP.X16,1 STOP BIT,
247:  002D E3                   MOVP3   A,@A            ;8 DATA BITS,PARITY FUNTION OF STRAPS
248:  002E 9ADF                 ANL     P2,#NOT CSEL    ;SELECT 8251
249:  0030 90                   MOVX    @R0,A
250:
251:
252: AVOCET SYSTEMS 8048 CROSS-ASSEMBLER - VERSION 1.63
253:
254: NONWIRE(TM) SLAVE VER 2.04 (C) 1984  CONTROLONICS CORP
255:
256:
257:  0031 2310                 MOV     A,#ICMD         ;CLEAR ERRORS RTS AND DTR.
258:  0033 90                   MOVX    @R0,A           ;RX AND TX DISABLED
259:  0034 8A20                 ORL     P2,#CSEL        ;DE-SELECT 8251
260:                    ;
261:                    ;       INITIALIZE RAM POINTERS
262:                    ;
263:  0036 B821                 MOV     R0,#HRGPTR      ;SET HOST RECEIVE GET POINTER
264:  0038 B027                 MOV     @R0,#HRBUF      ;TO START UP RECEIVE BUFFER
265:  003A 18                   INC     R0
266:  003B 18                   INC     R0              ;SETOST RECEIVE PUT POINTER
267:  003C B027                 MOV     @R0,#HRBUF      ;TO START OF RECEIVE BUFFER
268:  003E 18                   INC     R0              ;SET HOST TRANSMIT GET POINTER
269:  003F B03A                 MOV     @R0,#HXBUF      ; START OF TRANSMIT BUFFER
270:  0041 18                   INC     R0
271:  0042 18                   INC     R0              ;SET HOST TRANSMIT PUT POINTER
272:  0043 B03A                 MOV     @R0,#HXBUF      ;TO START OF TRANSMIT BUFFER
273:                    ;
274:                    ;       SET SEQUENCE # IN TRANSMIT BUFFER 0=0, IN #1=1
275:                    ;       SET SLAVE ADDRESS IN TRANSMIT BUFFER
276:                    ;       NOTE: MTBUF0 IS ALL ZERO AFTER INITIALIZATION
277:  0045 B86E                 MOV     R0,#MT1BUF      ;SET SEQUENCE #INUFFER
278:  0047 B010                 MOV     @R0,#SEQBIT     ;#1 TO 1
279:  0049 18                   INC     R0              ;STORE ADDRESS OF SLAVE IN BOTH
280:  004A 09                   IN      A,P1            ;OF THE TRANSMIT BUFFERS
281:  004B A0                   MOV     @R0,A
282:  004C B85D                 MOV     R0,#MT0BUF+1
283:  004E A0                   MOV     @R0,A
284:                    ;
285:                    ;       START UART, RX +TX ENABLE, DTR ON
286:                    ;
287:  004F 2317                 MOV     A,#DTREN+ERRST
```

```
288: 0051 9ADF              ANL    P2,#NOT CSEL    ;SELECT 8251
289: 0053 90                MOVX   @R0,A
290: 0054 8A20              ORL    P2,#CSEL        ;DE-SELECT 8251
291:                 ;
292:                 ;      START CLOCK AND ALLOW 1 BIT TIME TO INITIALIZE
293:                 ;
294: 0056 23F8              MOV    A,#T0BIT        ;LOAD TIMER
295: 0058 62                MOV    T,A
296: 0059 55                STRT   T               ;START TIMER
297: 005A 25                EN     TCNTI           ;ENABLE TIMER INTERRUPTS
298: 005B 2400              JMP    START           ;GO START UP MODEM
299:
300:
301: AVOCET SYSTEMS 8048 CROSS-ASSEMBLER - VERSION 1.63
302:
303: NONWIRE(TM) SLAVE VER 2.04 (C) 1984  CONTROLONICS CORP
304:
305:
306: 0100                   ORG    100H
307:                 ;
308:                 ;      RESET TEST MODE FLAG AND SET 1ST TIME FLAG
309:                 ;
310: 0100 FE        START:  MOV    A,AFLAG
311: 0101 430A              ORL    A,#TESTMD+STRTUP
312: 0103 AE                MOV    AFLAG,A
313:                 ;
314:                 ;      START SLAVE SYSTEM
315:                 ;
316: 0104 8A10              ORL    P2,#MMASK       ;SET TO READ TEST MODE STRAP
317: 0106 0A                IN     A,P2
318: 0107 5310              ANL    A,#MMASK        ;TEST MODE?
319: 0109 C616              JZ     TESTS           ;YES,GO START TEST MODE
320:                 ;
321:                 ;      MAIN CONTROL LOOP SLAVE STATION
322:                 ;
323: 010B A5        SLAVE1: CLR    F1              ;CAR TIMER OVERFLOW FLAG
324: 010C 9400      SLAVE:  CALL   READM           ;GET MESSAGE IF TIMEOUT
325: 010E 760B              JF1    SLAVE1          ;READ FOREVER
326: 0110 960C              JNZ    SLAVE           ;ERROR,READ MORE
327: 0112 5400              CALL   PGOODM          ;PROCESS GOOD MESSAGE,SEND NEXT
328: 0114 240C              JMP    SLAVE           ;GET REPLY
329:                 ;
330:                 ;      STARTUP SLAVE IN TEST MODE
331:                 ;
332: 0116 FE        TESTS:  MOV    A,AFLAG         ;SET TEST MODE FLAG
333: 0117 53FD              ANL    A,#NOT TESTMD   ;FOR SLAVE AND
334: 0119 AE                MOV    AFLAG,A         ;PROCESS AS NORMAL
335: 011A 240C              JMP    SLAVE           ;MODE SLAVE
336:
337:
338: AVOCET SYSTEMS 8048 CROSS-ASSEMBLER - VERSION 1.63
339:
340: NONWIRE(TM) SLAVE VER 2.04 (C) 1984  CONTROLONICS CORP
341:
342:
343: 0200                   ORG    200H
```

```
344:              ;
345:              ;THIS ROUTINE WILL PROCESS A RECEIVED MESSAGE WHICH IS FREE OF YSICAL
346:              ;ERRORS.
347:              ;
348:              ;THIS ROUTINE *MUST* EXECUTE COMPLETELY IN 2 MODEM CHACTER TIMES
349:              ;AFTER TRANSMIT STARTS.
350:              ;
351:              ;NOTE: THIS CHARACTER WILL ALSO CHECK LRC + NAK
352:              ;     USES 2 SUBROUTINE LEVELS
353: 0200 FD      PGOODM: MOV    A,LRC
354: 0201 DB              XRL    A,LASTC      ;LRC GOOD
355: 0202 96BA            JNZ    PGOXIT       ;NO, IGNORE MESSAGE
356: 0204 09              IN     A,P1         ;DOES THE GOOD MESSAGE
357: 0205 DA              XRL    A,TEMP       ;HAVE OUR ADDRESS?
358: 0206 C61C            JZ     PGOOD1       ;YES
359: 0208 FE              MOV    A,AFLAG      ;NO, SET STARTUP FLAG
360: 0209 4308            ORL    A,#STRTUP    ;SINCE SOMEBODY ELSE IS TALKING
361: 020B 53FB            ANL    A,#NOT DATAS ;CLEAR DATA SEEN FLAG
362: 020D AE              MOV    AFLAG,A
363: 020E FA              MOV    A,TEMP       ;GET ADDRESS BACK
364: 020F 96BA            JNZ    PGOXIT       ;IS NOT A BROADCAST,THATS IT EXIT
365: 0211 FF              MOV    A,FIRSTC     ;IS BROADCAST, IF DATA IN MESSAGE
366: 0212 530F            ANL    A,#0FH       ;THEN GO SEND OUT TO SLAVE
367: 0214 C6BA            JZ     PGOXIT       ;NO DATA, IGNORE BROADCAST
368: 0216 B451            CALL   CHKOUT       ;IS DATA,MAKE SURE IT WILL
369: 0218 F6BA            JC     PGOXIT       ;FIT IN THE BUFFER ELSE EXIT
370: 021A 4484            JMP    PGOD10       ;WILL FIT GO SEND TO SLAVE
371: 021C B451    PGOOD1: CALL   CHKOUT       ;WILL DATA FIT IN BUFFER?
372: 021E F6BA            JC     PGOXIT       ;NO, IGNORE MESSAGE
373: 0220 FF              MOV    A,FIRSTC
374: 0221 5320            ANL    A,#RESTRT    ;MESSAGE IS RESTART?
375: 0223 963B            JNZ    PGD014       ;YES
376:              ;
377:              ;       MESSAGE IS NOT A RESTART(IE ADDRESS SEQURNCE)
378:              ;
379: 0225 FE              MOV    A,AFLAG      ;IF RESTART FLAG IS SET THEN POWER
380: 0226 72BA            JB3    PGOXIT       ;FAILED ON SLAVE,WAIT FOR ADDRESS
381: 0228 4304            ORL    A,#DATAS     ;SET DATA SEEN FLAG
382: 022A AE              MOV    AFLAG,A
383: 022B DF              XRL    A,FIRSTC     ;THE MESSAGE IS FOR USE
384: 022C 5310            ANL    A,#RSEQ      ;NEW DATA
385: 022E 9675            JNZ    PGOOD2       ;YES
386:              ; OLD DATA, LRC IS GOOD
387: 0230 FE      PGOOD4: MOV    A,AFLAG      ;IF IN TEST MODE
388: 0231 3235            JB1    PGOOD13      ;THEN GO RETRANSMIT WITH ACK
389: 0233 A433    PGOOD9: JMP    RETRAK
390: 0235 FF      PGOOD13:MOV    A,FIRSTC     ;NO
391: 0236 F7              RLC    A            ;DID WE GET A NAK
392: 0237 F633            JC     PGOOD9       ;YES, RETRANSMIT
393: 0239 A43E            JMP    SNEXT        ;NO, SEND NEXT BUFFER
394:
395:
396: AVOCET SYSTEMS 8048 CROSS-ASSEMBLER - VERSION 1.63
397:
398: NONWIRE(TM) SLAVE VER 2.04 (C) 1984  CONTROLONICS CORP
399:
```

```
400:
401:         ;
402:         ; RESTART ON THE MODEM IS REQUIRED
403:         ;
404:         ;
405:         ; 4 CASES
406:         ;    1)ACK/FLAG SET  IMPLIED ACK,RESET BUFFERS (NORMAL CASE)
407:         ;    2)NAK/FLAG CLR  RESPONSE FROM PREVIOUS CASE 1 WAS
408:         ;                    DESTROYED GOING BACK(RETRANSMIT WITH ACK)
409:         ;    3)NAK/FLAG SET  1ST ADDRESS SEQ COMING OVER DESTROYED
410:         ;                    TREAT SAME AS CASE 1
411:         ;    4)ACK/FLAG CLR  MASTER POWERED OFF AND SLAVE DIDNT TREAT
412:         ;                    SAME AS CASE 1
413: 023B FF        PGD014: MOV   A,FIRSTC
414: 023C F7                RLC   A               ;ACK?
415: 023D E648              JNC   PGD015          ;YES
416: 023F FE                MOV   A,AFLAG         ;NO,STARTUP FLAG SET
417: 0240 5308              ANL   A,#STRTUP
418: 0242 C6BF              JZ    PG1             ;NOT SET
419: 0244 FF        PG2:    MOV   A,FIRSTC        ;CLEAR NAK BI1
420: 0245 537F              ANL   A,#NOT NAKBIT   ;SINCE CASE 3
421: 0247 AF                MOV   FIRSTC,A        ;REDUCES TO CASE 1
422: 0248 B661     PGD015:  JF0   PGD012          ;IF CURRENT BUFFER=1 ALL SET
423: 024A B86E              MOV   R0,#MT1BUF      ;IS ZERO,COPY WHAT IS
424: 024C B95C              MOV   R1,#MT0BUF      ;IN BUFFER 1 TO BUFFER 0
425: 024E F0                MOV   A,@R0           ;AND SET BUFFER 1
426: 024F B010              MOV   @R0,#NUACK1     ;CLEAR OUT BUFFER #1
427: 0251 530F              ANL   A,#0FH          ;AS ACTIVE BUFFER
428: 0253 A1                MOV   @R1,A           ;SET COUNT IN BUFFER 0
429: 0254 17                INC   A               ;AN APPLIED ACK IS ASSUMED
430: 0255 AD                MOV   LRC,A           ;FOR OLD BUFFER 0 AND WE
431: 0256 18       PGD013:  INC   R0              ;ALWAYS WANT TO START
432: 0257 19                INC   R1              ;WITH SEQUENCE # 0 FROM
433: 0258 F0                MOV   A,@R0           ;BUFFER 0
434: 0259 A1                MOV   @R1,A           ;SEND NEXT WILL THEREFORE
435: 025A ED56              DJNZ  LRC,PGD013      ;TRANSFER FROM BUFFER 0
436: 025C 95                CPL   F0
437: 025D FF                MOV   A,FIRSTC        ;RESTORE LRC TO THE NUMBER
438: 025E 530F              ANL   A,#0FH          ;DATA CHARACTERS
439: 0260 AD                MOV   LRC,A
440: 0261 FE       PGD012:  MOV   A,AFLAG
441: 0262 3268              JB1   PGD016          ;TEST MODE?
442: 0264 B85C              MOV   R0,#MT0BUF      ;YES,SET COUNT ETC IN MODEM
443: 0266 B000              MOV   @R0,#NUACK0     ;BUFFER 1 TO 0
444: 0268 FE       PGD016:  MOV   A,AFLAG         ;GET FLAGS
445: 0269 53FB              ANL   A,#NOT DATAS    ;CLEAR DATA SEEN FLAG
446: 026B AE                MOV   AFLAG,A
447: 026C DF                XRL   A,FIRSTC        ;SET LAST RECEIVED S #
448: 026D 5310              ANL   A,#RSEQ         ;SO IT IS DIFFERENT FROM THE
449: 026F 3675              JNZ   PGOOD2          ;ONE RECEIVED ON ADDRESS MESSAGE
450: 0271 FE                MOV   A,AFLAG         ;SINCE ADDRESS GOOD MESSAGEY
451: 0272 D310              XRL   A,#RSEQ         ;DEFINITION IS A NEW MESSAGE
452:
453:
454: AVOCET SYSTEMS 8048 CROSS-ASSEMBLER - VERSION 1.63
455:
```

```
456: NONWIRE(TM) SLAVE VER 2.04 (C) 1984  CONTROLONICS CORP
457:
458:
459: 0274 AE                  MOV     AFLAG,A
460:
461:
462: AVOCET SYSTEMS 8048 CROSS-ASSEMBLER - VERSION 1.63
463:
464: NONWIRE(TM) SLAVE VER 2.04 (C) 1984  CONTROLONICS CORP
465:
466:
467:                          ;
468:                          ;       NEW DATA, LRC IS GOOD
469:                          ;
470: 0275 FF        PGOOD2:   MOV     A,FIRSTC
471: 0276 530F                ANL     A,#0FH           ;ANY DATA
472: 0278 9684                JNZ     PGOOD10          ;IS NEW DATA WITH CHARACTER
473: 027A FE                  MOV     A,AFLAG          ;MESSAGE IS NULL, UPDATE
474: 027B D310                XRL     A,#RSEQ          ;EPECTED SEQUENCNUMBER
475: 027D 53F7                ANL     A,#NOT STRTUP    ;CLEAR STARTUP FLAG
476: 027F AE                  MOV     AFLAG,A          ;AND GO SEND NEXT BUFFER
477: 0280 3235                JB1     PGOOD13          ;TEST MODE
478: 0282 A43E                JMP     SNEXT            ;YES,SEND NEXT BUFFER
479: 0284 FD        PGOOD10:  MOV     A,LRC            ;GET # CHARACTERS
480: 0285 2A                  XCH     A,TEMP           ;TEMP=LRC=# BYTES DATA,A=ADDRESS
481: 0286 C69B                JZ      PGOOD12          ;IF BROADCAST GO TRANSFER DATA
482: 0288 FE                  MOV     A,AFLAG          ;CLEAR STARTUP
483: 0289 53F7                ANL     A,#NOT STRTUP    ;FLAG
484: 028B AE                  MOV     AFLAG,A
485: 028C FF                  MOV     A,FIRSTC         ;WILL GO. NEW DATA
486: 028D F7                  RLC     A                ;O.K.
487: 028E E693                JNC     PGOOD5           ;IF NAK SENDAST
488:                          ;
489:                          ; SEQUENCE NUMBERS DIFFERENT AND NAK RECEIVED
490:                          ;
491: 0290 FE                  MOV     A,AFLAG          ;IF TEST MODE THEN
492: 0291 32BB                JB1     PGOOD14          ;TREAT THE SAME AS AN ACK
493: 0293 D475     PGOOD5:    CALL    LOOPBK           ;LOOPBACK MESSAGE
494: 0295 B43E                CALL    SNEXT            ;ACK SEND NEXT BUFFER WITH ACK
495: 0297 FE       PGOOD6:    MOV     A,AFLAG          ;UPDATE EXPECTED
496: 0298 D310                XRL     A,#RSEQ          ;SEQUENCE #
497: 029A AE                  MOV     AFLAG,A
498:
499:
500: AVOCET SYSTEMS 8048 CROSS-ASSEMBLER - VERSION 1.63
501:
502: NONWIRE(TM) SLAVE VER 2.04 (C) 1984  CONTROLONICS CORP
503:
504:
505:                          ;
506:                          ;COPY INPUT MESSAGE TO OUTPUT BUFFER TO HOST
507:                          ;
508: 029B FE       PGOOD12:   MOV     A,AFLAG          ;IF TEST MODE THEN
509: 029C 329F                JB1     PGOOD15          ;NO OUTPUT
510: 029E 83                  RET
511: 029F B84D     PGOOD15:   MOV     R0,#MRBUF        ;PTR TO INPUT DATA=R0
```

```
512: 02A1 B926              MOV    R1,#HXPTR     ;R1= PUT POINTER
513: 02A3 F1               MOV    A,@R1
514: 02A4 A9               MOV    R1,A
515: 02A5 F0       PG00D7: MOV    A,@R0         ;MOVE NEXT CHARACTER
516: 02A6 A1               MOV    @R1,A         ;
517: 02A7 18               INC    R0            ;INCREMENT MODEM PTR
518: 02A8 19               INC    R1            ;ADVANCE HOST TRANSMIT BUFFER
519: 02A9 F9               MOV    A,R1          ;HOST TRANSMIT BUFFER PUT PTR
520: 02AA 03B3             ADD    A,#-MRBUF
521: 02AC 96B0             JNZ    PG00D8
522: 02AE B93A             MOV    R1,#HXBUF
523: 02B0 EAA5     PG00D8: DJNZ   TEMP,PG00D7   ;MORE CHARACTERS
524: 02B2 B826             MOV    R0,#HXPTR     ;NO,UPDATE HOST
525: 02B4 F9               MOV    A,R1          ;TRANSMIT PUT POINTER
526: 02B5 A0               MOV    @R0,A
527: 02B6 C8               DEC    R0
528: 02B7 FD               MOV    A,LRC         ;ADD #OF CHARACTERS
529: 02B8 60               ADD    A,@R0         ;TRANSFERRED TO
530: 02B9 A0               MOV    @R0,A         ;HOST XMIT BUFFER COUNT
531: 02BA 83       PGOXIT: RET
532: 02BB B433     PG0014: CALL   RETRAK        ;RETRANSMIT WITH ACK
533: 02BD 4497             JMP    PG00D6        ;GO UPDATE EXPECTED RECEIVE SEQ
534:                  ;
535:                  ;    ABNORMAL CASE WHERE SLAVE RE-ADDRESSED(IE WAS ALREADY
536:                  ;    ADDRESSED) AND 1ST ADDRESS SEQUENCE WAS NOT SEEN BY SLAVE
537:                  ;
538: 02BF FE       PG1:    MOV    A,AFLAG       ;HAVE WE ALREADY SEEN
539: 02C0 5244             JB2    PG2           ;DATA?,YES,IS ABNORMAL CASE
540: 02C2 85               CLR    F0            ;???????MUST FIGURE OUT
541: 02C3 A433             JMP    RETRAK        ;NO,NORMAL CASE
542:
543:
544: AVOCET SYSTEMS 8048 CROSS-ASSEMBLER - VERSION 1.63
545:
546: NONWIRE(TM) SLAVE VER 2.04 (C) 1984  CONTROLONICS CORP
547:
548:
549: 0300                   ORG    300H
550:                  ;
551:                  ;THE FOLLOWING IS A TABLE OF MODE WORDS FOR 81 INITIALIZE.
552:                  ;INDEX IS P20,P21
553:                  ; .X16 CLOCK
554:                  ; .#DATA BITS=8
555:                  ; .1 STOP BIT
556:                  ;PARITY IS FUNCTION OF DIPS
557:                  ;
558: 0300 7A       MTABLE: DB     07AH          ;P20=0 P21=0 --)EVEN,7 BIT
559: 0301 4E               DB     04EH          ;P20=0 P21=1 --)NO PARITY,8 BIT
560: 0302 7E               DB     07EH          ;P20=1 P21=0 --)EVEN,8 BIT
561: 0303 5E               DB     05EH          ;P20=1 P21=1 --)ODD,8 BIT
562:
563:
564: AVOCET SYSTEMS 8048 CROSS-ASSEMBLER - VERSION 1.63
565:
566: NONWIRE(TM) SLAVE VER 2.04 (C) 1984  CONTROLONICS CORP
567:
```

```
568:
569: 0400                  ORG 400H
570:
571:            ;THIS ROUTINE WILL AD A MESSAGE FROM THE MODEM.
572:            ;HOST INTERFACE IS CONTINUOUSLY UPDATED.
573:            ;TRANSFERS ARE CONTINUOUSLY MADE TO ALTERNATE MODEM TRANIT BUFFER.
574:            ;
575:            ;RETURN
576:            ;      F1=1 TIMEOUT
577:            ;      A=1 IF ERROR
578:            ;      A=0 IF NO ERROR
579:            ;IF NO ERROR DATA PORTION OF MESSAGE IS IN MRBUF.
580:            ;FIRSTC=CONTROL BYTE (IE. FIRST IN MESSAGE)
581:            ;TEMP=ADDRESS RECEIVED IN MESSAGE
582:            ;LASTC=READ LRC, LRC=COMPUTED LRC
583:            ;SUBROUTINES CALLED (USES THREE LEVELS)
584:            ;
585: 0400 9482  READM:  CALL  CPROC          ;GET 1ST CHARACTER
586: 0402 7651          JF1   RM1            ;TIMEOUT
587: 0404 C60E          JZ    RM2            ;NO, 1ST CHARACTER BAD
588: 0406 B428  RM3A:   CALL  NAKINC         ;INC NAK COUNTER FOR QUALITY
589: 0408 9482  RM3:    CALL  CPROC          ;YES, READ CHARACTERS
590: 040A 7651          JF1   RM1            ;UNTIL TIMEOUT
591: 040C 8408          JMP   RM3
592: 040E FE    RM2:    MOV   A,AFLAG        ;CLEAR ERROR FLAG
593: 040F 53FE          ANL   A,#NOT CBAD
594: 0411 AE            MOV   AFLAG,A
595: 0412 F9            MOV   A,R1           ;GET CHARACTER + SAVE
596: 0413 AF            MOV   FIRSTC,A
597: 0414 AD            MOV   LRC,A          ;INPUT RUNNING LRC
598: 0415 9482          CALL  CPROC          ;GET ADDRESS CHARACTER
599: 0417 764D          JF1   RM10           ;EXIT ON TIMEOUT
600: 0419 9606          JNZ   RM3A           ;IF BAD, READ UNTIL TIMEOUT AND EXIT
601: 041B F9            MOV   A,R1           ;SAVE ADDRESS CHARACTER
602: 041C AA            MOV   TEMP,A
603: 041D DD            XRL   A,LRC          ;INCLUDE ADDRESS CHAARCTER
604: 041E AD            MOV   LRC,A
605: 041F FF            MOV   A,FIRSTC
606: 0420 530F          ANL   A,#0FH         ;ANY DATA
607: 0422 C63C          JZ    RM4            ;NO
608: 0424 BB4D          MOV   LASTC,#MRBUF   ;YES, SET PTR TO START OF TA
609: 0426 AC            MOV   CCOUNT,A       ;SET COUNT ON #DATA CHARS
610: 0427 9482  RM5:    CALL  CPROC          ;GET NEXT CHARACTER
611: 0429 764D          JF1   RM10           ;EXIT ON TIMEOUT
612: 042B C633          JZ    RM6            ;ERROR
613: 042D FE            MOV   A,AFLAG        ;YES, SET BAD FLAG
614: 042E 4301          ORL   A,#CBAD
615: 0430 AE            MOV   AFLAG,A
616: 0431 843A          JMP   RM7
617: 0433 F9    RM6:    MOV   A,R1           ;GET CHAR
618: 0434 DD            XRL   A,LRC          ;UPDATE LRC
619: 0435 AD            MOV   LRC,A
620:
621:
622: AVOCET SYSTEMS 8048 CROSS-ASSEMBLER - VERSION 1.63
623:
```

624: NONWIRE(TM) SLAVE VER 2.04 (C) 1984 CONTROLONICS CORP
625:
626:
```
627: 0436 FB              MOV    A,LASTC        ;STORE CHARACTER
628: 0437 29              XCH    A,R1           ;IN BUFFER
629: 0438 A1              MOV    @R1,A
630: 0439 1B              INC    LASTC          ;ADVANCE PTR
631: 043A EC27    RM7:    DJNZ   CCOUNT,RM5     ;LOOP ON CRACTER
632: 043C 9482    RM4:    CALL   CPROC          ;GET LAST CHECK CHARACTER
633: 043E 764D            JF1    RM10           ;TIMEOUT
634: 0440 964D            JNZ    RM10           ;BAD CHARACTER ON LAST CHAR, PASS ERR BACK
635: 0442 F9              MOV    A,R1           ;GOT A GOOD ONE
636: 0443 AB              MOV    LASTC,A        ;SAVE IN LASTC
637: 0444 FE              MOV    A,AFLAG        ;RETURN STATUS OF MESAGE
638: 0445 5301            ANL    A,#CBAD
639: 0447 964D            JNZ    RM10           ;ERROR
640: 0449 B41A            CALL   ACKINC         ;NO,INC ACK COUNTER
641: 044B 27              CLR    A              ;A=0
642: 044C 83              RET
643: 044D B428    RM10:   CALL   NAKINC         ;ADVANCE NAK COUNTER FOR QUALITY
644: 044F 2301            MOV    A,#1           ;RETURN A NOT ZERO
645: 0451 83      RM1:    RET
```
646:
647:
648: AVOCET SYSTEMS 8048 CROSS-ASSEMBLER - VERSION 1.63
649:
650: NONWIRE(TM) SLAVE VER 2.04 (C) 1984 CONTROLONICS CORP
651:
652:
653:              ;
654:              ;
655:              ;
656:              ;THIS ROUTINE WILL TRANSFER ONE CHARACTER FROM THE HOST RECEIVE BUFFER TO
657:              ;THE ALTERNATE MOM TRANSMIT BUFFER.
658:              ;
659:              ;REGISTERS DESTROYED = A,R1,R0
660:              ;
661:              ;TIMING
662:              ;CASE1: NO CHARACTERS    17.5 MICRO SEC
663:              ;CASE2: CHARACTER BUTUFFER FULL = 47.5 MAX
664:              ;CASE3: CHARACTER MOVED  = 92.5 MICROSEC MAX
665:              ;
666:              ;
667:              ;NO SUBROUTINES CALLED (USES 1 LEVEL)
668:              ;
669:              ;
```
670: 0452 B822    XFER:   MOV    R0,#HRCNT      ;ANYTHING IN THE
671: 0454 F0              MOV    A,@R0          ;HOST RECEIVE BUFFER
672: 0455 C67A            JZ     XFER4          ;NO,GO EXIT
673: 0457 B95C    XFER1:  MOV    R1,#MT0BUF     ;SET R0=PTR TO
674: 0459 B65D            JF0    XFER2          ;TRANSMIT BUFFER
675: 045B B96E            MOV    R1,#MT1BUF     ;SET R0=PTR TO
676: 045D F1      XFER2:  MOV    A,@R1          ;GET 1ST BYTE
677: 045E 17              INC    A              ;INC COUNT
678: 045F 530F            ANL    A,#0FH         ;IF OVERFLOW THEN
679: 0461 C679            JZ     XFER3          ;BUFFER FULL + EXIT
```

```
680: 0463 11            INC    @R1              ;UPDATE COUNT IN MODEM TBUF
681: 0464 69            ADD    A,R1             ;GET POINTER TO NEXT MODEM BUFFER
682: 0465 17            INC    A                ;UNUSED CHARACTER SLOT
683: 0466 A9            MOV    R1,A
684: 0467 F0            MOV    A,@R0            ;DECREMENT COUNT ON NUMBER
685: 0468 07            DEC    A                ;CHARACTERS IN HOST
686: 0469 A0            MOV    @R0,A            ;RECEIVE BUFFER
687: 046A C8            DEC    R0
688: 046B F0            MOV    A,@R0            ;A=HOST RECEIVE GET POINTER
689: 046C A8            MOV    R0,A
690: 046D F0            MOV    A,@R0            ;COPY CHARACTER OVER
691: 046E A1            MOV    @R1,A            ;INCREMENT GET POINTER
692: 046F B821          MOV    R0,#HRGPTR
693: 0471 10            INC    @R0
694: 0472 F0            MOV    A,@R0            ;IF OVERFLOW WRAP
695: 0473 03C6          ADD    A,#-HXBUF        ;AROUND TO BEGINNING OF BUFFER
696: 0475 9679          JNZ    XFER3
697: 0477 B027          MOV    @R0,#HRBUF
698: 0479 83     XFER3: RET
699: 047A 2307   XFER4: MOV    A,#DTREN         ;BUFFER IS EMPTY SET DTR
700: 047C 9ADF          ANL    P2,#NOT CSEL     ;SELECT 8251
701: 047E 90            MOVX   @R0,A            ;SET DTR,RX,TX ENABLES
702: 047F 8A20          ORL    P2,#CSEL         ;DE-SELECT 8251
703: 0481 83            RET
704:
705:
706: AVOCET SYSTEMS 8048 CROSS-ASSEMBLER - VERSION 1.63
707:
708: NONWIRE(TM) SLAVE VER 2.04 (C) 1984  CONTROLONICS CORP
709:
710:
711:                    ;
712:                    ;READ CHARACTER MODEM, UPDATE HOST AND ALTERNATE TRANSMIT
713:                    ;
714:                    ;
715:                    ;      R0,R1,A DESTROYED
716:                    ;      RTF1 = 1 TIMEOUT R0,R1,A INDETERMINATE
717:                    ;      RTN F0 = 0 A = CHAR STATUS, R1 = CHARACTER, R0 = UNDEFINED
718:                    ;      IF A=0,NO ERROR, ELSE BIT = OVERRUN/FRAMING
719:                    ;                        BIT 2 = PARITY
720:                    ;      SUBROUTINES CALLED (USES TWO LEVELS)
721:                    ;
722:                    ;
723:                    ;
724: 0482 76AD   CPROC: JF1    CPROC1           ;IF TIMEOUT
725: 0484 B81A          MOV    R0,#UFLAG        ;GET RECEIVE CHAR
726: 0486 F0            MOV    A,@R0            ;STATUS
727: 0487 129F          JB0    CPROC2           ;IS A CHARACTER
728: 0489 D424          CALL   READH            ;READ HOST INP IF ANY
729: 048B 76AD          JF1    CPROC1           ;IF TIMEOUT EXIT
730: 048D B81A          MOV    R0,#UFLAG        ;GET RECEIVE FLAGS
731: 048F F0            MOV    A,@R0            ;CHARACTER AVAILABLE
732: 0490 129F          JB0    CPROC2           ;YES
733: 0492 D400          CALL   SENDHT           ;NO,SEND TO HOST IF ANYTHING
734: 0494 76AD          JF1    CPROC1           ;EXIT IF TIMEOUT
735: 0496 B81A          MOV    R0,#UFLAG        ;IS A CHARACTER
```

```
736:  0498 F0               MOV     A,@R0           ;AVAILAB'
737:  0499 129F              JB0    CPROC2           ;YES
738:  049B 9452              CALL   XFER             ;NO, TRANSFER TO ALTERNATE BUFFER
739:  049D 8482              JMP    CPROC
740:  049F 35      CPROC2:   DIS    TCNTI            ;DISABLE CLOCK INTERRUUPT
741:  04A0 F0                MOV    A,@R0            ;READ STATUS
742:  04A1 A9                MOV    R1,A             ;SAVE STATUS
743:  04A2 53F8              ANL    A,#NOT(VERR+ERR+RCAV)  ;GET ERRORS+CHAR AVAILABLE
744:  04A4 A0                MOV    @R0,A            ;UPDATE STAS
745:  04A5 C8                DEC    R0               ;SET PTR TO CHAR
746:  04A6 F0                MOV    A,@R0            ;READ CHARACTER
747:  04A7 25                EN     TCNTI            ;ENABLE CLOCK INTERRUPT
748:  04A8 16AE              JTF    CPROC3           ;OVERFLOW
749:  04AA 29      CPROC4:   XCH    A,R1             ;CHAR TO R1
750:  04AB 5306              ANL    A,#VERR+ERR      ;STATUS TO A
751:  04AD 83      CPROC1:   RET
752:  04AE F411    CPROC3:   CALL   UART             ;SIMULATE
753:  04B0 84AA              JMP    CPROC4           ;INTERRUPT
754:
755:
756: AVOCET SYSTEMS 8048 CROSS-ASSEMBLER - VERSION 1.63
757:
758: NONWIRE(TM) SLAVE VER 2.04 (C) 1984  CONTROLONICS CORP
759:
760:
761:  0500                   ORG    500H
762:              ;
763:              ;         RETRANSMIT CURRENT BUFFER WITH NAK.  R0, A DESTROYED
764:              ;
765:  0500 B86E    RETRAN:   MOV    R0,#MT1BUF       ;SET POINTER TO
766:  0502 B606              JF0    RETRA1           ;RRENT TRANSMIT
767:  0504 B85C              MOV    R0,#MT0BUF       ;BUFFER
768:  0506 F0      RETRA1:   MOV    A,@R0            ;SET NAK BIT
769:  0507 4380              ORL    A,#NAKBIT        ;IN FIRST BYTE OF BUFFER
770:  0509 A0      RETRA3:   MOV    @R0,A
771:  050A 23FE    RETRA2:   MOV    A,#TQBIT         ;CRITICAL REGION PREVENT
772:  050C 62                MOV    T,A              ;TIMER INTERRUPT BY RESTARTING
773:  050D 2319              MOV    A,#UPTR          ;START TRANSMISSION
774:  050F 28                XCH    A,R0             ;SET PTR TO BUFFER
775:  0510 A0                MOV    @R0,A
776:  0511 B81C              MOV    R0,#USTATE       ;SET STATE TO INITIAL
777:  0513 B005              MOV    @R0,#XSVAL       ;TRANSMIT
778:  0515 A5                CLR    F1               ;RESET OVERFLOW FLAG
779:  0516 A8                MOV    R0,A             ;GET PTR TO 1ST CHARACTER TRANSMITTED
780:  0517 F0                MOV    A,@R0            ;FROM BUFF. DID WE SEND A NAK/
781:  0518 F228              JB7    NAKINC           ;YES,GO ADVANCE NAK COUNTER
782:              ;
783:              ;         SUBROUTINE TO INC ACK COUNTER FOR QUALITY TEST
784:              ;
785:  051A B81E    ACKINC:   MOV    R0,#PKTXL        ;NO, INCREMENT # PACKETS SENT
786:  051C 10                INC    @R0              ;COUNTER D IF OVERFLOW TO 0
787:  051D F0                MOV    A,@R0            ;THEN CLEAR NAK COUNTER
788:  051E 9627              JNZ    RETRA5
789:  0520 18                INC    R0
790:  0521 10                INC    @R0
791:  0522 F0                MOV    A,@R0
```

```
792:  0523 9627           JNZ     RETRA5
793:  0525 18             INC     R0
794:  0526 A0             MOV     @R0,A
795:  0527 83    RETRA5:  RET
796:                ;
797:                ;     SUBROUTINE TO INC NAK COUNTER FOR QUALITY
798:                ;
799:  0528 B820  NAKINC:  MOV     R0,#PKTNAK    ;NAK.ADVANCE NAK COUNTER
800:  052A 10             INC     @R0           ;AND IF OVERFLOW TO THRESHOLD
801:  052B F0             MOV     A,@R0         ;THEN SET ALARM OUTPUT
802:  052C 03D4           ADD     A,#-THRMX
803:  052E E627           JNC     RETRA5
804:  0530 9AFB           ANL     P2,#NOT ALARM ;ALARM ON = LOW ON OUTPUT
805:  0532 83             RET
806:                ;
807:                ;RETRANSMIT CURRT BUFFER WITH ACK
808:                ;
809:  0533 B86E  RETRAK:  MOV     R0,#MT1BUF
810:  0535 B639           JF0     RETRK
811:  0537 B85C           MOV     R0,#MT0BUF
812:
813:
814: AVOCET SYSTEMS 8048 CROSS-ASSEMBLER - VERSION 1.63
815:
816: NONWIRE(TM) SLAVE VER 2.04 (C) 1984  CONTROLONICS CORP
817:
818:
819:  0539 F0    RETRK:   MOV     A,@R0
820:  053A 537F           ANL     A,#NOT NAKBIT
821:  053C A409           JMP     RETRA3
822:                ;
823:                ;
824:  053E 95    SNEXT:   CPL     F0            ;TOGGLE BUFFER
825:  053F B649           JF0     SNEXT1        ;NEW BUFFER IS #1
826:  0541 B86E           MOV     R0,#MT1BUF    ;NO, IS Z0. SET BUF #
827:  0543 B010           MOV     @R0,#NUACK1   ;FOR ZERO CHARACTERS + ACK
828:  0545 B85C           MOV     R0,#MT0BUF    ;SET PTR TO BUFFER # 0
829:  0547 A40A           JMP     RETRA2
830:  0549 B85C  SNEXT1:  MOV     R0,#MT0BUF    ;SET OLD BUFFER = 0
831:  054B B000           MOV     @R0,#NUACK0   ;FOR ACK+ZERO CHARACTERS
832:  054D B86E           MOV     R0,#MT1BUF    ;SET TO SEND BUFFER # 1
833:  054F A40A           JMP     RETRA2
834:
835:
836: AVOCET SYSTEMS 8048 CROSS-ASSEMBLER - VERSION 1.63
837:
838: NONWIRE(TM) SLAVE VER 2.04 (C) 1984  CONTROLONICS CORP
839:
840:
841:                ;
842:                ;     CHECK INPUT MESSAGE DATA WILL FIT IN HOST BUFFER
843:                ;
844:                ;     INPUT---FIRSTC IS CONTROL BYTE OF MESSAGE
845:                ;
846:                ;     OUTPUT
847:                ;         C=1 IF MESSAGE DATA WILL NOT FIT IN HOST XMIT BUFFER
```

```
848:                   ;         LRC=# DATA BYTES IN THE MESSAGE
849:                   ;         R0,A DESTROYED
850:                   ;
851: 0551 FF    CHKOUT: MOV   A,FIRSTC        ;GET CONTROL BYTE
852: 0552 530F          ANL   A,#0FH          ;MASK NUMBER DATA BYTES
853: 0554 AD            MOV   LRC,A           ;SAVE IN LRC
854: 0555 B825          MOV   R0,#HXCNT       ;COMPUTE -# FREE BYTES -1
855: 0557 23EC          MOV   A,#-(HXBSZ+1)   ;IN HOST TRANSMIT BUFFER
856: 0559 60            ADD   A,@R0
857: 055A 6D            ADD   A,LRC           ;C=1 IF OVERFLOW,ELSE C=0
858: 055B 83            RET
859:
860:
861: AVOCET SYSTEMS 8048 CROSS-ASSEMBLER - VERSION 1.63
862:
863: NONWIRE(TM) SLAVE VER 2.04 (C) 1984  CONTROLONICS CORP
864:
865:
866: 0600                 ORG 600H
867:                   ;
868:                   ; TRANSMIT CHARACTER TO HOST FROM HOST TRANSMIT BUFFER
869:                   ; IF THERE IS A CHARACTER TO SEND
870:                   ;
871:                   ;A,R0,R1 DESTROYED
872:                   ;1) TRANSMITER NOT READY -- 15 MSEC
873:                   ;2) TRANSMITTER READY NO DATA -- 30 MSEC
874:                   ;3) DATA PLUS NO BFER WRAP  -- 90 MSEC
875:                   ;4) DATA PLUS BUFFER WRAP   -- 90 MSEC
876:                   ;  NO SUBROUTINES CALLED (1 LEVEL USED)
877: 0600 9ADF   SENDHT: ANL  P2,#NOT CSEL    ;SELECT 8251
878: 0602 80            MOVX  A,@R0           ;GET USART STATUS
879: 0603 8A20          ORL   P2,#CSEL        ;DE-SELECT 8251
880: 0605 1208          JB0   SENDH1          ;TRANSMITTER READY
881: 0607 83    SENDH2: RET                   ;NO,ET
882: 0608 520B  SENDH1: JB2   SENDH3          ;TRNASMITTER BUFFER EMPTY?
883: 060A 83            RET                   ;NO SO CTS WILL THROTTLE OUTPUT
884: 060B B825  SENDH3  MOV   R0,#HXCNT       ;YES
885: 060D F0            MOV   A,@R0           ;ANYTHING IN BUFFER TO SEND
886: 060E C607          JZ    SENDH2          ;NO,GO EXIT
887: 0610 07            DEC   A               ;YES; DECREMENT COUNT
888: 0611 A0            MOV   @R0,A
889: 0612 C8            DEC   R0              ;PTR TO GET PTR
890: 0613 F0            MOV   A,@R0           ;GET THE GET POINTER
891: 0614 A9            MOV   R1,A
892: 0615 F1            MOV   A,@R1           ;GET CHARACTER
893: 0616 9A9F          ANL   P2,#NOT CTRLM+CSEL ;SET DATA ON C/D 8251+SELECT 8251
894: 0618 90            MOVX  @R0,A           ;SEND CHARACTER
895: 0619 8A60          ORL   P2,#CTRLM+CSEL  ;SET CTRL ON C/D 8251+DE-SELECT 8251
896: 061B 10            INC   @R0             ;ADVANCE GET POINTER
897: 061C F9            MOV   A,R1
898: 061D 03B4          ADD   A,#-MRBUF+1     ;GET PTR WRAPS AROUND
899: 061F 9607          JNZ   SENDH2          ;NO, EXIT
900: 0621 B03A          MOV   @R0,#HXBUF      ;RESET,ET POINTER TO BEGINNING
901: 0623 83            RET                   ;OFF THE BUFFER
902:
903:
```

```
904: AVOCET SYSTEMS 8048 CROSS-ASSEMBLER - VERSION 1.63
905:
906: NONWIRE(TM) SLAVE VER 2.04 (C) 1984  CONTROLONICS CORP
907:
908:
909:            ;
910:            ;       READ CHARACTER FROM HOST
911:            ;
912:            ;       R0,R1,A DESTROYED
913:            ;
914:            ;       THIS ROUTIN WILL READ CHARACTER FROM HOST AND STORE IN HRBUF.  IF
915:            ;       NUMBER CHARACTERS IN BUFFER IS LESS THAN THRESHOLD THEN DTR IS
916:            ;       CLEAR;ELSE DTR IS SET,  CHARACTER WILL BE STORED IN BUFFER.
917:            ;       IF USER CONTINUES TO SEND AFTER DTR IS CLEARED CHARACTERS WILL BE
918:            ;       ORED IN THE BUFFER UNTIL THE BUFFER IS COMPLETELY FULL AT WHICH
919:            ;       TIME INPUT CHARACTERS ARE THROWN AWAY.
920:            ;
921:            ;
922:            ;       A CHARACT PROPERLY RECEIVED WILL SET RTS=0.
923:            ;       A PARITY ERROR OR OVERRUN ERROR OR FRAMING ERROR WILL SET RTS=1.
924:            ;       NOTE RTS IS SET AFTER ERY CHARACTER IS READ. CHARACTERS RECEIVED
925:            ;       IN ERROR GET TRANSMITTED AS NULLS (ALL BINARY ZEROS).
926:            ;
927:            ;
928:            ;       TIMING
929:            ;       CASE 1 -0 INPUT CHARACTER -- 5 CYCLES -- 12.5 USEC
930:            ;       CASE 2 -- CHAR NO ERROR & NO SENDING BUFFER FULL
931:            ;               -- 46 CYCLES -- 115 USEC
932:            ;       SE 3 -- OTHER CASES MAX -- 58 CYCLES -- 145 USEC
933:            ;
934:            ;       THIS ROUTINE IS OPTIMIZED FOR SPEED NOT CODE DENSITY
935:            ;       A,R0,R1 DESTROYED;    NO SUBROUTINES CALLED (1 LEVEL USED)
936:            ;
937: 0624 FE     READH:  MOV    A,AFLAG          ;IF TEST MODE
938: 0625 3228           JB1    READH4           ;DONT NEED CHARACTER
939: 0627 83             RET
940: 0628 9ADF   READH4: ANL    P2,#NOT CSEL     ;SELECT 8251
941: 062A 80             MOVX   A,@R0            ;GET CHARACTER STATUS
942: 062B 8A20           ORL    P2,#CSEL         ;DE-SELECT 8251
943: 062D 3230           JB1    READH1           ;CHARACTER AVAILABLE
944: 062F 83             RET                     ;NO CHARACTER, EXIT
945: 0630 A9     READH1: MOV    R1,A             ;SAVE STATUS
946: 0631 9A9F           ANL    P2,#NOT CTRLM+CSEL
947: 0633 80             MOVX   A,@R0
948: 0634 8A60           ORL    P2,#CTRLM+CSEL
949: 0636 29             XCH    A,R1
950: 0637 5338           ANL    A,#RCERR         ;MASK ERROR BITS
951: 0639 9664           JNZ    READH2           ;ERROR?
952: 063B B822           MOV    R0,#HRCNT        ;NO
953: 063D F0             MOV    A,@R0
954: 063E 03F1           ADD    A,#-HRLIM
955: 0640 F657           JC     READH3
956:                     ;CASE IS GOOD DATA AND NO PENDING BUFFER OVERRUN
957: 0642 2307           MOV    A,#DTREN         ;DTR ON, XMIT&REC ENABLE
958: 0644 9ADF   READH8: ANL    P2,#NOT CSEL     ;SELECT 8251
959: 0646 90             MOVX   @R0,A            ;NO ERROR RESET
```

```
960:
961:
962: AVOCET SYSTEMS 8048 CROSS-ASSEMBLER - VERSION 1.63
963:
964: NONWIRE(TM) SLAVE VER 2.04 (C) 1984  CONTROLONICS CORP
965:
966:
967:  0647 8A20              ORL     P2,#CSEL        ;DE-SELECT 51
968:  0649 10      READH5:   INC     @R0             ;ADVANCE CHARCTER COUNT
969:  064A 18                INC     R0              ;SET PTR TO PUT PTR
970:  064B F0                MOV     A,@R0           ;PUT PTR TO R1
971:  064C 29                XCH     A,R1            ;STORE CHARACR
972:  064D A1                MOV     @R1,A           ;STORE CHARACTER
973:  064E 10                INC     @R0             ;ADVANCE PUT PTR
974:  064F F0                MOV     A,@R0           ;IF OVERFLOW
975:  0650 03C6              ADD     A,#-HXBUF       ;WRAP AROUND
976:  0652 9656              JNZ     READH9          ;TO BEGINING OF BUFFER
977:  0654 B027              MOV     @R0,#HRBUF
978:  0656 83     READH9:    RET
979:             ;CASE IS GOOD DATA AND PENDING BUFFER OVERRUN
980:  0657 2305  READH3:     MOV     A,#DTRDIS       ;TX,RX ENABLENO ERROR
981:  0659 9ADF  READH7:     ANL     P2,#NOT CSEL    ;SELECT 8251
982:  065B 90                MOVX    @R0,A           ;RESET, TURN OFF DTR
983:  065C 8A20              ORL     P2,#CSEL        ;DE-SELECT 8251
984:  065E F0                MOV     A,@R0           ;ST TO SEE IF BUFFER
985:  065F 03ED              ADD     A,#-HRBSZ       ;COMPLETELY FULL?
986:  0661 9649              JNZ     READH5          ;NOT YET, BUT BETTER STOP SOON
987:  0663 83     P5EXIT:    RET                     ;SHOULD HAVE LISTENED TRASH CHAR
988:             ;CHARACTER IN ERROR
989:  0664 27     READH2:    CLR     A               ;SET CHAR = 0
990:  0665 A9                MOV     R1,A            ;IN R1
991:  0666 B822              MOV     R0,#HRCNT
992:  0668 F0                MOV     A,@R0
993:  0669 03F1              ADD     A,#-HRLIM       ;BUFER OVERRUN PENDING
994:  066B F671              JC      READH6          ;YES
995:             ;CASE IS CHAR IN ERROR BUT NO PENDING OVERRRUN
996:  066D 2337              MOV     A,#DTREN+ERRST+RTSH    ;RESET ERRO RX - TX
997:  066F C444              JMP     READH8
998:             ;CASE IS CHAR IN ERROR + PENDING OVERRUN
999:  0671 2335  READH6:     MOV     A,#DTRDIS+ERRST+RTSH
1000: 0673 C459              JMP     READH7
1001:
1002:
1003: AVOCET SYSTEMS 8048 CROSS-ASSEMBLER - VERSION 1.63
1004:
1005: NONWIRE(TM) SLAVE VER 2.04 (C) 1984  CONTROLONICS CORP
1006:
1007:
1008:                        ;
1009:                        ;THIS ROUTINE WILL LOOPBACK DATA RECEIVED OVER THE MODEM IF THE
1010:                        ;SYSTEM IS A SLAVE RUNNING IN TE MODE.
1011:                        ;    INPUTS: TEMP,LRC=#CHARACTERS RECEIVE BUFFER
1012:                        ;    OUTPUTS: IF TEST MODE, THE MODEM RECEIVE BUFFER WILL BE
1013:                        ;             COPIED TALTERNATE MODEM TRANSMIT BUFFER AND COUNT
1014:                        ;             FIELD INITIALIZED.
1015:                        ;A,R0,R1 DESTROYED
```

```
1016:           ;
1017: 0675 FE   LOOPBK: MOV    A,AFLAG         ;ARE WE SLAVE
1018: 0676 328E         JB1    LOOPB1          ;RUNNING IN TEST MODE
1019: 0678 B85C         MOV    R0,#MT0BUF      ;YES, SET R0=PTR TO
1020: 067A B67E         JF0    LOOPB2          ;ALTERNATE BUFFER
1021: 067C B86E         MOV    R0,#MT1BUF
1022: 067E F0   LOOPB2: MOV    A,@R0           ;SET NUMBER OF CHARACTERS
1023: 067F 53F0         ANL    A,#0F0H         ;IN THE BUFFER
1024: 0681 6A           ADD    A,TEMP
1025: 0682 A0           MOV    @R0,A
1026: 0683 18           INC    R0              ;BYPASS SLAVE ADDRESS
1027: 0684 B94D         MOV    R1,#MRBUF       ;COPY RECEIVED BUFFER TO
1028: 0686 F1   LOOPB3: MOV    A,@R1           ;ALTERNATE BUFFER
1029: 0687 18           INC    R0              ;POINT TO NEXT BYTE DATA
1030: 0688 A0           MOV    @R0,A
1031: 0689 19           INC    R1
1032: 068A EA86         DJNZ   TEMP,LOOPB3
1033: 068C FD           MOV    A,LRC           ;RESET # CHARACTERS'
1034: 068D AA           MOV    TEMP,A
1035: 068E 83   LOOPB1: RET
1036:
1037:
1038: AVOCET SYSTEMS 8048 CROSS-ASSEMBLER - VERSION 1.63
1039:
1040: NONWIRE(TM) SLAVE VER 2.04 (C) 1984  CONTROLONICS CORP
1041:
1042:
1043:           ;
1044: 0700             ORG    700H
1045:           ;
1046:           ;       PAGE 7 ---) CLOCK INTERRUPT SERVICER
1047:           ;*************************************************************
1048:           ;******CAUTION *** DO NOT CHANGE THIS CODE IF YOU ARE NOT 100% UP TO SED
1049:           ;******ON WHAT IT DOES ****************************************
1050:           ;
1051:           ;
1052:           ;TIMING  ASSUMING 6 MHZ CLOCK, 2.5 USEINS CYCLE
1053:           ;
1054:           ;       TRANSMITTER
1055:           ;       THE TRANSMIT SIDE OF MODEM COMMUNICATIONS OUTPUTS THE SERIAL
1056:           ;       CHARACTER INFORMATION ONE BIT AT TIME. EACH BIT IS EXACTLY
1057:           ;       347.5 USEC IN LENGTH GIVING A BAUD RATE OF 2877.7 BITS/SEC.
1058:           ;       EACH CHARACTER IS 8 DATA BITS, 1 PARY BIT, 1 START BIT,
1059:           ;       AND 1 STOP BIT.  THE EFFECTIVE CHARACTER THROUGHPUT IS 261.6 CHARACTERS
1060:           ;       PER SEC. IN A FULLY LOADED SYSM EACH 15 DATA CHARCTERS INCLUDES 8
1061:           ;       BITS OF LRC AND AN 8 BIT HEADER.  THEREFORE THE EFFECTIVE USER DATA
1062:           ;       RATE IS (261.6)*157=230.8 CHARACTERS PER SEC OR 115.41 CHARACTERS
1063:           ;       PER SEC ENTERING EACH SIDE (11 BIT CHARACTERS) CONCURRENTLY.
1064:           ;       THE MAXIMUM NTINUOUS FULL DUPLEX RATE AT WHICH THE PLEXUS CAN
1065:           ;       HANDLE IS THEREFORE 1154.1 BAUD ON BOTH SIDES.  A SECOND ORDER
1066:           ;       EFFECT S BEEN IGNORED IN THAT THE STOP BIT IS SLIGHTLY LONGER THAN
1067:           ;       ONE BIT BECUASE OF LATENCY IN THE SOFTWARE.
1068:           ;       ERROR RETRIES HAVALSO BEEN IGNORED.
1069:           ;
1070:           ;
1071:           ;       THE TIMING IS DERIVED AS FOLLOWS
```

```
1072:           ;       CLOCK INTERRUT PERIOD —320 USEC
1073:           ;       VECTOR OVERHEAD — 17.5 USEC;   CLOCK SETUP — 10 USEC
1074:           ;
1075:           ;       THIS IMPLES THAT WHILE TRANSMITTING THE CLOCK IS INTERRUPTING ONCE
1076:           ;       EVERY 347.5 USEC. THE BIT TNSITIONS ARE ACTUALLY OCCURRING 32.5
1077:           ;       USEC AFTER EACH INTERRUPT.
1078:           ;
1079:           ;
1080:           ;RECEIVER
1081:           ;
1082:           ;       THE SAMPLING PERIOD FOR A START BIT IONCE EVERY 107.5 USEC. ONCE
1083:           ;       A START BIT IS SEEN IT IS VERIFIED 112.5 USEC LATER AND SAMPLING OF
1084:           ;       DATA COMMENCES ONCE EVERY 7.5 USEC.
1085:           ;
1086:           ;       START BIT SEEN (0,107.5 USEC)
1087:           ;       START BIT VERIFIED (112.5, 220 USEC)
1088:           ;       FIRST DATA READ AT (112.5+347.5,220+347)
1089:           ;       THE CONSEQUENCE OF THIS IS THAT DATA IS ALWAYS READ BETWEEN
1090:           ;       (.32, .63) OF PULSE IE ROUGHLY MIDDLE 1/3 OF THE BIT
1091:           ;
1092:           ;
1093:           ;
1094:
1095:
1096: AVOCET SYSTEMS 8048 CROSS-ASSEMBLER - VERSION 1.63
1097:
1098: NONWIRE(TM) SLAVE VER 2.04 (C) 1984  CONTROLONICS CORP
1099:
1100:
1101:           ;       THE USER MUST FIRST INITIALIZE THE MODEM CLOCK DRIVER.  THIS INITIAL-
1102:           ;       IZATION CONSISTS OF:
1103:           ;               CLEARING L BANK 1 REGISTERS
1104:           ;               RESETTING FLAG 1
1105:           ;               SET TRANSMIT OUTPUT=MARK
1106:           ;       THE MODEM THEN CAN BE STARTED IN ONE OF 2 MODES
1107:           ;               RECEE
1108:           ;                       SET STATE = 0 (R4 OF BANK 1)
1109:           ;                       ENABLE CLOCK AT INITIAL VALUE TOBIT
1110:           ;               TRANSMIT
1111:           ;                       SET STATE = 5 (R4 OF BANK 1)
1112:           ;               LACE PTR TO OUTPUT MESSAGE XPTR (R1 BANK 1)
1113:           ;                       ENABLE CLOCK AT INITIAL VALUE TOBIT
1114:           ;       ONCE STARTED THE MODEM INTERFACE WILL COINUOUSLY RUN AS LONG AS THE
1115:           ;       8049 TIMER IS ENABLED.
1116:           ;       ONCE RUNNING THE USER MUST
1117:           ;               ============
1118:           ;               RECEIVE DATA
1119:           ;               ============
1120:           ;               SET STATE = 0 (R4 BANK 1)
1121:           ;               F1 WILL BE SET IF NO CHARACTER RECEIVED IN 5.6 CHAR PERIODS.
1122:           ;               IF CHARACTER RECEIVED THRCAV FLAG WILL BE SET (BIT 0 OF R2
1123:           ;                       IN BANK 1)
1124:           ;               IF ERROR THE ERROR FLAG WILL ALSO BE SET (BIT 1 & 2
1125:           ;                       OF R2 OF BANK 1)
1126:           ;       IT IS THE USERS RESPONSIBILITY TO CLEAR F1 ON A TIMEOUT.  ALSO THE
1127:           ;       RECEIVE DATA FLAG AND ERROR FLAG MUST BE RESET BY THUSER.
```

```
1128:
1129:            ;       IN FACT, IF THE RECEIVE DATA FLAG IS NOT CLEARED THEN THE NEXT RECEIVED
1130:            ;       CHARACTER WILL GENERATE AN OVERRUN ERROR.HE USER MUST UNLOAD RDATA
1131:            ;       AND RESET RCAV IN 1 CHARACTER TIME (3.8 MSEC) TO AVOID OVERRUNS.
1132:            ;       THE MODEM DRIVER WILL CONTINUED READ INPUT CHARACTERS UNTIL TOLD
1133:            ;       TO TRANSMIT BY THE APPLICATION. THIS IS ACCOMPLISHED BY
1134:            ;               PLACING PTR TO MESSAGE IN XPT(BANK1,R1)
1135:            ;               SETTING STATE TO 5 (R4 IN BANK 1)
1136:            ;       THE MESSAGE WILL BE OUTPUT
1137:            ;       AFTER THE MESSAGE IS READ THE DRIVER WILL STA MONITORING RECEIVE
1138:            ;       DATA FOR INPUT CHARACTERS.
1139:            ;       THE FORMAT OF THE MESSAGE IS
1140:            ;               BYTE 1 -- LS 4 BITS -- NO. OF DATA BYTES NOT INCLUDING
1141:            ;                                       BYTE 1 (0 TO 15)
1142:            ;                       -- BIT 4 - SEQUENCE #
1143:            ;                       -- BIT 5-6 - UNUSED=ZERO
1144:            ;                       BIT 7 - 1=NAK, 0=OK
1145:            ;               BYTE 2 --       ADDRESS
1146:            ;               BYTE 3 TO 17 --         DATA BYTES
1147:            ;               BYTE 18 --              LRC
1148:            ;       BYTE 18 WILL BE COMPUTED AND PLACED IN BUFFER BY TRANSMIT
1149:            ;       ROUTINE. BUFFER SIZE IS 18 BYTES.
1150:            ;
1151:            ;
1152:
1153:
1154: AVOCET SYSTEMS 8048 CROSS-ASSEMBLER - VERSION 1.63
1155:
1156: NONWIRE(TM) SLAVE VER 2.04 (C) 1984  CONTROLONICS CORP
1157:
1158:
1159:            ;       STATE VECTOR TABLE ON CLOCK INTERRUPT SERVICE
1160:            ;       (*MUST BE ALIGNED ON PAGE BOUNDARY*);
1161: 0700 15    VTABLE: DB      SBSRC-VTABLE            ;STATE 0 = SEARCHING FOR START BIT
1162: 0701 25            DB      VSB-VTABLE              ;STATE 1 = VERIFY START BIT
1163: 0702 3B            DB      RRDATA-VTABLE           ;STAT2 = RECEIVE 8 DATA BITS
1164: 0703 4D            DB      RPARTY-VTABLE           ;STATE 3 = READ PARITY
1165: 0704 5F            DB      RSTOP-VTABLE            ;STATE 4 = VERIFY STOP BIT
1166: 0705 79            DB      XMITI-VTABLE            ;STATE 5 = TRANSMIT START SET B0
1167: 0706 A2            DB      XMITD-VTABLE            ;STATE 6 = TRANSMIT B0, SET B1
1168: 0707 A2            DB      XMITD-VTABLE            ;STATE 7 = TRANSMIT B1, T B2
1169: 0708 A2            DB      XMITD-VTABLE            ;STATE 8 = TRANSMIT B2, SET B3
1170: 0709 A2            DB      XMITD-VTABLE            ;STATE 9 = TRANSMIT B3, SET B4
1171: 070A A2            DB      XMITD-VTABLE            ;STA 10= TRANSMIT B4, SET B5
1172: 070B A2            DB      XMITD-VTABLE            ;STATE 11= TRANSMIT B5, SET B6
1173: 070C A2            DB      XMITD-VTABLE            ;STATE 12= TRANSMIT B6, SET B7
1174: 070D A2            DB      XMITD-VTABLE            ;STATE 13= TRANSMIT B7, SET PARITY
1175: 070E BE            DB      XMITS-VTABLE            ;STATE 14= TRANSMIT PARITY SET STOP
1176: 070F CE            DB      XMITT-VTABLE            ;STAT15= TRANSMIT STOP+WAIT
1177: 0710 D3            DB      XMITG-VTABLE            ;STATE 16= STOP BIT COMPLETE TERMINATE
1178:            ;
1179:            ;       TIMER INTERRUPT SERVICER --) 5 CYCLES + CYCLES ON
1180:            ;       JTF UART AT LOC 7 TO GET HERE = 17.5 USEC TO ACTUALLY PERFORM VECTOR
1181:            ;
1182: 0711 D5    UART:   SEL     RB1                     ;SELECT ALTERNATE BANK
1183: 0712 A8            MOV     ATEMP,A                 ;SAVE A
```

```
1184:  0713 FC              MOV     A,STATE          ;GET STATE
1185:  0714 B3              JMPP    @A               ;VECTOR
1186:                  ;
1187:                  ;    STATE 0 ---) SEARCHING FOR START BIT
1188:                  ;
1189:                  ;    46% GPROCESSOR IS USED DURING START BIT SEARCH
1190:                  ;
1191:                  ;
1192:                  ;
1193:                  ;
1194:  0715 23FE     SBSRC:  MOV     A,#TQBIT         ;SET TIME FOR 1/4 BIT PERIOD
1195:  0717 62              MOV     T,A              ;MARK
1196:  0718 561D            JT1     SBSRC1           ;YES
1197:  071A 1C      SBSRC2: INC     STATE            ;NO, POSSIBLE START BIT, ADVANCE
1198:  071B F8              MOV     A,ATEMP          ;STATE, RESTORE A AND DISMISS
1199:  071C 93              RETR                     ;INRRUPT SERVICER
1200:  071D 1B      SBSRC1: INC     XCNTRT           ;ADVANCE TIMEOUT COUNTER
1201:  071E FB              MOV     A,XCNTRT         ;=64 BITS = 5,8 CHAR TIMES
1202:  071F 9623            JNZ     SBSRC3           ;OVERFLO
1203:  0721 A5              CLR     F1               ;YES, SET TIMER OVERFLOW
1204:  0722 B5              CPL     F1               ;ERROR BUT KEEP LOOKING
1205:  0723 F8      SBSRC3: MOV     A,ATEMP          ;LET APPLICATION FIGURE IT OUT
1206:  0724 93              RETR
1207:                  ;
1208:                  ;    STATE 1 ---) VERIFY START BIT
1209:                  ;
1210:
1211:
1212: AVOCET SYSTEMS 8048 CROSS-ASSEMBLER -  VERSION 1.63
1213:
1214: NONWIRE(TM) SLAVE VER 2.04 (C) 1984  CONTROLONICS CORP
1215:
1216:
1217:  0725 462D     VSB:    JNT1    GOODST           ;MARK?
1218:  0727 CC              DEC     STATE            ;YES, WAS NOISE, BACK
1219:  0728 23FE            MOV     A,#TQBIT         ;CONTINUE START
1220:  072A 62              MOV     T,A              ;BIT SEARCH
1221:  072B F8              MOV     A,ATEMP          ;RESTORE A AND
1222:  072C 93              RETR                     ;DISMISS INTERRUPT
1223:  072D 23F8     GOODST: MOV    A,#TOBIT         ;SET RE = I BIT TIME, SOFTWARE
1224:  072F 62              MOV     T,A              ;CORRECTION NECESSARY FOR SKEW
1225:  0730 BB00            MOV     XCNTRT,#0        ;ZERO RECEIVE CHARACTER TIMER
1226:  0732 237F            MOV     A,#NOT PARAC     ;CLEAR RUNNING PARITY
1227:  0734 5A              ANL     A,FLAGSS         ;ACCUMULATE
1228:  0735 AA              MOV     FLAGSS,A         ;SHIFT REGISTER INITIALIZE
1229:  0736 BD80            MOV     XREG,#080H       ;GO ADVANCE ATE AND
1230:  0738 1C              INC     STATE            ;DISMISS INTERRUPT
1231:  0739 F8              MOV     A,ATEMP
1232:  073A 93              RETR
1233:                  ;
1234:                  ;    STATE 2 ---) READ 8 DATA BITS
1235:                  ;
1236:  073B 23F8     RRDATA: MOV    A,#TOBIT         ;RESTART CLOCK
1237:  073D 62              MOV     T,A
1238:  073E 97              CLR     C                ;A = RECEIVE DATA
1239:  073F 4646            JNT1    RDATA1           ;RECEIVE DATA = 1
```

```
1240: 0741 A7              CPL     C                       ;YES, TOGGLE PARITY
1241: 0742 FA              MOV     A,FLAGSS
1242: 0743 D380            XRL     A,#PARAC
1243: 0745 AA              MOV     FLAGSS,A
1244: 0746 FD      RDATA1: MOV     A,XREG                  ;SHIFT RECEIVE DATA
1245: 0747 67              RRC     A                       ;BIT INTO SHIFT REGISTER
1246: 0748 AD              MOV     XREG,A
1247: 0749 F61A            JC      SBSRC2                  ;IF A CY OUT THEN 8 DATA BITS
1248: 074B F8              MOV     A,ATEMP                 ;READ;ELSE KEEP READING
1249: 074C 93              RETR
1250:                  ;
1251:                  ;   STATE 3 ---> READ PARITY BIT;
1252: 074D 23F8    RPARTY: MOV     A,#TQBIT                ;START TIMER GOING
1253: 074F 62              MOV     T,A                     ;AGAIN
1254: 0750 FA              MOV     A,FLAGSS                ;IF RECEIVE DATA IS 1
1255: 0751 4655            JNT1    RPART1                  ;THEN TOGGLPARITY
1256: 0753 D380            XRL     A,#PARAC                ;ERROR?
1257: 0755 F7      RPART1: RLC     A                       ;PARITY IS EVEN OR ERROR
1258: 0756 77              RR      A
1259: 0757 E65B            JNC     RPART2                  ;ERROR?
1260: 0759 4304            ORL     A,#VERR                 ;YES, SETRROR FLAG
1261: 075B AA      RPART2: MOV     FLAGSS,A                ;GO DISMISS INTERRUPT
1262: 075C 1C              INC     STATE
1263: 075D F8              MOV     A,ATEMP
1264: 075E 93              RETR
1265:                  ;
1266:                  ;   STATE 4 ---> READ STOP BIT;
1267: 075F 23FE    RSTOP:  MOV     A,#TQBIT                ;SET 1/4 BIT INTERRUPT
1268:
1269:
1270: AVOCET SYSTEMS 8048 CROSS-ASSEMBLER - VERSION 1.63
1271:
1272: NONWIRE(TM) SLAVE VER 2.04 (C) 1984  CONTROLONICS CORP
1273:
1274:
1275: 0761 62              MOV     T,A
1276: 0762 FA              MOV     A,FLAGSS                ;CHARACTER IN BUFFER
1277: 0763 1272            JB0     RSTOP1                  ;YES, OVERRUN
1278: 0765 5669            JT1     RSTOP2                  ;NO, MARK LINE
1279: 0767 4302            ORL     A,#ERR                  ;NO, FRAMING ERROR
1280: 0769 4301    RSTOP2: ORL     A,#RCAV                 ;SET RECEIVE DATA AVAILABLE
1281: 076B AA              MOV     FLAGSS,A                ;
1282: 076C FD              MOV     A,XREG                  ;MOVE CHARACTER TO
1283: 076D A9              MOV     RDATA,A                 ;RECEIVE BUFFER]
1284: 076E BC00            MOV     STATE,#0                ;SET STATE 0
1285: 0770 F8              MOV     A,ATEMP                 ;DISMISS INTERRU
1286: 0771 93              RETR
1287: 0772 4302    RSTOP1: ORL     A,#ERR                  ;SET ERROR
1288: 0774 AA              MOV     FLAGSS,A                ;
1289: 0775 BC00            MOV     STATE,#0                ;SET STATE 0
1290: 0777 F8              MOV     A,ATEMP                 ;RESTORE A
1291: 0778 93              RETR                            ;DIISS INTERRUPT
1292:                  ;
1293:                  ;   STATE 5 ---> INITIAL XMIT MESSAGE STATE
1294:                  ;   *NOTE - ONLY 100 USEC LEFT OUT OF 320**************;
1295: 0779 F1      XMIT1:  MOV     A,@XPTR                 ;GET 1ST CHAR OF MESSAGE
```

```
1296:  077A 530F           ANL     A,#0FH              ;GET # DATA BYTES
1297:  077C 17             INC     A                   ;GET COUNTER ON TOTAL # OF
1298:  077D 17             INC     A                   ;BYTES
1299:  077E AD             MOV     XREG,A
1300:  077F 17             INC     A
1301:  0780 AB             MOV     XCNTRT,A            ;SET COUNTER
1302:  0781 23F8           MOV     A,#TOBIT            ;START COUNTER
1303:  0783 62             MOV     T,A
1304:  0784 8A08           ORL     P2,#MARK            ;SET START BIT(SPACE)
1305:  0786 F9             MOV     A,XPTR              ;COMPUTE LRC FOR THE
1306:  0787 AC             MOV     STATE,A             ;MESSAGE AND STORE
1307:  0788 27             CLR     A                   ;INTO LASTOSITION IN BUFFER
1308:  0789 D1     XMITT1: XRL     A,@XPTR
1309:  078A 19             INC     XPTR
1310:  078B ED89           DJNZ    XREG,XMITT1
1311:  078D A1             MOV     @XPTR,A
1312:  078E FC             MOV     A,STATE             ;RESTORE USER PTR
1313:  078F A9             MOV     XPTR,A
1314:  0790 BC05           MOV     STATE,#XSVAL        ;RESTORE STATE
1315:  0792 27     XMITT4: CLR     A                   ;CLEAR PARITY
1316:  0793 AA             MOV     FLAGSS,A
1317:  0794 F1             MOV     A,@XPTR             ;GET FIRST CHARACTER OUTPUT
1318:  0795 67     XMITT2: RRC     A                   ;GET NEXT BIT TO OUTPUT
1319:  0796 AD             MOV     XREG,A              ;UPDATE SHIFT REGISTER'
1320:  0797 FA     XMITT3: MOV     A,FLAGSS            ;SET UP BITX BIT REFLECT
1321:  0798 53BF           ANL     A,#NOT BITX         ;NEXT BIT TO OUTPUT
1322:  079A E69E           JNC     XMITT5              ;0--)IF NEXT BIT IS 0
1323:  079C 4340           ORL     A,#BITX             ;1--)IF NEXT BIT IS 1
1324:  079E AA     XMITT5: MOV     FLAGSS,A
1325:  079F 1C             INC     STATE               ;ADVANCE STATE
1326:
1327:
1328: AVOCET SYSTEMS 8048 CROSS-ASSEMBLER - VERSION 1.63
1329:
1330: NONWIRE(TM) SLAVE VER 2.04 (C) 1984  CONTROLONICS CORP
1331:
1332:
1333:  07A0 F8             MOV     A,ATEMP             ;RESTORE A REGISTER
1334:  07A1 93             RETR                        ;DISMISS INTERRUPT
1335:              ;
1336:              ;       STATES 6,7,8,9,10,11,12 ---) OUTPUT DATA BITS
1337:              ;
1338:  07A2 23F8   XMITD:  MOV     A,#TOBIT            ;RESTART TIMER
1339:  07A4 62             MOV     T,A
1340:  07A5 FA             MOV     A,FLAGSS
1341:  07A6 D2AC           JB6     XMITD1              ;OPUT NEXT DATA BIT = BITX
1342:  07A8 8A08           ORL     P2,#MARK            ;ON TRANSMITTED DATA
1343:  07AA E4B2           JMP     XMITD2
1344:  07AC 9AF7   XMITD1: ANL     P2,#NOT MARK
1345:  07AE FA             MOV     A,FLAGSS            ;DATA BIT A 1. TOGGLE
1346:  07AF D380           XRL     A,#PARAC            ;HORIZONTAL ??? PARITY
1347:  07B1 AA             MOV     FLAGSS,A            ;ACCUMULATION
1348:  07B2 FC     XMITD2: MOV     A,STATE
1349:  07B3 03F3           ADD     A,#-13              ;ARE WE SENDING MSB?
1350:  07B5 C6BA           JZ      XMITD3              ;YES,GO SET FOR PARITY NEXT
1351:  07B7 FD             MOV     A,XREG              ;GET CHARACTER
```

```
1352:  07B8 E495            JMP    XMITT2           ;GO SET NEXT BIT
1353:  07BA FA    XMITD3:   MOV    A,FLAGSS         ;SET CARRY FOR
1354:  07BB F7              RLC    A                ;PARITY NEXT TIME
1355:  07BC E497            JMP    XMITT3
1356:                ;
1357:                ;      STATE 14 ---) TRANSMIT PARY, SET STOP
1358:                ;
1359:  07BE 23F8   XMIT5:   MOV    A,#TOBIT         ;RESTART TIMER
1360:  07C0 62              MOV    T,A              ;SEND PARITY BIT
1361:  07C1 FA              MOV    A,FLAGSS         ;=BITX
1362:  07C2 D2C9            JB6    XMIT51
1363:  07C4 8A08            ORL    P2,#MARK
1364:  07C6 1C              INC    STATE            ;ADVANCE STATE AND
1365:  07C7 F8              MOV    A,ATEMP          ;DISMISS INTERRUPT
1366:  07C8 93              RETR
1367:  07C9 9AF7   XMIT51:  ANL    P2,#NOT MARK
1368:  07CB 1C              INC    STATE            ;ADVANCE STE
1369:  07CC F8              MOV    A,ATEMP          ;DISMISS
1370:  07CD 93              RETR                    ;INTERRUPT
1371:                ;
1372:                ;      STATE 15 ---) OUTPUT STOP BIT
1373:                ;
1374:  07CE 23F8   XMIT7:   MOV    A,#TOBIT         ;RESTART ME BASE
1375:  07D0 62              MOV    T,A
1376:  07D1 E4C9            JMP    XMIT51           ;MAINTAIN EXACT TIMING
1377:                ;
1378:                ;      STATE 16 ---) STOP BIT DURATION COMPLETE
1379:                ;
1380:  07D3 EBDE   XMIT6:   DJNZ   XCNTRT,XMIT61    ;MORE DATA
1381:  07D5 A5              CLR    F1               ;RESET RECEIVE CHARACTER TIMEOUT
1382:  07D6 23FE            MOV    A,#TGBIT         ;NO, SET 1/4 BIT
1383:  07D8 62              MOV    T,A              ;TIMER
1384:
1385:
1386: AVOCET SYSTEMS 8048 CROSS-ASSEMBLER - VERSION 1.63
1387:
1388: NONWIRE(TM) SLAVE VER 2.04 (C) 1984  CONTROLONICS CORP
1389:
1390:
1391:  07D9 27              CLR    A                ;STATE =0
1392:  07DA AC              MOV    STATE,A          ;ERROR+RECEIVE DATA
1393:  07DB AA              MOV    FLAGSS,A
1394:  07DC F8              MOV    A,ATEMP          ;RESTORE A
1395:  07DD 93              RETR                    ;DISMISS INTERRUPT
1396:  07DE 23F8   XMIT61:  MOV    A,#TOBIT         ;START FULL BIT TIMER
1397:  07E0 62              MOV    T,A
1398:  07E1 2305            MOV    A,#XSVAL         ;(TIMING)
1399:  07E3 8A08            ORL    P2,#MARK         ;SET START BIT(SPACE)
1400:  07E5 AC              MOV    STATE,A          ;S CORRECT STATE NEXT CHAR
1401:  07E6 19              INC    XPTR             ;ADVANCE MESSAGE PTR
1402:  07E7 E492            JMP    XMITT4
1403:  0000                 END
```

Having described our invention, what we claim as new and desire to secure by Letters Patent is:

1. A receiver for a local area network utilizing a digital carrier modulated transmission channel comprising:

A. means for detecting carrier and providing a square wave corresponding to it; and B. a state machine for receiving said square wave said state machine being programmed to produce a binary output data signal that changes state only when said square wave has changed between existence and nonexistence for a predetermined time duration.

2. A receiver as defined in claim 1 wherein digital signals transmitted over said local area network exist for a predetermined number of carrier cycles; and, C. clock means for supplying to said state machine a clock signal at a multiple of the frequency of said carrier, and said state machine being responsive thereto to change its state.

3. A receiver as defined in claims 1 or 2 wherein said state machine sets its output data signal to one state upon determining the receipt of a first predetermined number of consecutive good square wave cycles and does not set its output data signal to the opposite state until determining that a second predetermined number of consecutive square wave cycles has not been received.

4. A transceiver for a local area network utilizing a digital carrier modulated transmission channel comprising:

A. a state machine for receiving a square wave corresponding to received carrier, said state machine being programmed to produce a binary output data signal that changes state only when said square wave has changed between existence and non existence for a predetermined time; and B. a microprocessor connected to receive said data signal from said state machine, said microprocessor being connectable to a host device and, said microprocessor being programmed for a message format comprising:

1 bit for Ack or Nack;
1 bit for a message sequence number;
A data block; and,
A logical redundancy check.

* * * * *